United States Patent [19]
Logg

[11] Patent Number: 4,738,451

[45] Date of Patent: Apr. 19, 1988

[54] MULTI-PLAYER, MULTI-CHARACTER COOPERATIVE PLAY VIDEO GAME WITH INDEPENDENT PLAYER ENTRY AND DEPARTURE

[75] Inventor: George E. Logg, Los Altos, Calif.

[73] Assignee: Atari Games Corporation

[21] Appl. No.: 865,387

[22] Filed: May 20, 1986

[51] Int. Cl.[4] .................................... A63F 9/22

[52] U.S. Cl. ........................ 273/153 R; 273/DIG. 28

[58] Field of Search ............ 273/1 E, 85 G, DIG. 28, 273/138 A, 153 R

[56] References Cited

U.S. PATENT DOCUMENTS 4,477,069 10/1984 Crudgington, Jr. .............. 273/85 G
4,504,055 3/1985 Wells ...................... 273/DIG. 28 X
4,572,509 2/1986 Sitrick ............................ 273/1 E X

FOREIGN PATENT DOCUMENTS 2153189 8/1985 United Kingdom ............. 273/85 G

OTHER PUBLICATIONS

"Quartet", May 6, 1986, Atari Corp.
"Dandy", John Palevich, ©1983.
"Game Machine", May 1, 1986.
"Ali–Baba", Stuart Smith, ©1981.

*Primary Examiner*—Maryann Lastova
*Attorney, Agent, or Firm*—Ciotti & Murashige, Irell & Manella

[57] ABSTRACT

A multi-player, multi-character video game where the game rules force the players to cooperate in negotiating the maze at least until the characters reach a portion of the maze where a specific objective is located. Certain limited resources to change the attributes of the characters or to increase their longevity are displayed in a maze. The players may compete to obtain possession of these limited resources when the characters have cooperated in their movements sufficiently to move to the location of the limited resources. Cooperation among the characters is forced by forcing all characters active in the game to remain visible in the displayed window. Players may enter the game at any time, and they may leave the game at any time without affecting the status of the game or the status of the other characters in the game. All active players may simultaneously, independently control their characters so long as they do not attempt to move their characters outside the currently displayed window.

21 Claims, 5 Drawing Sheets

MAIN LOOP

ATTEMPT TO RESPOND

START A PLAYER

COLLISION ROUTINES

MAZE EXIT COLLISION PROCESSING

MULTI-PLAYER, MULTI-CHARACTER COOPERATIVE PLAY VIDEO GAME WITH INDEPENDENT PLAYER ENTRY AND DEPARTURE

BACKGROUND OF THE INVENTION

The invention pertains to the field of video games, and, more particularly, to the field of video games where multiple players may simultaneously control multiple characters and are encouraged by the game to cooperate in defeating a maze populated by longevity decreasing entities to obtain limited resources in the form of longevity increasing resources.

In prior video games, multi-player games have been available where each player controls a character independently and without being forced to cooperate by the game. One example is Dandy. In this game, each player may control his particular character in a maze, but the characters are not forced by the game to cooperate in negotiating the maze in the sense that each player may independently move his character off the screen to wander blindly, while the other players are manipulating their characters on the screen. In another game, Ali Baba, the players are also allowed to independently control the actions of their characters, but each player is assigned a time slice during play of the game and may control his character only during this time slice. The time slice is rotated so that each player may take a turn, but the players may not all simultaneously control their characters at the same time to independently or cooperatively negotiate the maze or defeat longevity decreasing entities in the maze. The characters do not need to be all in the same portion of the maze. Each character's portion of the maze is displayed independently during the character's time slice. Thus no cooperation between characters to negotiate the maze is forced by the game.

It is useful in a multi-player video game to allow any player to enter the game or leave at any time. This makes the game more social in the sense that a game may be started by any player or players and other players may join at will and begin cooperating or competing with the other players by simultaneously controlling his character while the other players are manipulating their respective characters. Neither of the aforementioned games allows simultaneous control of all characters, independent entry and departure of players at will and forced cooperation between players. In Ali Baba, the players may enter and leave at any time, but may not all simultaneously control their characters. Further, there is no restriction on the characters wanderings through the maze in the sense that the display changes during each player's time slice to show the particular portion of the maze in which that player's character is located. The characters do not have to all be visible at all times in the same portion of the maze. In Dandy, there is no restriction which prevents the characters from leaving the visible area, and the players must all start at the same time. Thus, no current video game of which the applicants are aware provides the features of allowing the players to join the game or leave at any time and simultaneously control their characters. Further, the games known to the applicants do not encourage the players to cooperate in defeating the maze.

SUMMARY OF THE INVENTION

In accordance with the teachings of the invention, an apparatus and method are provided to fill the above described need. The invention includes known video game apparatus including a computer, typically a microprocessor, which runs a program implementing the rules of the game and which causes the computer to read the controls at each player station and determine how many players are in the game and which characters each player is controlling. The computer provides for multiple characters, each of which may have different attributes such as speed of movement, fighting abilities, magical powers, shot power, shot width and/or other attributes. Each character has a longevity attribute which the computer individually calculates based upon events which happen to that character in the game. In arcade versions of the game, each player may add to the longevity of his character by adding more coins at any time during play of the game. The computer also provides a maze (some embodiments provide multiples mazes with exits between mazes which may be opened if the player's character obtains possession of a key) in which the computer places certain limited resources. Such limited resources may include such things as longevity increasing resources, e.g., food, or other attribute affecting items such as potions which may enhance certain attributes such as magical powers or keys which allow a player to leave one maze through an exit and enter another maze. In some embodiments of the invention, when a character obtains possession of a key, that character may open a door in the maze through which all the characters may pass to enter another maze. In some embodiments, the characters have their longevity attributes increased as they pass through the door. In still other embodiments, the character which first obtains possession of the key gets bonus longevity points added to that character's longevity which is greater than any longevity points, if any, added to the other character's longevity attribute. In still other embodiments, the other characters receive longevity points in accordance with the order in which they exit through a door in the maze to another portion of the maze or to another maze. All these embodiments are equivalent in that they encourage competition among the players to increase their longevity.

The computer also populates the maze with one or more types of longevity decreasing entities which detract from a character's longevity unless the character successfully avoids the effects of the entity. Typically, these entities are monsters which attack the characters but which may be destroyed by the character's actions in fighting the monster or monsters. In some embodiments, there are more than one maze or levels of the same maze, and the monsters may act differently in different mazes or on different levels or in different portions of the same maze. The entities may also be traps, poisoned food or other things. The players move their controls and the computer responds by causing the characters to move through the maze. The players may cause their characters to fight attacking monsters, and to attempt to obtain possession of the limited, longevity enhancing or attribute affecting resources. All of the above action is displayed by the computer on a video display by accessing graphic data stored in a memory, typically a ROM, and causing standard video display driver circuitry to use the graphic data to display the maze, the characters, their shots or other fighting action, the monsters and the limited resources.

The computer allows any player to join the game at any time regardless of how many other players are in the game provided there is an unused character available for a new player to manipulate. Entry of a new player or departure of a player may occur regardless of how long the game has been played or when other players leave the game. In arcade versions of the game, players are forced to depart in the sense that their control inputs are ignored when the player's character dies, i.e., the longevity attribute for that character falls to zero. However, in these embodiments any player may extend the longevity of his character indefinitely by adding more coins to the coin slot dedicated to his character. The computer reads the coin accepting apparatus as a peripheral device and takes the number of coins dropped for each character into account when computing the longevity attribute of each character. Other factors taken into account during the longevity attribute calculation for each character are the number of successful attacks on each character by monsters, and/or the number and magnitude of other longevity decreasing events which have happened to that character during the game. When a particular character's longevity attribute reaches zero, that character is out of the game until more coins are dropped or other revival actions are taken to bring the character back to life. Control of the characters is simultaneous in that all players may simultaneously move their controls and the computer will update the positions or actions of their respective characters on the next video frame or as soon as possible after all computations and comparisons have been made and the proper video data has been accessed and sent to the video driver circuitry.

The computer also encourages the players to cooperate during play by comparing the player's character position or desired position with the current displayed screen limits. The current displayed screen may be thought of as a window on the maze (sometimes herein also called the "playfield") which is larger than the displayed window. The current window is scrolled over the playfield based on the center of the currently active characters or by any other suitable measure which keep all the active characters displayed in the current window. The characters are not allowed to leave the current window. Thus, if three characters are cooperating to fight monsters and move in the same direction toward a longevity enhancing resource, but one player wants his character to go in a direction which would take the character out of the current window where the other characters are, the window will not scroll further when the four characters have reached the window limits and are attempting to move in directions which would require expansion of the window to keep them all on the screen. This feature causes the movements of the other three cooperating players/characters to be stymied until the fourth, non-cooperating player decides to move in a direction which will allow the other players to move their characters in the direction toward their objective or vice versa.

DETAILED DESCRIPTION OF THE PREFERRED EMBODIMENT

Figure 1:
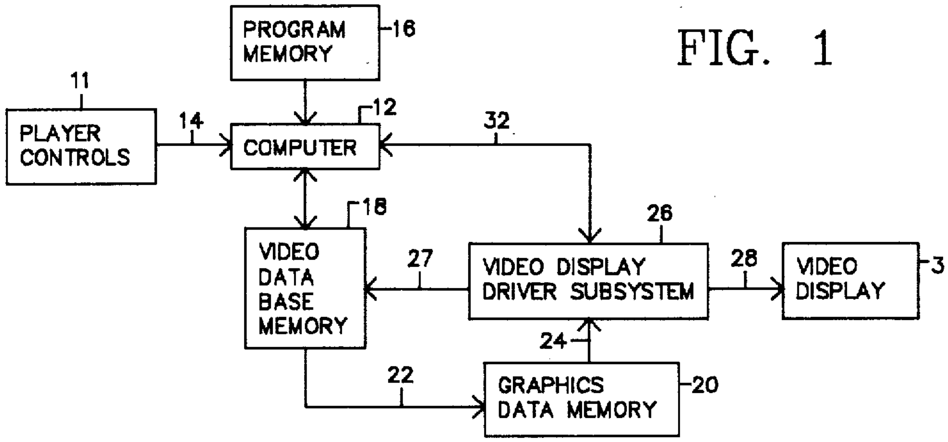
FIG. 1 is a block diagram of a standard video game system which may be used to implement the invention.

Referring to FIG. 1, there is shown a block diagram of a typical video game system which may be used to implement the video game of the invention. Such systems are known in the art of video game hardware design and the exact implementation details will be known to practitioners in this art. Other systems will also work to implement the video game apparatus of the invention in other embodiments. For example, the GAUNTLET (trademark of Atari Games Corporation of Milpitas, Calif.) game hardware will work with the object code software of the appendices hereto to implement the invention.

In FIG. 1, various player controls 11 such as joysticks for controlling movements of characters, fire buttons, magic buttons and coin accepting apparatus are coupled to computer 12 by bus 14. In the preferred embodiment, the computer 12 is a Motorola 68010, and the program memory 16 stores the programs of the appendices hereto. Typically, the player controls will be treated as peripheral devices and will either be periodically read in polled systems or will generate interrupt signals to the computer 12 in interrupt systems. In the latter, the service routines for the interrupts will cause the computer 12 to determine which player control caused the interrupt and will cause the computer 12 to read the data from the player control that caused the interrupt. The routines to read the player controls are stored in a program memory 16, and are well known.

The program memory 16 stores the program which controls the actions of the computer 12 and which implements the rules of the game. The control flow of the program to implement the novel features of the video game of the invention will be described in more detail below in connection with the discussion of other figures.

The program in program memory 16 establishes a cast of several characters each of which may have different attributes such as speed of movement, magical powers, fighting ability, movement ability, shot power, shot width, etc. Each character also has its own longevity attribute which is changed by an independent calculation of the computer for each character based upon events which happen affecting that character during play of the game. The program also establishes a maze populated by attribute affecting entities. Some entities adversely affect any character's longevity attribute upon which the entities act and are typically monsters, traps or other things which the characters should avoid to prolong their lives. Hereafter these adverse entities will be called monsters, but this term is to be understood as meaning any entity which reduces longevity of characters it affects. Other attribute affecting entities increase longevity and may take the form of food, resting places, healers, energy sources or any other thing which increases longevity. The longevity attribute might also be expressed to the players by the computer in terms of health, power or some other measure of vitality of a character. Hereafter longevity increasing entities will be referred to as food, but this term is to be understood as meaning any entity which increases a character's longevity attribute.

There are also established by the program certain other attribute affecting entities in the game. Such entities change or enhance an attribute or attributes of any character which comes into possession of same, and may affect the attributes of some characters more than others. Such entities may take the form of keys allowing exit from one maze to another, potions to change or enhance magical powers, objects found in the maze or which have fallen into it, treasures etc. All such attribute affecting entities which affect character attributes in a positive manner in the sense of helping the character in some way to negotiate the maze, defeat monsters or increase longevity will sometimes hereafter be referred to as limited resources. In the preferred embodiment, these limited resources will be limited in the sense that there are not enough of them present in the maze to allow all the characters to have as much of them as they want. In other embodiments, these "limited resources" may not be limited at all.

The computer uses a video data base memory 18 to keep track of all the attributes, positions and longevity of the characters and the positions of monsters, shots and other entities in the maze. The graphics data is stored in a graphics data memory 20. The particular graphics data used in the preferred embodiment is given in the appendices hereto. The graphics data for all moving and nonmoving objects in the game such as maze walls, traps, exits, treasures, limited resources, monsters, characters, shots, etc. are stored in the memory 20. Some equivalent embodiments may use a separate memory for maze graphics data and another memory for the character graphics. Separate routines performed by the computer 12 or some dedicated logic would be used to access and display each of the sets of graphic data for the maze and non-moving objects therein and for the characters, their fighting actions, movements, shots, etc.

The computer 12 performs the routines stored in the program memory 16 (see appendices hereto for exact object code of preferred embodiment) to read the player controls, compute longevity attributes for each character, cause the characters to move, determine collisions of the characters with monsters, limited resources, maze walls, exits, and the perimeter of the currently displayed window, or collisions of character shots with monsters, exits or other characters etc. Calculations of attributes affected by these events if any are made, and the computer 12 updates the data records in the data base memory 18.

The proper graphic data is then accessed when it is time to display the objects in the current window at their proper positions in the window. The proper addresses for the desired graphic data are sent to the graphics data memory 20 via the bus 22 from the video data base memory 18 under the control of a video display driver subsystem 26. This control is exercised by the video display driver subsystem 26 via addresses sent to the video data base memory 18 over the bus 27. The addresses of the desired graphics objects to be displayed are then sent to the graphics data memory 20 via the data bus 22. The desired graphics data is output at the proper time on a bus 24 to the video display driver subsystem 26. This is a conventional system which generates the proper raster scanning and synchronization control signals on a bus 28 to control a conventional video display 30. Typically, the video subsystem 26 includes logic to convert the graphic data from the graphics data memory 20 to pixel data suitable for creating a bit mapped display of the desired image. The video subsystem also typically contains a line buffer in which the bit mapped pixel data is stored prior to being displayed. Some embodiments may include one or two frame buffers, the purpose of which is to assemble and store the bit map for the current or next frame's displayed window image. The video subsystem also usually contains counters for keeping track of the current row and column position in the raster scanned image of the electron beam in the video display 30 for purposes of properly accessing the corresponding pixel data for that row and column position. The computer 12 may control or read some of the operating parameters of the video display driver subsystem via the bus 32. All of the foregoing is well known technology and further details will not be given here. Typical hardware systems that will work for the tangible elements of the system are taught in U.S. Pat. No. 4,116,444 to Mayer et al. Other patents which describe hardware systems and subsystems which may be used in implementing the invention are U.S. patents: Nos. 4,054,919; 4,045,789; 3,793,483; and 4,016,362. The disclosures of these patents are hereby incorporated by reference.

Figure 2:
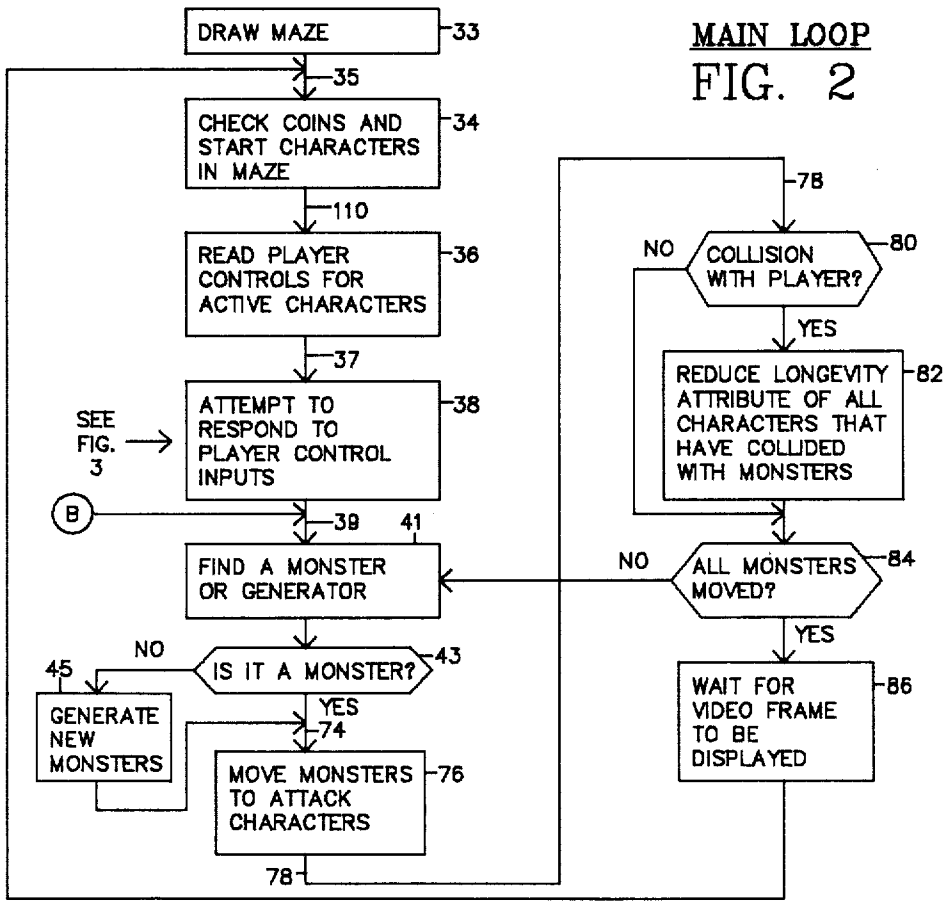
FIG. 2 is a flow diagram of the main loop of the program.

Referring to FIG. 2 there is shown a block diagram of the program run by the computer 12 in implementing the preferred, coin operated video game of the invention. The game is started when the first player drops a coin to bring his character to life in an arcade version of the game or when a player presses his start button in a home version of the game. The computer first draws a maze and places certain limited resources therein, such as longevity increasing food, keys, potions to affect certain character attributes such as magic, etc., treasures and so on as symbolized by block 33. Such routines are well known and need not be detailed here. The computer 12 does not draw in enough of the limited resources for all the characters in the game to have unlimited extensions of their longevity attributes. Only enough longevity increasing resources are drawn in the maze for some of the characters thereby encouraging competition among the players to obtain possession of these limited resources.

After the maze is drawn, the character or characters which have been brought to life are placed in the maze somewhere in the visible window as symbolized by block 34. The details of this process will be supplied below in connection with a discussion of the flow chart of FIG. 3.

Typically, the graphics data memory 20 has stored therein graphic data for a maze which is larger than the window which can be displayed on the screen. The computer 12 keeps track of where the characters are in the maze by updating the x and y coordinate fields (which define the position of the character in the current window) of each character in the database memory 18. The computer 12 then scrolls the window so as to keep all the characters visible in the window at all times. Only so much of the maze as is visible through the current window location is displayed. In the preferred embodiment, when a game is started, the window is located at some known position in the maze and the characters which have been activated are placed somewhere in the window.

Next, the computer 12 polls the player controls 10 to determine what the first player currently playing is doing with his character in terms of desired movements, fighting action, etc. This is symbolized by block 36 where controls for currently active characters are read. The routines to read player controls are well known to those skilled in the programming of video games. Block 36 represents the process of either polling all controls for all players and storing the data read in memory for processing in block 38 or the process of servicing interrupts from player controls as they occur and storing the data read during the interrupt service routines in memory to await processing by the computer 12.

Figure 3:
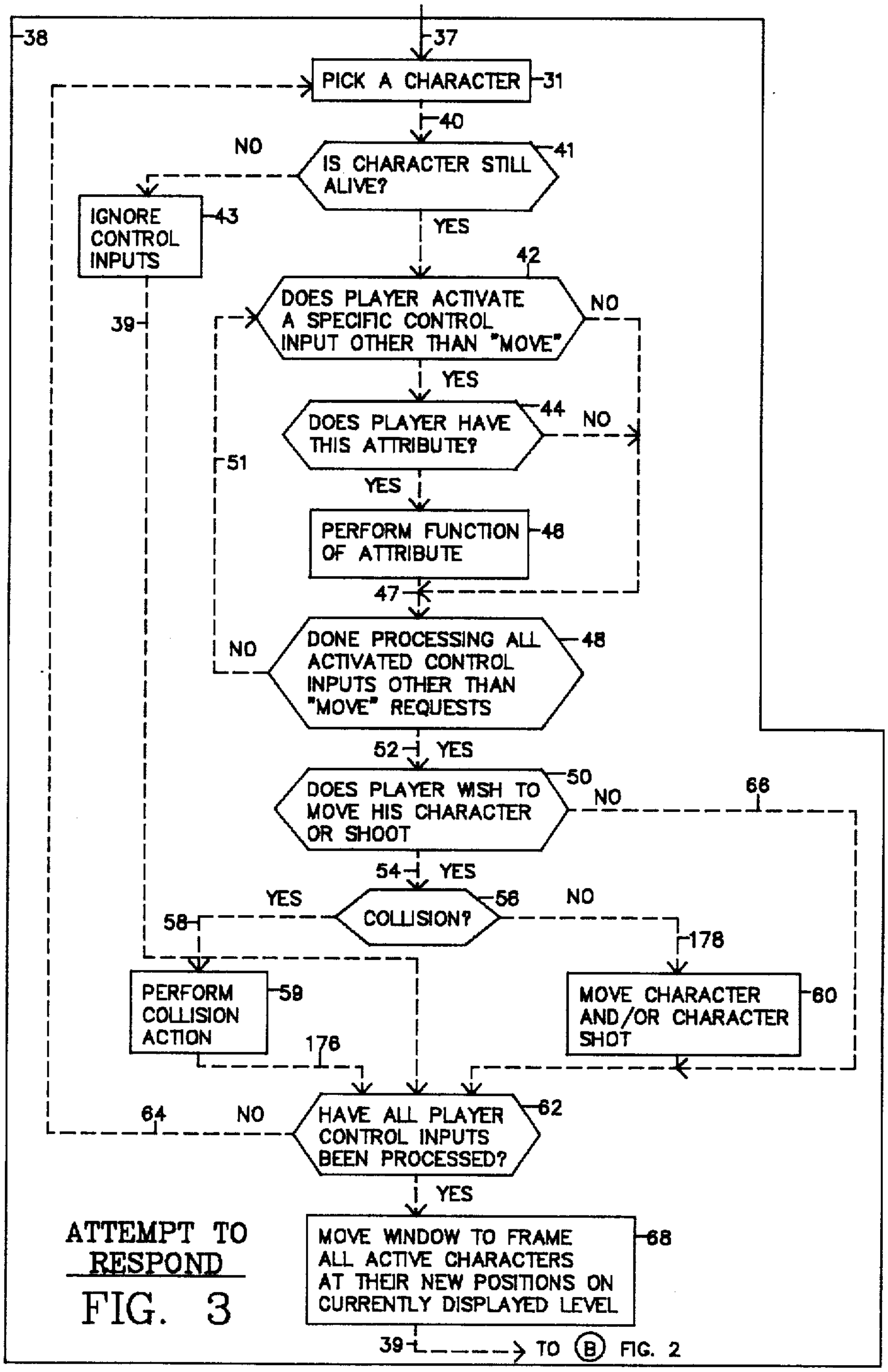
FIG. 3 is a flow diagram of the substeps in the process of responding to player control inputs in the main loop of the program.

The computer then attempts to respond as symbolized by block 38. This is a task which involves several sub-tasks which are detailed in FIG. 3. Referring to FIG. 3, the first sub-task the computer 12 performs as indicated by control flow line 37 to block 31 is to pick a character which has not been processed yet. Control then flows on path 40 to a test 41 to determine whether that character is still alive, i.e., in the game. The test of block 41 represents a process of accessing the data record for the character picked in block 31 and reading the longevity attribute field and determining if the character is still in the game. If the character is not still in the game, the control inputs from the player attempting to control the dead character are ignored as symbolized by block 43. Control then flows on path 39 to a block 62. If the the character is still active in the game per the test of block 41, the control inputs from the corresponding player must be processed.

The first step in this process is to decide whether the player has manipulated any special control other than a move control, e.g., is trying to exercise a special attribute of his character. The computer 12 provides predefined characters which the players are allowed to manipulate with controls to cause them to shoot, move, exercise their magical powers, etc. Each character, in the preferred embodiment, has different attributes such as speed, magic powers, shot power, shot width, armor strength, etc. In other embodiments, all characters have the same attributes. Either situation will suffice to practice the invention claimed, and each situation is eqivalent to the other in terms of what is critical to the practice of the invention. In embodiments where all players have the same attributes, the computer 12 need not check for whether a particular player is attempting to exercise an attribute which his character may not have so the next step, test 44 may be skipped. In the preferred embodiment, the computer 12 does check to see whether the player is requesting an action other than move, and does check whether the corresponding character has the attribute the player wants to exercise as symbolized in blocks 42 and 44. If the answer to both questions is yes, then block 46 is entered to cause the character to perform the requested funtion, e.g., shooting, increasing longevity by receiving new coins, starting a new player's character in the maze or exercise of magic powers. Typically, special attributes would include magical powers that not all characters have. The computer 12 keeps a data base of records defining character attributes and the status of each character in terms of his or her position in the maze, longevity of the character, possession of any limited resources such as keys or potions and other necessary information. Step 42 is merely a reading of the player controls 11 to determine what action, if any, has been requested by the player currently being processed. Step 44 is an access to the data record for the particular character to determine if the special attribute is present or to obtain any other information needed to perform the requested function. Step 46 symbolizes the process of actually carrying out the requested function, and involves accessing the proper graphic data to display the exercise of the special attribute or to place the character in the maze or to show shots or to increase the character's longevity attribute in accordance with the number of new coins received for that character.

Either after performing block 46, or if the answer to the test of block 42 was no, the computer 12 tests to determine if all the active players requested actions other than move have been processed as symbolized by path 47 and block 48. If not, flow goes back to step 42 to process the control inputs from the next player as shown by line 51. If the answer is yes, control flows to block 50 as shown by line 52.

Block 50 symbolizes the action of the computer 12 polling the current player's movement controls to see if the player is requesting movement of his character or shots from his character. If yes, control flows on line 54 to block 56 to determine if the desired movement would cause a collision. The collision test is to determine if the character's movement or shots would cause collision of the character or his or her shots with walls of the maze, monsters, attribute affecting items such as limited resources, the boundaries of the current window or an exit to another maze or another level of the same maze. If the answer to this test is yes, then control flows on path 58 to a collision action routine 59 which will be detailed below in connection with discussion of FIG. 5. If there is no collision, the computer 12 moves the character or his shot to the desired position by calculating the amount of the desired movement in known fashion and updating the character's record or the shot's record in the data base by changing the x and y coordinate fields in the data record for that character or shot as symbolized by block 60.

After the character or shot has been moved or the collision action routine has been performed, control flows to the test of block 62 to determine whether all the active players have had their control inputs processed. Block 62 is also entered if the answer to the test of block 50 was that the player did not desire to move his character. If all player's control inputs are found in block 62 to have not been processed, control flows on path 64 back to block 31 on FIG. 3 to pick the next character and process the corresponding player's control inputs. Processing then proceeds as described above.

If the answer to the test of block 62 is yes, control flows to a block 68 which will be described below.

Although the computer services only one player's inputs at any particular time, this process is invisible to the players since the processing is so fast that it appears simultaneous to them. There are no assigned time slots for each player during which he or she may operate the character controls where at all other times the controls are "dead". Each player may move his controls at any time, and the computer will appear to respond instantaneously. Of course there are situations to be described in the description of the collision routine where the player may wish to move his character but his character will not move because of a collision with a wall, the screen limits, etc. However, even when this occurs the character may still do whatever other things the character can be controlled to do, and the controls are not "dead".

After all player control inputs have been processed, control flows to block 68 where the window is moved to a new location, if required, corresponding to the new locations of all the active characters, i.e., those characters whose longevity attributes have not been reduced to zero. In the preferred embodiment, the new window location is determined by calculating the center of all the active characters and placing the window such that all the active characters are displayed in the window. However, in other embodiments any other method of determining the new window position will suffice for practicing the invention. It is only critical that whatever method is used be such that all the active characters be visible in the window after it is moved.

After the window has been moved or scrolled across the maze to its new position, the processing of block 38 on FIG. 2 is complete, and control flows on path 39 to point B, block 41 on FIG. 2. This step is to find a monster or a monster generator which has not been destroyed by the characters which may be used by the computer 12 to attack the players. Once a monster or a generator has been found, the computer 12 tests in block 43 whether what has been found is a monster or a generator. If it is not a monster, control flows to block 45 to generate new monsters. If it was a monster, control flows on path 74 to routine 76 to move the monsters to attack the nearest character or characters. The routine at 76 may be any one of several different processes, e.g., the positions of the monsters may be compared to the position of all the characters to determine the closest character and the monsters may be moved only toward the closest character, or the positions of the monsters may be compared to all the characters and the monsters may be split up such that some attack each active character. The process of moving monsters by updating their data records in the video data base and calling up the corresponding graphic data for the monster at the appropriate time is well known and any known code to accomplish this task may be used to practice this aspect of the invention.

Referring again to the main loop flow chart of FIG. 2, after the process of block 76 is performed, control flows on path 78 to the process of block 80. Block 80 represents a test of whether any of the monsters have collided with any of the characters being attacked. If the answer is yes, then control flows to block 82 where the longevity attribute of any character which collided with a monster is reduced. This is a process of accessing the data record for each character which suffered a collision with a monster and updating the longevity field by subtracting some assigned number of longevity units thereform and then rewriting the record in the data base.

After the process of block 82 is performed, control flows to the test of block 84 where it is determined whether all the monsters have been moved to attack characters. If not, control flows back to block 41 to find the next monster or generator, and processing then proceeds as described above. If all the monsters have been moved, then control flows to block 86 where the computer 12 waits for the video display driver subsystem 26 to signal that the current frame has been displayed. This fact may be determined by an interrupt from the video display driver subsystem 26 or by polling of the video display driver subsystem 26 by the computer 12. After the frame is displayed, processing returns to block 34 on FIG. 2, and processing proceeds as described above.

Figure 4:
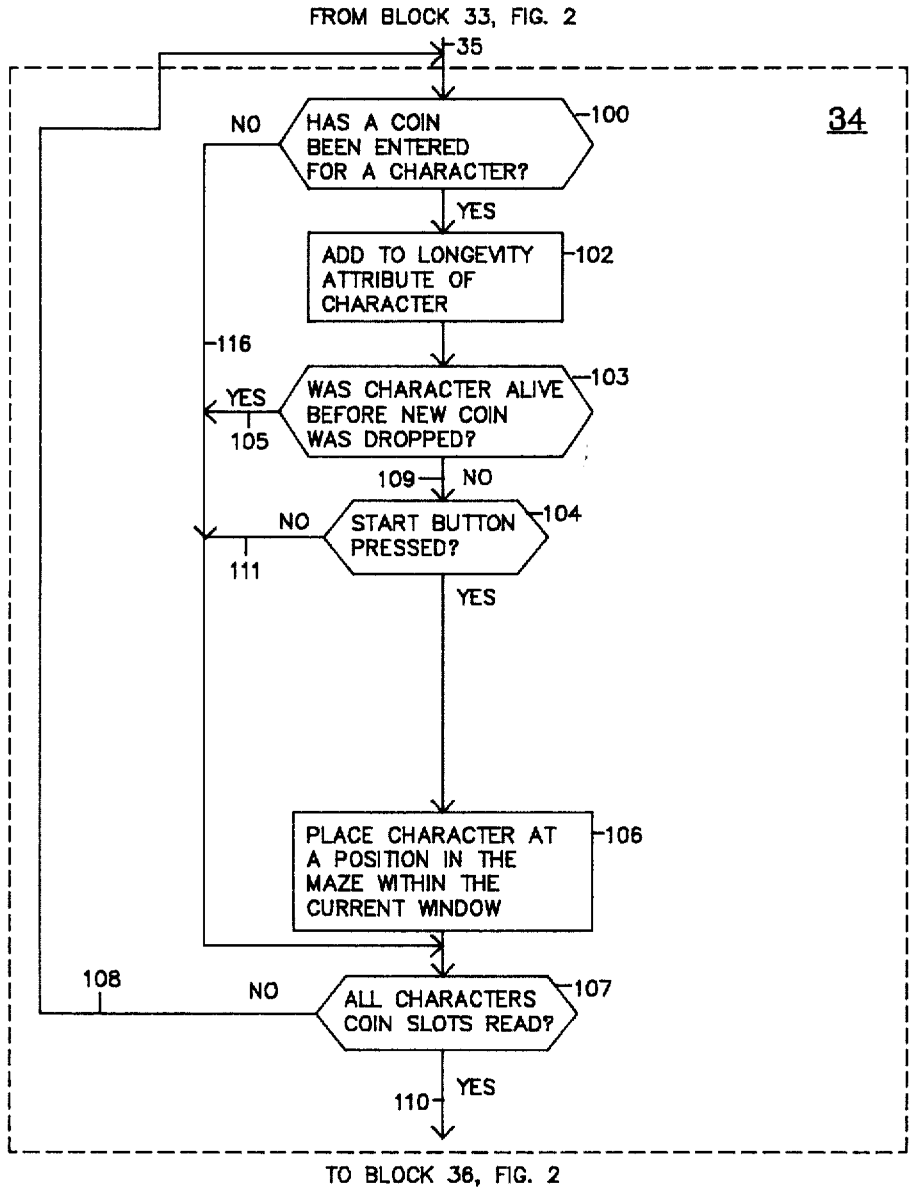
FIG. 4 is a flow diagram of the substeps in the process for checking for the addition of new coins by existing or new players and for starting new players in the game by placing their characters in the current maze.

Referring to FIG. 4, there is shown a flow chart for the processing sequence the computer 12 follows for starting a player. The flow chart of FIG. 4 is an expansion of the process represented by block 34 in FIG. 2. Block 34 is the process the computer 12 implements in allowing any one of a plurality of players to enter the game at any time and bring an unused character to life and control that character. This process may occur regardless of how many other players are playing (providing there is an unused character available), regardless of how long they have been playing or when they elect to leave the game or when their characters die. The computer 12 loops through the process of FIG. 4 once for each character.

The first step in the process of FIG. 4 is a test shown at block 100 to determine whether a coin has been dropped for the first character for which the loop is performed. In the preferred embodiment, adding coins allows a character to start or increases the longevity of a currently active character. Accordingly, if the answer to the test of block 100 is yes, block 102 is performed to add to the longevity attribute of the character for which a coin or coins was received. The longevity of the character is increased in proportion to the number of coins which were received. This is done by accessing the character's data record and adding some number of longevity units to the longevity attribute field of the data record.

In the preferred embodiment, the test of block 103 is performed to account for the case where a coin is dropped for a character which is alive and whose player wishes to extend the life of that character. In such a case there is no need to place the character in the maze or to wait for the player to press the start button, so subsequent steps in the process of FIG. 4 will be skipped and control will flow along the path 105 to the test of block 107 to determine if all coin slots have been read to detect the presence of new coins. If the character whose coin slot received a coin was not previously alive before the new coin was received, control flows along the path 109 to the test of block 104.

In block 104, a determination is made whether the start button has been pushed by the player corresponding to the character whose coin slot received the new coin. If it has not, there is no need to place the character on the screen, and control flows along the path 111 to the test of block 107. If the start button has been pressed, the computer 12 accesses the graphics data for the character and creates a data record for that character placing it somewhere in the current window and writing the fields of the data record to reflect its current longevity attribute and position and assigning it the attributes that said character has. This process is symbolized by block 106. The initial values of attributes assigned to the character may be stored in a look up table. In some embodiments, some or all of the attributes of all or selected ones of the characters may have their values changed by the computer 12 based upon prior events which happened in the game, e.g., collisions with treasures, potions, keys, thieves, etc.

After the process of block 106 is performed, the test of step 107 is performed to determine if all the coin slots for all the characters have been processed. If they have not, control flows along path 108 back to block 100. If all coin slots have been read, control flows on path 110 to block 36 in FIG. 2, and processing continues as previously described.

In embodiments suitable for use in the home, steps 100, 102 and 103 are not present as coins are not customarily used in the home environment. In such embodiments the test of block 104 is performed as the first step of the process of FIG. 3.

Figure 5:
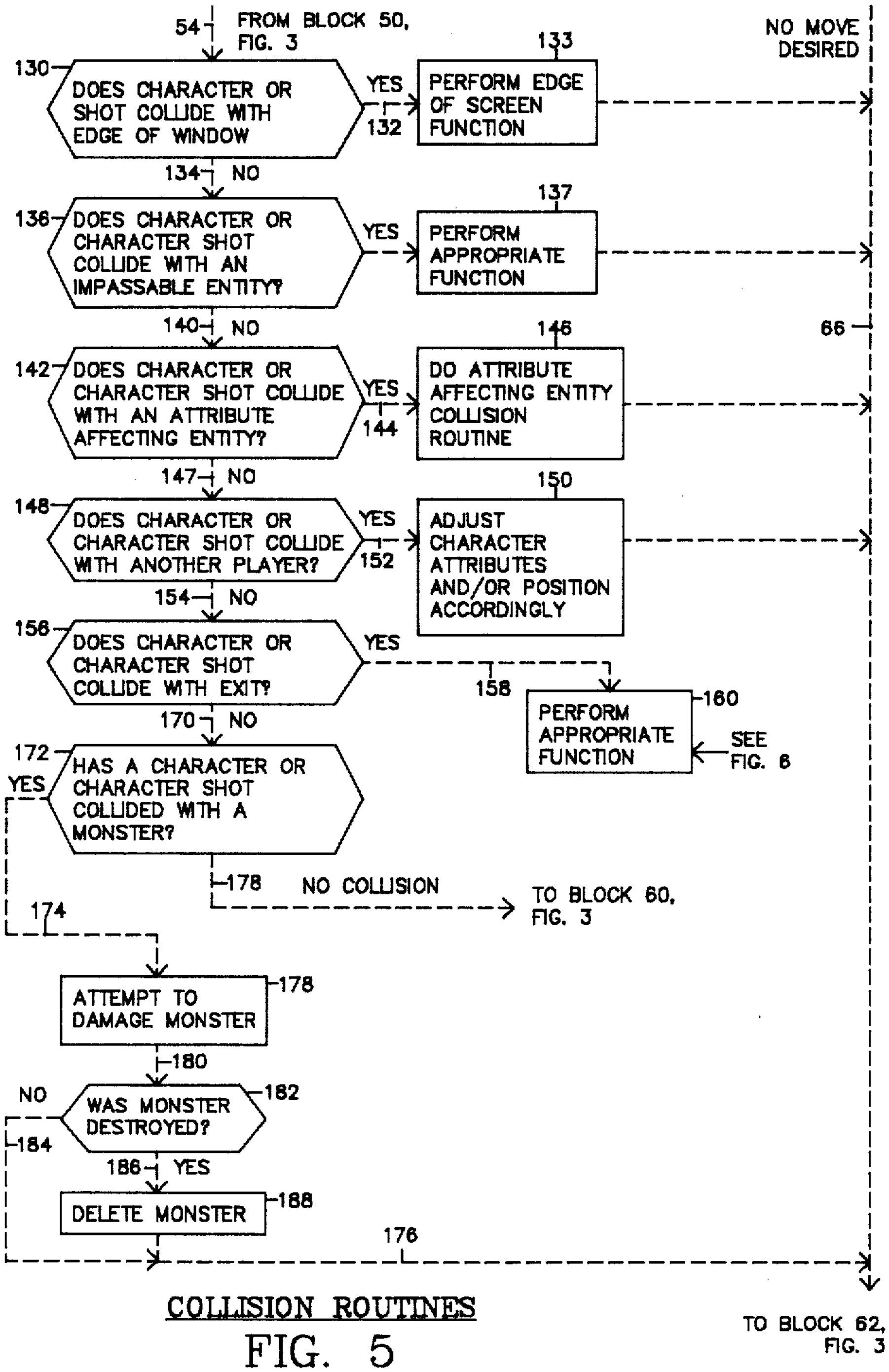
FIG. 5 is a flow diagram of the substeps in the process of checking for and processing of collisions of characters or character shots with monsters, walls, attribute affecting entities, exits, etc.

Referring to FIG. 5 there is shown a flow diagram of the collision processing performed in blocks 56 and 59 on FIG. 3. It is this processing which causes attributes to be affected both positively and negatively and which forces the players to cooperate to at least some extent. If the result of the test of block 50 is that the player does not desire to move his character, then control bypasses block 56, and control flows to block 62 on FIG. 3. If the result of the test of block 50 in FIG. 3 is that the player desires to move the character currently being processed, control passes along path 54 to a collision test in block 130. If the test of block 130 indicates that a collision with the edge of the window would result, then control flows on path 132 to block 133 where an appropriate edge of window routine is performed. The exact details of the edge screen routine as to processing of collisions of shots with the edge of the screen is not critical to the invention. In some embodiments, the shots may be allowed to continue past the edge of the screen, and in other embodiments, the shots are caused to disappear when they collide with the edge of the screen, i.e., the window edge. However, if the collision was between a character and the edge of the screen, the character is not allowed to move until the current window position is moved except in certain circumstances. After the process of block 133 is performed, processing flows to block 62 on FIG. 3 along path 66. There, processing proceeds as described earlier. Block 130 is the portion of the program run by the computer 12 which encourages the players to cooperate in the sense that all the active characters must move through the maze toward their objective in such a manner that they all remain simultaneously visible in the current window. For example, assume that one character's longevity is getting low, and thus that player needs to get his or her character to a longevity increasing entity. Such an entity could be food, a power source, a healer, etc. located elsewhere in the maze at a place not currently visible on the screen. Because of the processing at block 130, the character whose longevity is low may not move further than the edge of the current window or screen edge toward the longevity increasing entity until the other characters decide to move with him toward his or her objective. Actually, in the preferred embodiment, the character desiring to move toward the off screen food may only move until the character reaches the current edge of the window and then will be blocked from further movement until the edge of the window moves. Sinde the window center is recomputed every frame based upon the center of the characters, if the characters are cooperating and moving in the general direction of the objective, the window will continue to scroll over the playfield until the objective is within the perimeter of the window. In other embodiments, one character may cause the current window to move by his movements alone in certain circumstances. Those circumstances can be defined to exist when the center of the currently active characters is such that there is room for the window to be scrolled without causing the edge of the window to collide with another character. In such a circumstance, the character may move to the edge of the current window and continue to move thereby causing the edge of the window to move with him or her until the window has moved to a point where another character has collided with an edge of the window. When the window can no longer be moved without causing an active character to disappear from the current window, the characters are under constraints in that they may only move in directions which will keep them in the perimeter of the current window. The foregoing situation persists until cooperation among the players causes them to move in the same general direction such that their collective center is located so as to allow the current window to be moved to a new position with all characters still visible in the window.

After the players have cooperated enough that the current window contains the desird attribute affecting entity within its perimeter, then cooperation is not longer necessary. At that time, the players may begin competing against each other to take possession of the attribute affecting entity for themselves. Each player can decide on an individual basis whether to continue to cooperate and subjugate his self interest to the interest of the group or to act solely in his own self interest.

Other forms of cooperation in the game include the ability of the characters to simultaneously move as a group and to protect each other flanks by fighting all monsters approaching in their assigned zones of defense for the group. Another form of cooperation is the decoy strategy. This strategy relies upon the fact that the monsters are attracted to player's position to attack them, and generally are attracted to the closest player. The decoy strategy is to use one character as a decoy or magnet to attract the monsters while the other characters ambush the monsters from positions further away. Another form of cooperation in the game is the ability of the players to share the limited resources. The players may decide among themselves to allow the weakest character, i.e., the character with the least longevity left, to have all the limited resources. Or, in the case of multiple piles of limited resources, the players may divide them among themselves to best utilize the longevity enhancement effect for the good of the group. Another form of cooperation is to allow the character with a particular attribute to obtain possession of a particular limited resource if that character may use the resource more effectively for the good of the group than the other characters in the group. An example of this would be to let any character with extensive magical powers to obtain a possession of a magic anhancing resource as opposed to having a character with limited or no magical powers take possession of the resource. The portions of the program which implement these other possible forms of cooperation will be described below in connection with, inter alia, block 146, 150, 160 and 178. Certain other aspects of this cooperation feature of the game are implemented by portions of the program described above, e.g., blocks 80, 82, 42, 44 and 46. This cooperation aspect of the game provides for very exciting action and interesting social interplay among the players.

If the test of block 130 indicates no collision with the edge of the window would result from the move (in some embodiments the character is moved, a collision is found, and the character is moved back), then control flows on the path 134 to a test symbolized by block 136. This test determines whether the move would cause the character or his or her shot to collide with an impassable entity such as a wall in the maze. If the answer is yes, control flows on a path 138 to a block 137. There an appropriate routine is performed to implement the effects of the collision. The details of this block 137 are not critical to the invention, and the processing performed in block 137 may cause any type of action the game designer desires. For example, the character may be s*opped, the shot hitting a wall or trap may destroy th wall or trap or may cause a cloud of poisonous gas to be released. Any imaginable action may be performed by the block 137. After the processing of block 137, process control flows to block 62 in FIG. 3 via the path 66.

If the answer to the test of block 136 is no, control flows on a path 140 to the test of block 142. This is test to determine if the move would cause a collision between the character or the character's shot with an attribute affecting entity. Such entities may be any typical video game entity such as traps, black holes, time warps, keys, potions, objects which have fallen into the maze, treasures, food, energy or power sources, healers, etc. Neither what the entity or nor its affect on attributes is critical to the invention. Typically collisions with such entities do any of the following things: increase longevity; decrease longevity; enhance other attributes such as magical powers; decrease attributes; add new attributes such as different movement abilities, e.g., jumping or flying; change fighting ability; change armor capacity; and/or provide the ability to leave the maze through an exit.

If the answer to the test of block 142 is yes, control flows on a path 144 to a block 146 where the attribute is changed accordingly by accessing the data record for the character and adjusting the field of the attribute affected to implement the change. After this process is completed, control flows on path 66 to block 62 on FIG. 3.

If the answer to the test of block 142 is no, control flows on path 147 to the test of block where a determination is made of whether the proposed move would cause a collision of the character or character shot with another player. In the preferred embodiment, one character may push another character and move that character's position in the maze until such a time as the pushed character begins to push back. In other embodiments, the characters may be able to shoot and damage or destroy each other or otherwise hinder the progress of other characters toward their objectives. This feature provides for the competitive aspects of the game once a desired attribute affecting entity is located within the perimeter of the current window. If the answer to the test of block 148 is yes, control flows to a block 150 along path 152 where the characters have their attributes and/or positions changed in accordance with whatever competitive rule is adopted for the particular embodiment implemented. Of course player competition can take many other forms as well. For example, one character may refuse to move when that character is preventing movement of the current window toward the objective of another player. Further, one character may refuse to cooperate in shooting or fighting monsters which are attacking another character. Also some characters may be faster or be able to jump or fly, and these characters may speed ahead of another character which is headed for a longevity increasing entity and take possession of the entity for itself.

If the answer to the test of block 148 is no, control flows on a path 154 to a block 156. There the proposed move is tested to determine if it would cause the character or character shot to collide with an exit. If the answer is yes, control flows on a path 158 to a block 160. There the appropriate action for the rule adopted for the particular embodiment at hand is performed. The particular rule adopted for processing in block 160 is not critical to the invention. The processing for block 160 in the preferred embodiment is shown in more detail in FIG. 6.

Figure 6:
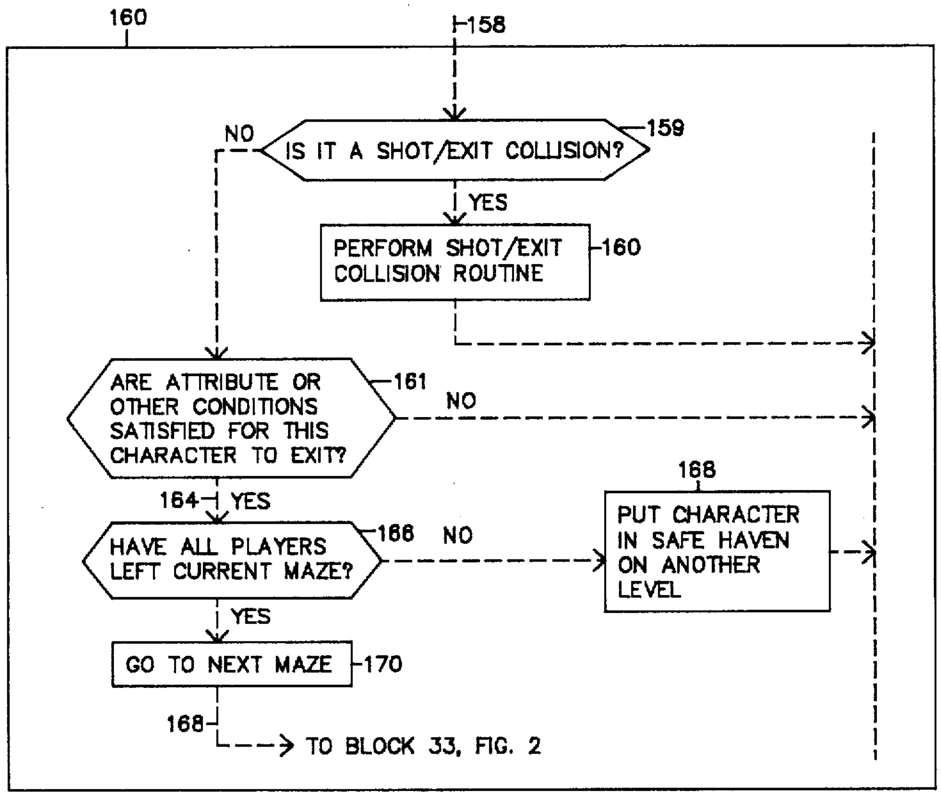
FIG. 6 is a flow diagram of the substeps in the collision processing routine for processing collisions with exits.

Referring to FIG. 6, the processing of collisions between characters or character shots and exits is detailed for the preferred embodiment. The processing of FIG. 6 is to determine if the game conditions, e.g. attribute status of the character such as possession of a key, are such that the character may pass through the exit, and to determine what to do for a shot/exit collision. Accordingly, the first step in the processing is to determine if a shot/exit collision has occurred as symbolized by block 159. If the answer is yes, processing proceeds to block 160 where an appropriate shot/exit collision routine is performed. In some embodiments, the shot may disappear, and in other embodiments, the exit may be destroyed. The possibilities are numerous, and any may be used in equivalent embodiments of the invention. If the answer is no to the test of block 159, control flows to a test symbolized by a block 161 to determine if predefined conditions for exit by a character are satisfied. The predefined conditions may be anything the game designer desires, and the exact conditions selected are not critical to the invention. For example, in some embodiments a character may not be allowed to leave through an exit until a particular monster holding the key for that exit is destroyed and the character picks up the key. If the answer to the test of block 161 is no, control flows on a path 66 to block 62 of FIG. 3, and now movement of the character through the exit results. If the answer to the test of block 161 is yes, control flows on a path 164 to a block 166 where a test is made to determine if the other characters have left the maze. If the answer is no, the character desiring to exit is allowed to exit and is placed on another level in a safe haven where the character cannot be attacked by monsters as symbolized by block 168. There the character awaits the arrival of the other characters.

If the answer to the test of block 166 is yes, then processing proceeds to block 170 where a new maze is drawn. In some embodiments, the new maze will have different kinds of monsters and attribute affecting entities therein and usually will have exits, monsters and entities placed differently. The character exiting is then placed in the next maze. In some embodiments, the characters may only move forward to new mazes which they have not previously occupied. In other embodiments, the characters may move back to levels or mazes which they have previously occupied. Control then flows on a path 168 to block 33 on FIG. 2 and processing continues as previously described for the new maze. In some embodiments the character's attributes remain the same in the new maze, and, in some other embodiments, the character's attributes are changed. The order of exit may be determine in some embodiments the position the characters will assume in the new maze.

Returning to FIG. 5, if the answer to the test of block 156 is no, control flows on a path 170 to a block 172 where a test is performed to determine whether a character's shots or character have collided with a monster. If the answer is yes, control flows on a path 174 to a block 178 where an attempt is made to damage the monster. In embodiments where the characters have different attributes, often the shots of one character may not be powerful enough to kill a monster whereas the shots of another character may be powerful enough to kill a monster. Further, some monsters may be stronger than others. To account for these embodiments, the process of block 178 is implemented to perform damage routines to monsters which have collided with characters or shots. After the process of block 178 is performed, control flows along path 180 to the test of block 182 to determine if the monster was destroyed. If not, then control flows to block 62 in FIG. 3 along path 184/176 to path 66. If the answer to the test of block 182 was yes, control flows along path 186 to a routine symbolized by block 188 which deletes the monster. Control then flows on a path 176/66 to block 62 and processing continues as described above.

Although the invention has been described in terms of the preferred embodiment herein and the other alternative embodiments, those skilled in the art will appreciate still other equivalent embodiments which may be implemented. All such embodiments are intended to be included within the scope of the claims appended hereto.

Appendix A - MAZES ©1985 ATARI GAMES, CORP.

%4E6A48000380000038032000000AB000382DE0003FDA30000000000000000000000000000000
%4E69C800038020000000000000000000000000000000000000000000382DE0003833D0003839F0003
%4E6128000380408403000384950003850100038571000385CE0003868C00038797000389150003
%4E6508000380608ABE00038BA00038CE600038DBA00038F3600039089000392 3C000393730003
%4E646800038080942300039 50D00039664000397E6000398B00003999C00039AE400039BF60003
%4E6388000380A09D2600039E3200038000000381 8F00039972000 39A7C00039C1500039CBD0003
%4E6548000380C09E4B0003830D0003846F000385F0000387 3E000388AF000389D600038A830003
%4E6498000380E08B7E00038C2300038DA500038E8D00038FBD0003915C000392470003800000 03
%4E60C8000381008 10B000381B700038317000384570003859500039 2EB0003938800039433 0003
%4E6518000381209 4FF0003961E0003971C000397BB00039890000399910003 9A5E00039B4B0003
%4E64A8000381409BD900039CE200039DC700039E7C000380000003868600038770000388BB0003
%4E6198000381608A0700038B0A000381070003 81E7000382A20003838100038 4B80003858D0003
%4E6398000381808 66C000387410003884200038 8FD0003897C00038A4D00038B0000038B820003
%4E65F8000381A08C1700038D1900038CB800038DC800038EB900038FAE000390690003922 80003
%4E6378000381C08E3000038EE600038F8D00039054000391100003920200039 2FF000393BE0003
%4E6008000381E09509000395A100039635000397030003 97C60003986500039 90A000000000000
%4E62D80003820000000000000000000000000000000000000000000000000000000000000000
%4E62F80003822000000000000000000000000000000000000000000000000000000000000000
%4E631800038240000000000000000000000000000000000000000000000000000000000000000
%4E633800038260000000000000000000000000000000000000000000000000000000000000000
%4E6C780003828000000000000000000000000000392F50003935400039 3DA00039476000395010003
%4E64A8000382A09651000396E300039810000399 3D00039A1F00039B1D00039BD500039CBA0000
%4E64E8000382C0000000000000000000000000000000000000000000000000000000000006564
%4E6D08000382E07A000000000000000B5A5B49D51B53C208C205C528DFCC2BDFDFDFDC1B5251DF
%4E6A0800038300DFDFDFDFDFDFDFC1BF717171C23FDFC24FCF4FCF4FCF4FC8A2B40391DD35DA1A
%4E6068000383 20D91ABFDA28CB2BC719D11AD91ADFD1B9D01AC33E06C035C40466CC0700 65647A
%4E681800038340000000000051100 9A8595A2860C22CA04570C32BCA06E54679CC044570CD1BC6
%4E6D98000383603 50446D70446C66FC046DFDFDFDFDFDFDFDFDFD1BFCBBFCABFDFDFDFD8BFD12F
%4E677800038380DFDFDFDFC86FDFCBBACABA6FD705535153DFCEBEC4B9C564BAC11BC51BC10065
%4E6A98000383A0647A00000000001013595A0468DE35DFC4057741E141DFDFE260D72AFA75E060
%4E6658000383C0DFD32841DFE7F9DFDFCBA1EBE440D328D1BFF54CE542EBE9DFC12A776140F360
%4E6608000383E0EB41EAEADFE8EC76EF61EFDFE061E66C73DFD0A4F170C01BEF60F203BE35D752
%4E690800038400E0060065647A00000000000321685E5B5A7A2849CD192859C32ACBAFA646D01B
%4E61D8000384206CC82A57DF1BC62A2844AFA1288169DFDA1E61C5A859CB35C52CC01C6FDA28B1
%4E64E800038440DFC21DD61ADFBF60CC05CCA2DD08C2BFCEB8C5BFC1BF1AD3040CDD040CDD040C
%4E63580003846052C21CC8BFC30CC30CC1040CC1BF2845C9BDAC7679CF1CDE23C9B3AFA2B74A1D
%4E6C5800038480471D6EDFC0BAAFA8BA2881CB195CC3BE06527FC80065647A000000000020048F
%4E637800038 4A05F686B1F825A506A827D70D1AB82AB56D528D320DFD5AF5F7EDFD2A645F3D1C1
%4E68C800038 4C0ECDC2047DFD306CEBF0F8140D30F41B2DFC9B8DFD7BFD6BFCFA7B8D0BFFE1F6E
%4E6408000384E0CEAFA0BF4BD40F48D40F6541D40F61C4B7A9C2A9B743DC0F40DC0FBE0FCD054D
%4E67B8000385000065647A00000000003103685AA5662C804440C5542B40C4272AFC65FFDB1AD3
%4E68B800038520B4EAC3B5DFD52840D7ABD82840DFDF7976CEA689C4B9A8DFDFC2BF5D05CD5FDF
%4E653800038540D3A9C5A87E76DF49DAABD728C02BDFD4A5C119E3D51A66DFE1C5B9C4B9C5A663
%4E67B800038560DB28DB1B41BE0645B528C45328B62A460065647A0000000000102168595A5B28
%4E64180003858080DC06C218D11B2848DEABC5AB52D92843DFC62ADA1B4E70DFC32CC5AFAADFC2
%4E6958000385A02A5841DFDF534259DBBF4AD3AFA9DFC2BFD2196FDFDF496ADF41C6AFA8B5DFDF
%4E6D58000385C018CF056FDC28DE28DE28BED2800636C65073700000080098D15D046876A0067B
%4E6FF8000385E0A02A3AB1C618E421CCA4CC43CDA11DA11DC153C748E6C1A2CE2AE1117AA3CE41
%4E623800038600C414C7ABE711F5C7A2F4C9A2D2A2266680A62ACDA5C81CA660EC7AC2A6C9A5CF
%4E6CF80003862044C81FA1D242CBA5C305CA4240C811A0F1E011C811ADC64163F0C7A5D1A16AAB
%4E6C68000386402862 80C4A3D0A5C214C311A072D01FA2C511ABCB20A0CA14C5A1E0C820A4EE3B
%4E6FD800038660A5C726A9C21AC03981E3D0191AA2CA3BA3CE2AA4C4B2A128C1A5CD2CA2C82AA0
%4E68280003868035C31ACA18C03BA0C41AC20065647A063302010024576 87B984A2A806241C206
%4E6AC8000386A028C02A60C019C02A0A811A81C206CC19D22866DB19708141400A81286B77B4AC
%4E67A8000386C02860404042C019407080382BC32A708228AFA31A40C3513BC12AC25019C2502B
%4E6A08000386E009C0502844D03BC1094CC21B81CA196163C4A528834083C0094A444C0942A760
%4E6DA800038700065C8A628C35A533B5028C35DAB28616344C2188142C02A708028BF28CBBFA4BF

%4E6ED80003872041C1BFDF4CC3523BCE5328A6B267C2513B18A728C3183BCBA52CC3513BC33BC1
%4E6A98000387400548 42C6BFC6A52842C6196206471806182BA64C43C2522AC2562843A76864C1
%4E6AE800038760A6C41A4CC25028C3513BC438A428B3A60A4CCD1940Z0847081Z1627E8475D228
%4E6A6800038780841C1BE2A0A8140BB2843B961C1BE3B0B82BE2CC21A00636C650814071B0020
%4E67F8000387A0455B75178B6440A01B8164C12180C113A02B1B80A01E81C121A04680A721E035
%4E6BF8000387C0C8A641A0E721C1A47221C703A0C1A1E0E1C317C10E7C04A02BE11BA0C80E72A0
%4E69B8000387E0E2C40418A1C21E60C1B3520EB27C04C005C6B2C1A30E780B80C00604C8040304
%4E69F800038800C9A2C103A3B2C7041804C303A0C82AC0B9C503C1B4C00381C8216BC1B51180A0
%4E6A8800038820EBC128AAE11180A0C3584B8004C02AC01281E21180A2B81143C028C3BBC4B2A1
%4E6BD800038840B735E260C12811BB17510B81C21369A0C828C2BF7135BBA028A81AC0A928C017
%4E6E3800038860C0722880A0C2B3C21A1BA0E6C60BBFE1C404C42AA0E1C7B341E3C2A2C428AA2A
%4E680800038880C1732880C0278144A0C01180A0C004C1041840A0C1B2C2A1B5C4B5C0B2A0C011
%4E6A38000388A0A0C204600403E1C104CE11A0C0A443E235B5A5B4A645A1E1C1A1E143E2C12B62
%4E6D08000388C0A0E040A0C12AC52842A01BE4E2E01BE0C7A503A8E0E12CA011A0E8C013E5E3E1
%4E6DD8000388E02DA0E043C1B2E0E0C0B2C12061E2E2E7E620A11EA5E2C0A6C4A1E0E0C0B2A0C3
%4E68F8000389000C80E4C4BBC1BE20A02ACA0C8118A0E51EC004C100636C65021F0000001138 7B
%4E668800038920B5284336862A3828A020A01AA020A01AA020A025A22545A7414040E0E0C01984
%4E6AF800038940CE0E0E0E0E0401CC01FC025C206C3A342E040404040C01985E5170EA0E3E0E0
%4E6D4800038960E0E04025541F541C5446B00B3BA1E2E040E0E0E5B346A1B2A1CFA1ECC1A1CAA1
%4E6D2800038980E91828E31DC653C1A12AC518E138A03828C23BC0A1C1A61AC028C22E70E22AA0
%4E66F8000389A0E526C0A1C010E3C02051C1A13504C02838A038A0C6A1E1E4C12AC0A1033504C0
%4E6818000389C02BE0C6A1C810A01AA11AC035043504C339B6A0C1A10380A0E1C5A110A1033503
%4E6988000389E03504C23918A1E061A1E242A0E1BF2A0435043504C13781A1C105C1A1E438C0A1
%4E667800038A002B703503350365A1E228A144A0C0B2A135043504662DA1C0A1E1C5A110A10335
%4E681800038A20036AA1C22AC110C128C0A11AC035046AA1C6A1038028C1A103673BC1A1C020A0
%4E6AE800038A40C5B213C3A165A6C1A1C4280380A1C313C13BC1A11AC03B1839E0C21AA0C328C0
%4E6EB800038A60B2632851E32A3983C4A1C0B6A0CA2BC0A12C3ACDA1C91A2AA0B2A0C3A9C1A1E9
%4E6CB800038A80C03BC41888C2A1C3601DC104C013C418A618C4A3E5C03BC083C21088CC10C0A2
%4E688800038AA0C2B40AB20DA210B216B4C9BEC1A1C33BC00435043504350435043504680063 6C
%4E6A5800038AC065175B0C1F00801968 4B396A388AA035A04F70A8C1381081C3A7641B8108 7040
%4E6A8800038AE0E2211072C0152615C03B65806080E61080C2B2C2154EE54364814AE6681BC9A6
%4E6D5800038B00C2A6B2A5038146C02110E577CD1080E6F3CD17C23BCB13AD2617CDB2A0CB1726
%4E608800038B20D21013C917C4BBCC2110DCBDA1C1A446C4BFCE05C7172615C7BFDC28D6A4C21A
%4E6CE800038B40C2A5038 2C935C91B434DCC1841CC1021104EC239C53B73C739824 2C21BC5A5B5
%4E6F0800038B60C83B8139235239D739357040D028CB0E270E4A43C8BF4881C03A812BC039EBC9
%4E6E8800038B801BC13A3981C01BEBD11BC6BF6183C13BC2BE06C1BDC2355B1B53681B810BC500
%4E685800038BA0616161033800040014446 85B39BB2E80D339C0752BC221C451C2A6715169 451
%4E6AE800038BC0E2C124C01EE1C251CD51E2C051398351E0C2511380C951F244E4C2511 [illegible]
%4E6D3800038BE0E2C2A6E2C251C751E2E242E2E2C251C33BB051E2E2C339E3E2C2511 [illegible]
%4E6D8800038C00E2211 9A0C2A11BA1E2E2C2513A81E2E2E2C0523952E0E2E2C251E3E2E2 [illegible]
%4E613800038C20F2C4 BA0E2E2C0A2E2E2E2C437E5E240E0E2C539EAE2E4E2C A24C4 [illegible]
%4E6A3800038C4064C1BF45C024E40C41C22440 4066C3523952C33AA0B2C1B2C0523952C324F4C1
%4E61D800038C6019A0C9B63956ECE2C2B6C05639B6E3CBA1E2E2E27FC319A0E2E2D239E1E2E248
%4E6E5800038C80C7B71880A1E219E1C351E4BBC7523952E2E2C35172A1C13AC2BA42E2E2C351C4
%4E6CF800038CA0A1E2B8C2A6E2C35143A1C2A12AA03A43E4C351C4A1C2A1C12CA0C13984E0C351
%4E6B9800038CC063A1C2A1E451C02160C051A0C351C31EC4A145A6C351C324C1BE05C0A106CF39
%4E69A800038CE051C327C12A00636C65070007FB0014276851 4B58DE18DAA2C00670D62CC105A3
%4E6CB800038D005FA8622AC21BCB1B810BC3351263 12C2AB5280C3A1B4C1B40381C11B42DFDF62
%4E6D7800038D20CDA66821A8C535C12A356BC22CC0196921117040C12A4AC60ED5B8A2C41D0ED4
%4E6C6800038D4011C6B50E4C6621114562211 1BF6F46C1B7DB2841C4BFD3A703C917BB17491C11
%4E6D8800038D60817 4C71727A6C3A7CA1781521BC4352811211 1485981C2BCA9DD28DFD2285E80
%4E6D5800038D80CDA6C8120B4049C0352C0E80C20EB3C6A9C0A3B8A71E0E73402A4024C0180B80
%4E6AF800038DA00435CC0E804371B252810435CE0E81BE28BC55810435CF0E1D00636C65081407
%4E65D800038DC01B0000135B7517046440A01B8164C12180A0C013A01BB1A01E81C121A04680A1
%4E6C9800038DE0E1C0A12161C8A641A0E1E1E121C1A40BC221C703A0E0E0E1C517C10E0BCB2BA1
%4E6E7800038E00E21BC90E0BE2E2C518A1C21EC3B3520E820BCE05C6B3C50E0BC80B80C0067369
%4E6C2800038E20C92BA2C103A3B2C90384A0CAB9C503C1B5C218C8216BC1B51180A0C0720372E7
%4E6A5800038E40C128AAE11180A0C12A80584B8004C21281E21180A2B81143C028C3BBC4B2A1B7
%4E6C9800038E6035E260C12811C017510B81C213C82B35A0C828BCC1BF0B61BBA028A9C0A928C0
%4E6DF800038E8017C0CBC22880A0C2B3C21A1B80A0E5C4A10BBFE1C404E5E1E72840E3C2A2E2C0
%4E6AC800038EA028C0A92AC10BC32880C02781C1B4C221A01180A0C41840A0C1B2C2A1B5E528A1
%4E6B3800038EC011C371607103E1C104CDB211C0A543E235B5A5B4A4E144A1E1C1A1E143E2E261
%4E6D6800038EE0A0E040A0C12AC52842A01BE4E2E01BE0C7A503A6E2E12CA011A0E8C013E5E3C1
%4E6D1800038F0028 2DA0E043C1B2E0E0C0B2C12061E2E2E7E620A11EA5E2C0A6C4A1E0E0C0B2A0
%4E6C1800038F202BC30CA0E3C4BBC1BE1AA01ACC0C18A0E51ECQ04C100636C65181B071A092044
%4E687800038F40034E04494175C31976C8402404E07380C1197780E52B0441E1C0197081C34219
%4E680800038F6071B0C219E0E0402BA0E2C0197081C20406047280E360C0A16180E0C0197080C2
%4E680800038F80421972C019E060826060E272EC6080616281E171E3C119C119E0616080606160
%4E6CF800038FA0E2C21228A0E028C012E1C8A2E5C128A0E228E1E7E16360E0E0E428A00EB061E3
%4E688800038FC0C12B63822BA035C435A028126081C32BE1B362801228A0C141C042E0280E6083
%4E68A800038FE0B3A0C218628028A0C22404C0042404E1280E12C318C22C82B20E28A0C25241C0
%4E6A080003900042E22860B22C821883B40E12A0C605E60E80C0B4C6B60E80C028A0C242C042E2

%4E67280000390202B1261B6C4B30EC328A0C035042451C004240435E0280E806060B3C0B2B2B30E
%4E69680000390400C41228A142C042A128126063B3E928C828A0608060EEC046E00E60F0C22B0FA0
%4E6F0800039060 0F28E20E8061ECE0C10FA00FA00FE1E00E62EAE40F240FA0E40EB0EBE2C10 A
%4E6FA8000039000F A00FE 1E2EB 5280FA0 0F23E661E6C6554455E6E3E2E5C21580E3E5C22BA0E
%4E6B48000039 0A0C91582EAE04 CA1584EA402404C913860A0441C81588C94000636C650E2D07 A
%4E69380000390 00000 1 68D15B4E2C80C0212844C121A0CB2AA01B504344E2E2E41B80C711A61B
%4E6978000390E0E228A012A1C0A1C0A34381C20AE5E2E14421A103C80AE3C01EE0C121C1354250
%4E6858000039100452A2843A0E1C021A07C8143C00AE2C311C1A4C1B31B7181C10541E3C01E2860
%4E6728000039120512A1B80A0E27180B5C703A0E1C08211C0B351547160A0C5B6214141E04055 A
%4E676800003914070002111A1E21180E542A1C0A272B211A00EC035E011E1B2A3C2A1C021A0E2C
%4E6A3800003916035 11A 021160E1E7C304C21EE5E011E1C1A1E9C21EC51160C0A328C1A1C5A14
%4E6AA80Q039180C3B 0 B2E3E11124A1C2A246C411A0E0E1E111A021A1CBB3E0C21160C1A1E141
%4E6B58000391A0C0A155A2C11EE640E04249C31EA1E3E2C3A2C2068050C02AC3A12AA0E1E2C021
%4E66D8000391C0E111C1A1B7A1B5A4E011C020C0A1E22041A0C12049E01123C20440E035A040C3
%4E685800039 1E0A147E211C204E1C020E0C420C3B3C02780A2C2A128814240C10380B2C020E4E4
%4E6BE800039200EAC5A1C3A3EB1B80C120E741 EC11E54B3E11B51B2C62A60A040C3B274A 1 5A
%4E6A580003922 0 360A01BA5B560 1C11A51874 1 35CCA21BC7BE2C280E8235D02AC50062 C 8
%4E67F800003924 0 07 100144 6 9E09B42C80 0 5440 3192BCD0681C02144C319A0038 C4
%4E69C8000039260354 2C319A0CC722745C319A0E225C0038470722A4083C319A0E2C20D800E8
%4E69A8000039280 19A0E2C020C 1180E2882040382C219C51BA0E2C3B30D0E28431481C2A8E1E04
%4E6A1800003 92A0 D0E28352A803528148 0C0611 E8C220410D800E810D0E801B24C02AC2AD 3A
%4E6C08000039 2 04 0C 8151 28800B801B50099 3 AFA C90F8111 8020CA2A1BE6C303A311AB1
%4E60D800039 2E0 11A 92 C924C52AB 4B4C7A6C555BFD020C22A18CFA2B4C503C2A1E2EB
%4E6BB80000393000D1 2BB054C2621ACA8405A3B5034245830035C2641D0D84D0A1C7A3BAD060 A
%4E6C480000393202884C2A2C30DC105EBC21BC01BC3660DC8611AC21B81C2BBA141C20DC3354
%4E6F48000039340BFE0E0C16435C3B5A3B 3CDBBA4BA03C21DC00D80C1752AC11E81C10F8175B9A
%4E6B98000039360B 2A0C0B2AB EBE 0 00727273 35BD2CCB0065647A022B07150003528
%4E 138000393 A A2AA0 0 A 10505A4C0A7EED9AFAAC42A73244465CBAFAA44
%4E 1C80003 3 A C BC 15 6C44FA3646 CD1A2AC4AFABE7C42AD5A1C2A1E2
%4E6338000039 0A12 1E22B41E DB AA446 C 19CA75AFAADFDF42C4AFABE472A02BA0E
%4E6B18000039 3E0C17922DFE57 28A01E 281C22AC12642AFAA56A024C5B242804080C02AA0208
%4E6F68000039400 5 A059B2C4B3EB 3E2C019A0C2B4CF06E11BA0FB1BE1D6BEE351A0C319
%4E66680000394206 32800 36C65C8040401004124110868A1E5C52AA062E34452C21AC9046
%4E6E08000039440 4A253C071A0 60 B3C3A4B2A6B2AA0E81C41AD40E83E4C72A7A0E81A0
%4E6C98000039 60 A2C3AE2 74 1 C81 41 43E1F40243 640A0C140C7A6CC4 6 3
%4E6038000039480EA 1 3581C0 E 705 040 1 263E256 6BFC762B4A3C827A2CA64CCBF
%4E60380000394A050C003A1BFC32A6353EBC7BBA9B7E940E9E6FC5AC522C01BC61BA0C620A1C2A1
%4E60480000394C0E2C1B4AFA1BF2752C62C7622C3355DC0B2AFA5E3C827CF04C37A28A035C527C4
%4E6F280000394E004C6AFA9BAA12BC204C31FC012C91CC012EAC4B2A0B2C2A2C382A0B2E
%4E685800003950 0A 2A 819A012A 2A 72AA052006 36C651800071400042 4B 0D06E8C 2AE1C
%4E6DE8000039520 A 20 20C 1A41 A0C4A6C51AC11A66A0C1B21CE251CAB31AE960A01CC3
%4E6B980000039540A2B4A4E160A21361CB1A6381E01C60C01E0FA0C135C7B5A4C1A2B2E1 0A2
%4E6D7800003956055CB1AE51C60C01E0FA063C2B6A6E860A228C0B50360CB1AC3A360C01E0FA0C7
%4E69D8000395B0A4C31A6856A12881C818CCA4132124C4A6C31AE6242124212421 0FB2C0BC4180
%4E6E780000395A028EE180F81C20F4481C0054BE00F86C2BF3508C9B942E1068572C3A1B2C2B6C5
%4E6BE80000395C01AA10BC10DB0C10DC20D81CAB9A341C072C272C272C006D1B91A0B80C5520D
%4E6A7800003 95E0F1C272068172068 1C076D50F86CBA4C6242124214A81C11A0BB11AC5B3A324
%4E691800003960073448341A5C1B463C0122881448341C01C0D82C2A50B2C0B28448341A7E4B30B
%4E6AC800003962082284383 41C71E438328B0C4A20380B60BC4A3438228C4A2C20ECA1E422885C
%4E6BD8000039640 0E81C0B654C3A3621BC6BE28830E80C3B52AB32AA02AC11EC0B628C051515151
%4E65C800003966053 53C000636C650814071B00320A5B6817757440A01B8174C12180C113A01B81
%4E692800003968 0A01E81C121A04680A721A03580C8A641A0E721A60BC221C703A0E160A0E1C317
%4E6CB8000396A0C10E0BE52BC32B04A02BE040A0C80E0BE2C80418A1E0C01E70C1B3520E820BCC
%4E68D8000396C004C005C6B2C1A30E0BC6A10B80C00604C8040304E9C303A3B2C7041804C303A0
%4E6CB8000396E0CAB9C503C1B4C00381C8217BC1B41180A0EBE128B9A8E11180A0C3584B8004C2
%4E66E8000397001 28171A01180A2B8114360E2E2C1B2A1B7E3706111C017510B8143A013E0C32B
%4E6BF8000397203528 68BCC1BF0B71BBA040A121A41AAA28C017C00B6280A028C51A1BA0E6C4A1
%4E6AD8000397400BBFE160A3214328E1E72840E3E4C0B3E060AA2AC10B6381E221E11BA0C01180
%4E67D8000397 60A0C004C1041840A0C1B2C2A1B3C3A2E0C011A0C204700403E1C104CE11A0C0A4
%4E6B88000039780 43E235B5A4B3A745A1E1C1A1E143E26172A0E040A0C12A6542A01BE4E2E01BE0
%4E6DF8000397A0C7A503A8E0E12CA011A0E8C013E5E3E12DA0E043C1B2E0E0C0B2C12071E6E7E6
%4E6E28000397C020A11EA5E2C0A6C4A1E0E0C0B2A02BC20C80A0E3C4BBC1BE28A028CA0C8118A0
%4E6958000397E0E51EC004C100636C650B2C00000000 2100BD475440680A0DAA318FBE203ABC5A1
%4E600800039B00 79C9191BC5A1E4D019C4A1E4EF42C2A1C31EA0EF43C1A1E45EA044C61EA05EA0
%4E640800039820E EF C 32AA0E9ECE4E9F2E9F2D20380BBA02AA6D30455C7A1BFC1BBAAC005C1
%4E607800003984003AAB2E9E2517ACAB2C32AA2B379C2A2C3B376EBC2A2E2F3C314E3F314A0E6E4
%4E60C8000039860C91BE0E014C014A0E4E45CA0E2E4E4EB35A0C320A0E8C4B6E7C006E2E8E4E7E6
%4E6BC80000398B0C114E3F4E714E5E2E2E4E714E7C114A024A0E42AC40380A0E014A020A0E0E414
%4E692800039 8A0A024F0E0E0E0C0A1BE61605BBBCCA100636C650914000000000 2AB5B0B59C54
%4E6A78000398C01 2B2B401BA028A02BA028A01BC01A28832B6CC10BC00BC00BC00BC10B85 04
%4E6E68000398E01BDFA4C314170E 20E1714CD4143B4A303A3B4A3D219B07274D84FC3B4A
%4E6E7800Q039900C 2 0 2 C04F 6 6C044454B55C3B3A7D10ACA4523CB0A F5ABAA574C00

```
%4E6198000399201 9A219A0D21BC00960C0A6C1BFAACC242824C44FDFDFDFBFC0BFC85151DC526
%4E6A28000399940C020C021C121C020C3402CC035C235C02CC403A5C2A6BFA2B2C0B2A2B871C235
%4E62E8000399607 6C728A006C006A04FDFE806C206A0CBA2B4DFDFD31BBEE8E4ECC4BE1B2A2880
%4E6768000399B01BA019A021A019A028A02AA028B405B428A02AA028A019A019A021006
%4E6978000399A03B0C1F3074 6D495A04A806 80C02AC12A6041C2A1710961C27106674 1E2351AA0
%4E6868000399C04261C72A6341E20B82A071096 16A41E20A84A04261C2741A41E2098 6A071096 1
%4E67E8000399E0C42A60C20381A0E90382616441D309616241D5096143C153C2A40380A5C15341
%4E6B3800039A0044E2C235C935E2710942E2C519C519E542E409C7A347A075A00A09C704C1044
%4E697800039A200AA0E40B0A09C2B5C203A0E103C2B5420A0BA028A21A0B0A09C905480A0B35A1
%4E6A0800039A40BFA0350B0A09C251C435C551420A0B1AA0BF2880A00B0A09C5B303A0E103B34
%4E6B5800039A600A0BA0E40A09C704C104470AA0C52BA009C7A347A044E2C519C519E5424 2E2
%4E687800039A8035C935E24244C4B5A40380A4B5446341D509616241 52D20961C2701AC10382A
%4E682800039AA0E90381536 1C02A6441E2098 6A042616841E20A84A042616A41C128A00B82A04
%4E692800039AC061C32AC1741A41E21A35A04261C70672701A41C128A14261C02AC12AC00680
%4E6B0800039AE0AFADBE00636C650A0A0000080500E5E6854A61EC34006C02A561EA814E14
%4E6CD800039B004150E971E4B2C041A8C1A4C2B2A0C4A1C2A11B6BA1C2A6C2A1CD41A1C2A3B54
%4E6B1800039B20C1A1C2A3C2A442A1C2B56141A1C2A14252C2A140C1A161E4C2A1C042C7A1E
%4E6D6800039B40A1CA4E1C2A161FA02A151C2A1E2D0A1C7A16167406 0E4C4BBA0E2CA4265C1A
%4E6E9800039B60C1A1C12AD02AE4E3C11BD01E54D1BFC542C40551C71B60C0BFC642C1B3A0E3B3
%4E6FD800039B806C40C9A150A1CD42C4B7A0C2A3E2B7D2A1C7A1CFBBA0C2A11E53A142A0BB69C1
%4E6AA800039BA0A1C2A742A1411EC6BFA0C140A1CA40A142A0BF63C040A142A168A1C140A16144
%4E6FB800039BC0C0A140C1ABC2A1E6C2A1CB1B2AC4A1C2A6C2A11ECCA1C2A5E0C240AFE374C241
%4E6C9800039BE0D414A81E642B6264A6BEB6A1B3B2AFA3B2B3A1B6DE00636C650436010 20B63A0
%4E660800039C00035104612180C20477 0421C70473C343C543C543C641C141C341C141C341C0
%4E674800039C202A41C441C341C14161C041C14160C141C24171C243C54363C043C0046464CC2A
%4E68A800039C4004C34162D111C041C44160C044A041A044C335417BC42A73CE51D551C641C428
%4E683800039C60C728C6417341C641A041A04165C141705CC004C454C10435C135C104C155C535
%4E684800039CB004C142E4C041C541E0C6427041 60C4356AC34170C241C2512A51C7512A51C441
%4E6A0800039CA0EAC041C40541E0CD5160C30435C404C751C641C541A041A041C7417341C63C
%4E6A4800039CC028C741C241D311C33543C65421C42A7354C604C944A041A04463C0416EC41C
%4E67C800039CE00661DC54606060D151C4412AC44362C14361C041C441C341C141C341C141C341
%4E686800039D00C441C02A41C341C141C341C128C041C05F217A73C9287004C251C151C551C151
%4E68F800039D20C551C451C000636C650A34071A00029C0C680B5B45C42C0B82620B81C40B8128
%4E607800039D40C2AFAB28C4442B1C40640B636360C444ABD11C421C7BEF7ECE1C60E8EEC2A377
%4E6C1800039D60A0678054C5B21CB22B4573A0CF1CA01CC0B64472A0D40444E26EE544C22B5152
%4E6DC800039D805252525 2C22BC4AA0B54C2A10381A6C344C80FBAC00F67C4410641EB0FA0CBBF
%4E6D4800039DA06143E70F230FA0CCBFAC12A00FA0C9BF636066A0228012DB352A22A0D028E935
%4E6D9800039DC0A012C00F80F9128 0C00F80DA2A1EC0206ECC2AC00FA0C552C1B5C3A3EB20A074
%4E6C6800039DE0C104C30A82CD20A0E6C30A84C8B8C020A0C451A4C10A80190A81E70FA0768056
%4E699800039E0004C2BA0A84E60F240FA0C50B60A052C22A0A82606261A00FA07408 1B58280428
%4E6AC800039E2063A2B4A7E0C0AA28BE05D50BC00B81608000636C65080307 1A0021DEA85B0C0B
%4E6DD800039E40DC4042AFAB24C20CB1C41CD04044AFABC31CC21CC20B81C128800B1B2C2AC10B
%4E617800039E60812882C5AFA0B261CA4E1B0BCFAFA1CF0CC10C80C874C473CAA3C1A5D30CC00C
%4E6F6800039E808064D154C3A3B2E1D21CC32881C32AD451C2B2A3B2CD54C054C82AC20F82CABF
%4E642800039EA0EBC106D0BFC94FCDB41BA3B2D0BFC94DBFEBC1B4A0C0A3C14DBFC3440F8042A0
%4E658800039EC0BDC0BFC0BFCEB2A6BAC0BC0B80CEBFC50FB3626CB2C2BEC0AAC572CD2881C535
%4E625800039EE0C22884C5A2B2A3B2A9B3A0B4A0B41BC5B7CA0C850B82C6BAC2AFA7B871CF0C86
%4E629800039F0060C10B814105C1AFA92BBECE0C86C30B81280000000000000000000000000000
%4E63D800039F200000000000000000000000000000000000000000000000000000000000000000
%4E63F800039F400000000000000000000000000000000000000000000000000000000000000000
%4E641800039F600000000000000000000000000000000000000000000000000000000000000000
%4E643800039F800000000000000000000000000000000000000000000000000000000000000000
%4E645800039FA00000000000000000000000000000000000000000000000000000000000000000
%4E647800039FC00000000000000000000000000000000000000000000000000000000000000000
%4E649800039FE00000000000000000000000000000000000000000000000000000000000000000
%4E67B80003A000636C65070D071A008497110B176842C421C03570CD04C226C02140AFA3C2A12
%4E6BC80003A020C341C41E72C21DC00E80C11DA003A02AC0A1C4AD2B1B0EC11DA0E0C21AC92772
%4E69280003A040C004352CA5C2A2607061AE28C20442C1356235C01AEAC74120C1A2B3C160E635
%4E69180003A060A0E27035C01C43E018C403E526A026A9E244C160E61BA071C41CE2422035C260
%4E6C980003A080E4C5A5E2C043A0C260C5A221C01BEDC31AA1C442A51B76A02873E1C34121B5CB
%4E6AE80003A0A0B2A0E1C22AC113A0C241A0402BA5E3E228C003BFA0BAA62140A0C30577A0C1B7
%4E6B380003A0C028C01828740642A1C235C203B2E173C02A7581C2A4B70CC00E80E0C3A2C71AC6
%4E6CA80003A0E00C811CBC0E80A0742AC21AC5B3A90E80A0C51B81C61AA01E0E81651CA022A2C3
%4E68480003A1001B81C51DA00E8103860EA170C41B81C420A0C3041B8404350EE028C46222C226
%4E6B180003A120A0C40386A1E12C0362C2A1C926E4E1C0362C1A127AE026A0C2576370A227C024
%4E67E80003A1402AC0C12AC01E2AC01B470A0E1C21863E0820318140C1B41130EC018607
%4E68D80003A160E1C0B9A0BA6270A05252511481430E806270A01BA0E165E22BA0B4A02BB4A0
%4E6AC80003A180B4A028B4A028B4C21BA0C6BE1BDD00636C650530071B0004F35B68178BC43C41
%4E687B0003A1A0A01B81C435C12180C113A01B81A01E81C121A04680A721E035CBA641A0E72
%4E6B280003A1C0A47221C703AC01A1E0E1C317C10E7B2B04A0E21BA0C80E72A0C2C40413C01E
%4E69A80003A1E0C3520E827C04C005C6B2C1A30E7B0BB0C006040304004C82BA2C103A2
%4E6A280003A200B2C7041804C303A0CAB9C503C1B4C00381C821CB35C1B511B0A0EB61AAE1113
```

%4E68C80003A220A0C35B4BB004C2126[illegible]1180A2B81143600C3BBC4B2A1B735E2C0356111B[illegible]
%4E6BC80003A2400B81C213CB2B35A068C2BF7135BBA028A81AC0A928C017C0722880A0C2B3C21A
%4E6BC80003A2601BA0E6C60BBFE1C40444A0E1C7B341E3C2A264AA2AC1732880C0278144A0C011
%4E68[illegible]80003A2[illegible]04C104184[illegible]1820A1B5C4B5C0B2A0C011A0C204C0350400E1[illegible]
%4E[illegible]0003A2A0[illegible]A443[illegible]35B5A[illegible]4A645A1E1C1A1E143E261C235A0E040A0C12A5[illegible]
%4E6D480003A2C0[illegible]1BE0C7A503A8E[illegible]120A011A067A0C013E5E3E12DA0E043C1B2E0E0C0D[illegible]
%4E6F280003A2E0C120C135E2E2E7E620A11EA5E2C0A6C4A1E0E0C0B2A02BC20C80E4C4BBC1BE28
%4E67A80003A300A02BCA0CB118A0E51EC004C100636C65002A071A0920A5685BD061E1218041A0
%4E6DE80003A3202A4[illegible]06E321E0E6E2[illegible]1E2E34180E040E8E4C02CE0C105C0A1C7A3E11EA0E4E[illegible]
%4E6A780003A340[illegible]1D0B80A[illegible]110A[illegible]482E7E2C10D8128C01081A06BC8B60DA00D708001A0[illegible]
%4E6E380003A360B[illegible]326E1C1A6E2C0A11[illegible]8228A0C3B5C61DE5E221A021E7EA4[illegible]E128E5[illegible]
%4E69F80003A380[illegible]1E041A[illegible]E02A60[illegible]1F1EA2E041A040C0A121A071A040[illegible]18E2[illegible]
%4E6FB80003A3A0E141E128E3C2BB02B[illegible]21FA028E2C2A1E5E0E221A0E2[illegible]C21EA0E3E2E[illegible]
%4E6A580003A3C010E1C31FA1C01FE0E1E344E01081A0C12CA0702871E128A0C51DA01DE11081A0
%4E6DF80003A3E0E2C11FA2C01EC20FA0C31DA0E01DA0E0108028E1E2E2E2220FA0E2E2C2A4E2C4
%4E6B980003A400A20F80A042A02840A028E4E2E240E2EFE21F2140E0E1666260E2E2E01FA0E2E1
%4E6D480003A42041A5B2A328A0E2E2E06448182E342E2C02AC5274460E4E2E4[illegible]204[illegible]
%4E6AA80003A440E2C1A7C2A3B4A0[illegible]8A128408B2A1B2840C02A4720814346C027C4BBE24280B2E4
%4E68080003A460C2B942C2B427C426A0266BA0C11800636C65161D071900100868B5040EC121E0
%4E68580003A480C72AE1211067040B82C20462A0E22CC00410AA0B82E2E2C020E0E210C0180E80
%4E67D80003A4A00C0E0C0E800CC00B82C3A2C0A2C0A21080C10382A00380A30341E0C40A84C010
%4E68780003A4[illegible]0CA2AC30D2804C126A0C00A84C010E2285120A06320C0350D80A0630A84B228E2
%4E6A980003A4E0E2E3C1AC03A040C3A2E5C46E204006C3204821C9560384C235A0C10D81C0671B
%4E6A080003A500C11240A00C0E0C18C157A1E203A603A0B4E0C3A5B335A0C220C02AC221E1C8BB
%4E6A980003A52044E46704E2204280C020C22AE5C11BCCB6E20F2040C320C1BFE041C035A7C0A[illegible]
%4E6A480003A540C0A6BE35A0C26228C0B2C163A0C535A0C22EA0C60DC104E220C104C20F20C104
%4E6D980003A560C81EC10A0DE02AE52CC10FE27272E6C1AAC0A6C0A7C36628E143C10EC32111B1
%4E69D80003A580CE0440441EC33511C00D82C821C4722BC0720E80C1B3E303A0C305C362A2C0A3
%4E6F080003A5A0E1CFB5E6601240A02CE1C21EC804C604C30DE2C20DC00DBFE672CA0DE10F4281
%4E6A280003A5C0ACC3727172B4A2E7C4610D81B640CB11C112C004C12028C30D8104C01BCA1180
%4E69080003A5E0BEE2C4610D81A0C02AC0B4C711211100636C65133307170902EC0B512860D818
%4E6C480003A600C328E0C651C62AC118C0A706A1C619A903A2C9A740D0A5C12AC12A40C041CBA4
%4E6CF80003A620C128C1AFA6C228B051C01BA019A0E419C419E019E119C251A4E0E2E2E219E2E2
%4E6CC80003A640C1A2C619A01BE7C8A2C5AFA735E6C01BC11BC01B2841C040C14228C1282A28C0
%4E69C80003A66052E440C02843C328C01BAC03A340C041C128C1281BA3C242C71BC12835C01BC0
%4E6C080003A6801BA51281C144C0A3C31BA62AC7A241E0C027E152E11281C9A32780A3C3A4CE28
%4E6AE80003A6A017C028C017C028C027C017CC12812AC027C517C217C017C82AA6B3C428C017C0
%4E68F80003A6C0275117C01752C3A52884C15328C053C053C05328A503A1C5A1178227C127C2A3
%4E6CD80003A6E046C81780A5178027C028C246C1A9C3A3B2C340A7D3A42881C4A5C51CA628817[illegible]
%4E65480003A70060C135C8A32881117460806082C93562827274 11C505E103A0B263802011741[illegible]
%4E67D80003A72081 61C6B467827175 11C7046782741181C256B635C304672072C028873500[illegible]
%4E69480003A74065101207170850 5EA1680EB561C140A0E0C214A0E7E0C00E82C003A1E2E2C2A1
%4E6DA80003A76003A1E2C040A0C2A1E2C076A0E4E6E0E5E6E6C12AE365E0E460E4C074A0E0C140
%4E6B580003A780A0C2A103A0E3C040A0C2A4E2E1E3E7E0C151E0E2C02AC1A1C404C640A0C15161
%4E6B380003A7A0C10E04C2510EE0C12AE0525252E4E0C12AE0C052E0E340A0C2A135A0B42CE1C0
%4E6E480003A7C040A0C2A4E263E0E460E4E0E4C075A0C12AE3E6E6E5E064E0C4707470A0C1A2E[illegible]
%4E6B980003A7E0E2C2A4E2C040A0E3E1E3E0E376A0E0C506C004C240A0C04204C005C40EE0C04[illegible]
%4E6E380003A800A0E3E0E3C45151E0E0C5A2E2E2C154A3B4E2E2C2B4A0E260E4E0E4E0C20E60E0
%4E6BE80003A820E5E6C32CE1C10EE365E0E460C470A0C1520EE0C07140A0C2A135A0E3C040A0C2
%4E6E680003A840A103A0E3E1C12AE0C42CE1E0C12AE0C42AC1A1C404E8C404E9E3E7E0C0520EE0
%4E6D880003A860C051E540A0C2A3B4C152A0C040A0C2A3B4E2E3E0E4C074A0E0E460E5E6E6C10E
%4E6A580003A88081E1E560C470A0E4C07428E0C103A1E2E2C2A103A1E2C040A0C2A161C140A0E[illegible]
%4E69180003A8A0C214A0C00EC004C00E80E0E063C00063 6C650D3B071708047A68B5044304C21F
%4E6DE80003A8C0C263192AC4192AC6351BC5AFA303C31BCC044541E6C7A303AACF3582C66324C0
%4E6C080003A8E0631BC121C3B2C005C2B2C1A5C1A2B4C21BC604C71BC16604E273A403B4A2B2C1
%4E6C680003A900A1C2B4C1A1CE04C522C62104CA1BC2A6C31E4474E3E2610441A1B5A2B3C2BAA0
%4E6FA80003A920C71BD51BCDA2C0B5A8B3A0C5BD43E321C022C304D453C2B3A303A679C26FC5BF
%4E6FB80003A940C2BF73A6C0B2A5CD61B2D0B5CABBC6B2A528C06A21C351C0B3C204C6B3C3207[illegible]
%4E6B180003A960[illegible]8A0C8A2C321E3BAC40B82C020C61940C321C3650B82B2A4B3C3A303A003C3
%4E6A180003A98021C40B812BC020C01942C01940C31BE4C40B82C3A3B4A3CE0B8242186421A0C0
%4E6D480003A9A0B7C621C40BB14035B6038EE241B0B80B82C11E28C31E28CF5E18C00B81C41E28
%4E6B580003A9C0D2A1B20380B5AFA1BF03B9A103BD06A0692AC52AC900636C650406071A00[illegible]
%4E6E280003A9E02B62041BDFC40394C92AC12AC02AC02AA02284A0C01B83C8B2AFA4B2A0D[illegible]
%4E6D280003AA00D1A8[illegible]383A9C70B87D60B81C00381C119C1A867C20B82A4C1[illegible]7D219EA[illegible]
%4E6F780003AA[illegible]0B84[illegible]4C0B468CA420BE[illegible]CA4156C07556755BE1D2BFA5Q381A[illegible]20564C[illegible]
%4E65A80003AA4035D1066D66CB35C735C6BFC6A5B4A9BBA0DFD0226465C1BFEBF1CBAFA[illegible]
%4E60380003AA606465CCB8AFA7B8DFC3A3C0A4C0A3E0C0A2C0A7C0BE2CE32B81E140E241A041A0
%4E6A280003AA8042C400636C65173B0C1F0230150368049B2880DFC745354560B6C019CD35D1B2
%4E6EB80003AAA0C1A1C2712C523551C17028CE19C2A540A6EA65CA35CDA4CD1CC01CC01CC01[illegible]
%4E6DE80003AAC019DE28C41AD8A3C51AC81AC1A542C175286066606965A3B4A042A0B3A3C21DC4
%4E60D80003AAE0A2C0A4286AC5B362C135C22CDA35C07FC8BF1AC135CA05CD2AC335C21BB[illegible]
%4E6DF80003AB00C819C0BFC0B4A628C054C054E2C135C635C41DC542C043A3B4A4B4A3C835[illegible]

%4E6F780003AB20C22AC31C61A6C24A6B67C71EB3CAB4C21E64C11EC235D735C543C11D61CAB449
%4E6DB80003AB407728C1B36BC218C177286EC151C243CA1DC843352AC07155C11DCCA4C243D0B4
%4E6C980003AB60C61EC71DC4B867C31DC0BE06C15128805A3560B23560C21CC0B32BC82A006564
%4E67180003ABB07A00000000000051600BA84A75358043C06604D044C804C91DC006C12B45C804D0
%4E62280003ABA044C9AFA044C94F40DFCE471B47DF5E8FD42AC02CC02AC56B6009BEA80380A4D0
%4E63680003ABC06B6FD835C91AE3D6BFC5A1DCA1FDC3B3C01AC16F2AC163A135C2BFA2CDA3B203
%4E6EA80003ABE080A1B2A41AC004CD6F04FE6FC91AADD0A1C10452E0C042D404E250E0C0B2D80A
%4E6E880003AC00E050C004C61AC31AC505E450E075D30AE0C042D33570D8B6A3B4CCBE6FCB28B4
%4E66680003AC20601900636C650A36071B0062915B6817757440A01B8174C12180C113A01B81A0
%4E6A480003AC401E81C121A04680A721A070C8A641A0E721A60BC221C703A0C1A1E0E1C317C10E
%4E6CB80003AC600BCB2B04A02BE11BA0CB0E0BE2E2C4041BA1C21E70C1B3520E820BCC04C005C6
%4E6A980003AC80B2C50E0BC80B80C00604C8040304C82BA2C103A3B2C7041804C303A0CAB9C503
%4E6A680003ACA0C1B4C00381C8217BC1B51180A0EB61AAE11180A0C3584B800435C11280C02AE1
%4E6B980003ACC01180A2B8114360C3BBC4B2A1B735E2706111BB17510B81C213C82B28A266C2BF
%4E6E580003ACE00B71BBA028A81AC2A728C017C00B6280A0C2B3C21A2BA2E4C60BBFE14A40A0C8
%4E67380003AD00B341E3C2A22863AA2AC10B6380C027806024B441A0C01180A0C004C1041840A0
%4E67380003AD20C1B2C2A1B5621128188B2A0C011A0C204700403E1C1046911A0C111A0C0A443E2
%4E6CC80003AD4035B5A5B4A2E245A1E1C1A1E143E2E172A0E040A0C12A6542A01BE4E2E01BE0C7
%4E6DB80003AD60A503A6E2E12CA011A0E8C013E5E3E12DA0E043C1B2E0E0C0B2C12071E2E2E7E6
%4E6EF80003AD8020A11EA5E2C0A6C4A1E0E0C0B2A02BC20C80E4C4BBC1BE28A028CA0CB11BA0E5
%4E6A280003ADA01EC004C100636C65173B0C1F000000A85A06602A80C52882C544452AC91BC84D
%4E6C780003ADC020C452C85219C14FC2537FD506D91AD756C5464740068266C156C32857068IC1
%4E6AB80003ADE00683C0494FC14A0680540681C24E1BC54219C2540680C10681C72881C24E421A
%4E67F80003AE00C40681C0068156C4534FC0471A2851C2064147415506B9C4068251C154C10681
%4E69480003AE20BFC72819C40565C619610689C60681C10681C106C04545404248400689C20681
%4E6B880003AE40C04A2881C84151C04051C351C6401BD154CB4F67440686CF068154C056C14FC0
%4E6F680003AE604FDFCA281A421AC84D55068155C1062855C64220D720D656DFCABE2AC7285A28
%4E64480003AE808052281B2851412852C1432A0065647A00000000000051030368049AC53584CA04
%4E6A880003AEA063C12AC2713584C019C619C041C1785235835262C0754162C246C04AC441C17F
%4E6A280003AEC0C454C319C04162C205C251C47219C041C541D641C541C24F41C141C319C041D2
%4E6BE80003AEE041C141C542C12AC71BC41B41C141676260CB41C141C4196EC441C01A41C54FC4
%4E6B280003AF0041C141D235C41BC041C141C042CD35C741C1422ABFCA71355F61C441C242C519
%4E6AE80003AF20C05CC435041B60C12AC241E6C44761C02CC21BC004C21BD228C541C142C119C0
%4E6AB80003AF4044C17B41C141E1E1D241C141CDA1C61BC041C14160C170A0D1417041EEE1C541
%4E6D080003AF60C14160C0772AC319C41BC041C141E7E6E3C241C01A4160C0792BC135C458C041
%4E69C80003AF80C141C542C01BE0C11BC135C0A1C142C14160C0714167C135C841C54160C935C0
%4E69B80003AFA073704160C07141C2BE28C25AC02AC05C3581C252C104C604C01BC0060065647A
%4E69980003AFC00D2F0002813018C368047535B063E0C2A160E4E22873C203A0E0C019E0C3A1C0
%4E6A880003AFE0A1C0202AA0E2038 0A0C2511BE1E0C0A1E003A0C01AE003A0E2E02C25A0E2E0C2
%4E6B380003B00004E7E2E003E8C0A2E003A0E0E003C551A0C0A1C0A128A1F0E0E01F63C02AE4E0
%4E6CF80003B020E0E0E0E0C052C004E0C22AA0E0E1E003C904E2E0C2A1C9B2E0E4E0E0E4C551C1
%4E6B980003B0401AA1C505C50419A0E025A0E0E0E1E7E4E0E0C204C425E4E003C904E2E0E028A2
%4E6D480003B060C041A0C5B2E0E0E0E0E0E0C004E2C418C3A1EEE0C2A1E2E5E003C203A0E0E0E4
%4E6CC80003B080C7BFA0E0E2C251E403A0C051E0E01F8058E7C252E0E00351E4E2C352E21AA1E0
%4E6A380003B0A00380C51BA0E0E2C4A1C204E4E0E0E103A0E203835362E1E2E203A1E061C3182A
%4E6AC80003B0C0E028E2C352E0C11D61A0E20352A0C05103A0E2E3C0A1C30380A0E2E9C1B2A0C4
%4E6BD80003B0E01E2AA0C0B2E3E2E00365A0E5E0E0C2A1C25163E5C0A1E8E0E1E0C05103B0A00
%4E69180003B10080A0E0C204C5A1E0C11CA0C0041DC904E0E0C0A12852E604C00381A0E0C052C
%4E6A780003B120A1E0E072A3C0A1E3C504E0C118C40382C31CA0C053A0E2E0C0A1C251E003A0
%4E69F80003B14003A02AE1E1E0E4C0A161A0C4BE355128E1E21EC251E0E5715 3C10600656 47A
%4E64C80003B1600000000021280B5E04682A803571C443E07C35627080734264717 0C11D7090
%4E6C880003B1802A66C0402841C051CFA30380AFA563CC2CC02AD31BCA1B461BC051C11C6CC0
%4E6C280003B1A04ACDA741A54172B1C72C35C32AB5C53542C31C696AC141D451C741718 0CDA103
%4E6C380003B1C081A2C341C11CD435C3B5416AC4B2C682C241C31BD841C02BC3BFC30380A2030
%4E6CD80003B1E0C205C30380A503A2C72AC152C652C12AC235C206C51BDCBFC735CB1BD0B2A103
%4E62580003B20081A1B2CCBFDF66C45164C4BFCABF2C35C32AC5352CE319C5B4C2AFB8E2D135B2
%4E6F980003B220C71BC951C01BD451E667C15160E835C3B6AFAABCC32B756078617B727375C8B6
%4E66880003B24061716075616B0065647A00000000000040155D5A28AA2C80CD04CD72056443E4C0
%4E6F580003B2600641F6D93543D37FD21A4BE0CDB6C6B46EC1701AC104EDC01ECC3504C53540CB
%4E6F580003B280AA41CA288255DFC2A6DFC1B3A3BB0384BCA60344C30EB80B8562CA0E41C00E83
%4E63E80003B2A00B8360C4BFCF0E810B83DF4445C57FCAB7AFA2B6E0C87FCB2CC6194E446ED21D
%4E64780003B2C0CF1BDFCA7719CB711BD31AD6B8CC1B4AC404C37FD31ABAC61BCE19C604C9BE76
%4E68580003B2E035B2C4BA35E2C11BC5350065647A00000000004007A8A7049E2780C742272AC9
%4E6F780003B30043646C4268410397D726C44F2A26D5AFA4C5444FC04026C86FD5777FC4ABCB48
%4E6D680003B32025DA7FC22AC06FC035C47426D0A3D37425C90B81C6BF6B06C205C1110B81C72A
%4E6D880003B340D2110B81C56FB4A2B8110B81C25FCB25C511840B81D60B86C026D50B86BF2AC4
%4E62980003B360435FC6B8ABC96D26D37FCFBF4126CD28566245AFA4D47FC1422A7F67560396CD
%4E6A580003B3806E63BE644C682800065647A0E1D0002000125A8AA61651B80D4406221A04FECC9
%4E6F880003B3A0281D7CA0E2C7A367A0E3E220E0F120E6CB05D84064B2F1C8A2C6B2E9C266A0E6
%4E65180003B3C05AE2E7E4EE21C3B7E3E21DEDEED219E9F04AA0C2A4C5B527C4A974E9C3BFC11F
%4E60980003B3E0D1BFE4D541A053A0C96DA0C5424AA0C040B5E2D625A2E2CB4FE457C6A4E8C3A2
%4E6FC80003B400B4C2441FE3C242A0F7E4C506F2E227C518ED1EE3E0C7A2CBB4E2C31DA0C46326

%4E6A980003B420EEFFD326C56227A0D3BEEAC51EC2B9C064280065647A00000000011000E686A
%4E6F480003B4409A48D52848E1741EA0E51BC441182AC32560A02CE328CC42E8E2E4C842E9E0E9
%4E60280003B460C442EACB1CC342D52AC542C420A1C205E7D128A0E3C572A0EFE1E7CE19B9C2A1
%4E61B80003B480C3B9E0CFA269CEA2E4E4C6A22857A0E4E2E2C526A0C71CA050C21EA221CDBFC3
%4E62C80003B4A0A1E5ECE828C3A1E9CC1AA0E253C61EC0B4E2C4B6E269B764A21FE9E3C41CA0D2
%4E64D80003B4C020E365A0E7C3A1C706A0E6E1E7E1E71DE61FE7E3E7E3E2F5E8E2E4C4B5E5E8E8
%4E60080003B4E021C01BA0E672B2E4C8A2E8E356D021A0B9E221FEE3C2BE28C9B828E962C20065
%4E6AB80003B500647A000000000020760E4B1168C42AF527C41BE0E8E8E7E021A043E8E21EE9E1
%4E67E80003B52041A0C021A421C211A0E0E2E4C12AE0C11BA01180C01180A0C111A0C12EA2C527
%4E6A080003B540C0A1181BA0E0E611A0C011804462E1C1A1E02AC62AA0C351B24262E1C5A2C2A2
%4E60280003B560E4C4A10BC252A0F61E60E2E0717373C6A1C3B5E01BD1B2E9E1F1E8C3B2CCB2E2
%4E69680003B58042628 0E0F5416280E173C30573C52CA040C1BF0B80E0D3522AA0416280A0C154
%4E60080003B5A0D127A0E7E1F1E91BC1B2CCB2E0C106C218E42AA0717373C21EA7E0E2F0EBC4A2
%4E6B080003B5C0C2A2E4C041C340E1C3A1E8E441C340E52A1BA0E61BA011E340C340C25211A0C2
%4E6B380003B5E018C011A01182E2515151E0C440C0B227C81EE0E57241E5E3272CB2C4B2E0C2A2
%4E6C980003B6002841C6A3C0A1C0A4C842D60B81C242E3C644E50B80E4C1BEC8446581C7006564
%4E66A80003B6207A0000000000010C111A0685A44C52AA02AC318A0C662A143E5C127A0E3C12754
%4E61580003B640A02A42A2E3E9E2E2C4A12CE2C2A435E2E458E1E7C91EE7E2C7A1E3E2C2431DC6
%4E6D980003B6601CC460A0E12CA0C543E3C1A2E31BC0A1E2C443C463A0C76128A0E8C719A0C7A3
%4E61080003B680C869A0D1B9E376A0E1C41CE8C31DB61BE0E31DE5E4E3C02AE5D02BA1E20383E2
%4E60180003B6A0CAA3BFC135A0C6B2C21B7B72E1651BA0EEE2C2A1E50382C1B4C2B7C22AC426E2
%4E6F980003B6C075E0C0B371A0C11FA3E450A01EEAE2C3612BE4C6B2A019E2C219A0CFB6C4A1E2
%4E61880003B6E0E3EDE0E571A0C106A051B4E9E11BC8A2E2E9C3A9CC1DD625C7B521CD622BA0E1
%4E6E980003B700C1A20E80C0AFA3C80E86D70E86C11853C22BE5C105C0BE0E86F1C30065647A0F
%4E6C480003B7200400020031 80A8AA665D0580D31FC74FE9C01BC14D2665A2E3B24FC027C2A1DC
%4E61B80003B740A143A0B2D5A1C520D5A1E1E1B2E2D1A1C54FECB2DD1EF9E1B2E1C2A1DD1DF4B2
%4E6FF80003B760DFE0C019A2B3C1632658CB1AE2BFC269604BA0C3ACBEA8E2C020C327C121CF42
%4E62980003B780A07CEFCDACD2491DE6CE6C1EA0C14020C246ABB9A1C1A259C627CA25C26A4FD4
%4E63480003B7A0A9DFC3A2BBCB451EC81BC6B6C4B6A8D2B4CFBEC7BBC41FCDB5060065647A0000
%4E6B080003B7C0000000030066860D95D2080282A69C00660C71862C518E22CE3E4E3E9E3E2E0C1
%4E6E280003B7E02CA0E319A0E719A0E32AA035C035A02AA0E3E2E5E2C219A0E419D519A0E619C4
%4E6F580003B800B244C3B2E3E84AE7EA4740E661E262E146E7E528A0E52A44E641E2E242E1CA19
%4E60C80003B820A0E5E4E519C719A061E2E662E119E6E5E8E5E541E2EA42E1C1BF03A0E5C505E5
%4E6FC80003B840E503414 3A0284CA0284342C3A8C1A743CE26C226DFDFD21DE0EE70EB4CE279E0
%4E60180003B860F270E7C7A128A1E775E0E7194050A0E770E3E7C019B9C0B9192AA0E7E3EAE246
%4E6A080003B880E2EDE44CA0E8E6CABE28A0696449C00065647A000000000236603B504683580
%4E6A080003B8A0C025D416842BCF05C71684C125C225C05269623552168435 44AA43A9417083C0
%4E6B680003B8C01DC41DC7601B7784D9352880352852C5651D52C063521B2B3542A643A843A5C1
%4E6B080003B8E01BC01683C61DC91DC341C10A83D62C0435520A350A3552C01DC2631D521DC562
%4E6BA80003B900A343A443A743A270C019C41CCB1DC12579D626C52B281BC33552C51EC26052C2
%4E6A680003B9206327BFA843A342A243A42628DB26DE2A81C062265226C526C26152C126C33542
%4E6DD80003B940AFADDD6028DE20732052202873207620C42AAFAC42707A1EC41E71C01EC61ECA
%4E6DD80003B9602AC82AC16528C21EC3605228665228C61EA541A842A742A106C16F766FCD43BE
%4E65980003B980C1521852615261 1BC81BC22A04C0182800 65647A000000000000369A866A06A35
%4E61380003B9A080C7472663442 6C052A0F5E3E35A46A0E52BE2C55AA0E7E3EFE3E4E368E3E3E6
%4E6E180003B9C0E3EBE3C3420453A0E9E3C80380A0E3C20380B8E1E363C31BE2E374A0E3C3410E
%4E6EB80003B9E0B1E4C540A1E3C70E81E5C25045A0C8060E80C1422AA3BBA2C74226ADCAA7CA04
%4E60980003BA00D2BFCA04C205C549AB35C335A1B4A7037BA75F26E277CA58A0E8E3EEC3B4C103
%4E63580003BA20B1E0E369E1E3E7E3C543A0E3C635E1E3E8E3C752A0E3E6E3EDE3E4E3EFE32A70
%4E60A80003BA40A0E3F1C3A2E366C2BFE7C244A0EBC551A0E6ECE9C1BE2666C04135BA4E006564
%4E69280003BA607A023200008011 4059A85A6ADF47A06405C528A01958A419A4C2A519A3194542
%4E6B480003BA80A019C12CA41942A01941F2190619766F42AAC161631AA41BD91942A163A219F6
%4E6BB80003BAA055A11942B5C365A22AC2B345A41A4CA319C36519C8B4198045A01941A019/D19
%4E6CD80003BAC0A11A45A319A319C7BA194180A4C22C46A156A0C16FC7BF427542B219C1A31A42
%4E69E80003BAE0B569A219A2191B44A4194842A01940A01949C363B519C0616119A01970D119A3
%4E6B280003BB001A43A94B41A2D36319C06B19A01942B4D1B2C1A319A419CAA619C1611AA01961
%4E6DF80003BB2019C8B4191A19C20640A01A6F42A819AAD21940D0BC19D619B42AC31BA9C4A91B
%4E69780003BB40CF281A506CBECD28B46D0065647A000000000200756B596A58E42B80C8202A20
%4E60380003BB604751C105E1D821E5D721E6515AE1C6A1E419ED47E0E4EC48E1E4EA4169A0E419
%4E63980003BB80F8E444F3E4D819A0E419D02AE6E447C720E7E4CF2067A0E419F8E4CCBF42E7E4
%4E64480003BBA04F67A0E419F8E4F9E4476FA0E41945F1E4EF47A0E45AE1EAE419EA6BA0E4E941
%4E6DB80003BBC0EBC4A2E5F0DE19A075DFDFD8B2C5BE2A21B0284D8075C2060065647A00000000
%4E6BF80003BBE00030405DE09ADF2B80D304C706E840E040E042A040C0A140E91FA0E01FA0E01F
%4E60680003BC00A0E12CA0E0E1E045E0E2E2C261E1E32BA0E3E0EC20EC35A0EAE2E21FA0E51FE3
%4E6E280003BC20E2E2E0E2E0E0E7E2C328A02AA0C050A0E2C128A056A028A0E419A0E4E4E1E62A
%4E60080003BC40E3E4E2E2E3E6E2E6E0E0E2E3E42AA0E4E4C050A0E2C253A0402AA0E2C1A1E2E2
%4E63D80003BC60E2C30380A0C319E1E1E9E2EBE1E3E2E2E2C0BF1DCD05E1E2E4E2E1EEE2E2C9B4
%4E62C80003BC80E1E1E8E2EBE1E1E2E2281FE0E3E3E2E2E1E0E2E035A0E320E41DA0E0E9E2E3E7
%4E64580003BCA0E1E2EDECE219A019A0E2E4ECC051A0E0E2E2E8E3E1E7ECE320E2E2E1E2E8E3E3
%4E62780003BCC0E2C0A140E0EDE7E3E0E1E4E4E7E5E3E220EAE5E7E020C1BE20A0E51DE520E1C8
%4E65A80003BCE0350065647A000000000004348689F040E1F80C12BC906C620C020C020C020C020
%4E6F480003BD00CB0388CA691B884DC61B88C42AC46454E32885A22AC52AC1A3C1A40388CA6735

%4E6F480003BD20C01BC61BC32AC12A47C51BC61BCB67AA57D71BC21BC10382C76228C71BC21BD4
%4E6B780003BD40A3C11BC21BCD6628805BA056A057A057A056A052C81A44DA690381C00383C254
%4E6F080003BD60C01AC4BF0387C03582C235C135CA6228C4ABD31EC81ECA6FD1A22840D028C464
%4E60680003BD80A54DC4A2C1B22BD86228DFDA6228D028D277C8774046C067BF1EA15BA05BA05A
%4E60580003BDA0A11EBF47A340C3A15CC65CA1C96735C235C635DFC42BC2BE622BC335B3C305C1
%4E67E80003BDC0B335C11AC41A0065647A00000000802113036804 5D1D8073C72A7A80C02A06B
%4E60580003BDE0C34F4871C02AC219CD1979C435C4196267C11974DFC44F42CA2BC11F35C51FC0
%4E62A80003BE002CC41F61DF62C94C69C825C825CE19D128C1196BC445CC2CCB35DFD0BF63C42B
%4E60980003BE20C30569CB1FCE1FD355D55FC74555C75FC719D12B67C75A2561C435255AC319C2
%4E6FF80003BE402AC94C77C65FD05F60C22A64C0041FC22EC21F62C21FCD4F4151DF76C21963C0
%4E6D580003BE601963C219C335195773C1584F47DFDFC2BE06718061C32C76C72A1D0065647A00
%4E6678000Q3BE8000000080507803B504160680C13580C219C01AC63526C028C118C228C006C344
%4E6C6800̀003BEA0C444C444C628C165612BC628C620D519C119C220C426C826C32BCB42C354354
%4E6FC90003BEC0C44355C355436FCC3581DC632BC71685C328CA44C445C344C66835 84DE73D774
%4E60380003BEE0C52A1683C526C426C15444C35D45C020DA68BFC15FCB05C46FCE3557CA5144C4
%4E6FA80003BF004AC2584329C318C474168976DFC51AC752C22AC952C6354C5CC8496FCE20C820
%4E6EB80003BF20C66020C819C06E2A566A2A43C84F43DFDD2AC020D845D06CBE06C0551928C019
%4E6F180003BF405835196054C2281828C25435193551C02?C00600000000000000000000000000
%4E64380003BF600000000000000000000000000000000000000000000000000000000000000000
%4E64580003BF800000000000000000000000000000000000000000000000000000000000000000
%4E64780003BFA00000000000000000000000000000000000000000000000000000000000000000
%4E64980003BFC00000000000000000000000000000000000000000000000000000000000000000
%4E64B80003BFE00000000000000000000000000000000000000000000000000000000000000000
%4E6A080003C000636C65173B0C1F001002090C1566C106C5040F83C61FC41FC135C505C1AFA42A
%4E6D480003C020C90416837CC5B335C304168376EA19A02BC2AFA42AE319A2C00444CC1AE46C8
%4E6F680003C0400444C61AEEB219AFA52B727BC035C22CC01ACBB435E1C71FC21FD4A2C80387C6
%4E6BF80003C060B2A03570CD6143D96143CB8335CB6143D96142BF28AEB8A20380654372 77C504
%4E6B880003C080C5614377 76C10400356543C1AFA1C5614 3C220C720C504C56143C720C620C104
%4E6E530003C0A0C56143C1AFA1C56143C21DC71DC504C1BF6443C71DC61DC104C56143C1AFA1C5
%4E6B380003C0C06143C52A288C118C028802AC204C4BF61BF42C52A288018C228802AC204C25F
%4E6F480003C0E05F6243C1AFA1CE1AC71AC504C4B2C1B2D504C1B6C22880C2BEC71AC61AC104C1
%4E64D80003C10028C128C128C10065647A000000000020236B5A045D3580C02BC73540C02CC235
%4E6EC80003C120C12A70746A2AC01FC01FC01F2AC21BDA1F4242C753D5286EC61FC11BDE28CA05
%4E6DB80003C140C9B606B6CF19C119CB1F77C72B455145 73C120C3A90381A74244A428C727200
%4E6DA80003C1602560608270460054D72C4EC206CA26C42540C22162766EC8BFD22AC2B7DAC1B
%4E6A380003C180CBBD35JCC11C401EB7C2262A2635C11BC0214760A500B3A4B600A53E1616
%4E6C180003C1A019C719D328D91AC32AD0B5C1BF40B06A63D11ADF72D51A8064C035404628
%4E6C280003C1C040702853480C1B8AFA4B44770C92C26C126434EC62644D12841C225 43C7BE7
%4E64E80003C1E0C326C12643C400e5647A171A000100400568670466188027606035C221C035C0
%4E6DC80003C2001E656220C011B2D935CC21446AC42AC02AC02AC02AC81ED8282CCA1AC71EC01E
%4E6FA80003C220C01EC01E4970D31AD42B414040D327DFD026DFDF4370D5286ECC1AD705DB10F
%4E60280003C240C65F41705FC55FC11AC25FC106D326C913DFDA27CC1ADF47704B404040 74DFD
%4E6C680003C2601BC01BC01BD327D726C92BC021C021C021C021C01ACD1AD71ECE2AC02AC02AC0
%4E6D380003C2802A422C1D43DFC0216544DDBE181BC01BC01B355E61C15E1EC3355E2762 2C5E11
%4E66F80003C2A0810065647A111100028273015668040DC121C4108763C4066080C3AFA5C1A3D5
%4E6D180003C2C028C40660C41981AFA2C1A12AD628C406C025C02AC619AFA061C21A6881C11FC5
%4E6EE80003C2E01FD4038CF11CC81CA0CC26C01A62CA35C01FD203B460C12AD52862CF26DA1606
%4E62E80003C3001FD416DA25814 0BFCE05C8BF4381BFDABF16DE16C3BFC0BFC63562C51FC1BF41
%4E6F580003C320CC5803835 96840C22683BF1F69496ACA2A46C95FA01CC81CA05E45C903BD4501
%4E6F180003C34021C51F6042C9AFB9C71A84C326C52AC525C82A82C0AFA1BBC50683C026C226CE
%4E6E480003C36025C3BCA0BAA0BAA0C1AFA3BCC0BE7EC01AC12A06B90A821A0A83C61B3504 1B1
%4E6D880003C3800636C65081F000088537 6B8DB687BC31D54D019D43BC819C51DC905C1B2A7C6
%4E62480003C3A0B21DF5E538A32A72CEA5C4B4A3463BD61EB6A9EA28C61EC82A60C8A728A01EC9
%4E68680003C3C0B26A606012A13BA2E8E01B60A028A028C0404060E1C2A238A1C340424038A0E0
%4E6C180003C3E0E0E0E81AC0A1E0E0E0E0E0E1C04040B4A0C81AE1E0C040A0E0E040A0E0C041A2
%4E69F80003C400C61AE1E028A0C04041A014A0E0C01BA01881A5E2E0E01BA0E0C0A1E0E0523981
%4E67280003C420C41AA0E0C040404040A0C01B60A0C01B3BC8B2A0C0404060A0E0E01BA04041A2
%4E6CE80003C440E9E0C0A2C0404041A0C0403BECE0C11BA0E0E0C0A112A0C7A5E8E0E0C4B355E4
%4E61480003C460CDA3C2B6C9A2C0A9C421A0EDEEC3B33A80A2CFA4C0A13BA028C32AA2C41EA6C0
%4E6CB80003C4801E59A2C2A52AC8A252E1C31EC42C58A071A0398170C31EC506B206C5A1E31881
%4E6A480003C4A0B3C0ABC0A6C6A2E0CA06A006C91EE070C31EC82AA02AC50065647A0000000000
%4E6B680003C4C0543068D9A0A7A11980404A502851515151 19A01980E8EEC219A01980E8ECC419
%4E6E380003C4E0A01980E848E0C07419A01980E8E8C81960E9E640E94044E2C118E1C07BA044E4
%4E6EE80003C500E2C42A48A0EA28A0D028A02C48A0C07FE1E8F5E640D42AAC0C118E1C07818CC2A
%4E63C80003C520A0E2CE05EDCA18C006BFEE2A7FEDDA2AA0E2CB18CB2AA0C118E1C07FE5E640F3
%4E60380003C540E8D228A04047A0C07E28A0EA2CA0EFEAE2CC1960E9C118E1C07819A01980E8E5
%4E6FE80003C56040C619A01980E8E8C619A01980E8EAC07219A01980E8ECC219A01980E8LEC0B
%4E63880003C580A019804C2028805150285150006564 7A000000000011510AA8616AC7622C6316
%4E6ED80003C5A06C2A525BA61AA3C1A72A82E1E0C028A821C2A7C92881B2B2C0B2A0C0B2E0EFE0
%4E6FB80003C5C0C02880B3C6A1C7B3B373C0622AC2A4C9B4D3A556C028ACE0C961A3B8B7B2B2B2
%4E6C680003C5E0B2B2B2B2B2B7B2A5C6B3A31AC14AC21AA3CC2B43284366B2CA60442144C06421C?
%4E613800 03C6001BA2507378C320CAA8C3A7D32A62C8B5C2BFC1A2D51BC51EC0A6CAA6C7A5CA1B
%4E6268 0̀003C620C4B5DE21E7DBB3C4A21BA0C6B4B4CB1B52C705E9C0B2C7A1B2E1CE2CA01EEBE0

%4E61080003C640C0BAA2BAA5B4ECE4C106A02AF261A0C628A0E261A0EAE3E4E4F5D2B6A21EA71B
%4E68080003C660A91EA0B5DFC1BE6B6B652800065647A00000000002070A85104AA21804E113567
%4E61180003C6807006C2AFABC3214F6645AFA9B3C3214FCFAFA9C5214F6448AFA7C7710EB02881
%4E62E80003C6A0C00EB128820EB1CCAFA5C9214FCFABC0ABDD20CBA5CC20CD4073AB2BBFD82882
%4E62D80003C6C0C0BFCA41B5ABBBA0E1C30EC41D4FC10EA00EBD0EBB0EB7C428AEC20EB3D511C1
%4E6F080003C6E01EC00385C156C04072A9C12881C8A4B961C9B3A2C2A3CBA5C9700BC01BA7B3C0
%4E6E580003C700B3A2C135C20B81C128801AE862C90B1BC2B3C12BC2A2C7A1B4DB1BC474A1B2C1
%4E60E80003C720B3C31AC321C2B6A5C3A2C41AC1B6C448B6A4C2A1B2C1B5E2B4C2BE05EFCAB72A
%4E69380003C7400065647A0000000000035259A85D5AC4062A52E6E266601FC2062AE7E0E1E1C0
%4E62680003C760062A1A74A052A0CCAFAAC46B1DC06FCC6FDF5ED3A6C51FCD621A707055B6E4E0
%4E6DC80003C780E0E0E0E0F31DA01DA01DA01DA01DA01D5D2A53A01DA01DA01DA01DA01DA0CE2A
%4E6AE80003C7A0E319A019A019A019A019A0195DC26019A019A019A019A019A019A0CDA4B7A0E0
%4E6E780003C7C0E0C0A5BF41B2C26F48A0C2A1B8D619A0C31FC21B681D612064A041A8C12AAAC2
%4E6D380003C7E01C42A0C1671DD019A0FD43407AC81FE14440C22BC5ABE2414053C82AC11CC262
%4E6B180003C80019A04240CC6B19A042407AC3A144A04440B5C7B4EB4440A0C1BD2832C02AC11F
%4E60180003C8200C30552C42CBB40C11FA0D4A3E478C1B40C0A1C0B4C1BEC7B2C6BCC02CB2C22AC5
%4E6C180003C84028005647A000000000060D05A681FD940A0C91FC01FC01FF0E4D41AE3C4EEE9
%4E65380003C860E4C653E4EBE4EAE7E4E4C3B5E3C452E3E441A0E0E6E5E4E62AE1E4E5E6E4E4E2
%4E60480003C880E5E2E4E22864A02BA0E5E4E4E028C620E644E0E4ECCC21C021A06BA0CDA22AC6
%4E61980003C8A0A3B3A569202CA0D6BFC320E24DCAB32BE328E4F2E4E319A0E143EAE420E2E3EF
%4E66C80003C8C0E4EB43EA63E9CA19E3C3B6E2E543EAE7E56EA0E7E564C419E3E7E5EF42E3E5EF
%4E60180003C8E0E7E54AE342E3E5EFE7E7E2E942E3C4BE70A00670A02C4362A0E7C2050065647A
%4E6C480003C900000000000013117A8605A9F358020A0C94F0560E2FAC81942A07FFFE3DFEDB4CB
%4E63C80003C920A0EEC441A020A0DB4FC2424FE0F6C14319D41AA0E7DFE0E6D77FC12BECCBBFF8
%4E64B80003C940FE20E1E7C0427FDFC04FD54CA1EBD020A0DFECD41A57E2E6E9D32EC103A4ECCD
%4E6CE80003C9601EC006E3C4482BA0FD6EE1F0C1B4D228A066BE2004C2B54FE42035006564 7A00
%4E66D80003C98000000000500A0368045B2C80622028C1196560C21F62A0C106D22BE6C120F3E5
%4E6F780003C9A0E3D01C70A0E3E32862AAC0A1B4E1E6C420606660E5E465DA1F6870E76B64EA19
%4E6CC80003C9C0A0C81FC02068E719A0E265F219A0E27A6070C235E5E4D057C05770617 5A02B26
%4E6E880003C9E064C6A1E0C9A5C2BA47A0D028BF63C435C205C0B247B2C947A0C435641169C6A2
%4E6CE80003CA00E0487B60716BD5357171DFE962656761C720C2A2F8627C62648061 7967D911D2
%4E6EC80003CA20BA61606358285828626 1CAA2B3A6C0A8BAE6E0C42A81C52A607BE21B61C92BC9
%4E68080003CA40BEC82AB31EC51EB328C521820065647A0000000002024D5AA8040935 80C311C1
%4E6AB80003CA606535C2630CC00DC00EC006C511D10CC00DC00E5103C22BC11145CA0CC00DC00E
%4E6B680003CA8082C411CC1BC30CC00D530382C411D10C540D84C46FC10C0384C01183651ACA0C
%4E63780003CAA086D6570386DFDF4143DFC32EC51BC81BCF5CD0038DD035CD055E038CBF038DCE
%4E65380003CAC035D0038EDFDFD21AC9601ADFE0E1E0E14EDFDFC61BE0C11BE1DFCEA3C165A249
%4E62180003CAE0C42CC01EC62BE6DFCC1EC43580C71BE0CBB4C4BE3580C3657D5E355DC2683500
%4E65C80003CB0065647A000000000000B0505F06682C806665644ED01073C421D821284 6D0107F
%4E6E680003CB20D71041C1A7C1A840404A404044404079434FDF64474F66DF454FDFCCB8D1B865
%4E62E80003CB40DC1FBFCE05DFDFDF6F454FDF64474FDF4D4FDF48C12B41404044404 0C2068235
%4E6AB80003CB60C6B9A6C2A7BA11B4C52BD111762142D11177D511C20380BE656764C15311C204
%4E69280003CB802A0065647A000000000305E5D5A0E683580C40C91C42A72E644E473C90C9176
%4E65D80003CBA0EBE577DFDFC7B260E040E040E040E060CB2CDDA2E8FAE66FE1EC61DFD42AE8C9
%4E65F80003CBC0A2DFD7BF44E0C12AC305C22A44DCB2DFCBA2C72AE8DFC55DF3626AE1DFE2E2E2
%4E6EC80003CBE0E3C5A4F3C51EE2D85EC40462E040E040E040E060CA04DEA4C1A2C0A2C0A2C1A1
%4E69680003CC0072C61EFAC303817FC12CC1BE1EC40406B3C10E8DC3350065647A00000000011C
%4E6C080003CC20570A5A040B2A81C119C006C419CB430BC72AC55103C51BC340C9B2C072CE52C1
%4E6AA80003CC40417262C51B73C5520385A061C01BA641B2A0CE0435C72AC0A14375C40386A0CB
%4E6D580003CC60A141B2A0CD35C628C2284519C152C51BC051C577C5B2A00381B2ACCDA235CB35
%4E62B80003CC8068616 1C719DFDFEFE0E0E0C60382C728FEDEC2BFE0E0E0E0C119C305C319C426
%4E61180003CCA0D155C1355 3C6DFA2BFC128E2C2B8C30383F3CFBAA363E2D104EDC719C435C0A2
%4E6D580003CCC0C0A1B261E2C25335CD40C328E7C00383A8035140B2C1B262E2E9C542ECE0E0E0
%4E6F480003CCE064C1B2A141B2C1B261E2E9C42AC143EAE0E0E0C8B242B2A328ED6169C12861E8
%4E6A780003CD00C72AC0B2C62AEDCEBEC12A28C028606060E063C5B260C12C0065647A00000000
%4E69380003CD20802038597 5C344C22BC01BA01BC006C11BA019C02840A006C12840A019C02BE7
%4E69880003CD40E5E4E5C528607161726171617261C028DFC01B4B42454042525455555 4A206C4
%4E6E880003CD601BC51AC214C01B4542C5B4CBB4CC28607162C1B5617162C1B561C0287C7BDFC5
%4E6C380003CDB01BC21BC51BC01AC21AC51BC00642525554545 5A2194443CB1AC41AC5B5C5B461
%4E6A980003CDA0C1B5C5B4C4BF28607161 72C1057162716 1C028DFC00642404346C91A52555455
%4E6E180003CDC054A21A444340 42CB1AC5B4CBB4CC28607162C1B5617161C2B561C0287C7BDFC5
%4E6B780003CDE0064240 43C61AC31A81C206525454555455A219C21AC01BC51AC41AC31BC41AC5B5
%4E6DB80003CE00C5B404B5C5B4C52B6071617261716 17261C02BE5E5E4E5C4BEC128E106C02BC1
%4E66D80003CE201BA006C028C01BA0C128C106A01AC20065647A00000000 9010C86859049A20E
%4E6DC80003CE40DC35C006E01DA0C12AE01B4273A06543DEABC1A3C1A941DE06E01DA0E31B4C
%4E61280003CE60A065C32ADEABC1A3C1A941DE28E01DA0C12AE01B42732 86543DEABC1A3C1A9DE
%4E6F780003CE80C106E01EA0E31B4273A065C32CDDBFABC1A3C1A85F0540DE28E01CA0C22AA01B
%4E61080003CEA0427 3A06543DEABC1A3C1A9DFE31EA0E31B4273A065C32ADEABC1A3C1A941DE0C
%4E6E880003CEC0E01DA0E31B4273A065C32ADEABC1A3C1A941DE28E01CA0C22AA01B4273C6A5
%4E69380003CF60BE23DB6EC00065647A0000000000060A76250605F1082EA1FA06840C000DA1646
%4E60280003CF00E81FA02857C8AFA44AD128DFDFCEA11FAAD120A2060475D3B2A0B20304C6B25C
%4E6EE80003CF2028E3E152F4C12171C1B2D520C72BF557D51FC1B2C5B3C9BF1082C835C1B352C5
%4E62280003CF40BFC2BF5BC1B264C10F82D220D5B3C1B2C5B2C2BFD6B2D62BC82BD4A341A3B3D4

%4E61C80003CF602B20?0DDBECFB410817ACB1EB150EDB2ADB2A0D310CD0F82C02B41
%4E6A080003CF80A6BC63C90FD2BE1007?FD1280065647A00000000000205AB5A045DC
%4E6D280003CFA0?BC11BA271DC?5E9D?82C6442A602AC24904E61BCD401A
%4E614800003CFC0A5C0451BC3A11B?31B07A1E372CE2BC41BA1C24D411AC?A1?72A60
%4E6F380003CFE0451BC72BA21AD1A128A128A128A0B2A135C25C7DC21BC11B6135B4AFA
%4E61E80003D000C0BFCDB22B80D11D72C6B3A0CE03BEA1CF2AC42AC7A1DEA14C1A64C9A1CC2AC4
%4E6E180003D0202ACAA11A616061C5B4CEA135D6441DA10386D535A1CE4EA1C74B441DC2A1D91D
%4E69180003D040C3A11BFA1DEA1C0BE63C52B60C1431DC055C5060065647A000000000171
%4E6F980003D06004????0663EED41BC02A42C1A1C10562D5A1FDCC2A6BD92AC2A4C2A14CCEA
%4E60580003D0804DC735A1E4B2B3D11BC1A1FDE5C32A40C10383E7BAE5D5A1E5C21967E9
%4E62180003D0A0A74BDFE975BF67E3BAE643CFA1C6AA42C456C0A17F0BC5573581A2E67
%4E6E480003D0C080A1E742750BC035C5A1C219C3AEE040C1A1D028C32AC5A1E7C7B2E7C1A1E74
%4E6CC80003D0E0C4350463C4A1C7AFA2C1A1D31A70C02A2C2AC003A1E7C8B2F361C604C
%4E69C80003D100C2AFA2B5F2E7C5BE35E562E7407580065647A000000000002920E5E9B6A4
%4E6D980003D12068C72CC0521EC12B42286EC0A2C841A2CDA1CA421E61C850A11ACA43D2A6C528
%4E6C780003D140CC0A86C154A02880C6540D86C6A16C411D411B42C5A158A2C20B85A
%4E60280003D1601AC104C51A76CF04CEA3708070B0C4A26ECD1DCC5FC1B2A0CAA2D0A11969C2BF
%4E6CD80003D180C81AC4A1C4BFD0A2B2A0C2A164C3A32880C12882C3A1C2A1357660CD19A160C0
%4E6E980003D1A0A1D2BFC5A1C2A152BFA27A5319A1C2A263CB352CC5A1E2C9A20382B2A1B3C419
%4E60180003D1C0A1C2B673A3F1690665CB1A6062C0541CC2AEB2ABC41DC71CC81CCCB2A01CC5B2
%4E6DE80003D1E0A01CD4A1C1A1C2A1C1A1C505E6C51BA1C51BA150B9C4BEC01DC0B2A056A056A0
%4E66F80003D200C70065647A000000000300A0E0D285EC3A170E072C0351C2ACF0535A142A
%4E6D280003D220044204E5C62AE7C0A243E5EF03A2C4A17B75C244E0D843B379C1352CCB4272E1
%4E6C580003D240C1A162B7A30380A475EA0C83C3610CC303A3C135E664C363C243B2A2B7C3BA0C
%4E6F780003D26085C30C82E2CB67C36372CB0380ACB5CF0C81C16DE6C0A1410C81C16A1E60BF78
%4E6B780003D280600CB50C81C3ABC80C85C42A4128402B412842ADB5C01CC44E70CD524028402B
%4E6BC80003D2A040512B5146C1B2C7A1B40380A5461E40C204C3A4CD45C435A1CF1C46C2A3C3A4
%4E6C980003D2C0B32835A6D04C1D77C61D42A5B242CFA2B342C542C428D00383A32A81D347A345
%4E6C580003D2E0C1B7C5A3B4491E467848B340A042BE421E35BD2CC4B5C147B342A01E40060065
%4E69680003D300647A00000000010579E6A0E04CE35D6A14D4C28C052CAA90381C428A0C0A7D1
%4E6F280003D3205252522ADB2882DF66F2E8C04FDFECC0A2D01E8082CE57576A0E54C453515151
%4E6A880003D34051515 1C32881C9ADF2D451515151515151C20EE0C1424CA02BA02BA0C1BFA1E0
%4E63C80003D360E0E4C2BFF0C51DD0450EE3E2C6BFE4E2E5DFC01CE1C11CE9C04240A0E3D0BFEC
%4E61080003D380E0E0E0E0C9464FD1B5A0D22CC635C10EC8A1BCC0B8C4B3A95C0651CD54D871C3
%4E6CF80003D3A0554942A2B4ADB9AAC4356E4B05CD462A44BEC3725252525252C14F2A1E006564
%4E68F80003D3C07A0000000081244668 5A585D358043E0C2A140E4E228C335C2A1E0C019E0C3A1
%4E6E780003D3E0C0A1C01F2AA0C2A3C31BE1C2A1C0A260C0A2E42C20A0C2B2E0EBE2C0A2EAE0B2
%4E6E180003D400A0C0A2E0C0A2E5C0A1C0A128A1F2C0B32543E6E0E0E0E2E4C22AE4C0A2CCB3C0
%4E6E780003D420B2C2A1C9B2E0E4C0B2E668A1C50566A0C120A0E0E0C1B3E7E4C2B2C825E4C0A2
%4E60A80003D440CEB2E028A0C0A3C5B2E0E0E0E0C0B2E0E454C3A1CEB2C4A1E9C0A2C1A1E2E4C7
%4E60B80003D460BFA0E0E2C8A2E2E02180B9E7C4B2C0A1B2C4B3E268A1C0A1B3C51BA0E4E4B4E8
%4E6CB80003D480E0E0C1A2C2A5B342C1B2E2C2A3E04153E128E2E57141A0C2A1B3A0C0B2A1E2E3
%4E61E80003D4A0E0B4C3A2EDC1B2A0C41E2AA0C0B2E3C4A8E7E0C2A147E5E1EAC3B3C0B2A5CBA1
%4E6E880003D4C0E0C11C72EBC0B2C0A128E7C1B2A2E5C0B2E0E4B4A0C0A1C3B2C7B351E303A273
%4E6D680003D4E0A0E1E2E2B2C4A2C004C4A22AC1B5E1E0E4E0B341A0E0C00403BE35A028E1E21D
%4E69F80003D500C2B2E0E5E2C004060065647A0000000000526F5EAA04281E80DC1EDF456FC02A
%4E64180003D5201ECA6FC26FD71ED81EC46FC8691E4ECF038DD235C11DC319E1F3E835D4A1E5D4
%4E6DA80003D54019C10385A0C01BD635C235C91AC41AD772C2BFC272CA05DB5335C2355
%4E6EC80003D5600384C119CB1AC7A1C4A1C71AC572C435A0EBC05AC372ECC11BC41CC035A1D
%4E63A60003D580038AA14F4EDFC928D328C41A28D6281ADA28DD281ACA1A6FDFC628C0BE0
%4E67380003D5A00065647A0000000000B3A30B5B5AA828801B6060C02BCA2B6160606000701
%4E64780003D5C0DE1BDFCD2B6FDFDFC5A2D5752AC51DC01DC87BA06364DFD32C6667806180C7
%4E6DA80003D5E0A3C806D6A203A0C1B5A2C84256D3BF42CB0553CA4256C235D042EA03A0CE42D0
%4E60580003D6001ACA4256C1B6C2B6CD42C22AC519E0C019C42AC742E9E2D71AC1A1C0A151DFD
%4E69980003D620D51A5253C643DB43DB43DB43DB42BE7D2ACB412B0065647A00000000064F00
%4E6F480003D6405E045BC11ACC2869C12A2CC11A5176C32865C52A35C2AFADD62B80C42BA
%4E6D880003D66042C1A373C31AC7286ACA4DC9A562C035806163C2A276C735806AD2358
%4E6E380003D680C23580CBA32872C6476166C81AC22CC609CCA5C109C635C009C228A376C4
%4E60480003D6A0530964C3BFCE05E209CAA5CC04C7A31BC55C61E761C61AC243A0C3574A5B7DC1
%4E6DB80003D6C05D2B61C12864C15FA2C542C24F40C728B265D01AC1542B51C2B4AFA145C042D0
%4E60E80003D6E01BC21AD11AC54454A2C2AFA31E7261DFD72BC02A63B3AFA3DFC1BE06C13A62D
%4E6C680003D7001AC10065647A00000000004066A85E6B9D35802ACE2A1ECC771A2AD7
%4E60B60003D720C619CD441BDAAEC7751AC042441AC11BDA35A0B268D2A1CB76B4C84FC8
%4E6FB80003D7402B7FCCB3A1C673712BA9C4A22CC01AC5BBA4C306C147A7CB42B2A2C3042D4
%4E6CE80003D760C805E1C4401BE2C8A5C306C043B2A7C7702CA4C0B2A3C0041CC1411ECE1AC041
%4E6E780003D78004C0A3D5B7A362A1C32CD72AC0A2C0A1B4C34FDF61DFDF6B61612A606161C04
%4E6DC80003D7A01E61C02A1E61C2AFAF2BC249472B54C12C5052CC2CC4492C5251515253C4BE47
%4E6A880003D7C048462CC1280065647A000000000429D0B5A686A2B804E2A4ADFDFC11F646271
%4E61A80003D7E06162626252DF5BDFDF5F72FEE0E0E0E0E0E0E01DA0E0E0E0E0E052C61CD21D
%4E61E80003D800C2A1E0E0E0E0E0E0E0E0E0E0E0E0C31DDFC0AFABCC11D2BFCA11CF05C006CD
%4E61980003D82011D0BFC3AFABC11DDEA1E0E0E01CA0E0E0E0E0E0E0E0E053C52EF9E0E0E0E0
%4E61E80003D840E0E0E0E0E01DA0E0E0E0DE2ADFDF545FDFDF59626262627160616 2C21FDDBCC0
%4E6A080003D860BE4F4BC20065647A15350002803300596 6A168A11980CE2B4CA019804981AC42

%4E6AA80003D880A01928E41983A0604EA01980E41940A0654BA0E619A06AC4505019A070E4065F
%4E67080003D8A0E52CE566EFE661D328A0C6AF77A0FFFFC818D42AA0DE2AAFC305DCBFD618DFD3
%4E62E80003D8C02AAFCD2AA0FDC818F3DC28A0DC28A0C6AFE62CE561CC515019A070E4664CA0E6
%4E6A780003D8E0065F42A0E619A06A46A01928E41940A06549A01980E41983A0604CA01980498I
%4E6CF80003D900ACC0BEA01980CD2BCC0065647A0000000000800E5C5E1A1DD91CDE1CC5198F47
%4E69880003D920DE1CDE1CC82BC52B4DD6ABDFC328C328DFDFDFC22BDFCD75C805CEACD91EC36F
%4E67680003D940C92BC35F69D4BF68DE1EC206C128C328D21EDE1ED7ACC228C52BDFDFDFDFCC74
%4E6FD80003D960D7ABDB1CC5198F47D5BC47C4BECE5E48C40065647A092B000080132F4B685E61
%4E6D480003D9801480CD1B2C2855432ACF1B2A283A70554081C2AFA0C2A50B81C70E811E0E85B3
%4E6C080003D9A0C31A438150540E81C00E86A04781C5A9C327A4628173C318C13970E06B81CB39
%4E6D980003D9C0C206A02AC11A4681C8AD18714181C1B7D92881D11E746380C027CAA7CB3980A3
%4E6D980003D9E0C327D83B81C5A41B63CD2A1EC404C135A53BC6BFC5A23B14C104C005C004C114
%4E6F880003DA003BA3CC3BA2B5A135C104542A6DC31BA4C53B81C0BFD627C4A2398175C3A7B5C9
%4E60580003DA2027608lC1BF55CBBF6581DC0B8170C11BBEACBE4881C51AC32AA006C2396A81EC
%4E6D280003DA4070C039187364B1C1B4A427C4A7B44581E70E861E574180BFC31AC40E811E0E81
%4E6CD80003DA60C3274680A671AFB742B051682C1BCDBE2A0B54C3B33A282A1BCC1400636C6503
%4E68480003DA802400008C844A0378687BC80E801117B0C417B0110EB0C705C70E80111417C417
%4E6AD80003DAA014110E807CC20E80111780711C11780110E8072C3AF38AE1A73C92C79D2381438
%4E6F780003DAC0D519C62AC619C6A538A838A839A46C7161F762E27AC51AE225A0E0E0E02538C2
%4E6CB80003DAE01AC5AAE2C01FE0C2A93B39C1181B181B18C01C386060E0E0601CC0181B181B18
%4E6A880003DB00C13980C245E150E050E0C245CAB360E0E0606060C0B3E7C243C019A0C119A0C0
%4E69480003DB2019E0C01CE019C143C11FA051C035E16060E060E060E0C13550E11AC24260C11C
%4E6A380003DB40A050E050E0C01C6044C61CE260E060606060E0C21CC5A1432A19A0C01FE0C01F
%4E69E80003DB60E0C01FE0192A43A1E0C02A52E13880E0E060E0E038A051C22AC442608022E050
%4E68780003DB80E050E0C022388044C52B18E23880606060E06080A0C2182BC6425019A0C025E0
%4E6A380003DBA0C025E0C025E0192844C127C3186219A0E019A0E019A0E019A0C218E4C1068IAI
%4E6C980003DBC0C02A605060C02C6050C0A10682C0A135C0BFA2BBAFA0BBA2BFC035B2E222A035
%4E6B180003DBE0C220C33A391B803920C22CA022A0E5E038E7608039386 4A0E0E3E0663938B035
%4E68C80003DC00A0C535E2E0C21AC21DC4391B80393AC71DC31AC000636C65060D000004000058
%4E69D80003DC206839B52880C41081D674108167CA05C1AFA80380A4C8118214C014C811806200
%4E62480003DC402AC71182D035A10380AFAC2EC22E69C02ACB7FCD5139C02ED518DFC72EDF4A4E
%4E61B80003DC6046D228C47F43D528D3BFDFD3284C44444BDFDF61D38F6F426142E241FB46D64
%4E6AA80003DC80CC2CC07E0449C3AFAC0380C013C923C624C020C310813A80C01351C751235107
%4E6CB80003DCA03B81C1512051C41081A20380ABB3AE28CE26CC1DBE2ACD512651CB060065647A
%4E69280003DCC00E2302018834197B5A5E5D194028A01AC128A0C23AA028523806A01A60A028C0
%4E6C280003DCE006A0E1E040E038A038A0E0E42AA1412AA042A051E17081E0E0E2E0E42AF4C2E
%4E6C880003DD00E26040E04242E050E02CE0E070E040E4E428A0E2E01BE2E4E4E05CE2C11CE1E0
%4E6B360003DD2040E2E0E2E2E2E0C128A040E1E240E24044E042E050C0A171E1E46180E272C0E0
%4E6D680003DD4071A0E0C01940E0E440E2E042E140E2E0C01CE0E2C01CE0E050E0E0E3E4E4E0F4
%4E6BC80003DD602BE35041E06138E0C328A0E4E0E240E161A0E0E2E2E0E2C23940C2A1E463A040
%4E6CA80003DD8042E01AE3E528E1E0E4C105E106E3E0C01BE0E14060E01A90E040E2E0C11BA0E2
%4E6D780003DDA0E060E144E0E240E2E0E443E061E1E4C31CA06141E0E1E2E2E0C01CE0E042E062
%4E6CB80003DDC042A062E0E042E0E2E042E0E5E4E462E062E062E0E1E24070E040E2E0E2E0E242
%4E6D380003DDE0E0E2E060E040E2E042E061E2E4E4C21BE061E128E4E0704028A0E240E2E0E2E0
%4E6BF80003DE00E3E2E042E0E2E0E22BA0C128A04162E0E4E406C01BE161C1A1E428A0E24050E0
%4E6AA80003DE2006A0E2406438C0A13861A01AA0E2E060E0C039E2E0E0C028A03A38C328A02B1A
%4E6AA80003DE4080C139E42861E02C38C000636C65173B0C1F8010150BA8395D2E80C228A071C1
%4E6B380003DE6042288 02B4271E0632CE2C742C341E3E164A0C7423A8142C6A2C12BC21BA0C441
%4E6F080003DE8053C341CBA1E1C219C14138C25441E31EC235C16F38E6C1A1DFC66805DC530519
%4E60080003DEA07CC419C338C253C840D13E2ECA40CF6B1A80C147C752C519C44A1AC11C033663
%4E6D280003DEC0453964388 03984C25339803839823880398 2BF2BC23AD53AC12831C23AD53AC1
%4E6CA80003DEE02BC039833880398338398438398338803982441AD41B8048D445C81CD242CE62
%4E60D80003DF001DC94071C2651DC9611DC240AFADC2631AC1613BC019CC6FC73BC51ACE18C4AB
%4E60280003DF20C4A53BA3C63B18842BCE18C03BC5A7B5D63BC9BE06B306C11AC162B761B42B1A
%4E66F80003DF40B2C928000000000000000000000000000000000000000000000000000000000000
%4E64580003DF6000000000000000000000000000000000000000000000000000000000000000000
%4E64780003DF8000000000000000000000000000000000000000000000000000000000000000000
%4E64980003DFA000000000000000000000000000000000000000000000000000000000000000000
%4E64B80003DFC000000000000000000000000000000000000000000000000000000000000000000
%4E64D80003DFE000000000000000000000000000000000000000000000000000000000000000000
%4E69680003E00063 6C65173B0C1F8042F26859A09A2A8043C01BC406404240A071 2842C01B6
%4E6EE80003E020A1C31BC2A2C2B2E9B267B2A042DF47C01BEAC71BC3A4B3E5C473A0C7119405
%4E60A80003E040C91BC9B2C42AC02C49C22AA2C8B3A1B8A2B3C2B4A0E1B3A36EE9741A80C120CE
%4E6DD80003E060B2CDB6A1CD77286D38A038C3A5C1A22846C338C2384280C11AA0E106AAC238E2
%4E6CC80003E0806040B0C7BFC0511FC11F61E1C005C03842807DB2C538C238C2AAC1B3CA38A038
%4E60580003E0A019C21CE028C01CC21CD4B8C5B2CCB964F2C01FC6A542CBA32BC6501DA5E342C5
%4E6F680003E0C0A4B2C71DC21C28C01CC2A1C25028C25AB3A2B2CDB2E1C41DC41DC552A2C72BE2
%4E62280003E0E08448C55F28E1C2A228D8B4E11DA3E1B9EBCB5FC11DC2A1C5BE48D250B3C0068A
%4E6AB80003E10006C1B22BC01DA01DC32A0065647A0E07020108 11EA5D5A286AC12CA0F741E409
%4E63F80003E12005E8E7F7E7F344E1F7E7F3E7F7E7F3E7C535F040E5F3C728D728E3E0E0E0E0E0
%4E6FE80003E140E0E0E0E0E0E0E0E0E0E0FFE0E0E0E0E0E0E0E0E0E0E0E0E0E0DF6170A00B85
%4E61880003E1601A0B842A0B85A060C1039EDFDFDFDFDF1A6363C128C11BC123C11B63DFDFC328

%4E6D280003E1804002841C12841C128C11EC02841C12840DFC728C528C528C728C70ECC0EC70E
%4E69B80003E1A0C718CC18C71873C1530E5374C4530E5371C2530653C000636C65173B0C1F0071
%4E69780003E1C0A3B851045920861A0D83562A0D21AC41B62A0C142A0C405E4C11A66A0C142A0
%4E68F80003E1E04A38A0C11AC0530380E1C142A0411976C138A0C9434119C1B5C2B571C1400381
%4E6AC80003E20035C02879E14238A071C21881E3E371E14438A07168A0E74638A06BA0E54838A0
%4E6B580003E220C2282AC1551862A0D4A2C00381E2C1B6C735C7B635C055E5C238A538A9410381
%4E6BF80003E240C120A0E2E311C21DC11CC328C451E1E211A0E311CE28A0C0BFE21160A0E3C8B3
%4E6AA80003E26043A043A0E4C7B4E43813E045A0C020E0E228E6E238A047A02842A01338B5C538
%4E69180003E280A0E24235C028E3E313A0E6400A82C00381A1E4C44638A0C00A81C035C0180A60
%4E69580003E2A0A0E4C021C12AC51DA0400A82C0510A2861A0E4C41DC438A0C00A8153C0038261
%4E6DD80003E2C0A0E42AEA038267A0E4C3B5C438A0C820E2E312B5A0C42AE3E4E4E312C02838A0
%4E6DE80003E2E041A3E114E8E3E1401AA0C31DE3C1A10881E0E3C02AA01AE2E8E1C345A1C438A5
%4E68280003E30042A00BC11BC0BE28CD3981062A80A03AC028380BC22C00636C650A210201083D
%4E6D080003E320FB0D785AA82880CA06C078A01AA019382A1AC61DF160191A81F5E26019A0031D
%4E6E380003E340C0B3EE1AE36019C91DC343E11AE560C8B3C44250A0E0E61AC2B4CA42B3A0E019
%4E6B380003E36038666 2A03864A2C270A060E074731BA6C528A01AA06019A0C67A3BE560E0E005
%4E6AD80003E380ADE360E06019A0C42A1AC5781AA060193860E0C335C318C53B55A060E06019A0
%4E6C980003E3A0C2AD553850E060E07018CA1857A0E050E019A0BF35C418C43BBFC005C13B52A0
%4E6D680003E3C060E0E0C1AD58A0E0E0C0A12AC67C1AA060E0E051C318C53B57A0193850E019AF
%4E6BC80003E3E0C32A50A060E0E0E02881D11AA060E060E0CE3BC3BC1AA06050601938C7A538A0
%4E69D80003E400C228A06019A060E0C51CC173712CE56060E07F038043A1E06019A0C4741DC21D
%4E6DD80003E420C0B2C24250A01AA0E0E5CE43E11AA0651AF5E560C3B6C2B4C21DC4B5E3C3601A
%4E69980003E440CB03816B601AA0BEC828B2C02CBE7828A01A381A382A00636C655F1101000002
%4E6E180003E460FF685B619E43D4397028C226C2A2C0A2C0A1C1A2C0A1C2397028C72AE0E2E2E2
%4E6BA80003E4802AC135C726C2A2C220E02EA050C2A42162EEE251802C51C1B2C42AC42080E2C9
%4E6AC80003E4A0B3C60381C020E0C0A1C12A042C6CECC104C1B2E35162C5B4C120C013C1A450B3
%4E6AE80003E4C054C1B345E0C206C02A56C22AB348C03SD61B408040C138C2B4C5A3C1835162S0
%4E6D680003E4E0C326C03881C0A5E452C1B34AC32635E2C32AB3C82643D33560C1BFA9E4275462
%4E6EB80003E500C1B3C535C275A055C1B3C535C77AB3E1C672A3C4B6C3B6E46150CB3C23C571
%4E6A880003E52038 1BC1B366C83841C2713803803BCA73388142C0B3C2113B1838C37982C41305
%4E6BA80003E54003 81A0C32AE8C613C23BC03A21E05162C2B3C2A5B7A1B2C111B3A2C5A2C2A2C7
%4E6B880003E5607028C404CB721B47C235C004C71180A0C3B8C571A9C111A3C5A85151C13B22C3
%4E67D80003E5800561D3B4E1C4BE1B2A1BA06380A04AC104C035C200636C65000D0103005440 68
%4E68780003E5A05BA1540680C02A43444344192A7940704271407 14172C6A939AFA02882D32840
%4E6C880003E5C0C1212C44C157535 12841C15528C0AFA1CD3AC027A048CA19D2287CC727C127A0
%4E6DF80003E5E0C11E80A04743C7A3C0A3E443C02AC4B4DA14C3A1DD1E80D127C319C02AC13B44
%4E6F380003E60080A424C0B343E0E3B8A0BCA23BE841C3192861C0BFC43BC805C1A663CA1E57E3
%4E69880003E62 0414A80A04380A0C2A45028C3521B6365E25428C352A0286942E6E22881544903
%4E62C80003E6402AC3BFC2BF6BB3A8B2D428DABB42CB2EE9C3A6C5A3B346801EC81EA0E52705
%4E6F280003E66040C22A28D428C42AC7BA4F45C055ABB7AAB71E64E01B6128E71B602A1B42C13F
%4E68680003E6804145 4847C10065647A10380102 8020AE0D689C4E06807080CA42641BC40673C1
%4E6B580003E6A01BC12AE342C542C51E70C1A561A152A51D427080B20E64C6A1C2427682C65528
%4E6D880003E6C0C242C6A3D143C11E62D41C42C0A2CCB2C6B3C5456345 1C4260C845DB28C343C2
%4E6D380003E6E0A4C4A42BC71C43CA42C640E4CE42C6401D63C8A15242A053B8C50C82C050028 3
%4E6DC80003E700A0C1B6C21AA055B4C1BF0C82B6C10C83A0C42CA02AA0C0426EE7E242C01D51D7
%4E6E480003E72042A5D64263C1A4C75742C04165C7A4C31DC441DAA41DCAB564C25641DD41D6D5
%4E6BB80003E74068C7A3C642C6A3D142C12A718228D1B2C041A40E821BC205CF417482D441746 2
%4E66B80003E760C0BE6BB52A62A051A028C11EA0C00600636C6514210102 80424D035104390680
%4E6BE80003E7801AC106C035C1212AC035C628C02AC12135C01BC006C22ACC05C43A6DC23A81CF
%4E6C180003E7A02AC22863C335CA35C128C13AC23AC22011C2A1B4A8B4CC753A82C020C00BC028
%4E6CE80003E7C085C00BC728C13A8028C60BC80BD40BC80BC63A8060201180 73C178C20BC80BC3
%4E62E80003E7E01A65C80BC80BC479CE0BC80BC17AC028CF0BC80BC935C90BC80BD40BC80BCB09
%4E6D780003E80081C51BC81BC51AC1BFC10981C020C3A25BA25BA3C440C4091AC6285CC035A05C
%4E6D780003E820C1355C28C528C4098058C4BD35A2C044C0BDC435C409C028C23BC028A0E828C0
%4E6D180003E84057C809C35A4735 8046C01AC43BC009EBE10A85285A6C84A0C14B28C43BC12047
%4E69780003E860E1350A84C8564204403B1183A0C14A58C5356147E128C72A69043BC120C035A0
%4E69980003E880C14B6847E10A85C01A3504C10665043B1183A0C14B61816347E1C628C21A6081
%4E67A80003E8A06380E5C14BC0BE21 1180C32011C428A02880A00A85C035060406006 36C65142A
%4E67680003E8C0010208 5219A8940693402AC21FC0422881C6412A634051C0062806C051CF5106
%4E69D80003E8E081C61206C552D052C20680CC05C60682C252C30681C654C354C228704D520680
%4E67180003E900C14341540681C20681C20680C828800680280 6C04453C452C14FC70680427251
%4E6AD80003E9200681C44606 81C2720681D24551C22852C8487FC553C152C154C90684C17FC052
%4E69980003E940C51F444256C34454C353C30680C353750651 0680D555C5760682CF06C106C006
%4E67C80003E960C006C5287852C00682C041404028 53C30682C055C052C02852CA06C006C006C1
%4E67F80003E98052CB400680C10681C465600680C551C64154C1062806C64306D20683C5288006
%4E68480003E9A081C821C22806C223C723404452C152C4064653C253C552C14A0681C0404C0682
%4E6A180003E9C0C7142 86206C652C2634651C754C3610681C10681C255C051C452DFC00681C253
%4E67080003E9E0C00681C60681C653CB2880062A512821 51602A554051288052C02CC051212806
%4E69F80003EA0028062A2806C00065647A15000102802066 68CE119BC42AF527C470A0E8E8E7E0
%4E69A80003EA2021A00E82E811 81A01EC70B80A0E10E80A0C021A421E3E0E2C30BA043C11BA011
%4E6DF80003EA4083A0E2C12EA2C527C0A1181BA0E0E6E0118260E7C1A1E02AC62AA0C4B20EE7C5
%4E62680003EA60A2C2A2E4E4E5F61EE4E0414343C6A1C3B5E07FC1B2E7E0E1F1E8C382CCB2E20E

%4E6D380003EA80C60BA0F50EC50B80A043C30543C52CA0C2BFC10B28D3532A60E5C154D12760E6
%4E6F480003EAA0E1F1E971B2CCB2E0C106C218E42AA0414343C21EA7E0E2F0C306E6C4A2C2A2E4
%4E6D380003EAC0E9C3A1E8E4EC2A1BA0E61BA011CD5151A0C218C011A01182E2515152C8D227C5
%4E6F480003EAE01EE0C370A041B2E7E3272CB2C32AB2E0C2A21CC670A3C0A1C0A4D70E83CE0E81
%4E6B580003EB00E0F1E60EB0BEDC0E8000636C65152B01020060B078A139BA1881C52AC104C46B
%4E68280003EB202BC03951C7110411C81180C111C22AC128C039813839813BA238398138398138
%4E69480003EB40398138A0C439406572727272 1E44C2A138A2383981383981383981383981 7571
%4E6A780003EB60A01EC2742BC2732138753AB2404139813 8A238398138A238C75240C363781EC3
%4E6A780003EB80B543C452C0A1383981383981383981C252C9523A38E01B7821383AB240753A5C
%4E68180003EBA04042C0398138398138A142C2526111523A38C12B4327C43A21A0C52A447352C1
%4E68280003EBC07239813841C052C25278B2403A52C17838C052407652353835813835523 5C1A1
%4E68880003EBE0C052C0517138C5BFC052404 6C053C005383AA003A0C051C251457352443980A0
%4E65D80003EC00403AA003A0C103A0C0B5C062715240C052C11B46E003B240C411C1524042C052
%4E69D80003EC2038A73B3951427139C4115240E41EC71EE50344C452C0A138398138A238B2C252
%4E68880003EC404075524027C8275240C13A54C43A5240C03981383981383981383981 38C17262
%4E6B980003EC605240E01BC32BCA1BC15245C2A138398138398138A238398138B240C827C97827
%4E6B280003EC80C8523839813839813839813839813839813839 51C6613A80CA713A80C31BA1C2
%4E68980003ECA05339A23981A43986A5B6686D63A0210380BE2ACE6B040600636C65000100 0200
%4E6AF80003ECC03312686108 9E2280C42CA0E406C02A3980210E1E0E271780E7C12BA0C20E71A0
%4E6AE80003ECE0C2111392839283828 39C10BE2E128A0E30EE241803928392839283951 1B42C11B
%4E6E580003ED00E4E5C23AC53918C2A1520BE32CC6A5C43953C11843E21ACA1BA0C4392AA2C0A4
%4E6FD80003ED20E11A41C551E1E4C574A8CFB54C6648D3B2E9F4C43BE2712B0021A0C3A3C0A1B6
%4E6EC80003ED40A52944E5C33BD1B6A2EB21E460B2C713A0C6BFC2A20381A0C0A1EAC605E4E2C6
%4E6FE80003ED6044C127E3ECC117A026A7E442EBC117A026E6E441CC0EA0E7E440E5E5E428E2C0
%4E61280003ED801BE22BE6C01A21E475A0E3E4C61AA3E4C02CE0E3EBEBE3E360C335E22804A374
%4E60580003EDA0A0EEC52BF7D2B225B2A011C2A3CC2BA01066A011CEA4C918A0D72B3E35C235A0
%4E6A780003EDC0C8B621C027492B0063 6C65173B0C1F00720168599161288 04F454306D61BE528
%4E6E580003EDE0D123C335E5C5A90381A5B3E34AA1E5C20B1B38C31ECC11A0E328C20B80A118A1
%4E6C980003EE000DC3278076 11A0C217A0E135A0C03BA01ECE542717E2E11E0DEE42C017A0E41E
%4E6D980003EE200D814BC3A1B3A0C51E0D80CA0380A2E12AC6A10D804D35C3A2E3513B4D81E354
%4E6BE80003EE4011817C55A0551181C72AC717A017C62B81C1BF7080C1A1E824A0D11BE817A017
%4E62A80003EE60D5BE0380C02AA0FDD62CC5B5CDBFC8A162A0DC19A01943C4BCD019A019E4D2BF
%4E6F780003EE802EE119E6D0A4E9C51B2BCA356AA0C3B2A221C7056CA044D52861A0C4B7A1C7B4
%4E6AB80003EEA0C3B46CA0CA04C3046DA0C6BEC104C30443B52C4362A02A430072657A0B140C
%4E6D380003EEC08243FD7B4E39041E8061C813351 3CA06A11EA260C928CBA1C205A10EC7523
%4E62D80003EEE052C8A1C5A1E83AA0C8A1C7A1E73BA0C7A1C9A1D0A1CBA146C6A1CDAFA0D110C8
%4E6CF80003EF001CD3B2A043E3B2D21CA1C6A11CCA3983C4A10383A1CC20C111C935CC3982C211
%4E6B080003EF2052D3A2C3352EC03A384041C3054341C1383AC12D18BFC211D4A2C611C674C135
%4E6E280003EF40C174CB543981C020E90383A1CC398253C4A1C5A11CD21CA142E3D3A11EC71FF3
%4E62D80003EF60B2A9B2BEA0EEBF45C6A1CCA1C63AC7A1CAA1D1A16581A1E738A0C8A1C6A12AD3
%4E6C280003EF802AA1C31EA1C83951C05139C9A1C2A1CA1035106AA106A1CA1409811469C0A1BE
%4E68F80003EFA006C953142A142A145368C01EA000636C65090C0C008000004D5A3978E3E12BC0
%4E6A780003EFC03A0435C0183B18E92B28C006C105707114C02AC21882E8C151397371C12AC218
%4E60280003EFE082C8043A80C016A4C1A3B2C053398153C8A103A2CD3B46EDE0E0EAE0E0DFEA60
%4E65780003F000E0EA60E0DFEAE0E0EAE0E04DC3A2DFFBE2DCB8D014AC20AE14BFC9B2C6B2F8E2
%4E63080003F020D42BDFC5A2CA35D80D80EDE0E0EAE0E0DF4880A060E0EA60E048DFE0E0E0EAE0
%4E6E780003F040E0DFD72DCC39800339 80F503A228C03A8004D5043AC016CEBEEBC139BE06C01C
%4E69080003F0603551C814EB2B51060065647A0E230201883419B85AC65E1BC03828A01AC12850
%4E69880003F08060C12672411A60A028C02C50E0E0C040A039C0A1C039E42AC3383AA0E2411DC0
%4E6B980003F0A02AA0C01D81E0C0B2E2E0E4E5E2E0E260C04042A0C240A070E0E11DA0C01DE006
%4E6C880003F0C0A0E4E428A0E2E01BE2E4E42AA070E206C01CE162A0C042A0E0E2E2C240A0C128
%4E6C080003F0E0A0C04142A0C042A0E0E4E0E2E070C0A1C11DE1E41A6161A0C21DE0E5C11DA0E0
%4E6A680003F100C019C040A0E4C042A0E0C241A0C042A0E0C01CE0E2C01CE0E070C040A0E3E4C4
%4E6C580003F12039C039E42BE370C140A06140A0C32839E4E0E2E0E161A0E0E2E2E0E2C239E0C2
%4E69A80003F140A1E463A0C04240A01AE3E528E1E0E4C105E106E3C0401BC041A0C0401AE01A80
%4E6B280003F160E0C042A0E0C11BA0E2E060E1C440A0E2C042A0E0E4C340A061E1E4C31CA061E1
%4E6CF80003F180E0E1E2E2E0C01CE0E0C240A0E2C238A062E0E0C240A0E2E0C240A0C42BA0E4E4
%4E6C680003F1A062E062E062E0E1E2E0C01DE0C042A0E0E2E0E2C339E0E2C0401AE0C042A0E0C2
%4E6C980003F1C040A061E2E4E4C21BE061E106E4C0401DC03828A0E2C042A0E0E2E0E3E2E0E21A
%4E6B380003F1E0A0E2E0C240A0C128A0C028A062E0E4E406C01BE161C1A1E428A0C240401EE0E0
%4E67080003F200E228441A404011AA01AA0E2E060C04042A0C040A0E13AA0C306A02B1A80E106
%4E69080003F22070E1607150A02C00636C650A3009170833DB0EA83964CA182B2D2E28180438C0
%4E6E880003F2403AC0357A74C42C2AC004387373CD038538CCA5C43887C1A9EBB4398654C135CC
%4E60280003F2603BC33BDB0380B2ABB6C9A4B4C104CF1EA5C704DEAFA1CD606067606FC060611E
%4E68380003F280C221C0606066A1C56060676028 18C4A1C82818631BC260606E606067602818C1
%4E6B080003F2A01BCC60612772C060606505C7606067606FC028186760606 6A6B9A538AAC2B6A1
%4E64E80003F2C0DFDFDBBDC5AFA6C121A5C20C816FCB0C816EB2C8AFA371A8C10D826FCA0D826B
%4E66D80003F2E0B2CBAFA0C127ABC044663506D041184167 06B2CE0065647A000000000020000 9
%4E66D80003F30003686BDF7556C52CC535DFDFCDAFA062A0C505DFD9A8B37255DFDFDBA6D6D
%4E65B80003F320D0A5B3DFCCBFDA42DD19DFD3A5CCBCC545D945CA0BCCB844B5D944DA44D40
%4E6A880003F34044DA44DA44DA45D945D945CDBECA44B3CA0CC10065647A0000000001000458 6
%4E6FC80003F360494ADFD619C01AC01BC128D70970C00BC02ADF23D71CC01DC01EC02C2DD70CC0
%4E6CF80003F3800DC00EC02FC2AFA4C730C1AFA4C01FC020C021C031D80FC010C011C132DD33D8

%4E6D380003F3A022C023C024C134D712C013C014C035DF2ED725C026C027C4ABBEBEABBEC015C0
%4E6B480003F3C016C017C3BFDFDFD718DFD3056FDFDFDFDFDFDFDFDFDFDFBEDE00636C65173B0C
%4E6CF80003F3E01F880105A84645000660C5450660CC2881CC2881ECB2A6C1A5B2A7C1A3DC454B
%4E60D80003F4004749AEC1ACC94D4E06CBA7C1AA464A28A04642A9C1A6C9B3D4A24E4641A1C5AA
%4E64580003F420C1A8CF4905C74FCEAFA2C7A4C649474FC3ABC3A9CA424F4FCBAACB40A3C34745
%4E60A80003F440A7C24DA0DFC02881C8AAC2A6B5A72860C84445484FCEA3C1ABC1A3C1A54B2881
%4E65480003F460C72881C54FD006C34306B306C34206B306C14206B30065647A000000000810105
%4E6E680003F48068464500434044649DF4EC1A9D928444B41DFC6A44CEC41C2B4CEB74343A043
%4E61280003F4A0464DC0A2DF284468B8A5C4A3B5F228D02845C9BA43CEA5C7A6B5444140F2C4BF
%4E64080003F4C0C3BF465148CCA5BEABC6BF4D46C3BFE2FAE228AFA3C1B342434847664946D3AF
%4E64B80003F4E0A4DD28476341CDA128C7AA28A7DF4B4C45C8B7C1AFA44E4DB7C1BBC13EE8D328
%4E63280003F5000065647A040D00008801058C64500066040420 6A04006604406C22860C045A0
%4E6C980003F520E206C0A5C1A5E0C0A2C082C206C24FC44042A0C0B2C0A5C028A4B228A5E2C24B
%4E6B880003F5404942A0C2A2C4A5C1A443B206C441A24749A12BB6C44442A6C2B2E0C342A1C2A4
%4E6A980003F560C341A0C0B3C328A3D540A2C5B3E04228A128A3C2A3C3A228A0D24360A0C041A2
%4E6B780003F58042B3CD28A0E4E4C24128A341B4C2A14260A3C04FC140A028B246A0C0B4C2B451
%4E6C380003F5A0CE28A3C745B4C6A3C5A328A3C2B2C4B5C24261E04643412882C040B3E106A040
%4E6C680003F5C0A028A1C0A2C0B5C5A328A2E3C945B2CAB2C043A3C1A2C244A228A1C042B240A0
%4E6B180003F5E04540B3C0A446A0C206A0C3A3E0C7A1C0A2C0A1C0B2C328A0C6A328A0C1424440
%4E63980003F600A0C0A2C0A228A0C628B3C0A2C128A028A2C528B328A028A140A1E0C5B3E0C7A1
%4E6AA80003F620E6E8C528A343A0E006E24160C0412860E141B2A0C0A3C0A2C1A1C0A2B2A0C0A4
%4E63880003F640E2430660C32860C22860C32806B32860006564 7A000000000800105684645002 8
%4E6D380003F660805D4D40DEA2C1A428CAA247A0446C284043E8CEB2A60642A0D728A746414348
%4E63F80003F68043CEB5A6DD28E54F4DCFA6DFE5C7BAE928A04343D228A028A4B649424FC1BFE1
%4E62980003F6A0C2B9A4BBC4BBA34A454B4CFAC2A92BBEA34BC1BA284C6DD52840C4AA28A44C40
%4E63A80003F6C0DFD0286AC3AFB6C1B7D1284BCAB2440628D628D428CBAFA6BC2880BD4ED1BE23
%4E66180003F6E0DC280065647A000000000810105A88685002880A06328A344662 8A04062A0C628
%4E6CD80003F700A0E2C028A0C228A1E9C042A0C428A0F3E3E747A0E6E040A0C028A0E6C2A1C244
%4E6D880003F720A0E3E2C64228A0E2E12BA1C128A0C6A1E2E242A0E242A06528A047A0E7E4E4E9
%4E6C480003F740EA28A0C3A1C828A0C128A0C3A1C128A0E3C6B240A1E2C044A0E0C442A141A0E4
%4E6CB80003F76060A0E643A0E4C228A0C228A0E442A1E940A1E3E5C228A042A242A141A0C4BFE8
%4E6D180003F780C428A064A0E14842A0C6A1E341A0C540B2E4C644A0C442A0E248A1C1A1E1ECE2
%4E6DE80003F7A0E1C828A0C2B2E5E442A0E3E2E2C242A0E0E3C228A045A0E142A0E528A0E1E1C1
%4E6C880003F7C0A1E141A028A0C06628A0C228A0E04228A040A0E5C5A1E3E8E1E4C3B242A0E0E3
%4E6D180003F7E0E4E1C444A0C128A0E2E2C1A1E4E1E841422806A0C028A0E041A0E9E1E241A0C4
%4E6AF80003F800r.1ECc.A2EB43BE52A040A0EAE5612800636C65173B0C1F880105A84645000680
%4E66D80003F820C04006A04006A04006C02881C04006C04006A02881C04CA062E2F4B241B2C282
%4E6D080003F84049B3C2B3C2B3C14F60C2414244B3E1B3C4B4C2B4A0E2B4C2B3A0C1B3C5454243
%4E6E680003F860444546B5C6B5D0B3C8B4C4B3C6B3C2B4C528B4C44145B4EBEAC541A041444241
%4E6E780003F880B3C2B44406C242A0C1B441B4E1CBB4A0C1B4C2B54828B4C2B3C2B4C24CB4C842
%4E6FA80003F8A04FE9C1B2C6B4C2B4C2B552C2B541B34406CB4FC0B2A0C24328A0C3B3CAB3C328
%4E6FA80003F8C0B7E1C44841B3CAB506C1B4C2B5E7E6C5424543B642422BB4C146A0C3B4E9B4E5
%4E60880003F8E0C3B4C128B4C528B4EBB328B3C24EB5C4B4D840B4D143B5C14647B4C128B5E1B5
%4E6CC80003F900E5B4E1C1B3A0C1B4C1414542424248 06B2CAB4A0C643B3E3C3B4C2B4C341B4E0
%4E67A80003F920C0B4C8B428A006B24006B24006B24006B261A0C2B406B228A006B2410065647A
%4E63A80003F94000000000810105E8864500EFCD6228404040 40A006A00640A0ED2840404040
%4E6D780003F96040404040C2A5D428A0C628C5A7B2E6C728D8A3B3D143C328D828A0C36628F028
%4E6FE80003F980C2B3A4C2A1C328C228C628A0C628CCB2A1E528C628D8A3B3F428C328C428D228
%4E61080003F9A0A0C32B56C628C4BAE228C2B3A4C1BFD128A0C628D66628F6C3A3B3CCA1C5B228
%4E6F180003F9C0C328C064A2C228C228C628A0C328C628C7B2E728C2B3A4D428A0C628F528C628
%4E6DF80003F9E0D028C9A3B3C4ABB7A3C428C428D3A1C228D928E0C0B3A4C4284040A0E2284040
%4E6A980003FA0041E0C16128E52840A061404040A00640E1C328DAA4B3C1BEC7B2C8B3CA060065
%4E66880003FA20647A00000000800105684645004944404445C1A42847A3E3E0E0E041E1C7A328
%4E69980003FA404544E228E048A3E4E0E043A006A0C6A3285541616 3A0404740E528A0E0E04443
%4E61180003FA60C2A2B6A248C2B4A4B6E0B7EFE041D628A0C5A7C9A2C1B8A52840D028DEA2D428
%4E6B380003FA804044D5B3A0B3A0B3C2B4A24A804040D32840 40BFA1B3C0B3A058C3A3C1A52840
%4E6CF80003FAA04081D2284040CAA2D3B3C0B3C1B642C7A3C1B6C0B6C0B6CBA2454040D128D228
%4E6CA80003FAC0406 6C1A2C4B3C0B3C0B3C1A644434DC5A328C3B6A2C1B3C7A32840410 64B4560
%4E6E780003FAE028C6A1B2C2B4A0C2A64F424540CBB3C1A328C6A6C7B44044494049C4A2C0B6C2
%4E6A580003FB00B4C1A6C3B6E2C2BE40 6A040C0B34043B52842B640C0B528A006B22800 65647A
%4E66880003FB20000000000810105686645000 6804 1E042C464284043C069A04F4DA028EDB2C3A
%4E6D880003FB40E8424FC1B3DB2844 40C485D0A6B3A1CB8 4 2C2404 8C6B342C1A2C1D2284 4
%4E60480003FB60622 8C8A6CAA7E528C7A343D828D528A0284540C4A244C2A6C2A228A046D98F4D
%4E6F680003FB8056C6A12846C4A549A1C4A247A0C4A4C2642840D128CEBB47D8A6B24B4048F2B9
%4E6E380003FBA0A0C1B9C2A5DFCCA1284947408040 8141A3C1A7C1A3B2A1B4A243D428C26D28D1
%4E6A080003FBC028E2C1A7CFB9A042D482C7BE63A02846B22844460065647A000000000800105A8
%4E6D980003FBE0864500 2882CE480682C228A628A628A428A3C68426747A228A72 8B2A128A4 E
%4E6D980003FC00C6B5C2A528B228A741 4642A0C54FC741A128A628A2C0B2C3B7CA4A414345B8C2
%4E6DF80003FC20B2C1A328A4CE4241464 1B3C2B4F3C54240 64B5D7A24246B4CCB4C3B4C461B6C2
%4E61080003FC4048B5C24340BF41A0C14705C342A0C96FE3C246B6C6B4C4B4C44A4FC4B6CCB8E5
%4E6D980003FC60C5B7C246B6C441464 14A42B5C2B6A328A3B5C7B6C7414A41B4C34166B2A128A4
%4E6DA80003FC8028A3B2C046A2C0B5F2C640B3C040B2A028A428A628A1C840A0CD6FA628A428B2

%4E6BD80003FCA0A54E6FC065B2A328B2A428A428A4B9A02B3628BE664FC042060065647A0000000
%4E67C80003FCC0006001056846450028B060A0D72860A143A042A0C3A128A841A0C1A128E2284[illegible]
%4E6F280003FCE06142DAA1D4B34BE528E3CBB4C2B4E0E741A04B42E0C0B6E545A0C5B6A047414[illegible]
%4E6E780003FD004CC5A3C1A1E2D2B2404041E028C2A1CDB74EA041C4B544E028EFCBB528A3D261
%4E6DE80003FD2044A0E448C6B3A041A0CFB5A326A241BFC6A12B5449A2EAC7A128404363E128E[illegible]
%4E6E580003FD4047C3B3E7C1A1CBB5445542E3D0B5C2B4A128A044A0CBB442424AA028C6B502B[illegible]
%4E6C080003FD60A1C0B4A0C5A1284C47D3B345A3B2E2D123404541A043A0E3C5B2A0B3A0B2264[illegible]
%4E6EF80003FDB02846A0E545EF28447A728ECD22BE245C6B402A8C0BE06A02841A0CB341426[illegible]
%4E66980003FDA0B50600A000000000000000000000000000000000000000000000000000000000
%4E64B80003FDC000000000000000000000000000000000000000000000000000000000000000000
%4E64D80003FDE000000000000000000000000000000000000000000000000000000000000000000
%4E64080003FE0000000000000000000000000000000000000000000000000000000000000000000
%4E64280003FE2000000000000000000000000000000000000000000000000000000000000000000
%4E64480003FE4000000000000000000000000000000000000000000000000000000000000000000
%4E64680003FE6000000000000000000000000000000000000000000000000000000000000000000
%4E64880003FE8000000000000000000000000000000000000000000000000000000000000000000
%4E64A80003FEA000000000000000000000000000000000000000000000000000000000000000000
%4E64C80003FEC000000000000000000000000000000000000000000000000000000000000000000
%4E64E80003FEE000000000000000000000000000000000000000000000000000000000000000000
%4E64180003FF0000000000000000000000000000000000000000000000000000000000000000000
%4E64380003FF2000000000000000000000000000000000000000000000000000000000000000000
%4E64580003FF4000000000000000000000000000000000000000000000000000000000000000000
%4E64780003FF6000000000000000000000000000000000000000000000000000000000000000000
%4E64980003FF8000000000000000000000000000000000000000000000000000000000000000000
%4E64B80003FFA000000000000000000000000000000000000000000000000000000000000000000
%4E68C80003FFC000000000000000000000000000000000000000000000000000000094AA555555
%4E60880003FFE0F5FF55555595FFABAAAAAAFEBFAAAAAA0A0000000000000000F0FFFF3F009351
%0781010

Appendix B - OPERATING SYSTEM, TABLES, MISC. ROUTINES

%4A65B400000000204F000005E200000300000003000000030000000300000003000000030000
%4A63240020000003000000030000000300000003000000030000000300000003000000030000
%4A63440040000003000000030000000300000003000000030000000300000003000000030000
%4A66E40060000003000000031400000326000003380000034A000003000000036C00000300
%4A63840080000003000000030000000300000003000000030000000300000003000000030000
%4A63A400A0000003000000030000000300000003000000030000000300000003000000030000
%4A63C400C0000003000000030000000300000003000000030000000300000003000000030000
%4A63E400E0000003000000030000000300000003000000030000000300000003000000030000
%4A68F401004EF9000031624EF900002ABE4EF900002A5E4EF9000029184EF9000030F44EF9
%4A63340120000031564EF9000031224EF9000031684EF90000316C4EF9000031304EF90000
%4A67E4014035B24EF900002E364EF900002B3C4EF900035224EF90000359A4EF9000041FA
%4A684401604EF9000037404EF9000037C24EF900035C44EF9000041844EF9000042C84EF9
%4A66A401800000427A4EF9000048024EF90000432E4EF9000044E84EF9000047A84EF90000
%4A689401A040384EF9000038604EF900038C04EF900039B04EF90003A7E4EF90003BE8
%4A65A401C04EF90003CF64EF90003F684EF90000401A4EF9000054540090400600904008
%4A6C2401E000904F8A009040040090400C0080300E00803170009040 0A0000000000000000
%4A66F402004EF9000031D24EF9000033464EF900032BC4EF9000032A04EF9000030444EF9
%4A6CD40220000035864EF900002CE4FFFFFFFFFFF4EF9000038044EF9000037064EF90000
%4A6874024041C84EF90000041CC4EF9000058C64EF9000048224EF9000042F84EF900002F04
%4A66E402604EF900002EB44EF900002EEA4EF90000332A4EF9000032DA4EF9000033100000
%4A62240280000000000000000000000000000000000000000000000000000000000000000000
%4A624402A0000000000000000000000000000000000000000000000000000000000000000000
%4A626402C0000000000000000000000000000000000000000000000000000000000000000000
%4A628402E0000000000000000000000000000000000000000000000000000000000000000000
%4A66B403000C794EF90004002466084242404EF9000400244E730C794EF90004000C66064EF9
%4A64E403200004000C4E730C794EF9000400186664EF90004001 84E730C794EF900040012
%4A673403406606 4EF90004001 24E734A7900904F0C66000B0C0C794EF9000400066064EF9
%4A61540360000400063 3C000B031404E73083900030080300967180C794EF90004001E6606
%4A645403804EF90004001E4A790080300E4E7333F90080300E0090400E4279009040104E73
%4A665403A043F9009040004 5F900904FFE49F9000003B6600006B64A44675449F9000003C4
%4A6E5403C06000089033C000803100083900060080300966F033C000803100083900060080
%4A602403E0300967F033C000803100083900060080300966F00839000000803001 66A233C0
%4A60B404000080310008390000008030 0167F043F90091000045F9009107FE49F900000424
%4A60E4042060000 6484A446700005E33FC000000910000383C00004EB900000C9833C00030
%4A6EF4044031000839000600803009 66F033C000803100083900060080300967F033C00030
%4A6DE40460310008390006008030096 6F008390000008030016 69833C000803100083 90000
%4A62D404800080300167F033FC00000091000043F9009000004 5F900901FFE49F900000444
%4A61B404A060000 5C84A44675438 3C00014EB900000C9833C000803100083900060080300 9
%4A6F7404C066F033C000803100083900060080300967F033C000803100083900060080300 9
%4A606404E066F0083900000008030016 69A33C000803100083900000080300167F043F90090
%4A6344050050004 5F900905FFE49F900000512600005 5A4A44670000563 83C00024EB90000
%4A6EF405200C9833C000803100083900060080300966F033C000803100083900060080300 9

%4A6F44054067F033C000803100083900060080300966F0083900000080300166A033C00030
%4A620405603100083900000080300167F043F90090200045F900903FFE49F9000005826000
%4A61F4058004EA4A4467000186383000034EB900000C9833C0008031000839000600803009
%4A6F6405A066F033C000803100083900060080300967F033C0008031000839000600803009
%4A6FE405C066F0083900000080300166A033C000803100083900000080300167F04EF90000
%4A614405E0070C46FC270033FC00010080312033FC000000803120303C0FA033C000803100
%4A63040600051C8FFF833FC00010080312008390003008030096600000B4EF9000003A041F7
%4A63F406200091000043F9009107FE303CF000544030C0B3C866F833C00080310043F90090
%4A65040640400045F900904FFE49F900000652600003DC4A44670A49F900000660600005F4
%4A63B4066033C00080310043F90091000045F9009107FE49F90000067C600003B24A44670A
%4A64540680383C00004EB900000C9833C00080310043F90090000045F900901FFE49F90000
%4A62D406A006A6600003884A44670A383C00014EB900000C9833C00080310043F900905000
%4A667406C045F900905FFE49F9000006D06000035E4A446700000C383C00024EB900000C78
%4A644406E033C00080310043F90090200045F900903FFE49F9000006FC600003324A446700
%4A63340700000C383C00034EB900000C987A0042790090400041F90091000043F9009107FE
%4A64B40720425833C000803100B3C866F433FC00000091000033FCF00F0091000233FCF00F
%4A6F8407400091000433FCF00F0091000633FC00000091050033C00080310033FC00010080
%4A6514076031204FF900904F004EB90000352241F80000343C7FFF4240323C0001D01833C0
%4A64E4078000803100D21B51CAFFF40C0000FF66060C0100FF675861000528083900030030
%4A6F6407A03009664A33C000803100083900060080300966F033C000803100083900060080
%4A601407C0300967F033C000803100083900060080300966F00839000000803001669033C0
%4A6E5407E000803100083900000080300167F033FC00010080312033C00080310033FC0001
%4A60740800009040140C794EF900040000667C0CB900040000000400026D700CB900080000
%4A60F40820000400026C644279009040144DF9000400804243205E201E670000B22240281E
%4A63E4084053844A9E6608610004DE600000A02008EC88EC883200524133C0008031002404
%4A652408605243D018D21833C00080310051CAFFF40C0000FF6704610005020C0100FF6704
%4A67F408B0610004F8B3C86EC660AA487B800048790000666E4EB900002E36504F3A3C0001
%4A6F9408A033C000803100083900060080300966F033C000803100083900060080300967F0
%4A6EB408C033C000803100083900060080300966F0083900000080300166B033C000803100
%4A613408E0083900000080300167F0605A4A4567560839000300803009664C33C000803100
%4A6F040900083900060080300966F033C000803100083900060080300967F033C000803100
%4A6FC40920083900060080300966F008390000008030016600FEBA33C00080310008390000
%4A6F3409400080300167F033C000080310033C0008031006100184C4AB06654083900030000
%4A6F4409603009664A33C000803100083900060080300966F033C000803100083900060080
%4A60E40980300967F033C000803100083900060080300966F0083900000080300166AE33C0
%4A615409A000803100083900000080300167F04FF900904F00203C000003FE41F900904000
%4A642409C033C000803100429851C8FFFC33C0008031004EB9000044E80839000300803009
%4A61A409E0671A4A456e1046FC270033C0008031004EF9000400000C450001661602450001
%4A62740A00233C50090401433C0008031004EF900000E14303C00010C794EF9000400246606
%4A60740A2033C0008031004EF90004002442B64280428433C0008031004DF900000A426000
%4A6FD40A4000A233C0008031004DF900000A52600000A433C0008031004DF900000A626000
%4A64740A60009833C0008031004ED44286428042844DF900000A7A600006A4DF900000A84
%4A63540A80600000724DF900000A8E6000006C4DF900000A98600000A24DF900000AA26000
%4A65D40AA000904DF900000AAC600000B04DF900000AB66000011670FF4DF900000AC26000
%4A64E40AC0000204DF900000AC6600000B64DF900000AD6600000FA4DF900000AE060000106
%4A6CD40AE04ED4204A91C92208E289204930C051C9FFFC4ED6428560027AFF52863E3C8000
%4A69A40B0041E9FFFE5488340730053210B041670478014ED4B5403080E24A64EEB1CA33C0
%4A68940B200080310065DE54883220B041670478014ED4B1C962F24ED6428560027AFF5286
%4A62340B407E0141EA000255883407300533C0008031003210B041670478014ED4B5403080
%4A6A340B60E34A64EEB1C962DB600254883210B041670478014ED4B1CA65F04ED6428560027
%4A69640B807AFF52863E3C800041E9FFFE5488340730053210B041670478014ED4B5403080
%4A64840BA03085E24A64EAB1CA33C00080310065DC3005548833C000803100320B0416704
%4A69640BC078014ED4B1C962EC4ED6428560027AFF52867E0141EA000233C0008031005536
%4A66340BE0340730053210B041670478014ED4B54030B03085E34A64EAB1C962DC30056002
%4A65C40C000546800008031003210B041670478014ED4B1CA65EA4ED65286204970003000
%4A62740C2000803100A70FFFF000032000000670478014ED40070FFFF0000320000000041
%4A69B40C40FFFF570670FF780148D4549B1CA5CE4ED633FC00000080312033C000803100
%4A6F440C6043F900000C8645F900906D0070001019670000120C0000206602424000408000
%4A69C40C8034C066E84ED4576F726B696E672052414D206572726F72002F012F002F032F04
%4A63C40CA033C00080310033FC0000008031204EB9000035224EB900002828DEFC00104E75
%4A63840CC033FC00000080312014001601487B80004879000066244EB900002E36508F2F30
%4A6D440CE0FFFFFFFF2F032F024EB9000028CADEFC000C0C0200FF67124878800048790000
%4A66C40D00663C4EB900002E36508F0C0300FF6712487880004879000066464EB900002E36
%4A6AF40D20508F7A024E7548E7FFFE2A4F2449224849F900000D3A6000FCF44A4467000034
%4A67B40D402E4D4CDF7FFF2F012F002F084878000433C00080310033FC0000008031204EB9
%4A68C40D6000002828DEFC001033C0008031007A014E752E4D4CDF7FFF4E7533FC00000080
%4A6AD40D80312048E7F8C22400260155882A08780FE8AD5585E38D0CAE00008000FFF65602
%4A68440DA055852F052F032F024EB9000028CADEFC000C4DF900000F1C4878800030365000
%4A67440DC048C02F004EB900002E36508F0C0200FF671A4DF900000F3C4878800030365000
%4A67940DE048C02F004EB900002E36508F0C0300FF671A4DF900000F5C4878800030365000
%4A68740E0048C02F004EB900002E36508F4CDF431F7A024E7533FC000100904F0C42790090
%4A61340E20400642790090400842790090400A4279009040044279009040004EB90000355C
%4A69940E4046FC200048C52F054EB90000129A46FC2700427900904F0C4EF900008EC48F7

%4A61940E6000C033C00080314033C000803100303900904006EF4880790090400A33C00090
%4A62240E805F6E33F90090400800930000083900030080300967124EB9000048024A406600
%4A65640EA0000846FC270060FE33FC000100904004537900904C0C4EB900002B3C4A790090
%4A62040EC0401466120C794EF90004004266084EB900040042600620 3C00B0300023C00090
%4A65B40EE04F8A4EB90000432E4CDF03034E7346FC270033C0008031000339000300803009
%4A6A340F0066F060FE302F000641F9009000000223C00000FFED15851C9FFFC4E75668666A2
%4A6EF40F2066BE66DA66F66712672E674A67666782679E67BA67D667F2680E682A68466850
%4A61940F40685A6864686E68786882688C689668A068AA68B468BE68C868D268DC68E668F0
%4A6D940F6068FA6904690E69186922692C69366940694A6954695E69686972697C551848E7
%4A62D40F803000302F000E342F0012362F001648C0D0802200300248C0ED80D08006800090
%4A63140FA05000D28020413202601622 6F0018424230D952427010B0426EF67060D1C05241
%4A67A40FC0B2436FE64CDF000C4E7548E73020247C00000F7E4EB900001632207C00910000
%4A66540FE0740F3202700CE16100410FFF30C142584258425853424A426CEB260806830000
%4A6FF4100000802043740F42583202700CE16100410F0030C13202700CE161004100F030C1
%4A62D41020320270 0CE1610041000F30C153424A426CD4487900006 5A44878001C48780001
%4A646410404878000 44E924879000065C448780009487800014878001 44E924879000065E4
%4A63241060487800124878000A487800144E924879000066044878001C4878001348780014
%4A62C410804E92227C0090500672014FEF004032BCA8002609068300000080224352 41701E
%4A623410A0B04162FA227C00905048720132BCA800260906830000008022435241701EB041
%4A636410C062EA227C00905000720470003001D0802040D1C930BCA80052417025B04162EA
%4A64A410E0227C00905E80720470003001D0802040D1C930BCA80052417025B04162EA4879
%4A63E4110000008000487900005CCA4EB900002E364879000080004EB90000226A4FEF000C
%4A6754112042A74EB90000113E0600000588F66084EB90000219060E84CDF040C4E7548E7
%4A68C411403838342F001E247C00904F82287C00904F7A267C00904F8A4A7900904F0C661C
%4A630411600C794EF900040042660C207C000400424E902680600626B900005A46300248C0
%4A60141180D0802040D1D33610024300FF3002D040204A38300000 3202D241204A3002D040
%4A6E2411A0224C30310000C04381701000 3202D241204A3002D040224C303100008043C170
%4A6E3411C010003002D040204C318300003002D040204A3030000048C0320448C1B3803204
%4A648411E048C1C081320348C10281000000F00A81000000F080814CDF1C1C4E7542790091
%4A66A412000000 33FC1FFF0091000233FC7FFF0091000433FCBFFF00910006427900910008
%4A63C4122042790091000A4E752F0A247C000016F64A790090401466302F39000400744879
%4A643412400090403E4E922F39000400784879009040584E922F390004007C487900904072
%4A676412604E924FEF0018602E487900005A4A4879009040 3E4E92487900005A5448790090
%4A69741280405 84E92487900005A5E48790090 40724E924FEF0018245F4E7548E73038247C
%4A62B412A000002E36267C0000113E287C0090400A4EB900001228427900 80312E4EB90000
%4A66E412C0169C4EB900001A344A7900904014 66444EB90000593C0C794EF900040048660A
%4A680412E0207C000400484A790090 42A74EB9000058C6588F0C794EF90004004E660A207C
%4A653413000004004E4E90600C487800144EB900005454588F4EB9000016320C794EF90004
%4A6FE413200030660A207C000400304E906012227C00900000424232C252420C4210006DF6
%4A636413404EB900001228487900008000487900005C7E4E924879000080004879000 05C96
%4A646413604E924879000080004EB90000226A4FEF001442A74E9334000800000 0588F6600
%4A6DD4138000960BC29001E70A301452400240000338803002E84034003002D040207C0000
%4A6DF413A0613430300000D17900904006 3002D040207C0000615430300000D17900904008
%4A639413C04879000080004E9248780001301448C02F0048780002487800124EB900002EEA
%4A652413E0487800014E933400080200014FEF001C670E487810004EB900000F04588F6014
%4A63E4140008020000670E2F3C0000F0004EB900000F04588F4EB9000021906000FF564254
%4A652414204EB900001B200C794EF90004003666 08207C000400364E904EB9000017D40C79
%4A667414404EF90004002A6608207C0004002A4E904EB900000FCA0C794EF90004003C6608
%4A62341460207C000400304E90227C009050004242300248C0D0802040D1C930BC00A05242
%4A6FA414800C4208006DEA42403600000040207C0000617433F0000000910002487900000000
%4A633414A03003E540207C000061142F3000004E92508F42A74E93340008000000588F6658
%4A609414C008020001674A3003E540207C000061142F3000004EB9000030F452437005B043
%4A6F3414E0588F660242433003D040207C0000617433F00000009100024879000080003003
%4A64141500E540207C000061142F3000004E92508F4EB900002190609A4EB90000163233FC
%4A6C541520FFFF0091051E33FCFCCC0091000842790091000A33FCF8880091000C33FCFFFF
%4A6F7415400091000E227C00900000424232F90004006252420C4210006DF2487900008000
%4A64141560487900005CDE4E924879000080004EB90000226A2F3C0000880042403600E540
%4A63841580207C000061282F3000004E924FEF001442A74E93340008000000588F6600008A
%4A60B415A008020001674A3003E540207C000061282F3000004EB9000030F452437003B043
%4A61A415C0588F660242433003D040207C0000617E33F00000009105 1E2F3C000088003003
%4A615415E0E540207C000061282F3000004E92508F3002E84034003002D040207C00006134
%4A6F04160030300000D179009040063002D040207C0000615430300000D179009040084EB9
%4A64241620000021906000FF6A4EB90000229C6000FC922F02207C00905000C5880C820090
%4A68D416405FFEC5886204425860F0207C00900000C5880C8200901FFEC58862184A790090
%4A6FC41660401466 0A3039000400 6048C06002700030C060DC207C009030004250207C0090
%4A62E41680200042 50207C009038004250427900910500 4EB9000011FC241F4E752F02227C
%4A600416A000910200207C00006184424132D852410C4101006DF6227C0091040042413410
%4A632416C002420FFF3010E2400240F000844032C2548852410C4101006DE4227C00910500
%4A663416E0424132D852410C4101006DF64EB9000011FC241F4E75226F0004206F000812D8
%4A6424170066FC4E754EB90000219042790080312E4EB9000021903039008 0300E42790090
%4A62E41720400E42790080317033FC00010080312E4E7548E73000206F000C302F0012242F
%4A655417400014760060083200524030C15283B6826DF44CDF000C4E7548E73800282F0010

%4A65F41760362F0016342F001A4A426F2C42A7300348C02F002F044EB9000032BC7026B043
%4A69E417804FEF000C6E0A702DB0436D0454B460025B8452435342600D04CDF001C4E7548E7
%4A64D417A03B00282F0010362F0016242F00184A826F1C42A7300348C02F002F044EB90000
%4A689417C032A05884524353824FEF000C60E04CDF001C4E752F0A247C0000173270004EB9
%4A65F417E000001632487804004B7900005CA64EB900002E3648780400487900005CAE4EB9
%4A6254180000002E36487900008000487900005CB64EB900002E364879000080004EB90000
%4A63E41820226A33FCA7BB00[illegible]105007000487B002042A7D080068000 90510A2F004E927040
%4A62441840487B0020487B0080D080068000 90510A2F004E92203C000000C0487B0020437B
%4A6044186000020D0800680009 0510A2F004E92203C00000100487B0020487B0040D080060 0
%4A611418B000 90510A2F004E92203C00000140487B0020487B0060D08006800090510A2F00
%4A623419A04E92203C000001C0487B0020487B00A0D08006800090510A2F004E92203C0000
%4A611418C0020048780020487B00C0D08006800090510A2F004E92203C0000024048780020
%4A637419E0487B00E0D08006800090510A2F004E92203C0000020C0487B00104[illegible]000AD080
%4A61341900068000 90510A2F004EB900001758203C00000340487B001148780 01AD080068
%4A6164192000 90510A2F004EB900001758203C00000400487B000A42A7D0800680009051 0A
%4A623419402F004EB900001758203C00000416487B00074B7B0173D080068000 90510A2F00
%4A62E419604E92203C00000456487B00064B7B017AD0800680009 0510A2F004E92203C0000
%4A62F41980040048780010487B000AD08006800090510A54802F004EB900001[illegible]
%4A620419A0054048[illegible]AD0800680009 0510A54802F004EB900001[illegible]
%4A631419[illegible]0060048780000A[illegible]D0800680009 0510A54802F004EB900001792[illegible]
%4A64841980487B00074B7B01F3008006800090510A2F004E92203C00000656487B[illegible]
%4A66641A0001FAD08006800090510A2F004E924FEF00F442A74EB9000011 3E08[illegible]
%4A65841A2066084EB90000[illegible]9060E8427900B00400245F4E7548E73E004EB90[illegible]
%4A60741A40783 04A[illegible]104A39000400726708004600800044008042A74[illegible]
%4A6A441A605C664EB[illegible]42A74EB90000226A42A7487900005BEE4EB9000[illegible]
%4A62441A8000144 2A74EB90000113E08000000588F66000088424574073005 4B[illegible]
%4A66541AA0D1F900[illegible]48C07601120 2E3A3C083672842A7[illegible]548C02F003[illegible]
%4A64541AC0720AD0812F007[illegible]300248C092802F014EB900003044 4FEF0010602642A[illegible]
%4A66341AE048C02F0030054800720AD0812F00721230024 8C092802F014EB90000[illegible]
%4A67641B0000[illegible]5345700 4B0456E864EB900002190 6000FF6[illegible]
%4A66B41B2048E[illegible]0B0267000005A362B7C00005A324EB9000[illegible]
%4A64F41B40000050FA4[illegible]02E3642A74EB90000226A424236023302009[illegible]
%4A62D41B60424233C2009040083 3C20090400642434FEF000C300348C0D080204 0D1D4300[illegible]
%4A64041B8048C0D080220 0D[illegible]422A413A8230034 8C0D080224 0D3F900005A3A320[illegible]
%4A62B41BA0300348C0D080224 0D3F900005A3E3001328030805 2430C4304006DB8[illegible]
%4A65141BC048C0D080204 0D1F900005A4242505 2437220B2436EE82E3900005A3E06[illegible]
%4A65841BE007FE2047[illegible]A42722AD0B1323C03FF2A403A8130814 2[illegible]
%4A6FF41C00[illegible]473003D040227C00005 99A30B10000424[illegible]
%4A61141C2020403003 48C0E980D08022000 6B100910200D1C13003D040227C00005 99A3[illegible]
%4A65841C400000241 0FFF3802700CE164D244308152427210B2426[illegible]
%4A62741C6042433003 48C0D080204 0D1D4300352403080300348C0D0802040D1F900005A[illegible]
%4A61241C803003D040[illegible]59BA30B10000300348C0D0802040D1D33003D040[illegible]000
%4A63041CA059CA30B10000300348C0D0802040D1F900005A3E300352403080524 37208B24[illegible]
%4A68441CC06EA0207900005A3C700ED1C030BC000742A7487900005D7C4EB900002E36500F
%4A61F41CE042A74EB90000113E22003001360008000000588F660004944878000 14EB90000
%4A61941D00113E38004878000 24EB90000113E3A00487800034EB90000113E3C0008040000
%4A64641D204FEF000C67064A526F025352080400016 70000A40C5203FE6C00009C341 23212
%4A65741D4048C1D2812001D0B900005A3EC18DB455C18D6600008052 5230124 8C0D080204 0
%4A62D41D60D1D430125240308030124 8C0D0802040D1F900005A3A30124 8C05380D080224 0
%4A62C41D80D3F900005A3A301106400600308030124 8C0D0802040D1D330124 8C05380D080
%4A62341DA02240D3D330110440060030803012 48C0D0802040D1F900005A3E30124 8C05380
%4A62641DC0D080220 0D2B900005A3E30122A413A803080600252 52E8433003D040227C0000
%4A60241DE061343431 0000D579009040063003D040227C000061543431 0000D5790090400 8
%4A62141E0008050007670E30124 8C0D0802040D1D3065000800805 0006670E30124 8C0D080
%4A60C41E202040D1D3045000800805000567123 0124 8C0DQ802040D1F900005A3A04500080
%4A61E41E400805000467123 0124 8C0D0802040D1F900005A3A065000803204340446 42C479
%4A62341E600090408E380233C10090408E30124 8C0D0802040D1D33210080400076 71C3012
%4A62B41E8048C0D0802040D1D3300152400240000734010242FFF8D042308008040 0066 71C
%4A61941EA030124 8C0D0802040D1D3300153400240000734010242FFF8D04230800804 0005
%4A62E41EC0671C30124 8C0D0802040D1D3300151400240003834010242FFC7D0423080080 4
%4A62141EE00004671A30124 8C0D0802040D1D33001504002400038024 1FFC7D04130803012
%4A61F41F0048C0D0802040D1F900005A3A3210080500016 720301248C0D0802040D1F90000
%4A62141F205A3A300152400240000F34010242FFF0D04230800805000 0671E30124 8C0D080
%4A62641F402040D1F900005A3A30015340024 0000F0241FFF0D0413080321248C1D2812001
%4A61B41F60D09372002A403215703FC2803001227C000059DA72001231 0000080600076 71E
%4A64E41F8030124 8C0D0802040D1D430124 8C0D080224 0D3D43011D04102407FFF3080080 6
%4A65541FA0000 6671E30124 8C0D0802040D1D430124 8C0D080224 0D3D43011904102407FFF
%4A62E41FC030800806000 1671E30124 8C0D0802040D1D430124 8C0D080224 0D3D430115240
%4A65941FE002407FFF3080080600000671E30124 8C0D0802040D1D430124 8C0D080224 0D3D4
%4A6234200030115340024 07FFF3080227900904F8A3611EB430243004030124 8C0D0802040
%4A64542020D1D330030A4000403212 48C1D2812241D3D33211024 1FFBFD041308042A742A7
%4A64A420404878000330124 8C02F0048780016487800164EB900002EEA42A742A74878000 4
%4A63F4206032124 8C1D2812001D09472002A403215 2F01437800174878001 64EB900002EEA %4A6424208042A742A748780003301248C0D0802200D2B900005A3A70002A413015EE882F00
%4A656420A0487800184878001 64EB900002EEA42A742A74878000330124 8C0D0802200D293
%4A663420C070002A413015EE882F004878001948780016 4EB900002EEA42A742A748780001
%4A641420E0301248C0D0802200D29370002A41301572 38C081E68052802F004B78001A4878
%4A6584210000164EB900002EEA42A7487900005A1A4878001A487800174EB900002F0442A7
%4A623421204 2A748780001301248C0D0802200D29370002A41301572 07C0D152802F004878
%4A640421400 01A487800184EB900002EEA42A742A748780001301248C0D0802200D2B9000
%4A659421605A3A70002A413015720FC0812F004878001B487800164EB900002EEA4EB9000
%4A6AB4218021904FEF00B86000FB584CDF3CFC4E75427900904 0044A79009040 0467F84E75
%4A638421A048E730004A7900904014661 60C794EF900040054660C207C000400544E902200
%4A6E3421C060062 23C000100002001E080140 00 20200FF1601020300FF20017210E2A07201
%4A61F421E0C08122006600007C487900008000487900006 7124EB900002E3610024 88048C0
%4A638422000C80000000FF508F6714487900008000487900006 8784EB900002E36508F1000
%4A640422204880 48C00C80000000FE6714487900008000487900006 9184EB900002E3650 8F
%4A654422404878000A1003488048C02F001202488148C12F014EB9000028CA70004FEF0000
%4A62E4226060027001 4CDF000C4E75302F00064A790090401466104A39000400726708223
%4A6774228000005B8E6006223C00005B5848C02F002F014EB900002E36508F4E7548E73C
%4A631422A0247C00002E36287C0090400C267C000030F44EB900001 6324879000080 00 0
%4A65E422C000005D984E924879000080004EB90000226A42A7487900005DC44E924EB9000
%4A645422E01704424338BC00F04FEF00143039009040 0E48C00280000000FF0C80000000FF
%4A61D423006700006030390090400E48C00280000000FF7210B280674A4EB90000219042A7
%4A64E423204EB900001 13E24000802000058 8F660004664A5466B64A43661A487B000F4B79
%4A646423400000800048790000 5DE24EB9000031624FEF000C4EB90000170452433 8C00
%4A65E4236060 8A487900005DC44E9330390090400E48C00280000000FF7210B280583F663C
%4A644423B042A72F3900005FC04E92508F42A74EB900001 13E240030023800080000005 8
%4A661423A0660003F44EB9000021906 0E04879000 05DE24E93487800074EB9000027AC3C00
%4A69A423C042A7487900005F544E924A464FEF0010660E42A7487900005F744E92508F604C
%4A67B423E042A742A74878000232064 8C12F01487800104B78001B4EB900002EEA42444FEF
%4A62C424000018700 11204E3A0340648C2C082671442A73004E540207C00005EFC2F300000
%4A679424204E92508F52447008B0446ED6487800064EB9000027AC33C00090401270FFB079
%4A619424400090401258 8F660642790090401242A7487800014878000332390090401248C1
%4A671424602F014878000F4878001A4EB900002EB442A7487900005F3B4E924878001442A7
%4A659424804879000060404EB90000316233FC0004008031703 8BC01E04FEF002C4A546F26
%4A641424A04EB90000219042A74EB900001 13E240008020000588F67E4487900006 0404E93
%4A66A424C0588F600002D2487900006 0404E934EB9000027F44A80588F660002BC4878001 4
%4A663424E042A748790000605A4EB90000316233FC000500803170 38BC007B4FEF000C4A54
%4A642425006F264EB90000219042A74EB900001 13E240008020000588F67E448790000605A
%4A674425204E9358 8F6000027048790000605A4E934EB9000027F44A80588F6600025A4A39
%4A618425400004007367624878001442A7487900006 0744EB90000316233FC00080080317 0
%4A658425603 8BC00B44FEF000C4A546F264EB90000219042A74EB900001 13E24000802 0000
%4A674425805 8dF67E448790000607 44E9358 8F600002064879000 0607 44E934EB900002 7F4
%4A699425A04A80588F660001F042A7487900005FFA4E927A0F7604508F42A74EB900001 13E
%4A6FD425C024003002380008000000588F660001C8300448C00280000000F0670253454A45
%4A636425E0660000667A0F300448C07230C08167064EB9000027F40804000767225243 7003
%4A63042600B0436604760460407006B04366047608603 6B67900904012 6D2E7601602A0804
%4A609426200006672453437001B0436F0A363900904012534360127003B0436604760260 08
%4A669426407007B0436602760548 7800034EB9000027AC3C0070FFB04658 8F6602424642A7
%4A66B4266042A7487B0001320648C17403C2822F014878000E4878001C4EB900002EEA42A7
%4A66F4268042A7487800013 20648C1E4817403C2822F014878000E4878001A4EB900002EEA
%4A662426A042A742A74878000132064 8C1E8817403C2822F014878000E487800184EB90000
%4A68E426C02EEA42A742A748780001320648C1EC817403C2822F014878000E487800164EB9
%4A645426E000002EEA42A748780001487800033203 48C12F01487800124878000C4EB90000
%4A651427002ED47001B0434FEF0078661042A748790000600C4E92508F6000006670028043
%4A653427206 60E42A748790000 60 4E92508F60507004B043660E42A748790000 60404E92
%4A66D427 40508F6030 7005B0436604 2A748790000605A4E92508F6028 7008B043661 64A39
%4A667427600004007367 0E42A748790000 60744E92508F600C42A748790000608E4E92508F
%4A63E427800804000167 0633C30080317 04EB9000021906000FE2448790000 5DE24E934279
%4A65E427A00080317058 8F4CDF1C7C4E75302F0006207C00904010 33C0008031703 3FC001E
%4A614427C00090400C30BC00B0082800070001670 84A790090400C66F008280007000167 04
%4A647427E070FF600E3039009040 0E48C00280000000FF4E754279008031703 3FC00040090
%4A654428004 00C4A790090400C6F1A4EB90000219042A74EB900001 13E0800000588F67FC
%4A610428207001600270004E7548E73000202F000C262F0010342F00164879000080 00E540
%4A62442840207C00005A1C2F300000 4EB900002E36487900008000487900005B224EB90000
%4A664428602E36487900008000 42A74878000 62F034878001648 78001B4EB900002EEA4879
%4A647428800000080000 42A74878000 0024 8C02F00487800174878000 94EB900002EEA4879
%4A644428A0000080004 2A74878 2F0066 48C02F004878001748 7800144EB900002EEA
%4A665428C04FEF000840DF000C4E7548E73000 142F000F162F0013102F0017E2001000 6C02
%4A62A428E0530 04879000080004 2A748780004720 01202E18974001403D2822F0148804 8C0
%4A68E429005 8B02F004878001A4EB900002EEA4FEF00164CDF000C4E75206F0008122F000F
%4A659429200C0100646754 0C010073 67 48E73C0076047B0F7A070C01005867 1C7A27000
%4A62A429400007 667140C0100 6867 0E7 3780 70C01006F6704760 17801222F0014 7000 30
%4A6114296000262 06F0018600001 1 22B202F00046A04448072 2D10C16004 2022 00043 26

%4A64F4298000163322F00120A01000167 10E249640C3209E449D249E449D0C172012F082F01
%4A634429A02F092F082F0061000 1164FEF0010225F206F0008322F00120A0100016 73C5501
%4A640429C06762653857416 70A302F0016D040323B0078D24110190C00002067F510C0D241
%4A675429E0640410FC002C10D966F41121200990887220600210C151C8FFFC4E75302F001
%4A60142A00D040323B004248411E0000F0401006467061210 10BC00204841600BD241640C
%4A61D42A2010C010C010170C000000 7F048414A016702 10C1484100060051 0F00020100
%4A6F342A40D24165F666F84E75000 0000000380004000200009000480024000920049000220
%4A66042A60000470004A6F0012670 70FF302F000E206F00084BE73C007604780F7A07D000
%4A65C42A80534042103270003024016A94A806B0C08C1001F60062401671AE6A9C4440C42
%4A6BB42AA0000A6D02D445D449110251C8FFEA4CDF003C4E7572201101 51C8FFFC60F02F02
%4A62E42AC0302F0012206F000C2248D0C0421053407 4004A6F00166604 08C2001F222F0000
%4A67242AE00C81000 1869F6F0EE28982FC0350340142414841D3810C4000046F0A7004600
%4A65642B00424146416 72682FC000A 3841060100301 101 51C8FFECB1C9671E22026B02740
%4A68642B2048413 02F00125D406AD6000C4A8266DC7220 1101B3C866FA241F4E7548E73000
%4A61D42B4045F900904F007403526A0004322A0002670000 8C41EA00083010 5250B06A000A
%4A6F342B606600017C4250526A00066100027 20C3200072018666032 02E54120721034700 0
%4A63542B8010280001906A00064A6A000E67060C40002960040C40001D6E3C671C7600 1628
%4A62242BA00006D65255436C0A4232201842721034600620680008 60C6258810347600 1628
%4A62D42BC00006D652554 36C044232201 8E2413232101061 00026A51 CAFF9650000 1024A32
%4A6F942BE02018670000F63002D0403232001 C52720024B27200246600 00E242720024 7200
%4A61D42C00123220180C0100066E0000D0D241323B10044EFB1002000C001C004E006C00AE
%4A60142C2000BA42322018D0402072003442B2003460104A32202C6712423 2202CD040 2072
%4A6D442C40003461000448600 00092 15BC0001202C72003232001 0D0402072003461000 1E0
%4A6B942C6060000078720012322030523220302241323200 10D0402072003430096 1000340
%4A6E442C80601872001232203022415 2322030D040207200343009 610003884A00663C3002
%4A60542CA0E540207200347200122800 06D25253416E0642322018602225AB000800344232
%4A62A42CC020306016D0402072003461000 04C600AD04020720034610000A051CAFF024CDF
%4A65642CE0040C4E754A7900904F0E670E7229922F000B7000102F0007600C7000102F000B
%4A62D42D0072001 22F0007ED40D041D04006800090500 04E75206F000443F900905000 4A79
%4A68242D2000904F0E671E70299028000 1D040D2C03F117280701 C32A9008093C151C8FFF8
%4A65142D40329F6018700010280001EF40D2C0321 1702832E9000251C8FFFA32817200 1228
%4A64842D600006D27900904F0053416F06206800 0860A64E75206F000443F9009050004A79
%4A67042D8000904F0E67227029902800 01D04006400E80D2C03F117280701C32A9FF80D3C1
%4A65342DA051C8FFF8329F601E700010280001EF4006400052D2C0321 170283361000251C8
%4A67242DC0FFFA55493281720012280006D27900904F0053416F0620680008609C4E752F02
%4A6B742DE043F9009050004A7900904F0E672443E9005441E9FFFE243C000000D2721D7028
%4A6B142E00332051C8FFFC4250D1C2D3C251C9FFF0602041E90080742C721C702932D851C8
%4A6F042E20FFFCD1C2D3C251C9FFF27029425951C8FFFC241F4E75322F000A206F000448E7
%4A64842E402020244834014A7900904F0E671E7000101A327C00807229921A4881D2790090
%4A63642E604F066B220C41002A6C1C60207200121A327C00027000101A907900904F066B06
%4A63F42E800C40001E6D06588A7000600EED40D041D0403202205A610000A47200 1212D279
%4A69142EA000904F0053416F06246A000260984CDF04044E754E56FFF02F2E00182F2E0014
%4A6E842EC0486EFFF02F2E00106100FBF44267486EFFF03F2E000E1EAE000B2F2E001C486F
%4A6B942EE000046100FF524E5E4E754E56FFF02F2E00182F2E0014486EFFF02F2E00106100
%4A65142F00FB5E60C84A7900904F0E67127229922F000B7000102F0007327C008060107000
%4A63042F20102F000B7200122F0007327C0002ED40D041D040322F0012206F000C2F022F08
%4A65042F40240943F900905000D2C0300102410003024 0FFFC4A7900904F0E671E6006D002
%4A66342F603280D3C21018670A0C00002066F0420060EE2008909F241F4E754A4167160041
%4A63842F800001660632 3C0040600A323CFFC06004420032C0101867DA0C00002067F24A41
%4A64942FA067F00C00004165EA0C00005A62E4D00160E0322F000A206F0004302F000E226B
%4A61C42FC00002D2C0594FD01848C02F0010102F40000410 11673E0C00002066047000 6030
%4A61D42FE04A7900904F0E670600400080602 20C010001651C0C400041651 60C40005A6210
%4A6164300000C010001620606400040600406 40FFC0613C7003508F4E75206F0004302F000A
%4A6024302022680002 4A310000671 6D01832407000 10102F002F0970006114508F70044E7
%4A64843040700 04E757000302F000E322F00120241FFFC80414A7900904F0E67127200 120F
%4A6424306000 07ED4106410029922F000B600C7200122F000BED41D22F0007D24143F90090
%4A605430805000338010004E75206F000448E7003043F90090500024680002700 04A790090
%4A643430A04F0E673A1010ED40064000299028000 1367C0080D040D2C060044251D3CB101A
%4A654430C066F870001028000 6D07900904F0053406F0620680008 60B84CDF0C004E751028
%4A66F430E00001ED40D010D040D2C060024259101A66FA60CE2F0A45F900904F0043EA0044
%4A67543100206F00087003B1E157C8FFFC660C4A32001867F242320018429161 00FF70245F
%4A63843120 4E757006322F000E6A484441700560427007322F000E33C100904F0A4279 0090
%4A652431404F062F2F00082F2F00086126504F33C000904F024E757004322F000A426F000A
%4A62443160601070026008 4E7570016002700 3322F000E48E7202045F900904F007403 43F2
%4A64E431B020194A2157CAFFFC664015BC0001202C42322030D442358120 1C4272202432 E
%4A6FC431A00012358120 10D442206F000C25882034244934000C020003670A000800046704
%4A668431C06100FC7C1482700160027000 4CDF04044E7548E72038246F001449FA02C67406
%4A655431E0700072294A7900904F0E6712101A921A207CFFFE0080006F0180001A6010121A
%4A6FC43200101A207C00800002006F0100001AED40D041D04006800090500022402 65A322F
%4A60D43220001A7000101B670A1034000061 20D44060EC72001212D27900904F0053416F06
%4A65343240246A0002609820024CDF1C044E7548E720202408484245FA017A0C40003 2660A
%4A6504326 04A016A0252400241FE7FE540D4C070FF3001801A3280300 1801A3380200 0D2C8

%4A62E432804A526712700030018O1A32803001801A33802000D2C8484054404CDF04044E77
%4A65A432A0226F0004322F000E0241FFFC302F000A207CFFFE00800041018O6092226F0004
%4A66C432C0322F000E0241FFFC302F000A207C008000020041010O6000FF764E56FFF02F2E
%4A6C2432E000182F2E0014486EFFF02F2E00106100F7CE4267486EFFF03F2E000E1EAE000B
%4A6D1433002F2E001C486F00046100FEC84E5E4E754E56FFF02F2E00162F2E0014486EFFF0
%4A637433202F2E00106100F73B60C81F6F0007000A322F0012426F00102F01486F000E6100
%4A6B843340FE92508F4E7548E72038246F001449FA01527000722 94A7900904F0E670C101A
%4A63943360921A207CFFFE0080600A121A101A207C00800002ED40D041D04006800090 5000
%4A6FA433802240265A24084842720070001 01B67261034000042514271 2000D2C852810C00
%4A63F433A000276D060C00002E6FE042514271 2000D2C8528160D474001412D47900904F00
%4A63B433C053426F06246A000260BB20014CDF1C044E75000201030406050708 0A090B0C0E
%4A647433E00D0F101211131416151718 1A191B1C1E1D1F2022212324262527 2B2A292B2C2D
%4A6454340021 2E00022F3031320103 2C2D33342C2D333500022F362C2D373839063A3B3C3E
%4A642434203D3F2C2D40413132424344464547484A494B000201032C2D214C0002014D2C2D
%4A68A4344021414E504F515206530731555456575958 5A5B5D5C5E5F6160625F6463651C67
%4A69F43460666869 6B6A6C3C3C3C3C6E3C6E3C6D6E00006F70000071720000 6D6D00003C6D
%4A6F8434B000003C6E00003C3C00006E3C00000000000000000000000000001C1EDBDD1C5D
%4A64C434A01D5B000000000000000000320000000000000000000000000000000000000000
%4A6BC434C000002528262900000 02E000000002C002B0000010203040506070809 2A270000
%4A614434E00024000A0B0C0D0E0F101112131415161718191A1B1C1D1E1F20212223000000
%4A61043500002D000A0B0C0D0E0F101112131415161718191A1B1C1D1E1F20212223000000
%4A61943520000070004A390004007267 0C0C794EF9000400006602700133C000904F0E611C
%4A6BB4354041F90090500043FB002C721D7014429851C8FFFCD1C951C9FFF44E7541F90090
%4A603435604F184268FFE84268FFEE4268FFEA4268FFF04268FFF243E8001C720342184299
%4A689435805 1C9FFFA4E7541F90090 5000202F0004D1C0D1C030AF000A4E75302F000641F9
%4A684435A000904F0460063210B25067FC51C8FFF84E75206F000410EF000B10EF000F4228
%4A6B9435C000044E754E56FFFE48E73F38142E000B162E000F227C00904FF0247900904FFC
%4A650435E0207900904FFC7214D1C12648204A720AD1C11810200A720BD0812840101446 00
%4A63E43600118006702420 40C0400E0651A7C03300648C0207C00904FEC4230000053464A46
%4A6FE436206D0000DC60E87C037A001A0200450004700010039A40024500031002E4081400
%4A677436401003E40816007001B045640242457000100 4721CC081E4803D40FFFE526EFFFE
%4A687436 60CAEEFFFE4A4567163006 48C02040D1CB5210660A300648C02040D1CA5210320 6
%4A62E4368048C1207C00904FEC1005D13018003206 48C120491005D13018001004EA087200
%4A67D436A012003A013001207C000069B67E003D47FFFE1D700000FFFF673C320648C12049
%4A676436C0700010301800B06EFFFE652A320648C12049102EFFFF913018007003B0456604
%4A674436E0700260027001320648C1207C00904FF4D13018006 0C453464A466C00FF2C4CDF
%4A65E437001CFC4E5E4E752F02223900904FFC2041700AD1C01410204170 0BD1C01010460 0
%4A603437 20B40067024202 0C0200E0650470006 00C72001202700 3C28052812001241F4E75
%4A62D437402F02242F00084EB9000037063200660670186000006A2002207C00904FF4D100
%4A635437 6022482002207C00904FECD1C034017000101080C1484002800000FFFF944070 00
%4A6E2437801011604265081002911110 07D11070001011B041650A100191111001D110 600
%4A602437A00C1000196304108C0017740014107000 3002C1FC000C81C134007000300224 6
%4A63E43700487548E73020242F00104EB90000370636006604700160262002207C00904FE0
%4A661437E0D1C024482F024EB900003740720CB280588F6E081003911270016002700 04CDF
%4A6304380004 0C4E7548E73000242F000C262F00104EB900003706 4A806604700160302003
%4A63F4382020 7C00904FF4D1C02248200320 7C00904FECD1C070001011720012 10D081B082
%4A63C43840640 47000 60144A826F0A4A11630653825311 60F21002911070014CDF000C4E75
%4A656438604 8E73E00242F0018222F001C2C3900904FFC0686000000E62A061839000400 0
%4A64643880488449C47007C8807600701 3B08155C344036600000820 04B082620C4A836704
%4A685438A070FF600270FE6012E5822002E582D480D4812042D1C5700010104CDF007C4E75
%4A6BC438C048E73E20242F001C2C3900904FFC203900904FFC7214D0812240700DB082660 6
%4A641438E010 390004006F48B048C0600000BE700DB082640670FF600000B22002D080207C
%4A6FC439000006 98E72001230000 02A0102810000 00E09A812002D080528 0207C00006 7 0
%4A6EF439207900 18200000 2005D086760024401612080100076716220552812041D1C670 0
%4A6164394010102203E189D08126006 03A080100066718220552812041D1C6700010106 88
%4A6284396022 03E989D0812600601C080100056716220552812041D1C670001010720FC6B1
%4A6484398 0E18BD0832600704 0B0846F102044D1C97000101 02203E189D08126007000B 08
%4A66E439A066062003E0882600200 34CDF047C4E7548E73830362F001A342F001E247000 70
%4A62E439C01F447009B04264067000600000AC72003202C2FC000520413003 4B0 0C0FC003 2
%4A654439E0224022 3900904FFC701ED280D3C1D1C928082204548170002641101320445200
%4A62343A0072001210E1892044760016107410E5AB2403D282D0812480204459887400141 0
%4A62C43A20224456897000101 1E148D440760270003002B0FC0028484002800000FFFF3200
%4A6D943A406604722060107 01AB041 640606410015600406410040300341EA0004118 1000 0
%4A68643A6070003002B0FC002802800000FFFF340053434A436CB8200A4CDF0C1C4E754E56
%4A67C43A80FFFA4B E73F 3C362C000A 242F000E246E00107009B0426C0670FF6000014430 03
%4A6A843AA048C0C0F20032 224022 3900904FFC701ED290D3C1284922522649CF890CB700FF
%4A6E143AC0FFFFCF 896306267001FFFF F 7A02320541EEFFFA2E0B1007020000FF1180 1000
%4A64A43AE02E0BE08F264753454A4560E24246424530054 1EA00041830 00000C0400616504
%4A6DF43B00040400200C04004165 0C0C04005A620604040040600E0C04002066044204 6004
%4A60043B2004040 01 50C040027630242043206C3FC002B70001004D2403C01524570 03B045
%4A6BA43B406EAE 3006E040020000FF1D40FFFD10060200 00FF1D40FFFE3C02CDFC00057A2C
%4A66F43B606018300548C05A8032 40B300300548C02200D28C2A41129553 45BA466CE4424 0

%4A67843BB030054800320648C1D0812240D3CC300541EEFFFA12B0000052457005B0456EE0
%4A66B43BA07004B0426F14300348C0E3B0588052802F004EB9000047A8588F7002B0426F12
%4A6B343BC0300348C0E38058802F004EB9000047A8588FCF8B4A87CF8B670470FE60027000
%4A6CE43BE04CDF3CFC4E5E4E7548E73830242F001C247C00904F4C267C00904F4B28122039
%4A61543C0000904FFB2480908428007600 49EA000472001213601406010000670620 04D194
%4A64B43C205283588C2001E28822004A8166E820035A80E540204A2204D3B000004A136728
%4A67743C404A82662448780 0094EB9000038C05280588F2F00487800094EB900003D18257C
%4A61543C60000038400028508F2004D1AA0028222A00280C810000384065000 06E42AA0028
%4A62643C8049EA001076006046588C224C221120010C8100000E10633480FC0E1038002003
%4A65B43CA058802F004EB9000038C072003204D081588F2F00200358802F004EB900003D18
%4A66B43CC070003004C0FC0E109194508F52837005B08362B442A74EB9000047A848780001
%4A68743CE04EB9000047A8508F168241EA000420084CDF1C1C4E752F02242F0008222F000C
%4A6A743D00700BB082630272002F012F024EB900003D1850BF241F4E754E56FFF848E73F38
%4A67F43D20262E0008242E000C247C000047A8227C00904FFC265120517214D1C12D48FFFB
%4A63F43D402E1106B7000000E62A07700BB08366162E024687028700000 0FF20472002E188
%4A61D43D602E088E8024071D790004006FFFFF3E2EFFFE48873D47FFFE026E0007FFFE700D
%4A66343D80B083640670FF600001D8700DB083664E424660344244300448C0320648C1D081
%4A67043DA02040D1C5421052447 00AB0446EE8340648C285FC000A48C22202700CD2802F01
%4A6A243DC04E9258BF0646000A300648C0322EFFFE48C1C3FC0014B0816C00018660B62A02
%4A67B43DE02F034EB9000038C0284020 43D1C83008207C0000698E7C001C3000003D46FFFC
%4A6B643E00024600 1F3E2EFFFC9E463D47FFFC2043D1C852883008207C0000698E78001830
%4A67443E2000007040B04458 8F6F26300448C02040D1EEFFF81002020000FF10802E05E08F
%4A69643E402A072E0CE08F2847487B00024E92588FBA8C6700010C7009B083663C204B7213
%4A65743E60D1C17800181052443004 48C07222143900040 06D48824 8C29282B0816D0A38 2E
%4A6AF43E80FFFEE34406440000204B7213D1C11084487800024E92588F082E0007FFFD6724
%4A63B43EA0300648C02040D1CB2205E0891081300648C052802040D1CB1005020000FF1080
%4A66F43EC0600000 8C082E0006FFFD6732300648C02040D1CB2205E8891081300648C05280
%4A64043EE02040D1CB2005E988320648C15281224 1D3CB12110201000F8001108060500 82E
%4A65F43F000005FFFD67383006 48C02040D1CB2005028000000F00E088320648C12241D3CB
%4A60843F2012110201 00F080 011080300648C052802040D1CB1005020000FF108060104A6E
%4A67C43F40FFFC660A3006480020 40D1CB10857009B0466D04700060027001 2F004E9258B
%4A6D843F604CDF1CFC4E5E4E754E56FFFC48E73C00302E000A262E000C48C0C0FC00322400
%4A66F43F80203900904FFC721ED081D4802A027802320441EEFFFC1003020000FF11801000
%4A65B43FA02403E08A260253444A446CE44AB3670670FF6000005E424442423002 48C03204
%4A64643FC048C1D081D08522 4010111320241EEFFFCB03010006200003230024 8C032044 8C1
%4A66243FE0D081D08522401011132024 1EEFFFCB0301000640C300448C081FC000548C0601C
%4A671440005242700 3B0426EB25A447032B0446EAB700A4CDF003C4E5E4E75222F00047001
%4A67F44020E3A07200123900904F4B80812F004EB900003BE8588F4E754BE73E00342F001A
%4A61B44040362F001E4200203900904FFC0680000000E62C0018390004006F488402440007
%4A61F440607001120 2E3A04680720 0123900904F4BC0812F004EB900003BE822007000300 2
%4A64B44080E580D081224 02A11E46D7000300 2E580D0812240429 10C430080588F63043630
%4A616440A000801239000 9006F488148C1E6817000 302803001207C000069A8123000004881
%4A63C440C0C2FC000FC2C32005 80C112390004006F4881EA41024100072041640476006 00A
%4A6FE440E076003600700030019680300372 13B240640270133602C6FC0014D64070003003
%4A64E44100D086C1895211C189672A70003002E388720CD0812F004EB9000047A870003002
%4A66044120E388720CD08152802F004EB9000047A8508F604A3404C5FC0014601230024 8C0
%4A62044140D08622401211620922401281 53424A426CEA70003003D08622401 2BC00804242
%4A66544160601470003002720CD0812F004EB9000047A8588F52423004E348B04262E44CDF
%4A66344180007C4E7543F900904F8E302F000E4840206F0008302F000640C146FC25000339
%4A6F0441A0000500B0300966 1A4AA900066614 33C00080317048401340000523480006 7001
%4A602441C0600270004 6C14E7570006002700 12040302F000640C146FC2500083900050080
%4A658441E03009660C33C00080317046C17001600846C12008530066D64E7543F900904F8E
%4A61D44200102900026A2072001229000 1B211671 82F0112112F014EB9000035C4508F43F9
%4A65644220 00904FBE600267 16B3E900066710137C00FF0002423900904FEB135100014EB9
%4A62B44240000 0432E43F900904F8E203C0001000320494EB9000041984A8066125239 0090
%4A65E442604FEB66000014533900904FEB600A1029000266045229000 24E7548E780C043F9
%4A6FB4428000904FBE2069000620086600002010290004488041F1000A522900040C00000F
%4A6E2442A06500001A422900046000001252A900065329000566000006 42A9000610B90080
%4A638442C0300F4CDF03014E7341F900904F8E10280003B02800046700001C522800030C00
%4A65F442E0000F650000064228000348804 8C01030000A4E7570FF4E7543F900904F8E302F
%4A6FA4430000060880000033C000803 12E32390080300E33EF000A008031700 8C0000042A9
%4A6644432000 0242A9000633C000803 12E4E752F0A45F900904FAB52B900904FF8206A002A
%4A64E443402208675430 2A002802400FFE43F900802001D2C0B308528967 1E532A00176508
%4A63C443605388558960 0000CC523900904FC0641053390 0904FC0600853 2A0016660000B4
%4A605443800C40003C641272020C40001E6502720341EA0019600000809 1C87200122A0004
%4A604443A0B22A0005670000A42032100658010201000C15410004E1981200E088204048E7
%4A638443C07E00740076 0078007A007C0043FA00F032191 01815801019E2096402B102E209
%4A651443E06402B103E2096402B104E2096402B105B10612196ADCBB0615450021B9061544
%4A6444440000 1D41EA001CB7061103B5061102460611064CDF007E2001E9409041D04043F9
%4A609444200080200 1D2C0157C000F0016157C0004001712 10B211677A40C0007C070033C0
%4A672444400080315012814 6C06068222A00006762701FE38155CBFFFC7201E1A1468 1C3AA
%4A62C444600000 22000C0000026D266E0C227900904FFC1229001360180C00000C6E0E3F01
%4A69244480 70EEE249D141E541D041321F0640000BC0FC000AD0B900904FFCE09980817200

```
%4A6FA444A0122A000525801006580102010000C1541000535490028254800 2A245F4E750003
%4A6A3444C0050607090A0B0C0D0EFF224A4CDF0C3C4A3900904FFA6600000C4A3900904FC0
%4A655444E06A00004E70FF4E7541F90004000030100C404EF9661820280002E28865100C80
%4A606445000000B000650B0C80000480006504700014E757007C0390004006FC0FC00140640
%4A684445200 0E6205F9FC023CF00904FFC224F2F0848E73C30244947F900802001740076 00
%4A6174454061000132670000502A006B0000182003C0FC000A41F200F643EA00147009 12D8
%4A66E4456051C8FFFC528253836100010A6A00001E4A85630001D22003C0FC000A43F200F6
%4A652445804 1EA0014700912D851C8FFFC57822002610002 1A52820C42000263A476021 42A
%4A6FA445A00013702290390004006DB40065027400700 7C0390004006FD000060000CCB400
%4A607445C0640A1540001361000 1BC6010610000A6670A6BF2200253806100010D2102A000A
%4A677445E04680B02A000B670A422A000A157C00FF000B303C00C742320 01E31C8FFFA7404
%4A603446007603 7A0061000 05E570A8A8030025340610 0019A0802000066025643 0042000
%4A6384462065E24A856A00000661000146780 7C8390004006F6724D8845384610 00386700
%4A604446400016 6A00000A6100017060000 00E200253806100015851CCFFE2610001A66700
%4A63544660000C7001610001466000017A4CDF0C3C70004E75700AC0C343F200002 0020740
%4A6394468090 42D04041F300048E73E481C104606 1A280010B806182800 0889C61 6290004
%4A647446A0E7061428 0002B50649FAFE14321CD24110301000 1200E40964028102E20964 0
%4A62F44600B103E2096402B104E2096402B105B106121C6ADA7200100680023003800400 0
%4A690446E067487201 49FA00507000E20EE350E20DE350E20CE350E20BE350E20AE350672 
%4A6FB44700526A000E6404536A000E08000004660800B18000000 00600A103400F068048301
%4A69B4472000F6D20164 021 23C0001 40DF127C52825283200 14E75FFFFFF00FF010 203FF0 
%4A62C447400506070809FF35790004000 70000C357C00FF000A7007C0390004006FD 0000
%4A631447600 00C15400 013 5108614E611B600000763 03C00C7423 2001E510 8FFFA223000
%4A669447800FF0602C7009423200 0051C8FFFA70024232001051C8FFFA7009423200 1 451
%4A670447A0FFFA123C00076008202F00047201E1A183B900904FA84E757007C039000400 6F
%4A67B447C066024E75D0407201E1A1534143EA00E6C0FC000A534C4231000051C8FFFA7000
%4A654447E0E1A160CC4EB90000432E203C00001A0A538066FC33C00080310061066 6E66000
%4A63444800FC0A43F900904FAB202 70000720012290005922900048 03180A900246702 7001
%4A66C448204E7548E73030 43F900904FA847F900802001742194 6F001 2 6 04202 0 106 61 
%4A64B4484061C0 64A226F00146100 E3267305B0053004880 48C0603820 2F001401801 0 
%4A61344860E0987200 40C2007C07001 22A000543F210065B01020100 0CB22A000466044 60
%4A6374488060 0C228015410005 46C27001600270004CDF0C0C4E752F02302F000A6012 2439
%4A6D3448A000904FFB223900904FFB828267F653404A406EEA241F4E754E56FFF82F021 22E
%4A698448C0000B102E000F242E0010227C00904F781D41FFF81D40FFF913C000904F794211
%4A684448E0600252111011498048C02040D1C24A1066F01001D1112D42FFFA422EFFF8 4237
%4A6A344900486EFFF84EB900002E36506F241F4E5E4E75202F00042F00103900904F 794808
%4A67B449204BC02F00103900904F78488048C02F004EB9000048B84FEF000C4E75202F0004
%4A664449402F00103900904F7948804BC02F00103900904F78488048C02F004EB900004 96
%4A6BC449604FEF000C4E754E56FFF648E73000142E000B162E000F202E001042A748 78000 
%4A6C3449804 86EFFF62F004EB900002ABE41EEFFF64FEF00106002528 80C10003067F8 4A10
%4A670449A0660253882F0810034880 48C02F00100248 8048C02F004EB90000 43B84FEF0000
%4A647449C04CDF000C4E5E4E752F02206F000872001210700010182248 32887400141 1800 
%4A660449E082802001241F4E7548E73020246F0010362F001660302F0A4EB9000049C84A80
%4A62D44A00588F670000267402101A1200E8080201000F9001E1A2300260064A1A66FC5340
%4A69C44A204A406CF653434A4366C02F0A4EB9000049C84A90588F6604700060022 00A4CDF
%4A67744A40040C4E754E56FFF448E73020246E0008342E000E362E0012700010 12E848780 
%4A6FB44A6018120244000F72029004E1A13A0132021004E0693401320553 41C441320 31004
%4A66644A80E069360132055341C6412F0A4EB9000049C84A80588F66067000600000C24A39
%4A6BE44AA000040072670470016002 70041D40FFF41D6E0017FFF5528A2D4AFFF6422EFFFA
%4A66244AC0082E0000001B670E486EFFF44EB900030F4588F601A7000302E001A0280000 
%4A6B344AE0FC002F00486EFFF44EB900002E36508F424060064A1A66FC5240B04263F6522 
%4A6BC44B00FFF4102E001752001D40FFF52D4AFFF6422EFFFAB44366060 06E0400001A0B2E
%4A65C44B200000001B670E486EFFF44EB9000030F4588F601A7000302E001A02800000FC00
%4A6B044B402F00486EFFF44EB900002E36508F300260064A1A66FC5240B04565F6200A4CDF
%4A66544B60043C4E5E4E7548E73E00242F0018382F001E362F00227000302F00262F002F02
%4A66A44B804EB9000049E824002F024EB9000049C84A804FEF000C670000484A3900040072
%4A60244BA0670470186002701 23C007A03602E7000302F002A2F00700030052F0070003003
%4A65844BC02F00700030042F002F024EB900004A4424004FEF00146700000856458A4663CE
%4A66144BE04CDF007C4E752F024A39000400726704700460027008240043 79000069AC4878
%4A63D44C00001B200256802F004EB9000048B82F39000400744EB9000049124879000069B4
%4A67844C204878001C200258802F004EB9000048B84FEF001C241F4E7548E72020227C0091
%4A61A44C400000247C00006B8A240906820000050020424250424132DA52417008B0416EF6
%4A6B544C604CDF04044E754E56FFFE48E73F38242E0008247C000048B81A390004006F4885
%4A60644C80024500074A456700031042473847600003024EB9000035224A39000400726704
%4A65744CA0700460027 00A4879000069C6487800012F004E92300C48C02F004EB90000493C
%4A65244CC0426EFFFE12390004006F488148C102E1000000E0EA8136015243380312390004
%4A65B44CE0006F488148C17018C280E6813001207C00006B9A1030000048 80C9C053447E04
%4A6BD44D003647424 64FEF0010720AB26EFFFE6F047003600E7264B26EFFFE6F047002600 2
%4A66644D2070013600302EFFFE48C02F00300648C056802F00300348C02F004EB900004966
%4A67244D4048790000 69DC300648C056802F0048780004 4E927213B2464FEF0018671E3004
%4A65F44D6048C02F00300648C056802F00487800054EB9000049664FEF000C6014487900 00
%4A6DB44D8069DE487800164878000 44E924FEF000C3D44FFFE526EFFFE12390004006F4881
%4A63E44DA048C17018C280E6813001207C00006B9A10300000488 0D840300643C02F00300C
```

%4A67244DC048C02F004EB9000038603600048C0508F2F00300648C056802F00487800094EB9
%4A67644DE000004966B64B4FEF000C6F02364352467214B2466E00FF124A390004007267046
%4A67244E007024600270303D40FFFE080BE24442463006480C02F003000480C02F004EB90000
%4A69644E20386030600C7EEFFFFED644300348C02E0B81C748C0360008030000508F67344A00
%4A62744E400004007257082030000000DD6002705D42A72F00300648C056802F00300034200
%4A64F44E60E280720CD0812F004EB9000030444FEF00103003E2403600602442A74878000000
%4A65644E8030064480C056802F00300348C0720BD0812F004EB9000030444FEF00105343 4A43
%4A65844EA06ED852467214B2466E00FF664A39000400726704700060007004380032004 3
%4A66344EC0300548C05280B28066444A82673B4879000069E44878001830044800568020F00
%4A66A44EE04E922F390004007B4EB900004912487900006 9EC48780019300448C058802F00
%4A67844F004E924FEF001C4EB900004BE6603848790000 6A06487800 1B300448C056802F00
%4A65044F204E922F390004007 44EB900004912487900006A0E4878001930044 8C058802F00
%4A66F44F404E924FEF001C42A74EB90000113E360008000000588F66383200480C13005480 0
%4A67444F605380828066 6C0803000167164A82671242A7487800 0D4EB900003CF6534C508F
%4A6FA44F80600E48780014EB90000489658 8F60B6524CB8C56D00FCFC4CDF1CFC4E5E4E75
%4A65944FA048E73E003 42F001A78002A047603300348C02F004EB900003 8C02200D85 1300
%4A69244FC0588F6016300348C05A802F004EB9000038C02200DAB1588F53454A466CE55340
%4A68F44FE04A436CCA487900006A1E4878001 1300248C056802F004EB900004BB82F044EB9
%4A66645000000493C4A844FEF0010670000860C840000FFFF6200000A0C850000FFFF6330
%4A668450200C840001FFFE6200000A0C850001FFFE630E2004E2882800 2005E2882A0060E0
%4A62445040200452B0E28828002005528 0E2882A0076003605C6FC003C200380C47200 3200
%4A64245060260148790000 6A2E4878001 2300248C052802F004EB900004BB82F034E390000
%4A68B45080493C487900005A404EB9000049124FEF00144CDF007C4E7548E73C20242F0018
%4A621450A07601247C000048B842A74EB90000113E3A000800000058 8F6600016A0805000 1
%4A69E450C0671C4A826718760042A72F034EB900003CF6508F52837008D08 6EEC76014A83
%4A602450E0670001324EB9000035224A39000400726704700060027004280048790000 6A46
%4A6334510048780001220 45E812F014E9276004FEF000C3003E540207C00006A522F300000
%4A62A4512022035A812F01200456B02F004E922F034EB9000038C022003A0170003001588F
%4A652451402F0020035A802F002204701 1D2802F014EB90000 4966700AB0834FEF001866 1C
%4A65E45160704BB045641648780014 42A7487900006B184EB9000031624FEF000C5283700B
%4A66945180B0836E8E4A8267344879 00006B3248780 01822045C812F014E922F390004007 8
%4A65E451A04EB900004912487900006B3A4878001922045E812F014E924FEF001C10390004
%4A67C451C0006F488048C07207C081673648790000 6B4E4878001B22045E812F014E922F39
%4A653451E000040074 4EB900004912487900006B564878001C220450812F014E924FEF001C
%4A67E4520060064EB900004BE62F044EB900004FA07600588F48780014EB90000489658 8F
%4A68A452206000FE864CDF043C4E754BE73800740F48780 00C4EB9000038C038004EB90000
%4A64C4524035224A39000400725 88F6708203C00006CE06006203C00006C5A42A72F004EB9
%4A63C4526000002E364A3900040072508F6708203C00006CFE6006203C00006C7842A72F00
%4A65A452804EB900002E362F390004007848780015 42A74EB900004BB82F39000400744878
%4A65F452A0001842A74EB9000048B8300248C02F00300448C02F004EB9000053924FEF0028
%4A620452C042A74EB90000113E3600080000005 88F660000A808030007670C72011002E1A1
%4A6FE452E0300188406010080300066 70A70011202E3A04640C8400803000567045242600 8
%4A6E545300080300046702534202420 00F320348C10281000000F06714300248C02F003004
%4A6504532048C02F004EB9000053925 08F080300016722700F340048C02F004878000C4EB9
%4A65D45340000038C0380048C0588F2F004EB9000053925 08F320348C17030C280670C4878
%4A67645360000A4EB900004896588F48780014EB900004896588F6000FF48300448C02F00
%4A6B2453804878000C4EB900003CF6508F4CDF001C4E7548E73F38362F002A342F002E347C
%4A632453A080007A05424736477 80F7207B24466204A39000400726 70470F5600270053A00
%4A6FC453C04A39000400726704700460027000364070 00300A32034BC1C081670470076002
%4A63B453E0700838407 20F300448C09280E3813C01DC45B8426608203C000000A060027020
%4A6514540042A72F00300B48C0320C48C1D0812F00300648C02F004EB9000030444 2A742A7
%4A6514542 0700F320C48C190013200 48C1D0812F00300643C02F004EB9000030 44300AE248
%4A6B04544034404FEF00205 3444A446C00FF5E4CDF1CFC4E752F02242F00084EB900004C3B
%4A6CB454602F024EB9000050982F034EB900004C66508F241F4E754E56FFDE48E73F3026 2E
%4A61B4548000083A2E000E382E0012247C000048BB26434A390004007 267047007 60027005
%4A66A454A03D40FFF2302EFFF2C1FC000334005C422F390004007B52427000 30022F0042A7
%4A62D454C04E922F390000 6BC6 5242700030022F00487800014E922F390004007 452427000
%4A662454E030022F0042A74E922F3900006 6A052427000 30022F00487800014E923D41FFF8
%4A6D745500426EFFFA4FEF0030600452 6EFFFA7000302EFFFA2F002F034EB900004 9584A80
%4A68C45520508F66E63D6EFFFAFFF4536EFFF4426EFFF63D6EFFF6FFFA42A7322EFFF648C1
%4A650455402F01720032042F01700 0302EFFF82F002F034EB900004B66487900008000487 8
%4A6664556000037000300 42F00720032 2EFFF82F012F034EB900004A44342EFFF248C27000
%4A6E1455803 02EFFF4322 8EFF648C1903 1B4804FEF002B641E48790000 6B66322EFFF248C1
%4A6DF455A0C3F00002 5A01 1 4 0 4 2 7C 14 3 3 4 7 4 2A 7 4 2
%4A644455C000001 13E 2 2 1 FF 0 0 8 8F 6 0 0 2E 4 4E7 5 0 0 0 1 4 E B 9 0 0 0 0 4
%4A689455E07000302EFFFE7230008158 8F67025040 000302EFFFE0280000000C067045 36E
%4A6834560 0FFFC0F804A47 0F806 70E4A6EFFFC6708082E0001FFFF67A43D6EFFF8FFEE4A6E
%4A6934562 0FFFC670602 6EFF3FFFFEC F804A47 0F806706026EFFCFFFFE7E193D47FFFC7E14
%4A6194564038470 82E0001FFFF6708 3D4 FFF8426EFFFA082E0006FFFF6 71 6526EFFFA30 6
%4A62F45660FFFA3E2 FFF 4 2 4 0 4 0 5 3 2EFFFA 0 1 2 2 B 2E0007FFFF670A4A6EFFFA6 2 0 4 3 6E
%4A691456 80FFFA7000302EFFFF0 28000000002670000FE48780001322EFFF648C12F01720 0
%4A6D3456A032042F01700030 2EFFEE2F002F034EB900004B66302EFFFAB06EFFF64FEF0014

%4A611456C064083D6EFFFAFFF6602A7000302EFFFA322EFFF248C17400342EFFF6D...
%4A64A456E063123D6EFFFAFFF63E2EFFF69E6EFFF23D47FFF642A77200322EFFF62F01...
%4A690457003204... 
%4A6794572000004...
%4A6AA457404878000248780008...EFFF47200322EFFF69081E480
%4A683457604FEF000C6408203C00006B7E600620390000 6D2A2F00322EFFF248C1C3F00003
%4A65B457805A812F0148780008 4E924FEF000C7C0010130246000F70011213E80952019206
%4A691457A0E3A03D40FFF07000302EFFF05380120 6E3A0324070 00302EFFFE7230C0816700
%4A6B4457C0009E082E0005FFFF673274003409700030 2EFFF8C48066122A402E09302EF...
%4A6DE457E080473D40FFF...
%4A6E445800FFFF67307001120 6E3A03E2EFFF8...
%4A6AB4582066123 02EFFF01206E3683E2EFFF89E403D47FFF8240B528220427400340970...
%4A6A245840302EFFF8C4801006E0AA524260064A1866FC53424A4262F64A106700FF58302F
%4A65645860FFFA906EFFF652403400C4FC00034878000170003002 2F00720032042F017000
%4A64845880302EFFEE2F002F0B4EB900004A44487900008000700030022F0072003204...
%4A6C4458A07000302EFFF62F002F0B4EB900004A444FEF00286000FD067000302EFFF84...
%4A67F458C03CFC4E5E4...
%4A686458E0203C00006CFE6006203C00006C7842A72F004EB900002E364A82508F66084EB9
%4A634459000000522A6024303900040070 48C02F004B78000C4EB900003BC0588F2F002F0...
%4A698459204EB9000054764FEF000C2F004878000C4EB900003CF650BF241F4E754EB90000
%4A63845940352 24EB900004C384A3900040072670 8203C00006D146006203C00006C8E4...
%4A68D459602F004EB900002E3642A7487800 0B4EB900003BC0588F2F00487900006D5A4EB9
%4A68C459800000547 64FEF000C2F00487B000B4EB900003CF64FEF00104E750000FF00F0F0
%4A66F459A0F00FFFFFFFFF0FF0FF0FFFF48FFB4F8F4F84FF4F8F48FFF80F08F080010001C00
%4A65C459C02C00400058007400940 0E000DC09D812D41BD024CC2DCB36C43F0102030405 06
%4A62D459E0070802040608 0A0C0E100306090C0F1215180408 0C1014181C20050A0F14191F
%4A61C45A0023280 60C12181E242A30070E151C232A313808101820283038407800 00005A68
%4A62545A2000005A8A00005AAC00005ACE00005AF0FFFF0090200000903000009028000090
%4A62045A4038000090 5F80008030004255 54544F4E203000004255 54544F4E203100004A4F
%4A60845A6059535449434B0000021600005A70000 0434F4C4F522020202020202052414D2065
%4A62645A8072726F722061743A2000021600005A920000504C41594649454C44202052414D
%4A6F645AA0206572726F722061743A2000021600005AB40000414C504841202020202020 2052
%4A65C45AC0414D206572726F722061743A2000021600005AD600004D4F54494F4E204F424A
%4A61545AE02052414D206572726F722061743A2000021600005AF800004741 4D452020202020
%4A60E45B0020202020 52414D206572726F722061743A20000E1700005B1A0000526561643A20
%4A60A45B2000000217000 05B2E020000005B1257726F74653A2000021D00005B3E0000666F
%4A61745B4072206E65787420746573740009 1C0090403E020000005B36021C00005B640200
%4A62E45B6000005B4C20507265737320000229 00005B740000666F72206E65787420746573
%4A60A45B8074000928009 0403E020000005B6C022800005B9A020000005BB22050726 57373
%4A61A45BA0200002 0D00005BAA0000494E50555420330002 0C00005BBE020000005BA2494E
%4A60B45BC050555420320002 0B00005BD2020000005BB2494E505554203100020A00005BE6
%4A62945BE0020000005BC6494E5055542030000B0900005BFA020000005BDA373635343332
%4A69045C00313000007F5F5F5F5F5F5F5F5F5F5F00DE00040500005C1A0000746F20736565
%4A61345C2020302061707065617200040400005C36020000005C12616E64206D6F76652 06A
%4A63D45C406F79737469636B7300000403000 05C56020000005C2A507265737320737769 74
%4A61A45C6063686573000000B0100005C72020000005C4A537769746368205465737400080 1
%4A62D45C8000005C8600005 06C61796669656C6420546573740000 0B0200005C9E00004261
%4A6EC45CA06E6B203D20000700 00005C04000007010 0005C10000008010 0005CBE0000416C
%4A62545CC070686120546573740000080100005CD20000436F6C6F72205465737400000801
%4A63D45CE000005CE6000020436F6E7665726 7656E636520546573742000000C0100005D02
%4A65C45D0000004D6F74696F6E204F626A656374205465737400000F1600005D1E00004F62
%4A61945D206A656374 3A000E1700005D32020000005D16506963747572653A00000B180000
%4A65E45D405D480200 00005D26486F72697A6F6E74616C3A000D1900005D6002000 0005D3C
%4A63545D60566572746963616C3A00111A00005D7602000 0005D5453697A653A0008180000
%4A64445D805D88020000005D6A436F6C6F722050616C657474653A00000A0100005DA00000
%4A64945DA0536F756E6420546573740000002040000 5DB40000576169742033205365636F6E
%4A64B45DC06473000002030000 5DD0020000005DAC54657374696E6720536F756E64204350
%4A66B45DE05500020300005DEA0000536F756E642050726F636573736F72204E6F74205265
%4A63F45E0073706F6E64696E670000020500005E12000053706565636820436869702054 69
%4A63B45E206D65204F7574000002 0600005E3000004D75736963204368697020546 96D6520
%4A64F45E404F75740002070000 5E4C0000536F756E6420435055204 96E746572727570742 0
%4A63545E604572726F720002090000 5E6E0000536F756E6420435055205 2414D2032204572
%4A64145E80726F720002080000 5E8C0000536F756E6420435055205241 4D20312045727 26F
%4A64245EA0720002 0C00005EAA0000536F756E64204350555205 24F4D203320457272 6F7200
%4A64545EC0020B00005EC80000536F756E642043505552052 4F4D2032204572726F72000 20A
%4A64A45EE000005EE60000536F756E6420435055205 24F4D203120457 2726F72000000 5E0A
%4A61E45F0000005E2800005E4400005E6600005EB400005EA200005EC000005EDE020E0000
%4A64B45F205F2400004375727265 6E7420436F696E20566 16C75653A00020F00005F400000
%4A62145F404E756D6 26572206F6620536F756E64732020 3A0002100000 5F600000000000 00
%4A65045F60536F756E6420435055205 3746174757320203A00191000005F7C0000476F6F64
%4A61145F8000000 21000 005F8E020000005F1C536F756E64202 3203A0002170000 5FA40200
%4A64445FA000005F82746F20686561722073 6F756E640009 1600 9040580200 00005F98021 6

%4A64145FC000005FCA020000005FB2205072657373200021A00005FDE020000005FBE746F
%4A63145FE0207365636563742073F756E64000719009040720200000005FD2021900006006
%4A6FC4600002000000SFEE4D6F76650000101200006014000053696C656E742020202020202
%4A6AC46020202020202020000101200006020E00004E6F697379202020202020202020202000C
%4A6E54604010120000604800004D7573696320436869702054657374420200010120000606B
%4A6084606000004566666563747320436869702054657374001012000060607C0000053706565
%4A6C446080636820436869702054657374200010120000609600002020202020202020202020
%4A6BE460A020202020202020202000101D000060B0000020576869746520200000101D000060C2
%4A6C9460C00000202052656420202000000101D000060D400002047726565E20200000101D
%4A6E0460E0000060E600002020426C756520200000101D000060F800002020477265792020
%4A6F446100000101D0000610A0000205669696F6C6574200000000060BA000060CC000060DE
%4A6054612000060A8000060F0000060AB00006102000060CC000000000000000FFFFFFFF
%4A61C46140FFFFFFFF00010001000100010001000100010000FFFF00010000000FFFF
%4A67F4616000010000000FFFF00010000000FFFF00010000FC00F0C0F00CFCCC4CCCFCCC
%4A65946180FC0CF0C00000F0000000F00F0000F0F00000F0FF0000FF000000FF0F0000FFF0
%4A62D461A00000FFFF0000FFB00000F0080000F0800000F0880000F8000000F8080000FB80
%4A64E461C00000FB880000FF000000FF020000FF040000FF060000FF080000FF0A0000FF0C
%4A6FA461E00000FF0E0000F0200000F0220000F0240000F0260000F0280000F02A0000F02C
%4A6EE462000000F02E0000F0400000F0420000F0440000F0460000F0480000F04A0000F04C
%4A600462200000F04E0000F0600000F0620000F0640000F0660000F0680000F06A0000F06C
%4A612462400000F06E0000F0800000F0820000F0840000F0860000F0880000F08A0000F08C
%4A624462600000F08E0000F0A00000F0A20000F0A40000F0A60000F0A80000F0AA0000F0AC
%4A636462800000F0AE0000F0C00000F0C20000F0C40000F0C60000F0C80000F0CA0000F0CC
%4A602462A00000F0CE0000F4000000F4020000F4040000F4060000F4080000F40A0000F40C
%4A60A462C00000F40E0000F4200000F4220000F4240000F4260000F4280000F42A0000F42C
%4A61C462E00000F42E0000F4400000F4420000F4440000F4460000F4480000F44A0000F44C
%4A61F463000000F44E0000F4600000F4620000F4640000F4660000F4680000F46A0000F46C
%4A631463200000F46E0000F4800000F4820000F4840000F4860000F4880000F48A0000F48C
%4A643463400000F48E0000F4A00000F4A20000F4A40000F4A60000F4A80000F4AA0000F4AC
%4A655463600000F4AE0000F4C00000F4C20000F4C40000F4C60000F4C80000F4CA0000F4CC
%4A667463800000F4CE0000F4E00000F4E20000F4E40000F4E60000F4E80000F4EA0000F4EC
%4A625463A00000F4EE0000F8000000F8020000F8040000F8060000F8080000F80A0000F80C
%4A62B463C00000F80E0000F8200000F8220000F8240000F8260000F8280000F82A0000F82C
%4A63D463E00000F82E0000F8400000F8420000F8440000F8460000F8480000F84A0000F84C
%4A640464000000F84E0000F8600000F8620000F8640000F8660000F8680000F86A0000F86C
%4A652464200000F86E0000F8800000F8820000F8840000F8860000F8880000F88A0000F88C
%4A664464400000F88E0000F8A00000F8A20000F8A40000F8A60000F8A80000F8AA0000F8AC
%4A676464600000F8AE0000F8C00000F8C20000F8C40000F8C60000F8C80000F8CA0000F8CC
%4A688464800000F8CE0000F8E00000F8E20000F8E40000F8E60000F8E80000F8EA0000F8EC
%4A669464A00000F8EE0000FF200000FF220000FF240000FF260000FF280000FF2A0000FF2C
%4A674464C00000FF2E0000FF400000FF420000FF440000FF460000FF480000FF4A0000FF4C
%4A686464E00000FF4E0000FF600000FF620000FF640000FF660000FF680000FF6A0000FF6C
%4A689465000000FF6E0000FF800000FF820000FF840000FF860000FF880000FF8A0000FF8C
%4A69B465200000FF8E0000FFA00000FFA20000FFA40000FFA60000FFA80000FFAA0000FFAC
%4A6AD465400000FFAE0000FFC00000FFC20000FFC40000FFC60000FFC80000FFCA0000FFCC
%4A6BF465600000FFCE0000FFE00000FFE20000FFE40000FFE60000FFE80000FFEA0000FFEC
%4A63A465800000FFEEF000F00FF0F0F0FFFF00FF0FFFF0FFFFFF80F008F080F088F800F808
%4A641465A0F880F888800084008800BC009000940098009C00A000A400A800AC00B000B400
%4A6EB465C0B800BC00C0A0C4A0C8A0CCA0D0A0D4A0D8A0DCA0E0A0E4A0E8A0ECA0F0A0F4A0
%4A699465E0F8A0FCA0C020C420C820CC20D020D420D820DC20E020E420E820EC20F020F420
%4A6D046600F820FC20C080C480C880CC80D080D480D880DC80E080E480E880EC80F080F480
%4A632466620F880FC8001020000662000004D61696E20524F4D2065727726F7200001500000
%4A6F14664066440000550017020000664E00004C000103000066580000476160652065F61
%4A616466607264205241 4D206572726F7200000104000066760000 4E4F2047414D45205052
%4A61C466804F4752414D000104000066BE0000524F4D2061742031303030302065727726F72
%4A6F1466A00000105000066AA0000524F4D206174203138303030206572726F7200000106
%4A601466C0000066C60000524F4D2061742032303030302065727726F72000001070000066E0
%4A615466E00000524F4D2061742032383030302065727726F7200000108000066FE0000524F
%4A6FC467004D2061742033303030302065727726F72000001090000671A0000524F4D206174
%4A6EF46720203338303030206572726F720000010A00006736000052 4F4D2061742034303030
%4A6F54674030302065727726F720000010B0000675200005 24F4D20617420343830303030 2065
%4A61B467607272 6F720000010C0000676E0000524F4D2061742035303030302065727726F72
%4A603467800000010D0000678A0000524F4D2061742035383030302065727726F720000010E
%4A60A467A0000067A60000524F4D2061742036303030302065727726F720000010F000067C2
%4A610467C00000524F4D2061742036383030302065727726F7200000110000067DE0000524F
%4A615467E04D2061742037303030302065727726F7200000111000067FA0000524F4D206174
%4A6EE4680020373830303020 6572726F72000001120000681600005 24F4D2061742038303030
%4A6F04682030302065727726F7200000113000068320000524F4D206174203838303030302065
%4A6E04684072726F72000001504000068 4E0000550015050000685800005500150600006862
%4A6C5468600000550015070000686C0000550015080000687600005500150900006880000 0
%4A6E94688055001 50A0000688A00005500150B0000689400005500150C0000689E00005500
%4A6F1468A0150D000068A800005500150E000068B200005500150F000068BC000055001510
%4A6CB468C0000068C600005500151100006 8D000005500151200006 8DA00005500151 30000

%4A605468E068E4000055001704000068EE00004C001705000068F800004C00170600006902
%4A6C94690000004C001707000069 0C00004C001708000069 1600004C00170900006920 0000
%4A6F3469204C00170A0000692A00004C00170B00006934 00004C00170C0000693E00004C00
%4A6F746940170D0000694800004C00170E0000695200004C00170F0000695C00004C001710
%4A6CF4696000006966 00004C0017110000697000004C0017120000697A00004C0017130000
%4A6BF46980698400004C0000020404050300000000010102020303440425054706280750 08
%4A65E469A031098E408A408C400A0F141E5072657373200000 20666F72206E657874207363
%4A666469C07265656E00004869737 46F6772616D20666F7220506C61796572200 02D002620
%4A650469E05550000050726573732000002074 6F20636C656172206 16C6C20686973746F67
%4A65046A0072616D7300005072657373200000666F72206E657874206C6576656C0000546F
%4A66246A2074616C20436F696E73203A2000004176672054696D652F436F696E203A200000
%4A62346A4020736563000053746174697374696373000000006A7E00006A8C00006A9A0000
%4A65746A606AAB00006AB600006AC400006AD200006AE000006AEE00006AFC00006B0A506C
%4A66B46A80797220302043 6F696E733A00506C79722031204 36F696E733A00506C79722032
%4A68546AA020436F696E733A00506C797220332043 6F696E733A003020506C7972204D696E
%4A65846AC073203A00312050 6C7972204D696E73203A00322050 6C7972204D696E73203A00
%4A67546AE03320506C7972204D696E73203A00342050 6C7972204D696E73203A00546F7461
%4A64946B006C2047616D6573203A004572726F7220436F756E74203A001B0F00006B240000
%4A61746B2000000000454550524F4D204552524F5200005072657373200000746F20636C65
%4A65B46B4061722073746174697374696373005072657373200000666F722068697374 6F67
%4A65F46B6072616D7300001E1F204D4F5245201E1F00001C1D204D4F5245201C1D00001E1F
%4A6C546B80204D4F5245201E1F00008F00FF0060FFF0FF8F008FFF60F0F0F00A0F141E0119
%4A66446BA000006BA60000746F2073617665207468697320736574 74696E6720616E642065
%4A67046BC07869740001160000 6BD0020000006B9E726573746F726573206F726967696E61
%4A63F46BE06C207365747469 6E670001080000 6BF6020000006BC44F4646000107 00006C06
%4A6F216C00020000006BEA4F4E0000050600006C1602000006BFA352034203320322 03120
%4A6B746C2030203720380005 0500006C3202000006C0A31203120312031203120310015 06
%4A6D946C4000006C4A020000006C2637203620352034203320322031203000 00D020000 6C66
%4A64046C6002000006C3E2853776974636820766572736 96F6E2900000F0100006C800000
%4A68646C80476 16D65204F7074696F6E7300000F0100006C96 0000436F696E204F7074696F
%4A6DC46CA06E730000050A00006CB0020000006C2637203620352034203320322031203000
%4A63246CC00010C00006CCC020000006CA44F464600010B00006CDC020000006CC04F4E0000
%4A65B46CE00B0200006CEC020000006CD028537769746368207665727369 6F6E2900000A01
%4A64746D0000006D06000047616D65204F7074696F6E7300000A0100006D1C0000436F696E
%4A61C46D20204F7074696F6E73000000006D2E20202020202020202020200000424D756C7469
%4A61646D40706C6965723A00310032003300340035003600370038007542 6F6E7573204164
%4A64346D606465723A004E6F6E650032206769766573203100342067697665732031003420
%4A63046D806769766573203200352067697665732031003320676976657320310000467265
%4A67046DA06520506C61790000000000000000000000000000000000000000000000000000
%4A63746DC00000000000000000000000000000000000000000000000000000000000000000
%4A63946DE00000000000000000000000000000000000000000000000000000000000000000
%4A62C46E000000000000000000000000000000000000000000000000000000000000000000
%4A62E46E200000000000000000000000000000000000000000000000000000000000000000
%4A63046E400000000000000000000000000000000000000000000000000000000000000000
%4A63246E600000000000000000000000000000000000000000000000000000000000000000
%4A63446E800000000000000000000000000000000000000000000000000000000000000000
%4A63646EA00000000000000000000000000000000000000000000000000000000000000000
%4A63846EC00000000000000000000000000000000000000000000000000000000000000000
%4A63A46EE00000000000000000000000000000000000000000000000000000000000000000
%4A62D46F000000000000000000000000000000000000000000000000000000000000000000
%4A62F46F200000000000000000000000000000000000000000000000000000000000000000
%4A63146F400000000000000000000000000000000000000000000000000000000000000000
%4A63346F600000000000000000000000000000000000000000000000000000000000000000
%4A63546F800000000000000000000000000000000000000000000000000000000000000000
%4A63746FA00000000000000000000000000000000000000000000000000000000000000000
%4A63946FC00000000000000000000000000000000000000000000000000000000000000000
%4A63B46FE00000000000000000000000000000000000000000000000000000000000000000
%4A61F470000000000000000000000000000000000000000000000000000000000000000000
%4A6214702 00000000000000000000000000000000000000000000000000000000000000000
%4A623470400000000000000000000000000000000000000000000000000000000000000000
%4A625470600000000000000000000000000000000000000000000000000000000000000000
%4A627470800000000000000000000000000000000000000000000000000000000000000000
%4A629470A00000000000000000000000000000000000000000000000000000000000000000
%4A62B470C00000000000000000000000000000000000000000000000000000000000000000
%4A62D470E00000000000000000000000000000000000000000000000000000000000000000
%4A620471000000000000000000000000000000000000000000000000000000000000000000
%4A622471200000000000000000000000000000000000000000000000000000000000000000
%4A624471400000000000000000000000000000000000000000000000000000000000000000
%4A626471600000000000000000000000000000000000000000000000000000000000000000
%4A628471800000000000000000000000000000000000000000000000000000000000000000
%4A62A471A00000000000000000000000000000000000000000000000000000000000000000
%4A62C471C00000000000000000000000000000000000000000000000000000000000000000

%4A62E471E00000000000000000000000000000000000000000000000000000000000000000
%4A62147200000000000000000000000000000000000000000000000000000000000000000
%4A62347220000000000000000000000000000000000000000000000000000000000000000
%4A62547240000000000000000000000000000000000000000000000000000000000000000
%4A62747260000000000000000000000000000000000000000000000000000000000000000
%4A62947280000000000000000000000000000000000000000000000000000000000000000
%4A62B472A00000000000000000000000000000000000000000000000000000000000000000
%4A62D472C00000000000000000000000000000000000000000000000000000000000000000
%4A62F472E00000000000000000000000000000000000000000000000000000000000000000
%4A62247300000000000000000000000000000000000000000000000000000000000000000
%4A62447320000000000000000000000000000000000000000000000000000000000000000
%4A62647340000000000000000000000000000000000000000000000000000000000000000
%4A62847360000000000000000000000000000000000000000000000000000000000000000
%4A62A473800000000000000000000000000000000000000000000000000000000000000000
%4A62C473A00000000000000000000000000000000000000000000000000000000000000000
%4A62E473C00000000000000000000000000000000000000000000000000000000000000000
%4A630473E00000000000000000000000000000000000000000000000000000000000000000
%4A62347400000000000000000000000000000000000000000000000000000000000000000
%4A62547420000000000000000000000000000000000000000000000000000000000000000
%4A62747440000000000000000000000000000000000000000000000000000000000000000
%4A62947460000000000000000000000000000000000000000000000000000000000000000
%4A62B474800000000000000000000000000000000000000000000000000000000000000000
%4A62D474A00000000000000000000000000000000000000000000000000000000000000000
%4A62F474C00000000000000000000000000000000000000000000000000000000000000000
%4A631474E00000000000000000000000000000000000000000000000000000000000000000
%4A62447500000000000000000000000000000000000000000000000000000000000000000
%4A62647520000000000000000000000000000000000000000000000000000000000000000
%4A62847540000000000000000000000000000000000000000000000000000000000000000
%4A62A475600000000000000000000000000000000000000000000000000000000000000000
%4A62C475800000000000000000000000000000000000000000000000000000000000000000
%4A62E475A00000000000000000000000000000000000000000000000000000000000000000
%4A630475C00000000000000000000000000000000000000000000000000000000000000000
%4A632475E00000000000000000000000000000000000000000000000000000000000000000
%4A62547600000000000000000000000000000000000000000000000000000000000000000
%4A62747620000000000000000000000000000000000000000000000000000000000000000
%4A62947640000000000000000000000000000000000000000000000000000000000000000
%4A62B476600000000000000000000000000000000000000000000000000000000000000000
%4A62D476800000000000000000000000000000000000000000000000000000000000000000
%4A62F476A00000000000000000000000000000000000000000000000000000000000000000
%4A631476C00000000000000000000000000000000000000000000000000000000000000000
%4A633476E00000000000000000000000000000000000000000000000000000000000000000
%4A62647700000000000000000000000000000000000000000000000000000000000000000
%4A62847720000000000000000000000000000000000000000000000000000000000000000
%4A62A477400000000000000000000000000000000000000000000000000000000000000000
%4A62C477600000000000000000000000000000000000000000000000000000000000000000
%4A62E477800000000000000000000000000000000000000000000000000000000000000000
%4A630477A00000000000000000000000000000000000000000000000000000000000000000
%4A632477C00000000000000000000000000000000000000000000000000000000000000000
%4A634477E00000000000000000000000000000000000000000000000000000000000000000
%4A62747800000000000000000000000000000000000000000000000000000000000000000
%4A62947820000000000000000000000000000000000000000000000000000000000000000
%4A62B478400000000000000000000000000000000000000000000000000000000000000000
%4A62D478600000000000000000000000000000000000000000000000000000000000000000
%4A62F478800000000000000000000000000000000000000000000000000000000000000000
%4A631478A00000000000000000000000000000000000000000000000000000000000000000
%4A633478C00000000000000000000000000000000000000000000000000000000000000000
%4A635478E00000000000000000000000000000000000000000000000000000000000000000
%4A62847900000000000000000000000000000000000000000000000000000000000000000
%4A62A479200000000000000000000000000000000000000000000000000000000000000000
%4A62C479400000000000000000000000000000000000000000000000000000000000000000
%4A62E479600000000000000000000000000000000000000000000000000000000000000000
%4A63047980000000000000000000000000000000000000000000000000000000000000000
%4A632479A00000000000000000000000000000000000000000000000000000000000000000
%4A634479C00000000000000000000000000000000000000000000000000000000000000000
%4A636479E00000000000000000000000000000000000000000000000000000000000000000
%4A62947A000000000000000000000000000000000000000000000000000000000000000000
%4A62B47A200000000000000000000000000000000000000000000000000000000000000000
%4A62D47A400000000000000000000000000000000000000000000000000000000000000000
%4A62F47A600000000000000000000000000000000000000000000000000000000000000000
%4A63147A800000000000000000000000000000000000000000000000000000000000000000
%4A63347AA00000000000000000000000000000000000000000000000000000000000000000
%4A63547AC00000000000000000000000000000000000000000000000000000000000000000

%4A63747AE00000000000000000000000000000000000000000000000000000000000000000
%4A62A47B000000000000000000000000000000000000000000000000000000000000000000
%4A62C47B200000000000000000000000000000000000000000000000000000000000000000
%4A62E47B400000000000000000000000000000000000000000000000000000000000000000
%4A63047B600000000000000000000000000000000000000000000000000000000000000000
%4A63247B800000000000000000000000000000000000000000000000000000000000000000
%4A63447BA00000000000000000000000000000000000000000000000000000000000000000
%4A63647BC00000000000000000000000000000000000000000000000000000000000000000
%4A63847BE00000000000000000000000000000000000000000000000000000000000000000
%4A62B47C000000000000000000000000000000000000000000000000000000000000000000
%4A62D47C200000000000000000000000000000000000000000000000000000000000000000
%4A62F47C400000000000000000000000000000000000000000000000000000000000000000
%4A63147C600000000000000000000000000000000000000000000000000000000000000000
%4A63347C800000000000000000000000000000000000000000000000000000000000000000
%4A63547CA00000000000000000000000000000000000000000000000000000000000000000
%4A63747CC00000000000000000000000000000000000000000000000000000000000000000
%4A63947CE00000000000000000000000000000000000000000000000000000000000000000
%4A62C47D000000000000000000000000000000000000000000000000000000000000000000
%4A62E47D200000000000000000000000000000000000000000000000000000000000000000
%4A63047D400000000000000000000000000000000000000000000000000000000000000000
%4A63247D600000000000000000000000000000000000000000000000000000000000000000
%4A63447D800000000000000000000000000000000000000000000000000000000000000000
%4A63647DA00000000000000000000000000000000000000000000000000000000000000000
%4A63847DC00000000000000000000000000000000000000000000000000000000000000000
%4A63A47DE00000000000000000000000000000000000000000000000000000000000000000
%4A62D47E000000000000000000000000000000000000000000000000000000000000000000
%4A62F47E200000000000000000000000000000000000000000000000000000000000000000
%4A63147E400000000000000000000000000000000000000000000000000000000000000000
%4A63347E600000000000000000000000000000000000000000000000000000000000000000
%4A63547E800000000000000000000000000000000000000000000000000000000000000000
%4A63747EA00000000000000000000000000000000000000000000000000000000000000000
%4A63947EC00000000000000000000000000000000000000000000000000000000000000000
%4A63B47EE00000000000000000000000000000000000000000000000000000000000000000
%4A62E47F000000000000000000000000000000000000000000000000000000000000000000
%4A63047F200000000000000000000000000000000000000000000000000000000000000000
%4A63247F400000000000000000000000000000000000000000000000000000000000000000
%4A63447F600000000000000000000000000000000000000000000000000000000000000000
%4A63647F800000000000000000000000000000000000000000000000000000000000000000
%4A63847FA00000000000000000000000000000000000000000000000000000000000000000
%4A63A47FC00000000000000000000000000000000000000000000000000000000000000000
%4A63C47FE00000000000000000000000000000000000000000000000000000000000000000
%4A64848000302F000648E73F3E340045F90090200047F90090280049F9009030004BF90090
%4A60C4802038004DF9009040463F3C0001303900904022B07900904024660004343039009 0
%4A660480404006D0403F00363900904AA6024300E0E64BD67900904862538341F9000086DE
%4A6FA4806010390090485848 80D0303000323900904004 0C4100016708E341B04163023001
%4A65B480803F00D44266083439 00905F80D4423C3520003F061C17024600FC0C4600A0662C
%4A6F3480A0303900904006024000036600035030322000064000 09B0790000CBDE65063039
%4A6F1480C00000CBDC35802000600003320446002465000 32A0C46007862000322383 32000
%4A65F480E03004907900904AB20C407FFF6200030E3A34200030059079 00904AB40C4083FF
%4A62A48100620002FA48023F0080B40005672C7006C06F0006660002E406762000200041F9
%4A6F5481200000865E640002001 1F90000B69E10306003D1362000600000C2080400046700
%4A6024814000050 0C46003055080046003863 0000AC303C0006C06F0006660002A006762000
%4A60E481602000640C088400043784200060343C170C46002465100C46002C620A41F90000
%4A60248180D268600002 6641F90000D1E86000025C300200400002322F0006B340024 0001E
%4A638481A066504A790090486267480C57003C6300002 84A7900904850660002402F2F0002
%4A687481C0E44E5F462F06E24A2F024EB9000470CE4FEF000C60000224610005280 8C2001E
%4A613481E0383320008A34200008040004670C6000FF7EC C57003C620002023C3620000246
%4A63A482001C003E3C0080363C007C00646040002461C000C460C006420DA4761000D1C6B18
%4A6FA482209A47DC46044604003033100002400 00F0C40000C6C000104044610000C460C00
%4A62E4824064209A4761000DC06B18DA47DC460446040030331000024 0000F0C40000C6C00
%4A64F4826000DA04460800C2461C000C460C006420984761000E5E6B18D847DC4604460400
%4A6054828030331000021000F0C40000C6C0000AC0646100002461C000C460C006420D847
%4A62D482A061000 8F06B18F847DC460446040030331000024 0000F0C40000C6C00007E0646
%4A60D482C00400024610002 1BE3FF20008D7620000834000508B30005200108 02001F6700
%4A638482E0008632050641040002 41FB000A41F8003C004064 00600EA48D240EC49D241B441
%4A60A483006700008430321000662 2B47900904A806606 33C100904A8037842000 39352000
%4A6EA4832061000914340138F32000606 230331000024 0000F0C40000C6D2C30023601E248
%4A65648340E2492F002F01B5B0000472556 08F4A722000670000EA610006BA3C1741F90000
%4A629483608E5F600000 8020C10803001E667241F90000869E10306000670000806A1C0804
%4A6314838000046776604803784200009652 0003C1741F90000869E10306001C02F0007665A
%4A6CD483A00676200020006432103060020800000672408040004661608F3000420010636
%4A6FB483C00060200035B90000CBF02000602C08B300042001600AD1362000080400046 61A

%4A617483E041F90000851E2070600010362000024000FCE24835B000002000548F341F0242
%4A66A4840003FF6606343900905F80D442B479009044906606FC7A4A6F0004664A30352000
%4A681484200024003FF66063003900905F80D04033C000904A803F7CFFFF00046000FC52B479
%4A6424844000904A8066B4003620000024003FF66063039009 0493AD04033C000904A803F7C
%4A690484600000000860945CBF4CDF7CFC4E75D4426608343900905F80D4423C3520003F06
%4A63B484800246FC000C462400650001260C469FFF6200011E383320003004907900904AB2
%4A64D484A00C407FFF6200010A3A3420003005907900904A840C4063FF620000F630390090
%4A600484C0402632000241000341F900904AF8D24108300002100167025040 0C466000 6616
%4A667484E048A7C0002F024EB9000472343E00588F4C9F0003601641F9009048083E301000
%4A68648500DE4741F90000860C3E307000D24141F9009048EE48C7DFB010003206EC498240
%4A6364852041F90004098A10301000675A027503FF200032007E0AEF68817520000C410019
%4A64E485406D2C41F90000C534D2413030100035B020000C46540065580C465FFF62520884
%4A61E4856000043784200002761FFF2000604241F90000C6607000103010000244FFF08840
%4A63A48580378420006 02AB47900904A80661E303620000240 03FF660630390090493AD040
%4A643485A033C000904A803F7C00000002610006C2341F024203FF6606343900905F80D442
%4A658485C0B47900904A806600FEB24A576620303520000240 03FF6606303900905F80D040
%4A691485E033C000904A803EBCFFFF6000FEBE548F3239009040260241000341F9009049D0
%4A6EE48600003000011 0004CDF7CFC4E750000000A0014001E00280032003C004600500000
%4A69748620CBE80000CBE80000CBE80000CCE80000CCE80000CDE80000CDE80000
%4A69F48640CDE80000CEE80000CEE80000CEE80000CFE80000CFE80000D0E80000
%4A66348660CC680000CC680000CC680000CD680000CD680000CD680000CE680000CE680000
%4A65248680CE680000CF680000CF680000CF680000D0680000D0680000D0680000D1680E06
%4A6B4486A080000E0680000E06800000064040000640400006404000060040000600400006
%4A62F486C000400002200000022000000022000FF06FF00FF06FF00FF06FF0000640E0040B
%4A632486E00F12060D1114080F13160A1115180C13171A0E15191C10171B1E12191D200600
%4A69A48700030041F90090486443F900904AF8183320001A3420004E56FFF470FF3D40FFFE
%4A635487203D40FFF476063F023C303000674CDC4608310000300166427200123460009205
%4A6664874048813E016A024447700010336000900448803C006A0244463406D447B46EFFFE
%4A65F4876064183D42FFFE3D46FFFC3D47FFFA3D40FFF83D41FFF63D43FFF455836AAA341F
%4A69448780302E0008E248760141F900008A64323000003C2EFFFC3E2EFFFAB24663027600
%4A693487A0B247630276024A6EFFF86A0851434443024300074A6EFFF66A0A0443000C4443
%4A6E1487C0024300070C4000126500011 00C40001662000108 0C46001464100C470014640A
%4A617487E0588302430007600001B00C46002C640001A80C47002C640001A0610001EA6700
%4A654488000198383C0012610001A26600018C41F900904AE6322EFFF46B00017E3C301000
%4A63E4882008310006180167025041E64E0246001E41F90000BFF03C306000DC4641F90000
%4A65948840C0883E301000320741F90000C098C3F0600041F90000C0AACFF060003C01322E
%4A6B048860FFF85441D241D241DC41322EFFF6D241D241DE413004E2482F002F033002E248
%4A6644889802F004EB900046EEE4FEF0000C3203D24141F90000A5A0103010004880D040D040
%4A6594889A09C4041F900904AB6318640EE41F90000A5B0103010004880D040D0409E4041F9
%4A64E488C000904A8E318740EE4879000000504EB90004806458BF600000C00C40000C6500
%4A60A488E000B80C400010620000B0610000FA670000A8383C000A610000B26600009C3002
%4A65848900E2483200D64341F90000F998D070300041F90000F9AAD2703000E24B0240001F
%4A62148920024103E0D240D2414A7210006726303510000240FC000C40D40067180C40E800
%4A62D4894067120C40E00067000C40180067060C40B80066440803000067140C4600106538
%4A62A4896090C476A0244460046000064420601408030001670 80C460010651E60060C470010
%4A6B94898065 16E2402F042F003002E2482F004EB900046EEE4FEF000C4E5E0276E3FF2000
%4A66C489A0D643D643D73620004E7541F90090487A4A724000660 64A7040006728 54444A72
%4A628489C0400066064A704000671A54444A72400066064A704000670C54444A7240006604
%4A65C489E04A7040004E75982900904A820C040006631C0C04007964169A3900904A840C05
%4A64448A0000008630A0003007064047 0F4E7578004E7530333000904438006A0244403234
%4A61448A20000092453A016A02444176 00C400400064027 6000C41040064027 6084A446A06
%4A62148A40044300204440 31300C4A446A0A0443003044430243001C0276E3FF2000073E
%4A67548A6020004E75000100010001000000200020004000400040004000400020002
%4A63B48A80000200014 8E73F3E322F0032D24145F90090200047F90090280049F900903000
%4A65648AA048F9009038004DF90090404661 3A35AF0036100037AF003A100039AF003E1000
%4A64248AC0027503FF1000302F0042740AE56081751000027603FF1000302F0046E5608176
%4A66F48AE010004CDF7CFC4E753032100067080C408000660000A843F900905F8041F90090
%4A65648B0048923601EC4B5243D643D6430C4300806D04363C007E383130003004D0403A36
%4A67A48B200000024503FF3C01E24EB846622E4A44660E3A390090493A33C60090493A601C
%4A62948B400C440020620 6BC7000006F103A0438350000024403FF3004D04060CE3B841000
%4A64848B603D8510003E046710DF47303670000240FC0080463D807000DA45670E30355000
%4A65548B800240FC006046 3B80000303130006704B04466083386300055436AEE4E754800
%4A65248BA00F3E342F003220060D241D44245F90090200047F90090280049F900903000
%4A6D948BC048F9009038004DF90090404661684CDF7CFC4E7548E73F3E342F0032D44245F9
%4A66248BE00090200047F90090280049F9009030004BF9009038004DF90090404661724CDF
%4A68348C007CFC4E7548E73F3E342F0032D44245F90090200047F90090280049F900903000
%4A67E48C2048F9009038004DF90090404661 0000D24CDF7CFC4E756100FEB035B2200010 00
%4A6E948C4037B320001000 79B42000100030352000024 0FC00027503FF10008175100030 36
%4A62B48C6020000240FC00027603FF100081761000383520000244 03FF3C04DC463A362000
%4A65448C80024503FF671 27600DE473036700002 40FC00D0443B8070004A44670E30366000
%4A68A48CA00240FC00D0453D8060003002E24EBC790090493A660633C50090493A3606EA4B
%4A66148CC05243D643D6430C4300806D04363C007E43F900905F80303130006704B046660B

%4A61F48CE033843000554 36AEE70003580200037802000398020003B8020003D8020004E75
%4A64B48D003B7520000244 03FF3C041C4E3A362000024503FF67123E05DE47303570000240
%4A66E48D20FC00D0443B8070004A44670F303660000240FC00D0453D8060003C02E24EBC79
%4A67748D4000904903A660A3300900493A3606EA4B5243D643D6430C4300806D04363C007E
%4A65548D6043F900905F8030313000670 4B04666083384300055436AEE303CFC00C1752000
%4A69448D80C17620004E754BE71F063E2F00260647000D603E48E71F063E2F0026603448E7
%4A67848DA01F063E2F002606470011602648E71F063E2F00260647001560 1848E71F063E2F
%4A67048DC000260647001960 0A48E71F063E2F002652473C2F00224BF9009038004DF90090
%4A68C48DE0404643F900905F8041F90090 4B923606EA4B5243D643D6430C4300806D04363C
%4A65048E00007E3831300030 04D0403A360000024503FFB846622E4A44660E3A390090493A
%4A62F48E2033C70090493A601C0C4400206406BC7000006F103A043835000002440 3FF3004
%4A62648E40D04060CE4A44670E3236000002 41FC0082473D810000300567 10D04032350000
%4A65948E600241FC0082473B81000030313000670 4B04466083387300055436AEEDE473B84
%4A69148E8070003D85700031867000 4CDF60F84E754BE73E06342F00225 2423C02D4424BF9
%4A63E48EA0009038004DF9009040463835200002440 3FF3A362000024503FF67123205D241
%4A61A48EC0303510000240FC00D0443B801000320467 10D241303610000240FC00D0453D80
%4A66D48EE01000BC790090493A660633C50090493A41F900904B9236302000EA4B5243D643
%4A64548F00D6430C4300806D04363C007E43F900905F803031300067 04B04666083384300 0
%4A65F48F2055436AEE700031802000 3B8020003D8020004CDF607C4E750C420080640E0C45
%4A64948F40F0806300009A72004A414E75323CFFC0D2424A72100067206B00008C30331000
%4A61C48F6090446A024440B043640E300590741 0006A024440B04365D03001554002400 03E
%4A63248F80024107C0D2404A721000671E6B643033100090446A024440B043640E30059074
%4A62C48FA010006A024440B043659E300158400240003E024107C0D2404A72100067206B3C
%4A62F48FC0303310009044 6A024440B043641030059074 10006A024440B0436500FF6C08C2
%4A60448FE0001F72FF4E7530331000044002006000FF70303310000440020060963 0331000
%4A63E49000004400 20060BE0C4207C0650C4A456A00009A72004A414E75323C0040D2424A72
%4A6F649020100067206B00008C3033100090446A024440B043640E300590741 0006A024440
%4A60F49040B04365D03001554002400 03E024107C0D2404A721000671E6B643033100090 44
%4A611490606A024440B043640E300590741 0006A024440B043659E300158400240003E0241
%4A609490 8007C0D2404A72100067206B3C3033100090446A024440B043641030059074 1000
%4A649490A06A024440B0436500FF6C08C2001F72FF4E7530331000044002006000FF703033
%4A6CA490C010000440020060963033100004400 20060BE3202300155400240003E024107C0
%4A6FB490E0D2404A72100067226B00008430331000 90446A024440B043641030059074 1000
%4A62D491006A024440B04365000086 0641FFC00C42008065244A721000671E6B5E30331000
%4A62449120904 46A024440B043640E300590741 0006A024440B04365560C4207C064280641
%4A612491400 0804A721000671E6B3A3033100090446A024440B043640E300590741 0006A02
%4A61F4916044 40B043652808C2001F72FF4E7530331000044002006000FF7830331000 0440
%4A6E74918002006 09C3033100004400 20060C04A414E753202300154400240003E024107C0
%4A6FB491A0D2404A72100067226B00008430331000 90446A024440B043641030059074 1000
%4A639491C06A024440B04365000086 0641FFC00C42008065244A721000671E6B5E30331000
%4A630491E090446A024440B043640E300590741 0006A024440B04365560C4207C064280641
%4A60F492000 0804A721000671E6B3A3033100090446A024440B043640E300590741 0006A02
%4A61C4922044 40B043652808C2001F72FF4E7530331000044002006000FF7830331000 0440
%4A63249240020060 9C3033100004400 20060C04A414E7548E73F3E302F0032D0403C2F0036
%4A66C492603E2F0026 45F9009020004 7F90090280049F900903000537900904ADC61064CDF
%4A64A492807CFC4E753A0041F900904 86434305000D44236332000383420003F3C00F00807
%4A618492A0000466000 15C08390006009048566 61230 03D046907900904A6C0C4070006400
%4A614492C00140D6466100071264000 1320C7280001000660000B2964606 4300800243FF7F
%4A6F5492E00C790540009040 3A63000116300190420240 07C00C4000406642080700066700
%4A602493000100 0829000600904 8566614300406400080907900904A6E0C407400640000E2
%4A6F74932006440080610005 7664000 49A6100055266000492044400806000048A0C4007C0
%4A605493406600 00BE080700076700 00B6083900060090485666143004044000 8090790090
%4A601493604A6E0C407400640000980444008061000568640004506100050866000448 0644
%4A624493800080600004406100040C667096464A7900904ADC676A30331000024000 0F0440
%4A64B493A0000C6B5C41F900904 85AD0400830000500016 60C41F900904AF04A700000673C
%4A659493C048A73F000C7903C000904 03A651AB8741000640A080700066 70E7E60600C0807
%4A6C8493E0000767047EA060027EE03C3C0080537900904ADC6100FE8E4C9F00FC0257FFEF
%4A60F4940008070005660001 2C083900060090485666123003904 6907900904A6C0C407000
%4A61E49420640001109646610005786400 01020C7280001000660000 82D6460243FF7F0C79
%4A60D4944005400090403A630000EA300290810240 07C00C4007C0662C0807000667000 0D4
%4A6304946008390006009048566600FEB63004064000 80907900904A6E0C40740064 0000B4
%4A641494806000FE9E0C40004066000 0AB0807000767000 0A008390006009048566600FECC
%4A637494A0300404400080907900904A6E0C407400640000806000FEB4610003AA6670D646
%4A64E494C04A7900904ADC676A30331000024000 0F044000 0C6B5C41F900904 85AD0400830
%4A64E494E00004000 1660C41F900904AF04A700000673C48A73F000C7903C000904 03A651A
%4A64A49500B8741000640A080700066 70E7E50600C0807000767047E9060027ED03C3C0080
%4A68149520537900904ADC6100FD5C4C9F00FC0257FFDF08070006660001580839000600 90
%4A63B495404856661230049046907900904A6E0C4074006400 013C9846610003 7E6400012E
%4A63049560 0C7280001000660000AED8460244FF7F0C790540009040 38630001163001908 2
%4A6F5495800240003E0C40003E66420807000567000 100083900060090485666143003064 0
%4A6FE495A00080907900904A6C0C407000640000E2064300806100042264000 20A610002A6
%4A6F7495C066000202044300806000 01FA0C40000266000 3E080700046700 00B608390006
%4A609495E000904856661430030440008090790090 4A6C0C4070006400009804430080610 0

%4A61349600003A0640001C0610002 5C6600001B80643008060000 1B0610002 6B6570D8464A79
%4A62F4962000904ADC676A30331000 0240000F0440000C6B5C41F90090485AD0400B300007
%4A65B49640000166 0C41F900904AF04A700000673C48A73F000C7903C000904038651AB673
%4A64A496601000640A08070005670E7EA0600C0807000467047E9060027EB03C3C00805379
%4A6934968000904ADC6100FBFE4C9F00FC0257FFBF080700076600012E0839000600904856
%4A628496A066123004D046907900904A6E0C40740064000112D84661000 1E4640001040C72
%4A623496C0800010006600008498460644008 00244FF7F0C79054000904038630000E83001
%4A63A496E09082024000 3E0C40003E662C0807000567000 0D2083900060090485666 00FEB2
%4A624497003003064000809079009 04A6C0C4070006500FE9E600000AE0C400002660000A6
%4A6304972008070004670000 9E083900060090485666 00FEC830030440008 0907900904A6C
%4A649497400C4070006500FEB4607A610001346670984 64A7900904ADC676A30331000 0240
%4A6474 97600 00F0440000C6B5C41F900904 85AD04008300006000166 0C41F900904AF04A70
%4A64E497800000673C48A73F000C7903C000904038651AB673100 0640A08070005670E7E60
%4A68D497A0600C0807000467047E5060027E703C3C00805379 00904ADC6100FACA4C9F00FC
%4A65A497C00257FF7F320406410400024 1F8000A41F80030030640060 0EA48D240EC49D241
%4A635497E0B441670000744A721000663A378320003984200030 05E2482F0041F900904864
%4A654498003001E24831805000 2F004BF9009038004DF9009040466100F41E4EB90004C690
%4A69E49820508F301F4E753005E2482F00E2492F014EB900049C364A40660ADEFC000A303C
%4A69C4984000F04E750C40FFFE660C4EB90004C690508F301F4E75508F3783200039842000
%4A67E49860301F4E753F013005E2482F002001E2482F004EB900049572508F321F4A804E75
%4A676498803F013005E2482F002001E2482F004EB900049572508F321F4AB04E750C42007E
%4A617498A0620A7200303CF080B0444E753202044100406 16065F43001554002 40003E0241
%4A65A498C007C0D240614E65E2300158400240003E024107C0D240603C0C4207BE630C4A44
%4A614498E06A06323C0000B2424E7532020641004061226 5F43001554002 40003E024107C0
%4A60F49900D2406110 65E2300158400240003E024107C0D2404A721000673B6B3B30331000
%4A60F4992090432300009040306A02444000C4007C0642033C0009040383034100009044330
%4A61249940009040 3E6A02444033C00090403A0C4007C04E7530331000064002 8002 40F80
%4A61149960044002009043 3C000904030 6A0244400C4007C064DC33C00090403B3034100
%4A626499800640010002 40F8009044 33C000904 03E6A02444033C00090403A0C4007C04E75
%4A616499A0320230015540024 0003E024107C0D2406100FF6265207040 0C4200806500924
%4A634499C06100FF5265103030008 00C4207C06406D2406000FF404E75320230015440024
%4A64D499E0003E024107C0D2406100FF2A652070400C4200B0650C92406100FF1A651030
%4A67E49A0000800C4207C06406D2406000FF084E75FF5265736574204869676820536 36F72
%4A68D49A206520546162 6C65733F004E6F0059657300EE536F756E647320696E2041747472
%4A69049A40616374204D6F64653F004E6F0059657300CC5265737 46F72652046616374 6F72
%4A68F49A60792044656661756C742053657474696E67733F004E6F00596573007547616 065
%4A64049AB02044696666696 37566 7479003020 2B204561736 965737400310032202D2045
%4A63549AA07379003 30034202D2048656 4657261746500350036202020486172640037202
%4A63B49AC02048617264657374003 30416C74682050657220436F696E000 13030003132
%4A6BA49AE0350031353000313735003230300032323500323530003330300033353000343 0
%4A6B849B003000343530003530300035353000363030003635300037303000373530003830
%4A6A749B20300038353000393030003935300031303030003131303000313230300031 3330
%4A6A849B4030003134303000313530300031363030003137303000313830300031393030 00
%4A62D49B6032303030000 98436F696E7300746F2053746172740031003200330034000 0417
%4A68849B80746F6D617469632052657365742 06F662048696768205363 6F726520546162 6C
%4A68F49BA065733F004E6F0059657300BB4469736162 6C652053706563686 3F004E6F00 59
%4A64549BC0657300AA52656475636 52054657 8743F004E6F00596573000000007B000000 37
%4A6A749BE00000003800000039000000 3A000400020006000200060002000600 00 4C45564 0
%4A69A49C004C2000000 0FE00FC00FD00F900FB00F300F700E700EF00CF00DF009F00BF003F
%4A6CD49C20007F007E121314141313141405051812050518120101171701011010020203 24
%4A64E49C40020222113737353537373535383827393838273934343A3A34343B3B20203C3D
%4A60C49C6020203E3606060404060604041616092316160923151508081515252507070 72A
%4A6B549C8007072B2E1F1F1E1E1F1F1E1E0C0C3F0F0C0C3F0F28281D1D282840404141 2C30
%4A6C449CA041413319131314141313141405051812050518120101171701011010020203 24
%4A65649CC0020222113737353537373535383827393838273934343A3A34343B3B20203C3D
%4A62949CE020203E3606060404060604041616092316160923 0A0A42420A0A0D0D43432D32
%4A69849D00434331 1A1F1F1E1E1F1F1E1E0C0C3F0F0C0C3F0F21214444212126260B0B2F1B
%4A61A49D200B0B1C0E051400009D2C0000434C454152494E47205354415 45300000B100000
%4A62F49D409D4802000 0009D24544F2041424F52540000 040C00009D5E020000009D3C5741
%4A63849D605252494F52204255 54544F4E530009080000 9D7A020000009D525052455353 20
%4A63E49D80424F544800005452 4541535552452 0524F4F4D00594F552048415645202020 20
%4A66149DA05345434F4E445300544F20434F4C4C454354205452454153555245530000594F
%4A65849DC055204D555354204558495420544F000052454345495645 20424F4E555320504F
%4A66349DE0494E545300000 090543C009056BC0090593C00905BBC030002010A0BA8A2B4A3
%4A6DA49E00AC9CB17BA57AA03B84008 8Q08C00900004B005A005DC061BBABBBCBDBEBFC0C1
%4A60F49E20C2C30000C4C5C6C7CBC9CACBCCCD0000CECFD0D1D2D3D4D5D6D70000A8A9AA20
%4A69849E4020A4A5A6A700ABACADAE0000AFB0B1B2B300B4B5B6B70000B8B9000020505245
%4A6E849E60535320535441525420002020414444202020434F494E2000202041444420 2020
%4A65749E80434F494E530020494E534552542 0434F494E2000202047414D45204F56455220
%4A66149EA020004F4E204C4556454C3A0021 1B00009EB40000434F494E204D494E2E002201
%4A64049EC000009EC60000 54494D453A0021190000 9ED400003120434F494E203D00001E19
%4A62749EE000009EE60000 4652454520504C4159203D001E1A00009EFA0000202020202048

%4A63149F0045414C5448001E1D00009F0E0000415441524920474144455300211C00009F26
%4A6FB49F20020000009F06403139383500 1F0200009E3000001F0100009E24020000009F2C
%4A60949F401F0000009E18020000009F3421060000 9E3C000023050000 9E46020000009F4C
%4A6FE49F60210B00009E3C0000230A00009E4C020000009F6021100000 9E3C0000230F0000
%4A62449F809E52020000009F74211500009E3C0000241400009E58020000009F8800009F54
%4A63249FA000009F6800009F7C00009F90040900009FB400004C4556454C3A000020202020
%4A6B149FC0202020202020202020202020202020200020202050524553532053544152542020
%4A64349FE0202020002057495448494E2032302053454F4E44532000020544F20434F4E54
%4A6094A000494E5545204741 4D4520200020202041542054484953204C4556454C20202000
%4A60B4A0209D289D249D1C9D349D209D289D2C9D1C9D189D389D289D249D309D189D209D28
%4A6814A0409D5A9D609D3C9D689D6E9D429D4C9D529D480200020002000280028002800200
%4A6284A0600200000000110019001100110019001100110019000 99D989D9E9D7C9DA49DAC
%4A6DC4A0809D8C9D829D869D940000010000000000000100000000000100000000 0A000A000A
%4A63B4A0A0000B000B000B0009000A0009001F003F003F007F007F00FF00FF0924 0924092D
%4A6CE4A0C0092D0936092609 3F093F09480948095109510 95A095A0EFC0EFC0FFC10FC1C5C
%4A6F84A0E01C5C1C601C640000010001800100 0000FF00FE80FF000000018002000 1800000
%4A6044A100FE80FE00FE8000000200028002000000FE00FD80FE0000000200028002000000
%4A6034A120FE00FD80FE000000010001800100 0000FF00FE80FF000000018002000 1800000
%4A6194A140FE80FE00FE8000000200028002000000FE00FD80FE0000000280038002800000
%4A66B4A160FD80FC80FD800000028003800280 0000FD80FC80FD80018001000000FF00FE80
%4A6124A180FF000000010002000180 0000FE80FE00FE800000018002800200 0000FE00FD80
%4A6054A1A0FE0000000200028002000000FE00FD80FE00000002000180010000 00FF00FE80
%4A6164A1C0FF00000001000200018 00000FE80FE00FE800000018002800200 0000FE00FD80
%4A6364A1E0FE0000000200038002800000FD80FC80FD8000000280038002800000FD80FC80
%4A6794A200FD800000028000 0F0001000100000001000100010001002000200020002 00064
%4A6524A220007D009600AF00C800E100FA012C015E019001C201F40226025802 8A02BC02EE
%4A6554A2400320035203840 3B603E8044C04B005140578 05DC064006A40708076C07D01DCF
%4A6924A2601DD81DE11DEA1DF31E001E001DF31DEA1DE11DD81DCF0000004700000046 0000
%4A6B34A280004500000044000000DA00000098000000D1000000D8000000D5000000DC0000
%4A6B94A2A0A2860000A28E0000A2920000A296000200010001000200000001A0000001B0000
%4A6824A2C0001C0000001D0000001E0000001F00000020000000210000000900000 00A0000
%4A6744A2E0000B0000000C0000002F000000310000003300000035000000300000003 20000
%4A69A4A300003400000036000000 5D0000005E0000005F0000005D0000006000000 06E0000
%4A68E4A3200061000000620000006300000066000000670000006B0000006D0000006C0000
%4A6854A34000610000006800000069000000640000006100000068000000690000006 40000
%4A67D4A360006100000062000000 6A0000006400000061000000620000006A000000640000
%4A6624A380A33E0000A34E0000A35E0000A36EFFFF00010000000000001000 1FFFFFFFF0000
%4A66A4A3A00000FFE00020FFE000200020FFE003E80FA007D0177003E81F4003E807D00002
%4A6CD4A3C0000500030007000200090002000300001C8800001DB400001DB700001DBA0000
%4A61C4A3E01DBD00001DC000001DC300001DC600001DC900001DCC00080007000A00090010
%4A6974A400000E001400120018001 5001E001B0004000400050004000600050007000 60008
%4A68A4A4200007000A00090004000400040004000300030003000300070006000900 08000E
%4A6844A4400000C00120010001500120 01B0018000400030004000400050005000600060007
%4A66A4A4600006000900080003000300030003000200020002000200000027000000280000
%4A6A44A4800029000000 2A000000940000009500000096000000970000000C6000000C70000
%4A6E04A4A000C8000000C9000000CA000000CB000000CC000000CE000000CF000000D00000
%4A6AA4A4C0007E0000007F00000081000000830000008400000085000000860000 00AB0000
%4A6CC4A4E000A9000000AA00000089000008A000008B0000008C0000008D0000008A0000
%4A6CD4A50000BF0000009000000091000000 04000600080000A0000A4860000A4960000A4BE
%4A6E34A5200000A4E6040A0A090000002B0000002C0000002D0000002E0000000010000FFFF
%4A66C4A54000010001FFFFFFFF000000010000FFFFFFE0000000200000FFE000200020FFE0
%4A6834A560FFE000000020000000000000020004000600010003000500070000000200040006
%4A6C34A58000200050006000200020000000FE00FF00050004000000000FE00FF0000000400
%4A6484A5A005000300020000000000000000200030001000000000000000000030002000200
%4A6BC4A5C0001100120013001400150016001700180019001A001B001C001D001E001F0020
%4A6AA4A5E0002100120022001400230016002400180025001A0026001C0027001E00280020
%4A6BB4A600000110012002900140015001600 2A00180019001A002B001C001D001E002C0020
%4A6D04A620002D001200290014002E0016002A0018002F001A002B001C0030001E002C0020
%4A6AC4A640001100120031003200150016003300340019001A00350036001D001E00370038
%4A6C04A660002100120039003200230016003A00340025001A003B00360027001E003C0038
%4A6DD4A680001100120029003D0015001600 2A003E0019001A002B003F001D001E002C0040
%4A6F24A6A0002D0012002900 3B002E0016002A003E002F001A002B003F0030001E002C0040
%4A6654A6C001C101C201C301C401C501C501C601C601C701C801C601C601C901CA01C901CA
%4A68B4A6E001C501CB01C601CC01CD01CE01C901CA01C501C501CF01D001C901C801C901D0
%4A63B4A70001C701CA01CF01CA01D101C501C9000801C501C5000800080 1C501D2000801CA
%4A6074A72001C9000801C90008000800080008000800080 1CA000801CA01C9000801D301C6
%4A63B4A7400008000801C601C6000801CA01C601D401D101D201D301D401D501D601D701D8
%4A66E4A76001D101C501C901D001C501D01D901CA01C901C801D301C601DA01CA01C601DB
%4A65E84A7800008000800080 1D000080008 01CF000800080 1C8000800080 1DA000800080008
%4A69C4A7A001C901C801DC01D001C901CA01DC01CA01CD01CE01DC01CA01C501C501DD01C6
%4A65B4A7C001D101C501DC000801DA000801C601C6000801CA01DE01CA000801DF01C601C6
%4A6564A7E001C9000801C901D001C7000801E0000801C701CA01DD01DB01D101C501DC01D0

%4A6494A8000100701C801CF01D000801C501CF01D001C7000801CF01D001C701C8000801D0
%4A61F4A82001C701C801CF00080008000801CF01D001C701C8000800080008001C8000801D0
%4A61F4A84001C7000801CF000800080101CF000801C7000800801D001C101C201E101C4
%4A65D4A86001E201E301E401D8000800801DD01C601D101D201E501D401C501CB01DD01CC
%4A66C4A880000801CA01DD01D401C401C001E501C601C9000801E501C601C701C801DD01C6
%4A6654A8A000801DF01DD01C601DA000801DD01C601C701CA000801CA01C9000801DC01D0
%4A64E4A8C001C501C5000801D001C001201C9000801C501C501CF000801C901C801DC0008
%4A6B84A8E001E601E701E801E901EA01EA01EB01EC01ED01EE01EB01EC01EF01F001F101F2
%4A6A94A90001EA01F301F401F501F601F701F101F801EA01EA01F901FA01FB01EE01FC01FA
%4A60E4A92001ED01FD01FE01FF0200020101F10202020102010202020201EA0203020401FF
%4A6F54A94001EF020501F1020202050205020202020202201FD020401FF01FB02020206020 7
%4A6EC4A960020202020202080207020201FD0208020902 0A020B0206020902 0C020D020E020F
%4A6494A98002 0A01EA01FC01FA01DA0201001F901FF01FB0211020602070212 01FD0209020 9
%4A6984A9A0020502050205020202130205020502140202020502150202020202160217020202
%4A6584A9C001FB01EE021B021901EF021A021B021C021D021E021F01F801EA01EA022002 07
%4A6E54A9E002000201021F02020212020202080207020201FD01F901FF020202210208020 7
%4A61B4AA0001FB020201FC021901EF0205021F0202021201FD02200209020A01EA0218021 9
%4A6064AA20022201EE01F902190202 01EE01F902190222020201F902190223021502020224
%4A6BD4AA40022302150214020202250225 01F902190226022702020202020502280202 0224
%4A6DF4AA600226020502140202022902 2702140202022602050202022401E601E7022A01E9
%4A6104AAB0022B020D022C020F0202022 0220020702 0A022D022E022F01EA01F3023001F5
%4A6314AAA002020202310220022F01FB01EE0232020701FB0202022E020701ED01EE022001EC
%4A6F84AAC00202022210220020702120202022002 0701ED01FD020401FF01FB0202021802 19
%4A6DF4AAE00233023302020222401EF021501F1020202010201021402 0201EF0234021F0202
%4A6024AB00023502360237023802390 23A023B023C023D023E023F023F0240024102420241
%4A60A4AB2002430244024502460247024B0249024A0243024B024C024D024E024F02500251
%4A6224AB400252025302 4C0254025502560257025802590256025A0258025B025C025D025E
%4A6164AB6002570258025702580 25A025F025A025B02600261025A02610262025F02630264
%4A64D4AB80025A025802650266026702680 23F0269026A026B026C026D026E026F01D70270
%4A6134ABA0026A02710250025102430272027302740275024F026C027602770278024502 79
%4A66B4ABC00267026702 7A027B025A025F027C027D0260027E025A025F027F025F025A025F
%4A6214ABE00280024F02810251025702820283028202840265028602870 23A023A02880289
%4A6454AC0002BA025602B3028B028C026 7028D028D025A0282028E028F02900291029202 76
%4A6414AC2002930294029502 4D0257025802960 25F029702980299029A029B0271029C0251
%4A64C4AC40029D024F024C025102 67029E029F02A002A10267029F02A002A1029E02A202A3
%4A6684AC6002A1029E029F02A40267026 7029F02A502A602A702A802A90290024F02AA02AB
%4A6614AC8002AC0267027C02A402670 29E029F02A402AD025802AE02AF0235023602B002B1
%4A65A4ACA002B202B301E40270026702 6702B8028902B402B502B602B702B802B902BA02BB
%4A66A4ACC0026702BC02BD02BE02BF024F02B602C002C1025802C202C3025202C402C502C6
%4A6634ACE0026702C702C80276027F025F02C902CA02AD0253025A0282024202 58029C024D
%4A6504AD00023A027102CB02CC02C1027E02CD025802430256024C02CE024202CF0283025B
%4A67E4AD2002D002D102D202D302D402D402D502D602D702D802D502D602D902DA02DB02DC
%4A69A4AD4002DD02DE02DF02E002E102E202DB02DC02D402D402E302E402D902E502DB02E4
%4A6B94AD6002E602DA02E302DC02E702E802DB02E902D402D402EA02E902EB02EC02EA02DC
%4A6DE4AD8002D902ED02DB02E902EE02ED02EA02E902EE02DA02EA02DC02D902ED02EF02F0
%4A6BB4ADA002EE02ED02D502D602EE02DA02F102F202F302EC02EF02F402F502F602F702F8
%4A6B84ADC002E702E802DB02E402EB02EC02E302DC02D902F902EF02F002FA02DA02F102F2
%4A6E04ADE002EE02ED02EA02E402EE02ED02E302E902EE02D802EA02E902FA02ED02EA02E9
%4A6A74AE0002D902E502FB02E402D902DA02FB02DC02E102E202FB02DC02D402D402FC02D6
%4A6B54AE2002E702E802FB02E902D702ED02D502D602EE02DA02E302DC02EE02D802D502D6
%4A6BF4AE4002D902ED02DB02E402D902ED02FB02E902D702DA02FC02F202E702E802FB02E4
%4A69B4AE6002D702D802E302E402EE02D802E302E402D702ED02E302E402D702D802EA02E4
%4A6B64AE8002D702D802E302E902EE02ED02E302E402D702D802EA02E902EE02D802EA02E4
%4A6AA4AEA002D702ED02E302E902EE02D802E302E902D702ED02EA02E402D002D102FD02D3
%4A6D94AEC002F502F602FE02F802EE02ED02FC02D602F302EC02FF02F402DD02DE02FC02E0
%4A6934AEE002EE02DA02FC02F202D902F9030002F002D902ED030002F002D702D802FC02D6
%4A6B44AF0002EE02D802FC02D602D702ED02FC02D6030102DA02EA02DC02D902ED02FB02E4
%4A6524AF2002D402D402EA02E402D902E502DB030202D4030302E3030202D902E502FB0302
%4A6EF4AF400304030503060307030803090 30A030B030C030D030A030B030E030F03100311
%4A6D44AF60030803120 30A031303140315031003110316031703180319030E031A03100319
%4A6E44AF80031B030F0318031103 1C0317031003 1D031E031F032003210322032303200311
%4A6ED4AFA0030E032403100325032603270320032503 28030F032003110329032A032B030B
%4A6124AFC0032C032A030A0303032D032E030A032F031C032303300 32F03310332033303 34
%4A6064AFE0031C0317031003190322032303180311032903 0D032B030B0335032E030A032F
%4A6CB4B00003260336032003370326032703180325032603380320032503390327032003 25
%4A6F54B020030E031A033A0319030E030F033A0311031403 15033A031103080309033B030B
%4A6084B040031C0317033A031D030C032A030A030B0328030F03180311032C030D030A030B
%4A60D4B060030E0336031003370 30E0324033A0325033C032E033B032F031C0317033A0319
%4A6054B0800339033D0318033703260 33D03180337033903360318033703390 33D03200337
%4A6EC4B0A0033903330318032503260336031803370339033803200325032603 3D03200337
%4A6E94B0C00339032703180325032603380318032503390336032003370304030503 3E0307
%4A6E74B0E003310332033F0334032C032A033B030B03400323034103420308031203 3B0313

%4A60C4B100032D032E033B032F03430344034503460343032A03450346030C030D033B030B
%4A6084B120032C030D033B030B0304034033B030B031B030F03200311030E0336033A0337
%4A6E84B1400316031703200319030E0340310032503160317031803 1D030E0348033A0325
%4A61A4B1600349034A034B034C034D034E034F03500351035203 4F0350035303540355035 6
%4A6294B18003570358035903 5A035B035C0355035D0357035E035F0360035303610355036 2
%4A62B4B1A003630354035F0356036403650355036603670368036903 6A036B0354036903 56
%4A62C4B1C003530 36C0355036A036D036E036F0370037103540369035603720373037403 75
%4A6564B1E003760377037803 79037A037B034F037C037D037E037F0380038103820383038 4
%4A63A4B20003640385035503620386038703 5F0388037203890374037503 8A037B034F037C
%4A6894B220036D036E036F0362036D036E035F038B036D038C036F038B038D036E036F038B
%4A6404B24003530361038E036203530354038E0356035B035C038E035D034D034E038F0350
%4A6364B26003900391038E0366039203770378037903 6D0354035F035603760352037B0379
%4A6444B2800353039303550362035303 6C038E036A038A037B038F037C0364036503 8E0362
%4A6104B2A003510352035F0360039403520 35F0360035103 6E035F036003510352036F0360
%4A61A4B2C003510352035F03700395037103 5F0360035103520 36F0370039403520 36F0396
%4A6414B2E00351036E035F0370039503520 35F0370035103 6E036F03600397038903980399
%4A6574B300038103820398038403760377038F0379037D037E039A039B0357035803 8F035A
%4A6534B320037A037B038F037C0372035203 9A0375037203 6E039A0375039C0352038F0379
%4A64C4B34003950352038F0379039D0377038F0379039D035403690356035303 9303 8E0362
%4A62D4B360034D034E036F036003530352035503 6A034D034E035F03700353035203 8E0370
%4A6514B380039E039F00000000039E039F03A003A1039E039F03A203A303A403A503A603A7
%4A68F4B3A003A803A903A903A903A903A903A903A903A903A903A903A903A903A903A903A9
%4A6984B3C003A903A903A903A903A903A903A903A903A903A903A903A903A903AA03AB03AC
%4A6054B3E003AD03AE03AF03B003B103A903A903A903B203B3000000000000000000000000
%4A6604B4000000003B403B503B600000000000000000000000000000000000000000000000
%4A6ED4B420000000000000000000000000003B703B803B903BA03BB03BC03BD03BE00000000
%4A6C24B440000003BF03B30000000000000000000000003C003C103C203C303C400000000003C5
%4A63C4B46003C603C703C803C9000000003CA000003CB03CC03CD03CE03CF00000000003D0
%4A6E44B48003D103D203D303D4000000000000003D503D603D703D803B3000000000000000
%4A6814B4A003D903DA03DB03DC03DD03DE03DF000003E003E103E203E303E403E5000003E6
%4A6934B4C003E703E803E903EA03EB03EC000003ED03EE03EF03F003F103F203F3000003F4
%4A67E4B4E003F503F603F703F803B300000000000003F903FA03FB03FC03FD03FE03FF0400
%4A6E14B500040104020403040404050406040704080409040A040B040C040D040E040F0410
%4A6D74B5200411041204130414041504160417041804190 41A041B041C041D03B300000000
%4A6EF4B5400000041E041F04200421042204230424042504260427042804290 42A042B042C
%4A6134B560042D042E042F0430043104320433043404350436043704380439043A043B043C
%4A6254B580043D043E043F0440044104420443044404450446044704480449044A044B044C
%4A6374B5A0044D044E044F0450045104520453045404550456045704580459045A045B045C
%4A6494B5C0045D045E045F0460046104620463046404650466046704680469046A046B046C
%4A65B4B5E0046D046E046F0470047104720473047404750476047704780479047A047B047C
%4A6194B600000000000000000047D047E047F0480048104820483048404850486048704880489
%4A6704B620048A048B048C048D048D048E048F0490049104920493049404950496049704 9B
%4A6094B640049904 9A049B049C049D049E049F000000000000000000000000004A004A104A2
%4A6754B66000000000004A304A404A504A604A704A804A904AA04AB04AC04AD04AD04AE04AF
%4A6994B6800C4B004B104B204B304B404B504B604B704B804B904BA04BB04BC04BD04BE04BF
%4A6004B6A004C0000000000000000000000000004C104C204C304C404C504C604C704C804C9
%4A6AF4B6C004CA04CB04CC04CD04CE04CF04D004D104D104D204D304D404D504D604D704D8
%4A6C84B6E004D904DA04DB04DC04DD04DE04DF04E004E104E204E304E404E504E604E704E8
%4A6CB4B70004E904EA04EB04EC04ED04EE04EF04F004F104F204F304F404F504F604F704F8
%4A66A4B72004D504D504F904FA04FB04FC04FD000B000B04FE04FF050005010502050305 04
%4A6FB4B74000505050605070508050905 0A050B050C050D050E050F051005110512051305 14
%4A6204B7600515051605170518051905 1A051B051C051C051D051E051F046C052005210522
%4A61D4B78005230524052505260527052805290 52A052B052C052D052E052F053005310532
%4A62F4B7A005330534053505360537053805390 53A053B053C053D053E053F054005410542
%4A6424B7C0054305440545054604900547054805490 54A054B054C054D054E054F05500551
%4A6524B7E0055205530554055505560557055805590 55A055B055C055D055E055F05600561
%4A6534B8000562056305640565000B0566056705680569056A056B056C056D056E056F0570
%4A6664B8200571057205730574057505760577057805790 57A057B057C057D057E057F0580
%4A6784B8400581058205830584058505860587058805890 58A058B058C058D058E058F0590
%4A6684B860059105920593059405950596049005970598059905 9A059B059C059D059E059F
%4A67B4B88005A005A105A205A305A405A505A605A705A805A905AA05AB05AC05AD05AE05AF
%4A6994BBA005B005B105B205B205B4005B505B505B605B705B805B905BA05BB05BC05BD05BE
%4A6AA4B8C005BF000B05C005C105C205C305C405C505C605C705C805C905CA05CB05CC05CD
%4A6BB4B8E005CE05CF05D005D105D205D305D405D505D605D705D805D905DA05DB000B05DC
%4A6BD4B90005DD05DE05DF05E005E105E205E305E405E505E6000B05E705E805E905EA05ED
%4A6CE4B92005EC000B05ED05EE05EF05F005F105F205F305F405F505F605F705F805F905FA
%4A6474B9400 5FB05FC05FD05FE05FF0600060100 0B0602060306040605060606070608060 9
%4A6144B960060A060B060C060D060E060F061006110612061306140615061606170618061 9
%4A6264B980061A061B061C061D061E061F062006210622062306240625062606270628062 9
%4A6314B9A0000B062A062B062C062D062E062F0630063106320633063406350636063706 38
%4A64D4B9C0063B063906 3A063B063C063D063D063E063F06400641064206430644064506 46
%4A69E4B9E00647064806490 64A064B064C064D064E064E064E064E064E064E064E064E064E

%4A6544BA00064F0650065106520653065406550656065706580659065A065B065C065D065E
%4A6664BA20065F0660066106620663066406650666066706680669066A066B066C066D066E
%4A66E4BA40066F0670067106720673067406750676067706780679067A067B067C067D0656
%4A67A4BA60067E067F06800681068206830684068506860687068806600689068A068B068C
%4A69A4BA80068D068E068F0690069106920693069406950696069706980699069A069B069C
%4A6AC4BAA0069D069E069F06A006A106A206A306A406A506A606A706A806A906AA06AB06AC
%4A6BE4BAC006AD06AE06AF06B006B106B206B306B406B506B606B706B806B906BA06BB06BC
%4A6D04BAE006BD06BE06BF06C006C106C206C306C406C506C606C706C806C906CA06CB06CC
%4A6D34BB0006CD06CE06CF06D006D106D206D306D406D506D606D706D806D906DA06DB06DC
%4A6E24BB2006DD06DE06DF06E006E106E206E306E406E506E606E706E806E906E906EA06EB
%4A6F04BB4006E906EC06ED06EE06EF06F006CA06F106F206F306F406F506F606F706F806F9
%4A6704BB6006FA06FB06FC06FD06FE06FF0700070107020703070407050706070707080709
%4A6464BB80070A070B070C070D070E070F06E90710071107120713071406EE071507160717
%4A6384BBA007180719071A071B071C071D071E071F07200721072207230724072507260727
%4A6554BBC007280729072A072B072C072D072E072F0730073107320733073406E807350736
%4A6794BBE0073707380739073A06E906EE073B073C073D073E073F07400741074207430744
%4A65C4BC0007450746074707480749074A074B074C074D074E074F07500751075207530754
%4A6BA4BC2007550756075707580759075A06E806E9075B075C075D06E906E906E906EE075E
%4A6764BC40075F073D0760076107620763076407650766076707680769076A076B076C076D
%4A68B4BC60076E076F0770077107720773077407750776077707780779077A077B077C077D
%4A6A24BC80077E077F0780078106E906E906E906EE07820783073D07840761078507860787
%4A6A94BCA00788078907 8A078B078C078D078E078F07900791079207930794079507960797
%4A6C04BCC007980799079A079B079C079D079E079F07A007A107A207A307A407A507A606E9
%4A6D64BCE006EE07A707A8073D07A907AA07AB07AC07AD07AE07AF07B007B107B207B307B4
%4A6CD4BD0007B507B607B707B807B907BA07BB07BC07BD07BE07BF07C007C107C207C307C4
%4A6CB4BD2007C507C607C707C707C707C707C807C907C707CA07CB07CC07CD07CE00001F40
%4A6E04BD4048414C0000001DB0454420000001C204420500000001A9044554D0000001900
%4A6CA4BD6045442000000017704246200000015E0504D43000000145044204800000012C0
%4A6E54BD8044465400000011304744530000001F4045444C0000001DB04541520000001C20
%4A60A4BDA04B454E0000001A904D5620000000190043414C00000017704D444E00000015E0
%4A6F14BDC0414D4100000014505A4F4E00000012C05043540000001130524 55A0000001F40
%4A6F24BDE04220460000001DB044414E0000001C20424146 0000001A9057495A0000001900
%4A6F5ABE0045444C00000017704 24F420000015E057494C0000001450 4D4541000000 12C0
%4A6C84BE205357430000001130434144 0000001F4045442000000 1DB042462000000 1C20
%4A6FE4BE404C5652000000 1A90454C46000000 1900524A460000000 17704745 4C000000 15E0
%4A6F44BE6053474D0000001450534D4F00000012C0414A4D0000001130434A2000060E0000
%4A6354BE80BE8400053434F5245205045 5220434F494E00000501 0000BE9C000057415252
%4A6384BEA0494F5253000001C010000BEAE0000 56414C4B595249455300061 10000BEC00000
%4A6534BEC05749 5A415244530 01D110000BED00000454C56455300 2020456E74657220796F
%4A63B4BEE07572000020202069 6E6974 69616C733A20001D28041D41214224040F41220423
%4A62A4BF00410F0E4124034123410E0C44224103460D0C4605450D44620622410943 21410C
%4A6354BF2041E46403230A234106464 1E4640241230B2241032346E56203C123C209A44323
%4A66F4BF404641E1426121622 1E1C609A624464427C40AA525464328E1C30E8522454329 11
%4A62E4BF6024622 20242422A1081244106412C1081244106412D0F812381082E0E81238108
%4A69F4BF80422D0D8123810801430A25161F0A1F0A1F0A1F0A1F0A1F0A1F0A1F0A1F0A1F0A
%4A6514BFA0000400020002000100010001000100010001000100010001000100010001
%4A6BD4BFC0000300020002000100010001000100010200050006000300 0200FF80FE00FF00
%4A6FF4BFE00700003000180FF80FF00FD800180038000080008000800080008000700010000
%4A6584C0000008000500030004000800060002000800000000000000000000007000 10000
%4A68C4C0200000005000300040000000600020000000 0C0BC0000C0CE0000C0D20000C0C4
%4A6934C04000030003000300030000004C000000 4E0000004D0000004F0080008000800100
%4A6344C06001000100010001000000100030001000000000000000000001000000000000000
%4A66F4C08000000000000000000006000700060008000800080008000A00000000200020002
%4A6C24C0A00000FFFEFFFEFFFE00000002000 20000FFFEFFFEFFFE0000000 2000001F30BB3
%4A6C04C0C013F30BE313F37FD379D30B7300F301F300F301F30B7313F316E308F37FD379D3
%4A6C54C0E00BB300F31EF3207340E338E340E310B3FF000BB33CF318B3FF013CF319F12CF3
%4A6C74C10020B326F3FF0224F350F13CF308B322F308F1FF032AF312F11EF338B3FF042BB3
%4A6DB4C12060F308B3FF053CF3FE00FE0201F33CF348D310D301F21EF348D3FF0610D35AF3
%4A67E4C14010D300F320202020202020202000202020202020202020202000002020202020
%4A6654C16020202020202020000020202020202020202020202020200020202020202020202020
%4A6674C1802020202020000020202020202020202020202020202000202020202020202020202020
%4A6894C1A02020202020202000002020202020202020202020202020202020000050C0000C168
%4A6134C1C0000005 0B0000C1CE020000000C1BA204F50454E20444F4F525320200005 0A0000
%4A60B4C1E0C1E802000000C1C220555345204B45595320544F2000050 90000C16802000000
%4A6014C200C1DC0A100000C14E00000A0F0000C21602000000C20222020474 84F5354532020
%4A6FB4C22000000A0E0000C22E02000000C20A202053484F4F542020200 00000A0D0000C14E
%4A6E44C24002000000C22206100000C1680000060F0000C25A02000000C2462047454E4552
%4A6314C26041544F525320200006 0E0000C27402000000C24E2053484F4F542047484F5354
%4A6D24C280200000 60D0000C16802000000C268020C0000C1A90000020B0000C2A202000000
%4A6334C2A0C28E2054414B45204D4F5245205348 4F54532000020A0000C2C002000000C276
%4A60C4C2C020202020534F4D4520474 84F5354532020200002090000C1AB02000000C2B40A10
%4A6094C2E00000C14400000A0F0000C2F202000000C2DE204752554E5453202 0000A0E0000

%4A60C4C300C3080200000C2E620204649474854202000A0D0000C14402000000C2FC0A0A
%4A6F94C3200000C17600000A090000C3320200000C31E2020204A4F494E20494E20202020
%4A6FC4C34000000A080000C34E02000000C3262048415645204652494E445320000000A07
%4A6F24C3600000C17602000000C3420A0A0000C15A00000A090000C37E02000000C36A2046
%4A6284C380494E4420455849542020000000A080000C39802000000C37220594F555220474F
%4A6FC4C3A0414C3A2000000A070000C15A02000000C38C0000C1F60000C23A0000C2820000
%4A6B54C3C0C2D20000C3120000C35E0000C3A6020101010101010102020202000001000000
%4A6BF4C3E0000001000000080070A0906050807030303030202020200020002000100010003
%4A6404C40000030002000200020000000000020003000200000000000400030000000010000
%4A6BB4C42000720000009C000000610000006800000069000000640000006100000068000
%4A6744C440006900000066000000610000006800000063000000640000001100000012000
%4A6714C460001300000014000000D0000000E0000000F000000100000016000000170000
%4A69F4C4800018000000190000003B0000003C0000003D0000003E000000990000000930000
%4A6A44C4A0000920000009B000000C50000007A00000080000000820000008800000087000
%4A6BD4C4C0C4960000C4A20000C4AA0000C4B6030203021CD71CDB1CDF1CE31CE71CEB1CEF
%4A6CC4C4E01CF31CF71CFB1D001D041D081D0C1D101D141C481C481C481C481C4C1C4C1C4C
%4A6BC4C5001C4C1C501C501C501C541C541C541C581C581C581C581C541C541C541C501C50
%4A6B84C5201C501C4C1C4C1C4C1C4C1C481C481C481C481C48000080001E099D3C9D7C1E0D
%4A6514C54080018001800108000800080009E109E109E1183F183F183F1B571B571B5713A2
%4A6EF4C56013A213A21A7509AB09B409BD09C609CF09D809C609CF09D809C609CF09D809C6
%4A6464C58009CF09D809B709A209630 96C88FC89FC170091FC92FC93FC94FC95FC96FC8AFC
%4A6694C5A08000800080008000B001800100000000000000000002000000000000000000200
%4A6554C5C0020002000200020002000200020002000200020002000200020002000200
%4A6574C5E0020002000200020002000200020002000200020002000200020002000200
%4A6304C6000200020000000000020000000000000000000000000000000000000000000000
%4A66D4C62000000000000000090000110000001212121212121212121111111212121212121212
%4A6B24C640121912121212121212121212121212121207090120909090909090900000000000
%4A6B64C66000000000000000000000203040203040607080 90A0B090A0B000505050505050505
%4A6904C6800505050505050505050101010101010101010101010100000000000000E090E12
%4A6F34C6A00E1B0E120E990EA20EAB0EA20E630E6C0E750E6C0E3F0E480E510E480DEA0DF3
%4A6044C6C00E000DF30E240E2D0E360E2D0E7E0E870E900E870EB40EBD0EC60EBD1C9F1CA3
%4A64B4C6E01CA71CAB1CAF1CB31CB71CBB1CBF1CC31CC71CCB1CCF1CD31C971C9B17FC17FC
%4A6214C70018FC18FC19FC19FC1AFC1AFC1BC31BC31C681C681C6C1C6C1C701C701CD71CDB
%4A6F14C7201CDF1CE31CE71CEB1CEF1CF31CF71CFB1D001D041D081D0C1D101D141C741C74
%4A6EB4C7401C781C781C7C1C7C1C801C801C841C841C8B1C8B1C8F1C8F1C931C930C3F1087
%4A69D4C7601090109910A210AB10B410BD114817AB17B417BD17C617CF17D817E113A217EA
%4A6884C78017F3180016091812181818241548176C177517 7E178717901799 17A20BD80BF3
%4A6754C7A000120C2D0C3F0B870BA10BBD11B411CF111211 2D11461163117E11991412142B
%4A6874C7C0144814631 3A213BB13D813F315D815F316121 62D1648166315A215BD0C870C90
%4A6ED4C7E00C900C900C990CA20CA20CA20CAB0CB40CB40CB410870CBD0CBD0CBD0C3F0C48
%4A6CE4C8000C480C480C510C5A0C5A0C5A0C630C6C0C6C0C6C0C750C7E0C7E0C7E12C61348
%4A6024C8201348134812EA1351135113511 1EA131213121312121213 1B131B131B12361324
%4A6404C8401324132412 5A132D132D132D127E1336133613361 2A2133F133F133F1412137E
%4A6504C860137E137E142D138713871387144813901390139014631399139913991 3A2135A
%4A6624C88013 5A135A13BD1363136313631 3DB136C136C136C13F3137513751375156C1524
%4A6654C8A01524152415751 52D152D152D157E1536153615361587153F153F153F15901548
%4A63F4C8C0154815481599155115511551155A1512151215121563151B151B151B0D5A0D63
%4A6FD4C8E00D6C0D750D750D6C0D630D5A0D7E0D870D900D790D990D900D870D7E0DA20DAB
%4A6394C9000DB40DBD0DBD0DB40DAB0DA20DC60DCF0DD80DE10DE10DD80DCF0DC60CC60CCF
%4A6DC4C9200CD80CE10CE10CD80CC60CBD0CEA0CF30D000D090D090D000CF30CEA0D120D1B
%4A6AD4C9400D240D2D0D2D0D240D1B0D120D360D3F0D480D510D510D480D3F0D3612C612CF
%4A66A4C96012D812E112E112D812CF12C612EA12F313001309130913 0012F312EA11EA11F3
%4A6024C980120012091209120011F311EA1212121B1224122D122D1224121B12121236123F
%4A6364C9A01248125112511248123F1236125A1263126C1275127512 6C1263125A127E1287
%4A66C4C9C012901299129912901287127E12A212AB12B412BD12BD12B412AB12A2141214C6
%4A6AE4C9E014C614CF14CF14C614C614 12142D14D814D814E114E114D814D8142D144814EA
%4A6404CA0014EA14F314F314EA14EA144814631500150015091509150015001463 13A2147E
%4A67E4CA20147E14871487147E147E13A213BD14901490149914991490149013BD13D814A2
%4A69D4CA4014A214AB14AB14A214A213D813F314B414B414BD14BD14B414B413F316B416BD
%4A6D94CA6016C616C616C616C616BD16B416CF16D816E116E116E116E116D816CF16EA16F3
%4A6654CAB017121712171217121216F316EA171B1724172D172D172D172D1724171B1736173F
%4A6734CAA0174817481748174817 3F1736175117 5A176317631763176317 5A1751167E1687
%4A6BA4CAC01690169016901690168 7167E16991 6A216AB16AB16AB16AB16A216990BCF0BD8
%4A6B84CAE00BE10BD80BEA0BF30C000BF30C090C120C1B0C120C240C2D0C360C2D0B630B6C
%4A6DE4CB000B750B6C0B7E0B870B900B870B990BA20BAB0BA20BB40BBD0BC60BBD11B411BD
%4A6354CB2011C611BD11CF11D811E111D8111211 1B1124111B112D1136113F1136114811 51
%4A6314CB40115A115111631 16C1175116C117E1187119011871199 11A211AB11A214121 41B
%4A6494CB60142414 1B142D1436143F1436144814511 45A14511463146C1475146C13A213AB
%4A6834CB8013B413AB13BD13C613CF13C613D813E113EA13E113F31400140914 0015D815E1
%4A64E4CBA015EA15E115F31600160916001612161B1624161B162D1636163F1636164816 51
%4A6B34CBC0165A1651166316 6C1675166C15A215AB15B415AB15BD15C615CF15C60987099A
%4A67B4CBE01709096C0975097E0890086C08480824080009000 8D808B40890086C08480824

%4A6544CC000800090008D808B40890086C084808240800090008D808B40890086C08480824
%4A65C4CC200800090008D808B40890086C084808240800090008D808B40899087508510082D
%4A6974CC40080909090BE108BD08A2087E085A083608120912O8EA08C608AB08870863083F
%4A6814CC60081B091B08F308CF0890086C084808240800090008D808B40899087508510082D
%4A69B4CC800809090908E108BD08A2087E085A08360812091208EA08C608AB08870863083F
%4A6BE4CCA0081B091B08F308CF08AB08870863083F081B091B08F308CF08A2087E085A0836
%4A6874CCC0081209120 8EA08C6089908750851082D0809090908E108BD0890086C08480824
%4A6874CCE0080009000BD808B40A5A0A3F0A1B0A0009E10AB40A900A750A5A0A3F0A1B0A00
%4A6864CD0009E10AB40A900A750A5A0A3F0A1B0A0009E10AB40A900A750A630A480A240A09
%4A6BB4CD2009EA0ABD0A990A7E0A6C0A510A2D0A1209F30AC60AA20A870A6C0A510A2D0A12
%4A6BD4CD4009F30AC60AA20A870A630A480A240A0909EA0ABD0AAB0A7E0A5A0A3F0A1B0A00
%4A68D4CD6009E10AB40A900A750B240B120B000AEA0AD80B5A0B480B360B240B120B000AEA
%4A6A24CD800AD80B5A0B480B360B240B120B000AEA0AD80B5A0B480B360A630A480A2D0A09
%4A6DD4CDA009EA0ABD0A900A7E0B1B0B090AF30AE10ACF0B510B3F0B2D0B1B0B090AF30AE1
%4A6C04CDC00ACF0B510B3F0B2D0A630A480A2D0A0909EA0ABD0A900A7E0B240B120B000AEA
%4A6C84CDE00AD80B5A0B480B36197E195118F31899183F186C18C61924197519481 8EA1890
%4A6B24CE0018361863188D191B196C193F18E11887182D185A18B41912196C193F18E11887
%4A6A04CE20182D185A18B41912197E195118F31899183F186C18C619241987195A190018A2
%4A6A94CE40184818751 8CF192D1990196319091 8AB1851187E18D81936199019631909 18AB
%4A6C14CE601851187E18D81936197E195118F31899183F186C18C61924197E195118F31899
%4A6E64CE80183F186C18C61924197E195118F31899183F186C18C6192419D819CF19BD19AB
%4A6144CEA0199919A219B419C619D819CF19BD19AB199919A219B419C619D819CF19BD19AB
%4A6F64CEC0199919A219B419C619D819CF19BD19AB199919A219B419C6197E195118F31899
%4A61A4CEE0183F186C18C619241BCD1BAB1B8D1B6F1B511C2A1C0C1BEB1BCD1BAB1B8D1B6F
%4A6F14CF001B511C2A1C0C1BEB1BCD1BAB1B8D1B6F1B511C2A1C0C1BEB1BD31BB11B931B75
%4A6BD4CF201B571C301C121BF11BD31BB11B931B751B571C301C121BF11BD91BB71B991B7B
%4A6EF4CF401B5D1C361C181BF71BD91BB71B991B7B1B5D1C361C181BF71BD31BB11B931B75
%4A6A94CF601B571C301C121BF11BD31BB11B931B751B571C301C121BF11BD31BB11B931B75
%4A6F34CF801B571C301C121BF11BDF1BBD1B9F1B811B631C3C1C1E1C001BDF1BBD1B9F1B81
%4A6D34CFA01B631C3C1C1E1C001BE51BC71BA51B871B691C421C241C061BE51BC71BA51B87
%4A6BF4CFC01B691C421C241C061BE51BC71BA51B871B691C421C241C061BD31BB11B931B75
%4A6664CFE01B571C301C121BF11412142D144814631 3A213BD13D813F31412142D14481463
%4A6574D00013A213BD13D813F31412142D144814631 3A213BD13D813F3141B14361451146C
%4A6584D02013AB13C613E114001424143F145A147513B413CF13EA14091424143F145A1475
%4A6484D04013B413CF13EA1409141B14361451146C13AB13C613E114001412142D14481463
%4A69C4D06013A213BD13D813F314CF14E114F31509148714991 4AB14BD14CF14E114F31509
%4A6844D08014871499 14AB14BD14C614D814EA1500147E149014A214B414C614D814EA1500
%4A64D4D0A0147E149014A214B41412142D1448146313A213BD13D813F31412142D14481463
%4A6814D0C013A213BD13D813F314C614D814EA1500147E149014A214B414C614D814EA1500
%4A6964D0E0147E149014A214B41AC61B1B1B001AE11A751A901AAB1B361AC61B1B1B001AE1
%4A6B14D1001A751A901AAB1B361AC61B1B1B001AE11A751A901AAB1B361ACF1B241B091AEA
%4A6D74D1201A7E1A991AB41B3F1AD81B2D1B121AF31A871AA21ABD1B481AD81B2D1B121AF3
%4A6D64D1401A871AA21ABD1B481ACF1B241B091AEA1A7E1A991AB41B3F1AC61B1B1B001AE1
%4A6A24D1601A751A901AAB1B361AC61B1B1B001AE11A751A901AAB1B361AC61B1B1B001AE1
%4A6A44D1801A751A901AAB1B361AC61B1B1B001AE11A751A901AAB1B361AC61B1B1B001AE1
%4A6A64D1A01A751A901AAB1B361AC61B1B1B001AE11A751A901AAB1B361AC61B1B1B001AE1
%4A6A84D1C01A751A901AAB1B361AC61B1B1B001AE11A751A901AAB1B361AC61B1B1B001AE1
%4A6D64D1E01A751A901AAB1B3619D819CF19BD19AB199919A219B419C61A6C1A5A1A241A12
%4A6914D20019EA1A001A361A481A631A511A1B1A0919E119F31A2D1A3F1A6C1A5A1A241A12
%4A6C24D22019EA1A001A361A481A631A511A1B1A0919E119F31A2D1A3F19D819CF19BD19AB
%4A6BD4D240199919A219B419C6197E195118F31899183F186C18C61924197E195118F31899
%4A6E14D260183F186C18C619241BDF1BBD1B9F1B811B631C3C1C1E1C001BE51BC71BA51B87
%4A6BF4D2801B691C421C241C061BE51BC71BA51B871B691C421C241C061BE51BC71BA51B87
%4A6A14D2A01B691C421C241C061BD31BB11B931B751B571C301C121BF11BD31BB11B931B75
%4A6A34D2C01B571C301C121BF11BD31BB11B931B751B571C301C121BF11BD31BB11B931B75
%4A6D14D2E01B571C301C121BF10E120EA20E6C0E480DF30E2D0E870EBD0DF30F090F120F1B
%4A6CC4D3000F1B0F1B0F1B0F120F090F900F990FA20FA20FA20FA20F990F900F240F2D0F36
%4A6FE4D3200F360F360F360F2D0F240F5A0F630F6C0F6C0F6C0F6C0F630F5A0ECF0ED80EE1
%4A6F04D3400EE10EE10EE10ED80ECF0F3F0F480F510F510F510F510F480F3F0EEA0EF30F00
%4A6FA4D3600F000F000F000EF30EEA0F750F7E0F870F870F870F870F7E0F750FC60FC60FC6
%4A6D04D3800FCF0FCF0FD80FD80E12106C106C106C10751075107E107E0EA20FE10FE10FE1
%4A6C64D3A00FEA0FEA0FF30FF30E6C103610361036103F103F104810480E480FAB0FAB0FAB
%4A6524D3C00FB40FB40FBD0FBD0DF3101B101B101B10241024102D102D0E2D100010001000
%4A6FA4D3E0100910091012101 20E87105110511051105A105A106310630EBD0000D5280000
%4A60D4D400D5460000D5720000D5A00000D5C80000D5EC0000D61C0000D6480000000000000
%4A6434D420D55E0000D58E0000D5BE0000D5DA0000D6000000D6340000D65C0000D6D60000
%4A6204D440D6FC0000D71E0000D74B0000D7800000D7B00000D7DA000000B0000000B60000
%4A6524D46000B2003150000D46A0000464 94E4420544845204B494444454E20504F54494[illegible]
%4A6174D480000000517000D48A00005354554E204F5448455220504C415945525300000 6[illegible]
%4A6294D4A00000D4AA02000000D482504C41594552205348 4F5453204E4F5700000519000[illegible]
%4A62C4D4C0D4C40000485552 54204F5448455220504C4159455253000006180000D4E4020
%4A6644D4E00000D4FC504C41594552205348 4F5453204E4F57000081B0000D4FE000474F %4A6254D5[illegible]4E00061A0000D51800000000D4F6504C415945525320
%4A6774D5204[illegible]5204652494346444453204A4F494E20494E20414E[illegible]
%4A65F4D540[illegible]4F4E5553204D554C449504C4945522042590043[illegible]
%4A6524D5604C4[illegible]494E47205452454153555245004D4F524520504C415945525320[illegible]
%4A66D4D5804C404F[illegible]204849474845520000424F4E5553204D554C5449504C4945520000
%4A6374D5A04144420434F524520504C4159455253204 64F522047524541544552000046 49
%4A6654D5C052455[illegible]4552004144420434F494E5320414E5954494D4500464F522045 58
%4A6574D5E054524120[illegible]4841C544800004D41474943 20504F54494F4E5320574F524B0000
%4A6634D6004449464645524 54E544C5920464F5220454143 4820504C41594552005348 4F4F
%4A64F4D620544 94E47204D41474943 20504F54494F4E5300004341532041204C45535345 52
%4A6604D640204546 4645435 40053544 14C4C494E472057494C4C20434155534500444F4F52
%4A6154D660532054 4F204F5 0454E008C000000D67800000000000000000047414D45204F5645
%4A63B4D6805 [illegible] 4C544820 3D2030008400000 0D6A00000D6BA0000D[illegible]
%4A6774D6A048 [illegible] 4 2555454 4F4E20544F2053484F4F540052454C454153
%4A6374D6C04520 46 [illegible] 45 5 544F4E20544F204D4F56450080000000D6E400000000
%4A64E4D6E00000D6924 6494E44204558495420544F204E455854204C4556454C0080000000
%4A6064D700D70A000000000000000000047484F5354532 04D5553542042452053484F54008000
%4A60B4D7200000D72C000000000000000000534F4D4520464F4F4420 43414E2042452044 4553
%4A6234D740[illegible]4524F59454400008000000 0D7560000D76C0000000046494748542048414E44
%4A6704D7[illegible]20544F[illegible]48414E41204 2 5900525 54E4E494E4720494E544F2047525554 4E 545300
%4A6254D78[illegible]800000000D7BE0000D7A000000000042455741524520544845204 4454D4F4E5300
%4A6304D7A057484943 4820534 84F4F5420594F55 00B0000000D7BE00000000000000000534F
%4A6444D7C052434 55249525 3204D4159204245 20494E5649534942 4C4500008000000 0D7E8
%4A6154D7E000000000000000000555 45204D414749432 0544F204B494C4C20444541544800
%4A6CC4D80000904B1A00904B1E00904B1C00904B200001002000400004001000030002000 0
%4A6834D820006100000062000000630000006400000 0A1000000A2000000A3000000A40000
%4A68D4D84000A5000000A6000000A72020202020202020202020202020202020202020 20
%4A6B24D860200020202020202020205741 5252494F523A2020202020202020200020202020 2020
%4A6F84D880205641 4C4B595249453A20202020202020200020202020202020202057495A415244 4
%4A6A84D8A03A2020202020202020200020202020202020202020454C463A2020202020202020 20
%4A6364D8C020000000D8620000DB7A0000D8920000D8AA0000D8E60000D8F60000D9060000
%4A61D4D8E0000000000000020464F4F443A2020484541 4C544820002049 4E4352454541534544
%4A6AD4D90020425920200002020202020202031303020202020200000000D92A0000D9380000
%4A6EC4D92000000000000000000000000020464F4F442F4452494E4B3A200020203130302048 45
%4A6FD4D940414C5448200000000D95A0000D9660000D97200000000000000000020534F4D4520
%4A6214D960464F4F44200020444553545 24F5945442000204259205348 4F545320000000
%4A6044D980D992000D9A6000000000000000000000000000020494E5345525420434F494E5320
%4A6114D9A0464F5220000002020204D4F5245204845414C544820202020000000000D9CE0000
%4A6E24D9C0D9DE0000000000000000000000000000205341564520 4B45595320544F2000002020
%4A6ED4D9E04F50454E20444F4F52532020000000000DA020000DA1A000000000000000000000
%4A6494DA00000020434F4C4C454354204D41474943 20504F54494F4E202000204245464F52
%4A6074DA2045205052455353494E47204D414749432000000 0DA460000DA5600000000000000
%4A60D4DA4000000000000000205341564520504F54494F4E5320200020464F52204C41544552
%4A6DA4DA60205553452000000 0DA7A0000DA9000000000000000000000000000202053484F4F
%4A63C4DA8054494E47204120504F54494F4E202000204841532041204C455353455220 4546
%4A6DF4DAA046454354200000000DABA0000DACA000000000000000000000000000205452454153
%4A6F64DAC05552453A20202020200020202020203130302050 4F494E5453200020 20504C4159
%4A6264DAE04552204C4F5345532020202048454 14C544820000000000DADA0000DB0A0000
%4A60A4DB00000000000000000000000000202053484F4F54204F522041 564F494 4420474 84F5354
%4A6D14DB2053202020200000000000DADA0000DB3A00000000000000000000000000202053484F4F
%4A62F4DB4054204F5220464947 48542047 52554E545320202000000000DADA0000DB6A0000
%4A61B4DB60000000000000000000000020205348 4F4F54204F52204649474854204 4454D4F4E
%4A6DD4DB8053202020000000000DADA0000DB9A000000000000000000000000000202053484F4F
%4A6414DBA054204F522046494748 54204C4F424245525320 2000000000DADA0000DBCA0000
%4A6114DBC0000000000000000000000002053484F4F54204F52204649474854205 34F52434552
%4A6E74DBE04552532000000000DADA0000DBFA000000000000000000000000000205553452 04D
%4A6244DC00414749432 0544F204B494C4C2044454154482020000000000DC2A0000DC400000
%4A6EB4DC2000000000000000000000000202053484F5453204 44F204E4F5420485552542000
%4A6364DC40204F544845522050 4C41594552532028594F55 5429000000 0DC6A0000DC820000
%4A6014DC600000000000000000000000204D414749432 0504F54494F4E53204146464543 5420
%4A6424DC800000204556455259 5448494E47204F4E20534352454 54E2000000000DCAE0000
%4A6124DCA0DCC600000000000000000000000000204B494C4C20544849 5454620544F20524543
%4A6064DCC04F564552 20000202020202020535 44F4C454E20495445 4D2020202020202020000000
%4A6EA4DCE0DCF20000DD08000000000000000000000000020202054484945462045 53434150
%4A6234DD0045 443A2020200000204954454D204F4E204E455854204C4556454C2000000000
%4A6FF4DD20DD320000DD440000000000000000000000000020534F4D452057414C4C53204D41
%4A6114DD405920000020204245204445535452 4F594544202000000000DD6A0000DD7C0000
%4A6BB4DD6000000000000000000000000202020 5452415053204D414B45202020200020574 14C
%4A61E4DD804C5320444953415050454152 20000000DDA20000DDB80000DDCE000000000000
%4A63A4DDA000002020205452414E53504F52544552532 04D4F56452020002059 4F5520544F20
%4A64C4DDC0544845204 34C4F534553542020200020 5452414E53504F525445522 0564953494 2
%4A6F04DDE04C452000000000DDF80000DE0C0000000000000000000000000002020594F55204152

%4A64D4DE00452046554C4C204F4620200020424F4D425320414E442F4F52204B4559532000
%4A6674DE200000DBD20000D9460000D97E0000D9BA0000D9EE0000DA320000DA660000DAAE
%4A6654DE400000DAF60000DB260000DB560000DB860000DBB60000DBE60000DC160000DC56
%4A6604DE600000DC9A0000DCDE0000DD1E0000DD560000DD8E0000DDE40000D91600000000
%4A6624DE8000000000000000000000000000000000000000000000DAA60000000000000000
%4A63D4DEA00000000000000000000000000000000000000000000000000000000000000000
%4A65F4DEC0000000000000000000000000000000002020202020202020202020202020202020
%4A6EF4DEE020202020202000002020202057415252494F52204E4F57204841532020200000
%4A61D4DF0020202056414C4B59524945204E4F572048415320202000002020202057495A41
%4A6104DF205244204E4F57204841532020202000002020202020454C46204E4F57204841
%4A6384DF405320202020200000204C494D4954454420494E5649534942494C495459200000
%4A6DD4DF6020202020202045585452412041524D4F52202020200000202020202020455854
%4A6FD4DF805241205350454544202020202020000020204558545241204D4147494320504F
%4A6FF4DFA0574552202020000020202045585452412053484F5420504F5745522020200000
%4A6034DFC020202045585452412053484F542053504545442020200000202045585452412 0
%4A6464DFE0464947485420504F574552202020000000000DEE80000DF000000DF180000DF30
%4A6474E0000000DF480000DF600000DF780000DF900000DFA80000DFC00000DFD800000000
%4A6734E020000000B300000000000000B400000000000000B5000000C4000000C200000000
%4A64B4E04000000000000000000000000000000000000000000000B700000000000000D2
%4A6514E06000000000000000D3000000D40000000000000000000000000000000000000022
%4A6184E080000000230000002400000025534 84F545320544F204B494C4C3A0000504F494E
%4A64C4E0A0545320464F523A0044414D41474520544F20504C4159455253204845414C5448
%4A6144E0C03A004C4547454E4400000000E0FE0000E1080000E11A0000E1300000E13E0000
%4A61A4E0E0E14E0000E15E0000E1740000E18A0000E1A00000E1B60000E1C4000000005452
%4A6794E1004541535552450000646573747275637469626C6520464F4F44006E6F6E2D6465
%4A6984E12073747275637469626C6520464F4F44004D4147494320706F74696F6E7300696E
%4A6594E14063726561736573204152 4D4F5200696E6372656173657320535045454400696E
%4A6594E16063726561736573204D4147494320504F57455200696E63726561736573205348
%4A6424E1804F5420504F5745520000696E637265617365732053484F542053504545440000
%4A6794E1A0696E6372656173657320464947485420504F574552004B455920666F7220646F
%4A66F4E1C06F72730074656D706F7261727920494E5649534942494C49545900000000E210
%4A6FF4E1E00000E21A0000E2200000E2260000E2340000E2400000E24C0000E25E0000E270
%4A6FD4E2000000E2820000E2940000E29800000000545245415355524500004452494E4B00
%4A6584E220464F4F4400004D4147494320504F54494F4E530045585452412041524D4F5200
%4A62E4E24045585452412053504545440045585452412 04D4147494320504F574552004558
%4A6314E26054524120 53484F5420504F5745520000455854524120 53484F54205350454544
%4A64F4E2800000455854524120464947485420504F574552004B455900494E564953494249
%4A6694E2A04C495459000044455349474E45522F50524F4752414D4D45523A000047414D45
%4A6554E2C02050524F4752414D4D45523A0000564944454F204752415048494353 3A00454E
%4A6864E2E047494E4545523A00544543484E494349414E3A00534F554E442044455349474E
%4A64F4E3003A00434142494E45542044455349474E3A005350454349414C205448414E4B53
%4A6D84E32020544F3A0000021A0000E312000002170000E30202000000E32602130000E2F4
%4A6F84E34002000000E32E02100000E2E802000000E33A020D0000E2DE02000000E3460206
%4A6E94E3600000E2CE02000000E35202030000E2BC02000000E35E02000000E2A602000000
%4A66A4E380E36A4544204C4F474700424F4220464C414E4147414E000053414D20434F4D53
%4A6484E3A0544F434B0000535553414E20472E204D43425249444500414C414E204D5552
%4A64A4E3C05048590057494C4C204E4F424C45000044415645205045545449475245570000
%4A64F4E3E0504154204D434341525448590000534145204F482F435249532044524F424E59
%4A63A4E400000048414C2043414E4F4E004541524C205649434B45525300004B454E204841
%4A6154E42054410000444156452054484555524552 00004D494B4520414C42415547480000
%4A6194E440414E44204D414E59204F54484552530004 1D0000E4400000041C0000E4320200
%4A6E24E4600000E450041B0000E42402000000E45804180000E41A02000000E46404150000
%4A6064E480E40C02000000E47004140000E40202000000E47C04110000E3EE02000000E438
%4A6024E4A0040E0000E3E002000000E494040B0000E3D002000000E4A0040A0000E3C40200
%4A6124E4C00000E4AC04090000E3B802000000E4B804080000E3A602000000E4C404070000
%4A61D4E4E0E39802000000E4D004040000E38A02000000E4DC04010000E38202000000E4E8
%4A6654E50000E0FFC80000E6A40000E6AC0000E6C60000E6E20000E6FA0000E7080000E714
%4A6394E5200000E71C0000E7280000E7440000E7600000E77E0000E79A0000000000E0FFF6
%4A62C4E5400000E7B60000E7BE0000E7D80000E7F2000000000000E80C0000E8180000E820
%4A61F4E5600000E82C0000E8480000E8640000E8800000E89C0000000000E000260000E8B6
%4A6524E5800000E8C00000E8DA0000E8F40000E90C0000E9180000E9240000E92C0000E938
%4A6394E5A00000E9540000E9700000E98C0000E9A80000E9C400E000560000E9E00000E9E8
%4A6194E5C00000EA040000EA1E000000000000EA340000EA400000EA480000EA540000EA70
%4A6764E5E00000EA8C0000EAA80000EAC40000EAC600E000B60000EAE20000EAEC0000EB06
%4A6604E6000000EB1A0000EB360000EB4E0000EB5A0000EB640000EB700000EB8C0000EBA8
%4A6144E6200000EBC40000EBE00000000000E000B80000EBFC0000EC020000EC1A00000000
%4A60A4E640000000000000EC2E0000EC300000EC360000EC420000EC5C0000EC7400000000
%4A62B4E6600000EC920000000000E000EA0000ECAA0000ECB00000ECCA0000ECD400000000
%4A6694E6800000ECEC0000ECEE0000ECF40000ECFC0000ED180000ED30000000000000ED48
%4A6484E6A0000000000047484F53545300005 06C617965727320 73686F742068757274 2067
%4A6AA4E6C0686F73747300506C61796572732063616E6E6F74206669676874206 7686F7374
%4A6614E6E0730047686F737473206875727420706C6179657273 20616E6400202020646973

%4A6104E700617070656172000047454E455241544F525300047484F535453000020312020
%4A6E94E72020322020203300007573696E67206D616769632020202020202031302020313020
%4A6214E7402031300073686F6F74696E672067686F73742020203130202031302020313000
%4A6934E7606669676874696E672067686F737420204E4F5420504F535349424C4500006B69
%4A63F4E7806C6C2067656E657261746F72202020313020203130202031300067657474696E
%4A6F04E7A06720686974202020202020313020203230202033300047525554E54530000506C
%4A67D4E7C061796572732073686F74732068757274206772756E747300506C617965727320
%4A6984E7E063616E206669676874206772756E747300004772756E74732077696C6C206669
%4A6494E80067687420706C617965727300047454E455241544F525300004752554E54530000
%4A6E94E8202031202020322020203300007573696E67206D61676963202020202020313020
%4A6264E840203130202031300073686F6F74696E67206772756E7420202020352020203520
%4A6294E860202035006669676874696E67206772756E742020203235202032352020323500
%4A63D4E8806B696C6C2067656E657261746F72202020313020203130202031300067657474
%4A6134E8A0696E6720686974202020202020203520202038202031300044454D4F4E530000
%4A6994E8C0506C61796572732073686F747320687572742064656D6F6E7300506C61796572
%4A6A84E8E0732063616E2066696768742064656D6F6E73000044656D6F6E73206669676874
%4A6504E90020616E642073686F6F740000202020706C6179657273000047454E455241544F
%4A60E4E9205253000044454D4F4E5300002031202020322020203300007573696E67206D61
%4A6284E940676963202020202020313020203130202031300073686F6F74696E672064656D
%4A6524E9606F6E20202020352020203520202035006669676874696E672064656D6F6E2020
%4A62D4E9802032352020323520203235006B696C6C2067656E657261746F72202020313020
%4A6FE4E9A0203130202031300067657474696E6720686974202020202020352020203820
%4A6034E9C02031300067657474696E672073686F7420202020203130202031302020313000
%4A6884E9E04C4F424245525300506C61796572732073686F74732068757274206C6F626265
%4A6744EA0072730000506C61796572732063616E206669676874206C6F6262657273004C6F
%4A6654EA2062626572732073686F6F7420706C617965727300047454E455241544F52530000
%4A6214EA404C4F4242455253002031202020322020203300007573696E67206D6167696320
%4A6294EA60202020202020313020203130202031300073686F6F74696E67206C6F6262657220
%4A6314EA802020352020203520202035006669676874696E67206C6F626265722020323520
%4A62A4EAA020323520203235006B696C6C2067656E657261746F7220202031302020313020
%4A6014EAC020313000000067657474696E672073686F742020202020203320202033202020
%4A6674EAE03300534F5243455245525300536F726365726572732063616E206E6F74206265
%4A67C4EB002073686F740020202020207768696C6520696E76697369626C6500506C61796572
%4A66E4EB20732063616E20666967687420736F7263657265727300536F7263657265727320
%4A6654EB40666967687420706C617965727300047454E455241544F52530000534F52434552
%4A6FD4EB60455253002031202020322020203300007573696E67206D61676963202020202020
%4A6124EB8020313020203130202031300073686F6F7420736F72636572657220202020203520
%4A6174EBA02020352020203500666967687420736F7263657265722020202032352020323520
%4A6254EBC0203235006B696C6C2067656E657261746F722020203130202031302020313000
%4A6184EBE067657474696E672068697420202020202020203520202038202031300044454154
%4A66E4EC0048004F6E6C79206D616769632068757274732064656174680000446561746820
%4A6634EC20687572747320706C617965727300200004445415448004F4E4C59204D41474943
%4A6594EC4000007573696E67206D616769632020202020202020203F3F3F3F000073686F6F
%4A64D4EC6074696E67206465617468202020202020202031006669676874696E6720646561
%4A6444EC80746820204E4F5420504F535349424C45000020202020555020544F2E2E2E2020
%4A6364ECA02020202020202032303000544849454600546869656620737465616C7320666F
%4A6604ECC06D20726963686573740020202020706C6179657200506C61796572732063616E20
%4A6404ECE066696768742074686965660020005448494546002020202020203100007573696E
%4A6674ED0067206D61676963202020202020204E4F20454646454354000073686F6F74696E67
%4A6464ED2020207468696566202020202020353030006669676874696E672074686965662020
%4A6F04ED4020202020203530300067657474696E672068697420202020202020202020313000
%4A63F4ED60313030207820434F494E530054524541535552452053207800424F4E5553203D00
%4A6D54ED804E4F20424F4E5553202121000000005B00000051000000520000005300000054
%4A69D4EDA000000055000000560000005700000058000000590000005A0000005400000057
%4A6974EDC00000005900000056000000580000005300000054000000550000005600000057
%4A6984EDE00000005200000053000000540000005800000059000000580000005700000056
%4A6254EE00000000055000000540000EDB80000EDCC0000EDE00000EDF4000000BF000000C0
%4A6D64EE200000005B000000BA0000005B000000C1000000BB000000BC000000BD000000BE
%4A6BC4EE400001000200020002000000020002000F000F007700F007700F00070700001E13
%4A6C54EE601E141E151E161E171E181E191E1A1E181E181E181E1B1E1C1E1D1E1E1E1F1E20
%4A6C34EE801E211E221E231E241E251E261E1E1E271E281E291E2A1E2B1E2C1E2D1E211E2E
%4A6C24EEA01E2B1E2F1E281E301E181E311E321E331E341E351E361E371E381E391E3A1E3B
%4A6DB4EEC01E3C1E3D1E3E1E3F1E401E411E421E431E441E451E461E471E481E491E4A1E42
%4A6ED4EEE01E4B1E4C1E4D1E4E1E4F1E501E441E451E511E521E531E541E551E3E1E561E57
%4A6F94EF001E581E591E5A1E5B1E5C1E5D1E5E1E5F1E3E1E601E611E3E1E621E631E641E42
%4A6FC4EF201E651E661E451E671E681E421E691E6A1E421E4B1E6B1E6C1E4E1E6D1E131E6E
%4A6F14EF401E451E6F1E701E711E721E731E3E1E741E751E131E761E3E1E771E781E791E3E
%4A6184EF601E7A1E3E1E7B1E7C1E3E1E7D1E7E1E7F1E801E811E821E451E831E841E851E86
%4A61F4EF801E641E421E4B1E131E871E881E891E8A1E8B1E451E8C1E8D1E8E1E8F1E551E3E
%4A6014EFA01E901E131E131E911E921E931E3E1E3E1E3E1E7A1E3E1E941E951E961E971E98
%4A6334EFC01E991E9A1E9B1E9C1E9D1E9E1E9F1EA01EA11E641EA21EA31EA41EA51EA01EA6
%4A63D4EFE01EA71EA81EA01EA91EAA1EAB1EAC1E551E3E1EAD1EAE1E131EAF1EB01EB11EB2

%4A6444F0001EB31EB21EB41EB51EB61EB71EB81EB91EBA1EBB1EB91EBC1EBD1EBE1E131EBF
%4A6FE4F0201EBA1EC01EC11EC21EC31EC41EC21EC21EC21EC51EC61EC21EC21EC21EC31E13
%4A6154F0401E551EC71EC81EC91E131E131E131ECA1ECB1ECC1ECD1ECE1ECF1ED01E131E13
%4A6674F0601E131E131E131E131ED11E131E131E131E131E131E131E131E131E131E131E13
%4A6914F0801E131E131E131E131E131E131E131E131ED21ED31ED41ED51E131E131E131E13
%4A6914F0A01E131ED61ED71ED81E131E131E131E131E131E131E131E131E131E131E131E13
%4A6634F0C01E131E131E131E131E131E131E131E131E131E131E131E131E131E131E131E13
%4A6C54F0E01ED91EDA1EDB1EBB1E131E131E131E131E131E131EDC1E131E131E131E131E13
%4A6584F1001E131E131E131E131E131E131E131E131E131E131E131E131E131E131E131E13
%4A6754F1201E131E131E131E131E131E131E131E131E131EC11EBB1E131E131E131E131E13
%4A6ED4F1400000FFFFDFFFAFFF00002F007F00FF00000020BF708FF08F00002FF07FF0FFF0
%4A6CA4F160000020F070F0F0F000000000F888F00F0000FFA0F08EF00C00005FFFFFFFFFF
%4A64E4F1800000000000000FF000000FC80FCA400000000F532FB63FFFF000000000000FFFF
%4A6DB4F1A000000000FFF0FF600000F050F080F0F00000F226F33DF66F00005FFFFFFFFFF
%4A6954F1C0000066319631C631F631F643F654F87683337223A324F334C334C445E445F445
%4A6844F1E00000722294447753F421B842F740AF70842174229532C532F4227974E532F643
%4A68A4F2000000A520D533E633A733C833CB33D622673335228522B633F5229A55C844BA66
%4A6524F2200000427299A2B69587A493537252A0B7735310306131E1318131B343F121C252
%4A6654F24000008108F226C224933693367559C44863370000A1245226A33693689558D447
%4A6904F260000055517552766377747885799579967441355145527663777478857995799 6
%4A68F4F2800000515557233A366747775887599769971441155525583557477758875997699
%4A69D4F2A000007515C5256636774778587959796974142515552 5A6367747785879597969
%4A6AD4F2C000002FF0AAA0EA609DA0B842F740AF709421553000006C92BB809DB0F550A643
%4A65F4F2E0000046007F004F00F421B842F740AF709421000000004C324F225E52F532F743
%4A6794F30000009520 3F70F630AA30C8308B33D622773300008522C744C6339D60A944BA66
%4A6D14F32000007715C72568367B477C583F599F6959142B155725A9367A477B587D597F69
%4A6954F340000026833B538C6348636C647B6584559733642 2339249D345C349648C648BA45
%4A6774F36000002666B66682240000C647B658C88853368AAAB86656686807000074447333
%4A6DC4F380000035278C3BF6375C3BE8358B36F7226736AF3F9526B637B5279A55C844BA66
%4A68A4F3A000003253833C4A36343BBE39563B4F2B2537600004272A388B2538852D84286A6
%4A6164F3C00000614D446F605F617FB15B917DD47DF5AFF89F7FB09F00F400FD00F900FFFF
%4A6D24F3E0F410F010F110F322B5204531F531F731FC63F840FD84F335F246F158F26AF37B
%4A6E44F400F410F223A323D4349434B535E545F545E878E656F868F335F246F158F26AF37B
%4A6C74F420F410F023F023F034F034F035D045F045F067F056F076F098F046F158F26AF37B
%4A6EB4F440F410F033F033F034F044D055F045F155F177A366F588F0A9F246F158F8BDF37B
%4A6A64F460F3106300A400F5009600A500B910F811FA21B900FA43FA70F046F158F26AF37B
%4A6124F480F410F400F620F720F830F930CB32FB40FF609D50FF87FFBAF046F158F26AF37B
%4A63F4F4A0F410F403F604F705F806D906EB17EB08DF5CFD09FF5CFF9EF046F158F26AF37B
%4A6AD4F4C0F410F020F020F030C030F030C040D150E175F053F075F09AF046F158F26AF37B
%4A6E44F4E0F410F024F025B035F035F036D047C158F069F069F079F09AF046F158F26AF37B
%4A6954F50000006960B960C9429A50A953F741CC91EFA0AE94CFF4FFF8000000000000000
%4A6A34F52000005326D326943AA439C53BB54BF549F76D877FFAAFFEEF000000000000000
%4A67D4F54000003A606A50B9229A506C41BC41F831FFB3FA50AFD7EFD70000000000000000
%4A68F4F56000006608B608A7077606790A6B1D9B0C8F5F7D0EBF5FEF5F000000000000000
%4A66D4F5800000000303F603FB039603F803FB04FF05D877FF5AFF8FF0000000000000000
%4A62F4F5A000000003A304C303F704F405F506F617F624F60DB40FB4000000000000000000
%4A6DD4F5C0000000002435000003F7E00003A1649578845D64560800000000000000000000
%4A6114F5E0000067007B417B316F438F418F559F559F76AF76BF88CF99F400FD00F900FFFF
%4A60E4F6008F00CF21FF76FF98FFDDFFFF000000008F008F00CF21FF76FF98FFDD0000000
%4A6914F6208F008F008F00CF21FF76FF98000000008F008F008F008F00CF21FF7600000000
%4A64C4F6408F008F008F008F008F00CF21000000008F008F008F008F008F008F000000000
%4A6064F66000000004FEC5F008F00CF20FF20EFFF8F00CF21FF76FF98FFDDFFFF00000000
%4A6404F68000005B30446F6930F0578F75F057CA66B9BFAF76F46ADF899F44AF66DF67FFFF
%4A6444F6A000006700504F6F407F308F418F559F699F76AF66BF88CF99617FD4CFA8BFFFFF
%4A6144F6C0000067006F306F407F308F418F559F559F76AF76BF88CF99F400FD00F900FFFF
%4A6034F6E00000670031306F407F308F418F559F969F76FF60FF70EF97F400FD00F900FFFF
%4A62D4F700000614D446F605F617FF89F7B9FB68FF5AF4F7776417F98910FFD00F900FFFF
%4A60A4F72000005B30446F6930F0578F75A2BFCA66B9BF4F775F807F980000D4CFF900FFFF
%4A62F4F74000000000988FA99FC99FFBBFA888000099997FBF711F5F936F84EF86F0F0FFBB
%4A6324F76000000007F848F85AF8340F7FF20FF82FFC0FFFF5F5081F8EF88D79FA17FA00F
%4A64F4F780000000000002FFF4EEF5EEF6FFF6FFF8FFF00008FFF6F6FAF9F5F995F656F33
%4A6AA4F7A000000000FFFF3FFF6EEF7EEF8FFF9FFFBFFF0000FFFF9F6FCF9F6F996F658F33
%4A6934F7C000000000FF005FFF8EEFAEEFCFFFDFFFFFFF0000FF00FF6FFF9F9F996F65CF33
%4A6B84F7E000000006ABF8BBFBAAFDCBFFDDFFFFF5F776F998FAA9FBBAFCCCFDD5BBFFF00
%4A6EE4F800000000002FC55F845F966F86AFC06FB16F9A6F308F006F551F194F006F11AFFF
%4A6104F82000000003FC57F847F968F86CFC09FB19F9A9F30CF009F552F196F008F11CFFF
%4A6484F84000000004FC59F84BF96DF86FFC0FFB1FF9AFF30FF00FF553F199F00DF11FFFF
%4A6BF4F860000000000000000009F9AAF9A29096A0898068889CCF4F335F897F83BF949F11
%4A60C4F8800000000FFFF00009F9ACF9A49099A08C8068888ACCF5F336F897F83BF94BF11
%4A6FF4F8A00000000FF000009F9AEF9A6909CA08F8068888BCCF6F337F897F83BF94DF11
%4A66C4F8C000000008F34AF54BF96DF78DFB66F99FF9ABF00FF30FFB36F459F77F6FFFFFF
%4A67C4F8E000000006F939F84CF83FF66CFC88FBCFF9AF25FF48FF8BF700FDFFFD111FFFF

%4A6F34F9000000000006F939F84DF86FF9A9FD9CFC8FFF6DFFFFFFF000000000007F430000
%4A6694F9200000000006F939F84DF86FF9A9FD9CFC8FFF6DFFFFFF60F190F0C0F67F434A8F
%4A6E04F940BF966F450000FFFFFFFF0000FFFFFFFF0000CFC8FF9AF25FFFFFFFFFFFFFFF
%4A6D54F960FFFFFFFF9FD9FFF6FFFFFF44FF44FF44FF44FF44FF4460F190F00000FFFFFFFF
%4A6E44F9800000FFFFFFFF000000060005000A000800040004000700050000000100010001
%4A6864F9A00000FFFFFFFFFFFF0000FFE0FFE000000002000200020000 0FFE000000000077
%4A6AE4F9C000000078000000790000007300000075000000740000007600700060 00E000A0
%4A69E4F9E000B0009000D0005000F00070106020503040000007100000070000000000000000
%4A6314FA80000000000000000000000000000000000000000000000000000000000000000
%4A6334FA20000000000000000000000000000000000000000000000000000000000000000
%4A6354FA40000000000000000000000000000000000000000000000000000000000000000
%4A6374FA60000000000000000000000000000000000000000000000000000000000000000
%4A6394FA80000000000000000000000000000000000000000000000000000000000000000
%4A63B4FAA0000000000000000000000000000000000000000000000000000000000000000
%4A63D4FAC0000000000000000000000000000000000000000000000000000000000000000
%4A63F4FAE0000000000000000000000000000000000000000000000000000000000000000
%4A6324FB00000000000000000000000000000000000000000000000000000000000000000
%4A6344FB20000000000000000000000000000000000000000000000000000000000000000
%4A6364FB40000000000000000000000000000000000000000000000000000000000000000
%4A6384FB60000000000000000000000000000000000000000000000000000000000000000
%4A63A4F880000000000000000000000000000000000000000000000000000000000000000
%4A63C4FBA0000000000000000000000000000000000000000000000000000000000000000
%4A63E4FBC0000000000000000000000000000000000000000000000000000000000000000
%4A6404FBE0000000000000000000000000000000000000000000000000000000000000000
%4A6334FC00000000000000000000000000000000000000000000000000000000000000000
%4A6354FC20000000000000000000000000000000000000000000000000000000000000000
%4A6374FC40000000000000000000000000000000000000000000000000000000000000000
%4A6394FC60000000000000000000000000000000000000000000000000000000000000000
%4A63B4FC80000000000000000000000000000000000000000000000000000000000000000
%4A63D4FCA0000000000000000000000000000000000000000000000000000000000000000
%4A63F4FCC0000000000000000000000000000000000000000000000000000000000000000
%4A6414FCE0000000000000000000000000000000000000000000000000000000000000000
%4A6344FD00000000000000000000000000000000000000000000000000000000000000000
%4A6364FD20000000000000000000000000000000000000000000000000000000000000000
%4A6384FD40000000000000000000000000000000000000000000000000000000000000000
%4A63A4FD60000000000000000000000000000000000000000000000000000000000000000
%4A63C4FD80000000000000000000000000000000000000000000000000000000000000000
%4A63E4FDA0000000000000000000000000000000000000000000000000000000000000000
%4A6404FDC0000000000000000000000000000000000000000000000000000000000000000
%4A6424FDE0000000000000000000000000000000000000000000000000000000000000000
%4A6354FE00000000000000000000000000000000000000000000000000000000000000000
%4A6374FE20000000000000000000000000000000000000000000000000000000000000000
%4A6394FE40000000000000000000000000000000000000000000000000000000000000000
%4A63B4FE60000000000000000000000000000000000000000000000000000000000000000
%4A63D4FE80000000000000000000000000000000000000000000000000000000000000000
%4A63F4FEA0000000000000000000000000000000000000000000000000000000000000000
%4A6414FEC0000000000000000000000000000000000000000000000000000000000000000
%4A6434FEE0000000000000000000000000000000000000000000000000000000000000000
%4A6364FF00000000000000000000000000000000000000000000000000000000000000000
%4A6384FF20000000000000000000000000000000000000000000000000000000000000000
%4A63A4FF40000000000000000000000000000000000000000000000000000000000000000
%4A63C4FF60000000000000000000000000000000000000000000000000000000000000000
%4A63E4FF80000000000000000000000000000000000000000000000000000000000000000
%4A6404FFA0000000000000000000000000000000000000000000000000000000000000000
%4A6424FFC0000000000000000000000000000000000000000000000000000000000000000
%4A6444FFE0000000000000000000000000000000000000000000000000000000000000000
%0A81640000

Appendix C - MAIN LOOP GAME PROGRAM

%4E6698000400004EF90004014C4EF9000401564EF90004000C4EF9000400124EF9000400184EF9
%4E6B080004002000000017E4EF9000401400000000000000004EF900042566000000000000000000000
%4E6188000400400000000000000000004EF900040A0A0000000000004EF90004FF26F0F0F0F0F0F0
%4E6868000400600000000100001000200030000000001002CE08F0001000401290004011300040102
%4E6C08000400800004000000004FFFF00008000000000000010000000000000000000000000AED68C17
%4E6038000400A0FB806A3380F0F0F0F0F0F0F0F0F0F0F0F0F0F0F0F0F0F0F0F0F0F0F0F0F0F0F0
%4E6108000400C0F0F0F0F0F0F0F0F0F0F0F0F0F0F0F0F0F0F0F0F0F0F0F0F0F0F0F0F0F0F0F0F0
%4E6C48000400E0F0F0F0F0F0F0F0F04EF9000450EA4EF9000413AA4EF9000425A04EF9000446C6
%4E689800040100ED7957415252494F52206A6F79737469636B0057415252494F52203C46495245
%4E67F8000401203E20627574746F6E0057415252494F52203C4D414749433E20627574746F6E00
%4E63B8000401400C40000066064EF90001000046FC23004EF900040C0A48E7C0C033C000803100
%4E643800040160 33C00080314030390090400AEF4880790090400C33C000905F6E33F900904008
%4E6FE8000401800093000052790090400 20C79270F00904004670000C00C79004000904002 6C00

%4E6578000401A0FFA6303900904C006600FF9C33F90090402200910310041F90090401A43F90000
%4E6218000401C0F94030106702 5D50544833F10000009103BA33F1000200910393301067025D50
%4E6188000401E0544833F10012009103AC33F10014009103B033F10016009103B2301067025D50
%4E61C8000402005448 33F10024009103CC33F10026009103D033F10028009103D4301067025D50
%4E62080000402203 3F10036009103F633F10038009103F83039009040060240 00FC0C4000306D04
%4E6108000402400A4000FCE24841F9000403C633F000000091002E303900904006320002400 00F
%4E619800040260662641F90091003A02410010660E3239009100383 0C130C130B1600C43F90000
%4E64B8000402 80F17A30D930D9309141EF000F43F90004090110 2900 1B0A00009FB1103039009 0
%4E6328000402A048520C40FFFE670000CC3039009040060240000166 00006A3039009047B40240
%4E63C8000402C0000F41F9000403A6D040323000004 1F90091056022 48D0FC0010D2C14A790090
%4E6218000402E040406B1C0651100006501000643200 50F0000051F00033FCFFFF009040406020
%4E6FD8000403000451100004501000301002 40F00066100250 0FFF025 10FFF33FC000000904040
%4E60E8000403202003900904006024000036648303900904042E9404 1F90091055040F90000F60
%4E6598000403 40D2 0070052009 01C8FFFC3039009040440179 00904042E671 40C7900050090404
%4E630800040360651233FCFFFF00904044600833FC0001009040443039008030030800000036614
%4E6468000403804EB9000001844A40660A2E7800002078000 44ED04EB900000154 4EB9000001 46
%4E6E98000403A04CDF03034E73001E001A001E001A001A000A001C000800080010001000100010
%4E66E8000403C00010001000 10F00FF00EF00DF00CF00BF00AF009F008F007F006F005F004F003
%4E676800 0403E0F002F001F000F000F100F200F300F400F500F600F700F800F900F A00FB00FC00
%4E6498000404 00FD00FE00FF00322F000A7000302F000480C13F00302F000880C14840301F4640
%4E65C8000404204E75303900803000 33C000904 85AE248E5F9C0904028E248E5F90090403030 39
%4E64880000404400080300233C00090485CE248E5F90090402AE248E5F9009040323039008030 04
%4E66080000404603 3C000090485EE248E5F90090402CE248E5F90090403430390080300633C00090
%4E685800040480496 0E248E5F90090402EE248E5F9009040364E753030F0008 322F000430 10C1F0
%4E6648000404A036190A405D3530800 14841323C0000E2810081403 04 8C048 7541F90090 4EAA
%4E635800040 4C060D6322F0006D24141F900903000 0C41007E620E0C70F0801000 5300 0304 00
%4E61C8000404E04E7548E7202043F90090280041F90090300045F90090200034010441004 06100
%4E6FC80004050000B2653030015540024000 3E024107C0D2406100009E651C30015840024000 3E
%4E6838000405200241 07C0D24061000 0BA65084CDF040470FF4E753001E2484CDF04044E75322F
%4E638800040540000 6D24141F9009030000C4107BE630C303010006A4E303C04004E754 0E7 2020
%4E60A8000405604 3F90090280041F90090300045F9009020003401054100406138 602C300 15540
%4E6128000405800240003E024107C0D2406126651A300158400240003E024107C0D2406114 6508
%4E6898000405A04CDF040470FF4E753001E2484CDF04044E754A721000673C6B3C30311000 9071
%4E6F78000405C02000 33C000904 03C6A0244400C4007C0642233C000704038303010009070 2000
%4E614800040 5E033C000904 03E6A0244 4033C00090403A0C4007C04E75303110000 6400 2300240
%4E618800040600F8000440020090712 00033C00090403C6A0244400C4007C064DA33C00090 4036
%4E6E78000406203030100006400100024 0F80090702000 33C00090403E6A02440 33C00090403A
%4E649800040640 0C4007C04E75322F0006D24148E7202043F90090280041F90090300045F90090
%4E619800040660200034013001554002400 03E024107C0D2406100FF3E652A70400C4200806500
%4E68E80004068092406100FF2E651A303C00800C4207C06408D2406100FF1C650870FF4CDF0404
%4E6718000406A04E753001E2484CDF04044E75322F0006D24148E7202043F90090280041F90090
%4E61D8000406C0300045F9009020003401300154400240003E024107C0D2406100FED8652A7040
%4E6728000406E00C420080650C92406100FECB651A303C00800C4207C06408D2406100FEB66508
%4E68B8000407007 0FF4CDF04044E753001E2484CDF04044E75302F0006322F000A48E73F303400
%4E6308000407 20D040D24141F90004088A363010003A30101841F90090280043F90090300045F9
%4E63D8000407400090200047F900904 8643C30100202 46FF803E3110020247FF8038331000D B44
%4E6998000407606 1566A4C47F90090491E34331000D44247F9000408BAD6C2D442D442D6C2D053
%4E68B8000407806136 6A2C905DD053612E6A24905BD05361266A1C905B341 3670ED042611A6A10
%4E6E48000407A0905BD05361126A084CDF0CFC70FF4E75E2484CDF0CFC4E750C4000406D140C40
%4E6A48000407C007FE6F200C71F3FF1002630E064008004E750C71F3FF10026 20474FF4E750640
%4E65A8000407E008004E75B04467F24A72000067EC6B46343000000242FF80944606420 20033C2
%4E65B80004080000904 03C6A040A42FF80B44364CC33C2009040383431000 00242FF80944733C2
%4E6408000408200090403E6A040A42FF80B44364AC33C20090403A4E7534300000642028 00242
%4E6498000408 40F80094463 3C20090403C6A040A42FF80B443648633C2009040383431 00000642
%4E65A8000408600100 0242F800944733C20090403E6A040A42FF80B4436400FF6233C20090403A
%4E61B8000408 80D479009040398A424E75058004000480040004800480048004800480 04800480
%4E6F4800040 8A004800800060007000600060006000600060006000600 0600FFFEFFC00002
%4E6DB8000408C0FFBEFFC2FFC2FFC000020040FFFE0002FFC00040FFC20042004200020040FFFE
%4E6E98000408E0FFC00040FFFE00020042003E003E0040FFFEFFC00002FFFEFFC00040003EFFBE
%4E6B4800040900FFBEFFC0FFFE000200404EB90004FEEA202F00083200E44141F900039FD41230
%4E62B8000409201000E34002400007E02102010003E30148814EB90004FED4207900038 0004EB9
%4E6518000409400004FED4202F0008E5402070000023C8009049C04E754EB90004090A3001E740
%4E6568000409604 1F9000380404 0EF000446FC27004EB90004FF0046EF00040A41000633C10090
%4E6BA8000409804 9C44E754EB90004090A41F90003EE6A43F90003EEC8D2C140EF000446FC2700
%4E67C8000409A04EB90004FF0C46EF00040A41000633C1009049C44E754EB90004090A3001E740
%4E6828000409C041F9000380404 0EF000446FC27004EB90004FF0046EF000433C1009049C44E75
%4E688800040 9E04EB90004090A3001E74041F9000380404 0EF000446FC27004EB90004FF1446EF
%4E62F8000 40A0000041 3C1009049C44E75487900009A104EB900000248538F4E75000000000000
%4E668800040A200000000000000000000000000000909000000000000000000000000 070900000A0A
%4E63E800040A40000000000000000000000000000000000000000000000000000000000000000000
%4E659800040A60000000000000000000000000C0000000D0C000000000000000000000000000000000
%4E664800040A8000000000000000000000000000000F00000000000000000000000000F000000100F
%4E63B800040AA00000000000000C0000000000000000000000000000000000000000000000001200

%4E644800040AC000000000000000000000001200000013120000000000000000000000000000000000
%4E655800040AE0000000000000000000000000000000150000000000000000000000015000000161 5
%4E657800040B000000000000000000000000000000000000000000000000000000000191900001919
%4E6C9800040B20000000000000000000000001A1A00001A1A001919190000191900001B1B00191B1B
%4E6DC600040B4019191A1A00001A1A00191C0000001C1C000000000000000000001D1C00001D1D
%4E640300040B6001C1C0000001C1C00001E1D001C1E1E1C1D1D1C00001D1D001C1F0000001F1F
%4E6A8800040B8000000000000000000000000201F00002020001F1F0000001F1F00002120001F2121
%4E690800040BA01F20201F00002020001F2200000022220000000000000000000000023220000002323
%4E69B800040BC0002322200000222000002423002224242223232200002323002225000000002525
%4E6A2800040BE000000000000000000000262500002626002525000000252500002726002527 27
%4E664800040C002526262500002626002S4E56FFFE48E70030247C009040024EB900043123447EE
%4E660800040C20FFFE4A6266044253 60F8527900904006425233F9009040240090402 24EB90004
%4E684300040C40C024EB900040 4224EB900040CEC4A7900904B24660000444EB90004 55C44EB9
%4E694800040C6000043 88C4EB900045A964EB9000481964EB90004512E4EB900046E544EB90004
%4E6CD800040C80C7F44EB90004C1184EB900044B284EB90004BA564EB900044A9C4EB90004B5FC
%4E6A9800040CA04EB90004635E4EB9000456B44EB90004353C4EB9000420BE4EB9000411B24EB9
%4E664800040CC0000040E844EB90004811A4A52670C33FC0008009048506000FF4A30390090485 0
%4E68D800040CE0E24833C000904850600 0FF3848E73038247C009048D6287C00904AA6267C0090
%4E683800040D0004A3422390 0904FECB2B9009049 3E6700016E23F900904FEC0090493E42433003
%4E669800040D2046C02F004EB900000 1664A80588F670001444A790090484E6700013A4A726614
%4E687800040D404AAA0004660E4AAA0008660 84AAA000C6700000C72FDB2790090485266144A79
%4E650800040D600090485 26C0C4EB900041E4A42B9009048483003E540204A4AB00000670000 82
%4E626800040D803003D040204B527000003403E542204A70003014721FC081D0B0227C0000A21E
%4E643800040DA07 23231 0B00D38020004A3900904858 6F065339009043583003207C009049F4
%4E6C9800040DC042 3000030032 07C009049D000300002000030 03D040204B7200323000007000
%4E64F800040DE030140280000003 00E08052 80B280625A300348C02F004EB9000430AC588F604A
%4E61D800040E003003E540207C009048EE42B000003003D040204B31BC00010000 3403E542204A
%4E604800040E2072003214701FC2802001D080227C0000A21E7200323108002181200003 0348C0
%4E68E800040E402F004EB9000430AC588F3003D040207C00904AA831BCFFFF00003003E540227C
%4E6A3800040E6000009BDC2F3100004EB90004806458 8F6000FEAC524372 04B2436600FEA24CDF
%4E680800040E80 C0C4E7548E72038247C00904944 267C00904942287C009049464EB900000178
%4E656800040EA02200340170FFB041670000284A53670A0C4200FF6616425360184A52670E3002
%4E67B800040EC048C07207C08166044252 60064EB900040F3E4A5367105353 4A536600005C4EB9
%4E694800040EE000040F3E60524A52670E53524A5266484EB900040F3E604053544A546C3A4B79
%4E655800040F00000000074EB9000002424A80588F671034BC001E38BC00F0427900904948 6018
%4E6A1800040F20425452790090494 80C7900B40090494 86P064EB900040F3E4CDF1C044E7542A7
%4E661800040F4042A74EB90000025433FC00B4009049424279009049444279009049484EB90004
%4E6B1800040F6080AC508F4E754E56FFFE48E73038243C009049C6287C00904010267C00904018
%4E698800040F804EB9000001844A8066F642A742A72242485 14EB90000024E360070FEB0434FEF
%4E666800040FA0000C662022422449 14FC0007421A14FC0098421A204A548A4250204A548A30B9
%4E674800040FC000904AA64A436C14487800014 2A72242485 14EB90000024E4FEF000C22422449
%4E64A800040FE0204A528A1010488038804EB90004FED47007B054620000147000 3014E5802040
%4E62980004 1000D1F9000380004A90660438BC0007101A48800240000733C00090400E204A528A
%4E60D80004 1020101048803680 0C5300986500000 80C5300A2630436BC0098101A488002400003
%4E67B80004 104033C000904016204A548A33D0009049BE0C7907D0009049BE6F064279009049BE
%4E63980004 106023FC00008CA000904012204A548A301048C00280000000FF323900904AA648C1
%4E66380004 10800281000000FFB081670000D64EB900041DF248790000800048790000 9D6E4EB9
%4E66480004 10A0000000300363C0294 45EEFFFE508F4A436D6042790090400 24A790090400 26604
%4E61980004 10C0425260F43039008030004BC07203C081660C700123C000904012600000844879
%4E62E80004 10E00000800048780001 4878000270003003 80FC003C02800000FFFF2F0048780018
%4E65480004 1100487800114EB9000002725 3434FEF0018609C424342A7320348C12F014EB90000
%4E65580004 112001C0508F5243700AB04366E842A74878000D4EB9000001C00079800000 704AA6
%4E62C80004 1140700030390090 4AA62F0048780 00C4EB9000001C0700123C0009040124FEF0010
%4E68680004 11604CDF1C0C4E5E4E75227C009049C612F90090401112F90090400F12F90090401 9
%4E66780004 118012F9009040172049548930B9009049BE2049548930B900904AA64878000142A7
%4E68380004 11A0487900904 9C64EB90000024E4FEF000C4E75227C009049C6207C0090401 24A90
%4E60780004 11C0670253904A906600006A20BC00008CA070001011B079009040106600005 07000
%4E6E380004 11E0102900 01B0790090400E660000407000102900 02B079009040186600003 07000
%4E6FD80004 120010290000B079009040166600002041E900043010B079009049BE660000103039
%4E67280004 122000904AA641E90006B05067064EB90004116 84E752F0A247C00904AA64EB90004
%4E67280004 12400F 3F48A742A74EB900041 3AA4EB90000023633C0009048 4E4878000C4EB9C000
%4E67580004 1260 01A834804878000B4EB9000001A872FCC081588F2F00487800 0B4EB9000001C0
%4E60F80004 12807000301202800000 10004FEF0014671E303900 04007002 40EFFF3480700 03012
%4E68280004 12A02F0048780 00C4EB9000001C050 8F4EB900040F664EB90004776E4EB90000014E
%4E68480004 12C042790090496A4279009 04B5070FD33C000904852 48C02F004EB900041F8258 8F
%4E65380004 12E0245F4E754241 3001E540207C009048EE42B000003001E540207C009048D642B0
%4E6E480004 13000000 2001207C009048EA4230000 3001207C009048E642300000 3001207C0090
%4E61280004 132049364230000030014 8C0D080207C00904864427008003 0014 8C0D080207C0090
%4E62880004 13404B00427008003 0014 8C0D080207C00904AF8427008003 0014 8C0D080207C0090
%4E61980004 13604AF04270080 03001D040207C00904B0831BC00010000 3001D040207C00704AAB
%4E69280004 1380 1BCFFFF00003 0014 8C0D080207C009048D631BCFFFF0300524170 04B0416E00
%4E67180004 13A0F4 2 4 2 7900904 8 624E7548E72030342F0016362F001A247C000424FE267C0000

%4E65580004130C0F1C02F3C0091000048790000F140487800404E92300248C0E9805080D080204B
%4E6198000413E03030080033C00090402433C0009040222F3C009105003002E94048C0D080204B
%4E6448000414000487008004878001 04E922F3C009105203003E94048C0D080207C0000F3E04870
%4E63F80004142008004878001 04E927010B0424FEF0024670000D02F3C0091054048790000F660
%4E64D800041440487800104E922F3C009105603002E94048C0D080204B48700800487800104E92
%4E6638000414600C79270F009040044FEF001866142F3C0091058048780010 4EB9000425508F
%4E6498000414806022F3C00910580 3003E94048C0D080207C0000F3E048700800487800104E92
%4E6718000414A04FEF000C2F3C009105E02F3C0091052048780010 4E92487850002F3C007105C0
%4E65A800041 4C02F3C009105E0487800104EB90004251848783002F3C009105A02F3C00710 5C0
%4E6638000414E048780010 4EB9000425182F3C00910200487900 00F740487801004E924FEF0038
%4E641800041500602E2F3C0091054023C0000F6607020D2802F01487800104E922F3C00910560
%4E65C80004152048790000F6A048780050 4E924FEF0018487870002F3C009104002F3C00710500
%4E67E800041540487800004EB9000425184FEF00104CDF0C0C4E752F0A247C000425504240 33C0
%4E61880004156000904022 33C0009040242F3C00910000487800804E922F3C0091020048780100
%4E67880004158 04E922F3C0091050048780080 4E922F3C00910400487800804E924FEF0020245F
%4E6468000415A04E754878000 44EB9000404BA3200588F66047000601 67001B041660470406 00C
%4E63D8000415C07002B0416604700160027002 4E754 8E72038242F0014247C0090485626 7C0090
%4E6458000415E04000287C009040044EB9000416 9220425E8814900C54270F67000092 7007B053
%4E6458000416006 24A7072B053654470003014 80FC01BC484002800000FFFF32000C410149 6310
%4E63D8000416204EB9000415A2580050 0081126000005E0C4100DE630A4EB9000415A281 12604C
%4E6258000416407073B041644600120 00C60400C530093653A0C5300A262347000301480FC00A0
%4E615800041660484002800000FFFF3200707 8B04164060012004C60167050B04164060012 0040
%4E63B80004168 0600A7028B0416404001 2000C4CDF1C044E7548E72020227C0003800030390090
%4E62F800041 6A049C4E2403400D040207C00009BEC3030000048C0220906810000 7B20D0812440
%4E60EB000416C0425 23002D040207C00009BF43030000048C0240906820000 7B20D08224403012
%4E64080004 16E020090680000 07B40244042523039009049C448C0E78024097240D481D0822440
%4E6788000417003012 4CDF04044E7548E72030247C00902000267C009049AE70FF33C000904B6C
%4E64D80004172033C000904B664279009 04B687008B07900904000466144878000 34EB9000404BA
%4E655800041740564033C00090496C588F7072B0790090400063444879000080004879000 09BFC
%4E6278000417604878000448780 01F4EB90000025A48790000800048780001487800037000 3039
%4E6588000417800090400 42F0048780004487800254EB9000002604FEF00284EB900041692 2F39
%4E6868000417A0009049C04EB9000425A0083900070090485658 8F670A42A74EB9000418965 88F
%4E6268000417C0424 13001D040207C0090496E4270000052417020B0416EEA425374203002D040
%4E6268000417E0207C009038003230000 0700AE069703BB041661A7020B0536E044278000 13013
%4E62B800041800525 3D040207C0090496E31820000524 20C4204006DC6424230024 8C052 80D040
%4E614800041820204A427000003002 48C05AB0D040204A427000003002 48C07209D081D040204A
%4E614800041840427000003002 48C0720DD081D040204A4270000030024 8C07211D081D040204A
%4E61780004186042700000300248C07215D081D040204A42700000300248C07219D081D040204A
%4E67C800041880427000005242 7004B0426EBC426A003A4CDF0C044E7543E73E30342F0022267C
%4E63F800041 8A00090380042444 5EB00404A42661A7620321A700AE0697006B04166025244 5243
%4E65C800041 8C00C4304006C2260EB76203A1A700AE06D702AB0456700000 8702BB045660252 44
%4E671800041 8E052430C4304006DE24A4467000 0CE4A426F06B4446F023404424545EB00404A42
%4E657800041900664670 01B0446C40300448C02F004EB9000404BA3C007620588F6024321A700A
%4E671800041920E0697006B041 6616BC45671042A7300348C02F004EB9000446C6508F52455243
%4E665800041940BA446C00007660D44A446F00006E4A426F000068700030048 0C202800000FFFF
%4E672800041960 2F004EB9000404BA3C004243588F321A700AE0693A01702AB0416706702BB045
%4E6908000419806 6E05344BC43671A524 3321A700AE0693A01702AB0416706702BB04566EC5344
%4E6C88000419A06 0E220045 30204B908EE2882F004EB900008 3D45342588F608E4CDF0C7C4E75
%4E62E6000419C0488 73C3E2670 0904B74247C000404BA287C009048624A79009049 6A662A7008
%4E67E8000419E0B0790090400462 204B7800064E922400702FD480588F2F024EB900041D3433FC
%4E67C800041 A0000030090496A588F4A7900904B6E6F120CB900007D2900904B7867062 6B90090
%4E67F800041A20487 84A93671E2013EC8033C0009049B02413703FC4802F024EB900041D344293
%4E62E800041A40588F600833FC006400 9049B00C790098009040006400010C424370003039 0090
%4E644800041A604AA602B0000000E0EAB03A007001B0546600005E7004B0456C1C7408300548C0
%4E682800041A80948048780004 4E92B4B0588F6C045743601E5543601A7404300548C09480487 8
%4E65E800041AA000044E92B480588F6C04554360025343424430044 8C0D080207C0090486 44A70
%4E63F800041AC0080066 00000E5244700 3B0446F0460E2780170 02B05466167407300548C09480
%4E668800041AE048780004 4E92B480588F6C0253431239009048584881300420 7C00008 6FE1030
%4E64C800041B000000483092404A416F1C 3001E440964034014 8C27003C490487800044E92B480
%4E651800041B20588F6F025 3437003B0546604524360087004B0546602544 34A436C1024034822
%4E68E800041B40448 22F024EB900041896588F60144A436F1048 72002A4EB900041D345343588F
%4E686800041B6060EC4CDF1C3C4E7548E738004243742030024 8C0723FC0816606427900904002
%4E61E800041B803002D040207C009038003230000 0700AE06938017039B041660276017039B044
%4E651800041BA06700000B703AB044661042A7320248C12F014EB9000446C6508F52420C420400
%4E6C2800041BC06DAE4A43670E48790000003F4EB900048 064588F4CDF001C4E7548E73820342F
%4E648800041BE000162 62F00183002 48C0721FC081EF80D0802040300248C002800000003E0E880
%4E62A800041C00D0800680009 00000D1C024482003E580D0802040D1FC0000B3802243301906 40
%4E6E2800041C20200034802 80A06840000000802044301906402000 3080204A5488301906402000
%4E62F800041C40308028 0A068400000082204430110640200030804CDF041C4E7548E73020342F
%4E63E800041C6000123002 48C0721FC081EF80D0802040300248C00280000000 3E0E880D0800680
%4E600800041C8000900000D1C024482 27C0000B3983019064020003480260A0683000000302043
%4E6E7800041CA0301906402000 3080204A54883019064020003080260A068300000008220433011

%4E66280004 1CC0064020000308040DF040C4E7548E73800362F0012342F00163003480721FC081
%4E633800041CE0EF80D080204030034BC00280000003E0E880D08006800090000D1C022483202
%4E603800041D007000E161340132029351280906840000008020443002915020495488300029150
%4E64B800041D20280906840000008220443002915040DF001C4E7548E73800342F00124878003E0
%4E628800041D404EB9000404BA3600064300205B8F3003D040207C009020004A70000670C5243
%4E63C800041D600C4304006DEB762060E442A7300248C02F00320248C1207C0000C62470001030
%4E621800041D8018003203480102B1000003E00AB1000003E0ED81D0812F00300248C0207C0000
%4E640800041DA0C6607800183008003203480C1700BE1A1300248C0D080207C0000C5AC30300800
%4E650800041DC048C09280DB812F04300248C0D080207C0000C534303008004BC02F0030034BC0
%4E67F800041DE02F004EB90000BA844FEF00184CDF001C4E75424033C00090400A33C000904008
%4E62C800041E002F3C00905F80487800404EB900042550424033C000903000033C000902800033C(
%4E639800041E20009020002F3C00905000487807804EB9000425502F3C00900000487810004EB9
%4E635800041E40000425504FEF00184E752F0A247C00904852424133C1009040007000030012F0C
%4E6B4800041E604EB90004095670FDB05258BF660E33FC000100904B244EB90004B5FC70FDB052
%4E651800041E8066064EB9000412E4487900000434EB90004806442523 3FC0001009040044EB9
%4E6AC800041EA00000014E4879000000024EB900048064 2F3CFFFFFFFF4EB9000430AC4A79009C
%4E695800041EC0484E4FEF000C67064EB900042E844EB900041708303900904966 48C02F003039
%4E6B6800041EE000904964 48C02F004EB9000413AA427900904B1433FCFFFF00904968508F245F
%4E638800041F004E7548E73C20227C00900000247C0000B3A04200120014004882207C0000BEF2
%4E612800041F20424342444A016616101048804 8C00280000000E0EF8034001218020100 1F301A
%4E631800041F40D04232802A0906850000008022455301524470298044 6ECC2A0904850000148C
%4E691800041F6022455489524370 1EB0436EB6487800104878001 04EB9000413AA508F4CDF043C
%4E680800041F804E7548E72030342F0012247C00904968267C009049BC4EB90000014E4A79009C
%4E67D800041FA04B24670E33FC000100904B244EB90004B5FC48790000000 14EB90004B06433FC
%4E652800041FC00001009040044279009040004EB900041554 4EB9000412E44EB900041DF2487
%4E657800041FE0000000434EB90004806470FEB042508F6600007A207C009049B852503210700D
%4E66F8000420000B0416E2C4279009049BB42A74EB9000001BA4EB90000023633C00090484E4876
%4E675800042020000C4EB9000001A833C000904AA6508F34BC04B04EB900041F024EB90004BF06
%4E610800042040700030390090 4AA602800000400067184A5366144879000000424EB900048064
%4E69D600042060368C0002588F60505353604C70FFB042660C34BC02584EB900047038603A70FI
%4E6DC80004208 0B042660C34BC0E104EB90004246A602870FCB042662234BC02582F3CFFFFFFFF
%4E6A48000420A04EB9000430AC30390090485448C02F004EB90004B654508F4CDF0C044E7548E7
%4E655800042 0C03030247C00904852207C00904968267C009048544A526E00038A4A52662A740C
%4E626800042 0E01439009049397200123900904938700010390090493776001639009049368083
%4E642800042100828084816600035 04A506D00035653504A526700021270FFB05267080C500210
%4C64F80004212060000020 70FEB0526608 0C5004746D00001270FDB0526600007 80C500DD46C0C
%4E627800042140000704A790090434E6700006670003039009048 5A7203C0817203B2806600002
%4E620800042160700030390090485C7203C0817203B2806600002B700030390090485E7203C081
%4E621800042180720 3B28066000014700030390090486 07203C0817203B230671670FF3480320C
%4E68A6000421A048C12F014EB900041F82588F600002B470FDB05267080C50021C6D00000E70FE
%4E61B80004 21C0B052664A0C5004746C4470003039009048 5A02800000000F00CB0000000F0660C
%4E60F8000421E0001870003039009048600280000000F00C80000000F0671670FD34803200 48C
%4E67A8000422002F014EB900041F8258BF6000025670FDB05266080C500DD46D00002270FEB052
%4E65F80004222066080C5004746D00001470FCB052676070FDB052675A0C50021C6C547000303
%4E6EB8000422400090485C0280000000F00C80000000F06600001870003039009048 5E0280000C
%4E6EF80004226000F00C80000000F0672634BCFFFC36BC00082F3CFFFFFFFF4EB9000430AC2F3C
%4E6BF80004228 0FFFFFFFC4EB900041F82508F600001D470FCB05266080C50021C6D00001270FE
%4E6063000422A0B0526600 00B20C50047 44C00007A7000303900904 85C0280000000F00C0000 0C
%4E6168000422C000F06600001870003039009048 5E0280000000F00C80000000F0674A4A53661
%4E66A8000422E070FF348032004 8C12F014EB900041F82588F600016E53537000303900904AA6
%4E62A80004230002800000040067087007B0536602425330BC02583213 48C12F014EB90004B654
%4E6B38000423205 8BF6000013E4A506C0000C433FCFFFF00904B5870FCB052663A4A5366083 48C
%4E626800042340FFFF6000002535370003039009 04AA60280000004006708700 7B053660242 5
%4E67F8000423600 0B0025832134 8C12F014EB90004B654588F60524A5266344AB9009048D6660C
%4E68F800042380001E4AB9009048DA660000144AB9009048DE6600000A4AB9009048E2670E4EB
%4E6D8800042 3A000041E4A42B9009048 48601A535270FCB052661236BC00082F3CFFFFFFFF4EB
%4E6468000423C0000430AC588F4A526700009270FCB0526600000A7008B0536600008232124BC1
%4E6438000423E02F014EB900041F82588F600000704A52660000 6A7001B07900904004670000 5F
%4E674600042400 4A39009049366654 4A390090493766 4C4A390090493866444A3900904939663C
%4E63E8000424203210 48C183FC003C4B4148C14A81662C487900008000487800014878000232 1C
%4E69780004244048C183FC003C48C12F014B78000E4B78000D4EB9000002604FEF00184EB9000
%4E6FD80004246024684CDF0C0C4E754E7548E70030247C0090494A267C0090495A2F3CFFFFFFFF
%4E670800042 4B04EB9000430AC42B9009048484878 00964EB9000409B64EB900041708303900 9C
%4E67D800042 4A049664BC02F00303900904964 48C02F004EB9000413AA487800034EB900046A9C
%4E6F9800042 4C0025700000C0E40000206A000C1010488037400006700025400008254000042 48C
%4E657800042 4E04240374000043740000236 8033FC0004009049624FEF00144CDF0C004E75302F
%4E64F8000425000002 26F0008206F0000424160043 0D95241B2406DF84E7548E73800342F0012
%4E626800042520222F0014226F00184244601A2041548176003610700030 2F001E96804A836C02
%4E65F8000425407600320 35244BB426DE24CDF001C4E75302F0006206F000842416004425852 41
%4E634800042560B2406DF84E754EB900041F02207C00901480424130010640700030C05241701C
%4E62D800042580B0416EF0227900000 1F42079000001DB424030802079000001DC308032804E75
%4E6368000425A048E73C00242F0014427900904 93C42443804D040207C00902000320 4D241227C

%4E6F88000425C000903000424333831000320 4D241227C00902800338310003204D241227C0090
%4E607800042 5E040463383100032 04D241227C009038003383100031830000524 40C4404006DB0
%4E6368000426004244300448C0D0802A00068500905F802045425052447040B0446EE678033004
%4E66A80004262048C0D080207C009048644270080053444A446CEA42790090493A2F024EB90004
%4E610800042640AD0620427009D1C012107000 1001E84833C00090496470001001024 0000F33C0
%4E6078000426600090496620425088121070001001E84833C0009049B470001001024 0000F33C0
%4E6628000426800090 49B648780020487800 0142A74EB9000441F62F024EB9000415CE70003039
%4E6A48000426A00090493C2F004EB9000450EA4EB9000427084EB900042B544EB900043AF04FEF
%4E6588000426C0001 84CDF003C4E752F02322F000A302F000E34000242001F300148C0721FC081
%4E6298000426E0EB80D4407020B0426E0000143002D040207C009020000C708000000660470FF
%4E634800042700600270002 41F4E7548E73000424342423002 48C02F00300348C02F004EB90004
%4E6A6800042720273A508F524 27020B0426EE452437020B0436EDA4CDF000C4E7548E73F30342F
%4E6408000427400026362F002A0242001F0243001F3679009049B442463802EB44D8433004D04C
%4E602800042760207C009038003230000070 0AE0693A017006B041670000107007B0456700000E
%4E66C80004278070 08B045661A300548C05D802F00300448C02F004EB900041BDA508F600000F4
%4E67E8000427A0703BB045661230044 8C02F004EB900041C5A588F600000DC703AB04566043C3C
%4E6578000427C03000487800044EB9000404BA3800E544300348C053802F00300248C02F004EB9
%4E6498000427E0000426C84A804FEF000C67040644001030034 8C053802F00300248C052802F0C
%4E659800042800 4EB9000426C84A80508F670406440020300348C02F00300248C052802F004EB9
%4E64E80004282000 0426C84A80508F670406440040300348C0EF80D0802040300248C0E380D08C
%4E64C80004284006800090000 0D1C02448300448C0D0802040D1FC0000A5C02248380BC9FC003C
%4E64080004286 0D84630 19D04434802E0A06870000008020473019D0443080204A54883019D044
%4E67B800042880308 02F0A06870000000220473011D04430804CDF0CFC4E7548E73838342F001E
%4E64880004 28A0322F0022224 7C00042B72267C000426C8287C00043B423602EA433802024 4001F
%4E63F80004 28C07 03B804166 1 3 00248C02F004EB900041C5A588F6000006270 06B041670000 1C
%4E6428000428E07007B041670000087 50 8B04166163001 48C05D802F00300248C02F004EB90004
%4E65D80004290 01BDA508F60324A416700000870 3AB0416616300448C02F00300348C02F004EB9
%4E63C80004292000 04273A508F6010300448C02F00300348C02F004E92508F300448C02F00300C
%4E671800042 94048C02F004E9130044 8C053802F00300348C053802F004E934A804FEF0010671 4
%4E64B8000429603004 48C053802F00300348C053802F004E92508F300448C02F00300348C053 8C
%4E6698000429 802F004E934A80508F6726300448C02F00300348C053802F004E92300448C02F0C
%4E66D8000429A0300348C053802F004E944FEF0010602830044 8C02F00300348C053802F004EB9
%4E6538000429C00004273A300448C02F00300348C053802F004E944FEF0010300448C052802F0C
%4E65E8000429E0300348C053802F004E924A80508F6716300448C052802F00300348C053802F0C
%4E659800042A004E92508F60183004480 53802F00300348C053802F004EB90004273A508F3004
%4E65B800042A2048C053802F00300348C0 2F004E934A80508F6724300448C053802F0030034 8C
%4E660800042A402F004E92300448C053802F00300348C02F004E944FEF0010300448C052802F0C
%4E65C800042A60300348C02F004E934A80508F6726300448C052802F00300340C02F004E923004
%4E65C800042A8048C052802F00300348C02F004E944FEF0010602830044 8C052802F0030034 8C
%4E668800042AA02F004EB90004273A300448C052802F00300348C02F004E944FEF0010300448C
%4E65B800042AC053802F00300348C05280 2F004E934A80508F6714300448C053802F00300348C
%4E66F800042AE052802F004E92508F300448C02F00300348C052802F004E934A80508F6724300 4
%4E672800042B0048C02F00300348C052802F004E92300448C02F00300348C052802F004E944FEF
%4E641800042B20001030044 8C052802F00300348C052802F004E934A80508F6714300448C0528C
%4E67B800042B402F00300348C052802F004E92508F4CDF1C1C4E7548E73020247C0090200042 4
%4E626800042B6042420C5A8000661470003 0022F00700030032F004EB900042B92508F5242702C
%4E68A800042B80B042 62DE524 37020B04362D44CDF040C4E7548E73E20342F001E362F0022024 2
%4E63F800042BA0001F0243001F3202EB41B2433A39009049B67020B0416F04780160123001D04C
%4E621800042BC0207C009038003830000070 0AE06C7038B0446700001070 37B04467000008703
%4E655800042BE0B04466027A0530034 8C02F00300248C02F004EB900042C9C3200207C00009C24
%4E620800042C00700010301000320548C1C2FC0044D08153 80E580D08006800000A6C022403003
%4E651800042C2048C0EF80D0802040300248C0E380D08006800090000 0D1C024487001B044508F
%4E63E800042C4066060 6323C1000601E7039B0446606323C4000601230044 8C072369081720CE3AC
%4E60E800042C603200064150003019D0413 4802C0A06860000008020463019D04130802 04A548E
%4E657800042C803019D04130802C0A0686000000822046301 1D04130804CDF047C4E7548E7382C
%4E644800042CA0362F0016342F001A247C000426C84244300248C053802F00300348C053802F0C
%4E676800042CC04E924A80508F6702524 4300248C02F00300348C053802F004E924A80508F6702
%4E65D800042CE054443 00248C052802F00300348C053802F004E924A80508F670258443002 48C
%4E649800042D0053802F00300348C02F004E924A80508F670250443 00248C052802F00300348C0
%4E64E800042D202F004E924A80508F67040644001030024 8C053802F00300348C052802F004E92
%4E656800042D404A80508F670406440020300248C02F00300348C052802F004E924A80508F6704
%4E63C800042D600644004030024 8C052802F00300348C052802F004E924A80508F670406440080
%4E675800042D80300448C04CDF041C4E752F0A247C0000025A207C00904936 4A79009048626600
%4E64B800042DA000E07001B0790090400467000 0D470FFB07900904968670000C84A10660000C2
%4E629800042DC04A28000166000 8A4A2800026600 00B24A28000366000 0AA48790000000 04EB9
%4E64E800042DE000048064487900008000487900009FBC487800 0C487800054E9248790000 8000
%4E66D800042E00487900009FD0487800 0D487800054E9248790000800048790000 9FE4487800 0E
%4E665800042E204878 00054E92487900008000487900009FF848780 00F487800054E924879000 0
%4E655800042E40800048790000A00C48780010487800054E924879000080004879000 09FBC487B
%4E664800042E6000114878 00054E924879000000424EB90004806433FC0001009049BC4FEF006B
%4E665800042E80245F4E7548E73038247C00904018267C0000025A287C009040164242 7008B079
%4E641800042EA00090400464000 08A4A790090496C66000080740148780003 4EB9000404BA5640

%4E624800042EC033C00090496C381233C1009040007000300012F004EB90004095630145240D152
%4E632800042EE00C5200A2508F631E3012044000A20640009853403480OC520098660A30145240
%4E61A800042F00024000033880 4EB90004BEC05380D040207C00009E10303000005240 33C00090
%4E6C1800042F20484C2F3CFFFFFFFF4EB9000430AC588F207C009050004241424330FC8000524C
%4E693800042F40701DB0436EF47046D1C05241701EB0416EE648790000000DE4EB9000480644A42
%4E65A800042F60588F670000AA48790000800048790009D864878000548780001 4EB900000260
%4E64C800042F802F3C00008400487900009D944878000B487800054E9348790000800048780001
%4E66F800042FA04878000270003039009048 4C80FC003C02800000FFFF2F00487800 0B4878000E
%4E664800042FC04EB9000002602F3C0000840048790009DA84878000C487800054E932F3C0000
%4E699800042FE08C00487900009DBE4878000E487800074E932F3C00008C004879000009DD04878
%4E65D80004300000F487900054E934FEF0068603C48790000600048790009FAC4EB900000200
%4E6FF8000430204879000080004878000148780003700030390090400042F00487800094878001C
%4E6768000430404EB9000002724FEF00202F39009049C04EB9000415CE4EB90004AA3870003039
%4E644800043060000904AA6028000000400588F660A33FC00B400904B14600833FC009600904B14
%4E677800043080 4CDF1C0C4E752F02207C0090500042424241425852417 01DB0416EF67046D1C0
%4E66F8000430A05242701EB0426EE8241F4E7548E73C38302F0022247C00000142287C00904852
%4E6208000430C0267C0000025A3A0032054A406C000178207C0090500042433803741D70058044
%4E6348000430E06606424406430400721C42585341 4A416CF8720C30030640800030C053414A41
%4E67480004310 06CF272154258534 14A416CF8524453424A426CC80C7900980090400064122F3C
%4E6588000431200000940048790000 9F404E92508F60104879000080004879 00009EBE4E92508F
%4E620800043140487900008000487900009F1A4E92700030390090 4AA6028000000400508F670C
%4E66E8000431600008 4A546C0000DC4879000080004879 00009EF24E924A79009048 4E508F6712
%4E66E80004318048790000800048790009EC04E92508F60104879000080004879 00009EDE4E92
%4E6618000431A0508F4A790090484 6 670E72003239009 04AA6701 FC2806002721F48790000800C
%4E62E8000431C04878000148780004D281207C0000A21E7000303018002F004878001A4878001E
%4E63E8000431E04EB9000002604A79009048 4E4FEF001867507000303900904AA6028000000300C
%4E6448000432 00E0805280320 03A017001B0416C342F3C00008400487900009EAC4E922F3C0000
%4E6508000432208400487800014878000130054 8C02F00487800 1B4878001F4EB9000002604FEF
%4E61E800043240002042457203340160 0002E6300248C05280ED802200E580D081D0800680009C
%4E63C80004326050 3A22403002D040207C00009E083830000007204760C32C453434A436CF8706E
%4E65D80004328 0D3C053414A416CEC30044 8C02F003002E540207C00009F9C2F3000004E923002
%4E6668000432A048C02F004EB9000435E2300248C02F004EB90004363C300248C02F004EB90004
%4E6268000432C037263602C7FC000550433002207C009049360C30000400004FEF001466123002
%4E6618000432E048C02F004EB900047ED2588F6000024 0300248C0D080207C009048644A700800
%4E60880004330066 0000764A546D0000703002207C009049360C30000200006 65E3002D040207C
%4E61E8000433200090 4A3C3030000 0B0790090400467484879000080004879 00009EA230034 8CC
%4E63B8000433402F004878001E4E93300448C02F004878000148780003720032390090 4A702F01
%4E64C800043360300348C02F0048780 0274EB9000002604FEF0028600001B8300248C0D080207C
%4E63E800043380009048644A70080066464A546D423002E540207C009048D64AB0000066323202
%4E64F8000433A0D241207C00904AA870FFB07010006720487900008000487 900009E9430034 8CC
%4E64B8000433C02F004878001D4E934FEF0010600001603002E540207C009048D64AB00000670C
%4E63E8000433E0000870FDB054663A4A790090484E673270003039 00904AA6028000000400660C
%4E64E800043400012E4879000080004879 00009E86300348C02F004878001D4E934FEF0010600C
%4E618800043420010E300248C0D080207C009048644A70080066123002207C009049360C300002
%4E6378000434400000660000 0A70FDB054660 0009C4A790090484E670000927000303900904AA6
%4E6FE800043460028000000300E080380052443002D040207C00904A3498700 0006F00006C7001
%4E685800043480B0446C1E2F3C00009C0048790000 9E78300348C02F004878001D4E934FEF001C
%4E687800043 4A0601C2F3C00009C00487900009E6A300348C02F004878001D4E934FEF00102F3C
%4E6298000434C000009C00487800014878000130044 8C02F00300348C02F00487800234EB90000
%4E63F8000434E002604FEF0018604630024 8C0D080207C009048644A70080066123002207C0090
%4E636800043500049360C30000200006600000870FDB054661C2F3C00009C004879 00009E5C3003
%4E6D18000435204 8C02F004878001D4E934FEF00105342B4456C00FD184CDF1C3C4E7570FEB079
%4E61D80004354000904852670 0009A70FFB0790090485267000 08E3239009040060241000 33001
%4E60D80004356020 7C009049360C300004000067000072300 1E540207C009048D64AB00000670C
%4E6E480004358000600839000200904007672030012 07C009049D00830000000000671030014 8CC
%4E6198000435A02F004EB9000435E2588F60343001207C009049D0083000010000660000163001
%4E66A8000435C0E540207C009048D60CB0000000C800006C0E300148C02F004EB90004363C588F
%4E63D8000435E04E752F02342F000A3002D040207C00009E0830300000 48C02F00487800014878E
%4E6498000436000007300 2E540207C009048EE2F30000030024 8C0C1FC00055EB02F004878001D
%4E655800043620 4EB9000002603002207C009049D0023000FE00004FEF0018241F4E7548E7380C
%4E62A80004364034 2F00123602C7FC00055E433002D040207C00009E0838300000300348C0538C
%4E6298000436 60ED80D08006800090503E22403202D241207C00904B087001B0701000641E3002
%4E614800043680D040207C00904B083030000006400030064080003 2C032BC8078600432C43284
%4E64B8000436A03002D040207C00904AA83030000048C0720FC08172082806F283202D241207C
%4E65C8000436C000904AA870FFB07010006716300248C0D080207C009048644A7008006704383C
%4E6288000436E0800032044 8C12F0148780001487800053002E540207C009048D62F300000320C
%4E640800043700 48C12F0148780025 4EB900000 2603002207C0090490002300 0FD00004FEF001E
%4E688800043720 4CDF001C4E7548E73E00362F001A70FDB079009048526700 00DA42453003E54C
%4E627800043740207C00009DE62270000032032 07C009048EA70001030100 0B0456308524532FC
%4E650800043760 98A160E6300548C0720C3803207C009048E67400143040009282B0816C125245
%4E65D80004378030 03D040207C00009E0S32F000006 0D4700CB0456F08524532FCB8A360F23003
%4E63E8000437A0E540207C00009DE62C300000048600000180224 6300348C0D080207C00904AFE

%4E6E48000437C002300800300D040207C00009E0836300000424530 01E24032000801000067 1C
%4E6178000437E03005D040207C00009DFC343000006002340330052 07C00009DF61030000048 8C
%4E67E80004380048C0D0802040D1C9308252457006B0456EC24CDF007C4E75206F000442404A1E
%4E6498000438206704524060F848C04E752F02322F000A302F000E340002420 01F300148C0721F
%4E6098000438840C081EB80D4407020B04263047000603830020040207C009020003030000000C4C
%4E6678000438609D1864047000602000C409D3C6404700160160C409D7C6404700260000C409DA0
%4E6648000438806204700360027000241F4E7548E73038247C009049D4267C00000BD4287C009C
%4E60D8000438A049E442433003D040204A34300000670002303003D040204C3030000048C0C189
%4E66A8000438C0B2FC0000C1896D000218C189B2FC0003C1896E00020C22402009 2240D3C02009
%4E6FC8000438E0303B00064EFB0002000800880104018432030241204A0442002031821000702C
%4E6DC8000439000B042630E3003D040204A4270000060000 1D03002D040207C00902000303000000
%4E6798000439203200 0C409D7C65140C419DAC620E700030022F004E93588F600001A60C419D18
%4E6328000439406520 0C419D38621A700030022F004E933003D040204C31BC0003000058 8F6000
%4E6E18000439600180 3003D040204A427000006000017232030241204A5242318210000C42040C
%4E6D48000439B0650E3003D040204A4270000060000152300 2D040207C0090200030300000320C
%4E68A8000439A00C409D3C65140C419D6E620E700030022F004E93588F6000012 80C419D18651E
%4E6258000439C00C419D38621870003 0022F004E933003D040204C427000005 88F60000104300
%4E6FF8000439E0D040204A42700000600000F63203D241204A064200203182100 00C420400650E
%4E6CD800043A003003D040204A4270000060000 0D43002D040207C0090200030300000032000C40
%4E686800043A209D7C65140C419DAC620E700030022F004E93588F600000AA0C419D1865200C4
%4E625800043A409D38621A700030022F004E933003D040204C31BC0001000058 8F600000843 00
%4E6F6800043A60D040204A42700000600000763203D241204A534231821000702 0B04263 0C300
%4E6FC800043A80D040204A427000006056300 2D040207C0090200030300000032000C409D3C6512
%4E693800043AA00C419D6E620C700030022F004E93588F602E0C419D18651E0C419D386218700
%4E61F800043AC030022F004E933003D040204C31BC0002000058 8F600A3003D040204A427000 0C
%4E66E800043AE05243700BB0436200FDBC4CDF1C0C4E7548E7300074014243700030032F00700C
%4E60A800043B0030022F004EB90004382A3200508F671C700030012F00700030032F0070003002
%4E681800043B202F004EB900043C284FEF000C52437020B04362C452427020B04262BA4CDF000C
%4E64C800043B404E7548E73030362F0016342F001A267C0004382A247C00043C280243001F0242
%4E62D800043B60001F300248C053802F00300348C02F004E933200508F671A700030012F003002
%4E667800043B8048C053802F00300348C02F004E924FEF000C300248C052802F00300348C02F0C
%4E668800043BA04E933200508F671A700030012F00300248C052802F00300348C02F004E924FEF
%4E62F800043BC0000C300248C02F00300348C053802F004E933200508F671A700030012F003002
%4E66D800043BE048C02F00300348C053802F004E924FEF000C300248C02F00300348C052802F0C
%4E65F800043C004E933200508F671A700030012F00300248C02F00300348C052802F004E924FEF
%4E662800043C20000C4CDF0C0C4E7548E73020342F0012362F0016322F001A247C0004382A0242
%4E632800043C40001F0243001F7002B041665E700030032F0070003002 53802F004E924A80508F
%4E61B800043C606600000187000300 32F00700030025 2802F004E924A80508F671870003 0032F0C
%4E62D800043C80700030022F004EB900043E12508F6000017C700030032F00700030022F004EB9
%4E62D800043CA000043F0C508F6000016470038041665E7000300353802F00700030022F004E92
%4E63C800043CC04A80508F660000187000300352802F00700030022F004E924A80508F6718700C
%4E609800043CE030032F00700030022F004EB900043E1250BF6000011870003 0032F0070003002
%4E61C800043D002F004EB900044080508F60000100700030032F00700030025 3802F004E924A8C
%4E626800043D20508F660000187000300 32F00700030025 2802F004E924A80508F674870003003
%4E60F800043D4053802F00700030022F004E924A80508F660000327000300352802F0070003002
%4E63E800043D602F004E924A80508F6600001A700030032F00700030022F004EB90004408050BF
%4E610800043D80600000BA7000300353802F00700030022F004E924A80508F660000187000300
%4E62C800043DA052802F00700030022F004E924A80508F67467000300 32F00700030025 3802F0C
%4E643800043DC04E924A80508F66000030700030032F00700030025 2802F004E924A80508F660C
%4E61A800043DE00018700030032F00700030022F004EB900043F0C508F60147000300 32F00700C
%4E691800043E0030022F004EB900043E12508F4CDF040C4E7548E73E20342F001E362F0022247C
%4E611800043E200004382A0242001F0243001F4246700030032F0070003002 53802F004E924A8C
%4E63A800043E40508F67027C017000300352802F00700030022F004E924A80508F670254467000
%4E629800043E6030032F00700030025 2802F004E924A80508F6702584670003003 53802F00700C
%4E65E800043E8030022F004E924A80508F670250463A02EB4DDA433205D241207C00902000300
%4E61E800043EA0D040227C0000A02031B1000010003805D844207C00902800320370 0BE169318 1
%4E61D800043EC040003605D643207C00903000320270 0BE1690A41F8000641000931813000360 5
%4E636800043EE0D643207C009040463005D040227C0090404632310000024103FF3406700AE162
%4E676800043F00D24231813000 4CDF047C4E7548E73E20342F001E362F0022247C000426C80242
%4E65A800043F20001F0243001F300348C053802F00300248C02F004E924A80508F66047A06604C
%4E650800043F40300348C055802F00300248C02F004E924A80508F6734300348C053802F003002
%4E676800043F6048C053802F004E924A80508F661C300348C053802F00300248C052802F004E92
%4E666800043F804A80508F66047A036002424530 0348C052802F00300248C02F004E924A80508F
%4E661800043FA066045445604830 0348C054802F00300248C02F004E924A8050BF67323 00348C0
%4E660800043FC052802F00300248C052802F004E924A80508F661A300348C052802F00300248C0
%4E66F800043FE053802F004E924A80508F6602524 53C02EB46DC433206D241227C00902000300
%4E601800044000D040207C0000A04033B000001000 3806D844227C009028003003720BE360320 9
%4E601800044020D241207C0000A052907010003380400036 06D643227C009030003005D040207C
%4E60B800044040000 0A0643030000720BE3620A42FB00D042338030003206D241227C0090404C
%4E625800044060300 6D040207C00904046303000000240 03FF064028003380100 04CDF047C4E75
%4E642800044080 48E73E20342F001E362F0022247C000426C802420 01F0243001F300348C02F0C
%4E65A800044 0A0300248C053802F004E924A80508F66047A06604C300348C02F00300248C0558

%4E6748000440C02F004E924A80508F6734300348C053802F00300248C053802F004E924A80508F
%4E6558000440E0661C300348C052802F00300248C053802F004E924A80508F66047A0360024245
%4E647800044100300348C02F00300248C052802F004E924A80508F660454456048300348C02F0C
%4E646800044120300248C054802F004E924A80508F6732300348C052802F00300248C052802F0C
%4E66C8000441404E924A80508F661A300348C053802F00300248C052802F004E924A80508F6602
%4E62980004416052453C02EB46DC433206D241207C009020003005D040227C0000A07631B1000C
%4E61380004418010003806D844207C009028003003720BE360318040003606D643207C0090300C
%4E61E8000441A03005D040227C0000A09A303100003202740BE5610A41F8003405D442227C000C
%4E6188000441C0A08892712000D041318030003206D241207C009040463006D040227C0090404
%4E68F8000441E030310000024003FF06401400318010004CDF047C4E754E56FFFA4BE73F3C342E
%4E6678000442000000A362E000E3C2E0012287C0090493A2D7C00903800FFFC267C009020004A4
%4E64580004422060E300648C0320248C1D0816000025E426EFFFA600002487001B043670000
%4E6348000442407039B043670000087038B043665E3002D040204B31BC800000003802D844207
%4E606800044260009028003002720BE36090790000C5AE318040003202D241207C00903000300
%4E6548000442804BC00280000003E00A80000003E0ED80318010003802D8442A6EFFFC204D300
%4E6208000442A0720AE3603180400060001CE703AB0436700002070 3BB04367000018 7006B04
%4E6118000442C0670000107007B0436700000870 08B043665E3002D040204B31BC80010000380
%4E6388000442E0D844207C00902800300 2720BE36090790000C5AE318040003202D241207C009
%4E63C8000443003000300248C00280000003E00A80000003E0ED80318010003802D8442A6EFFF
%4E61F800044320204D3003720AE36031804000600001 4A7005B04366244A790090493C6712700
%4E65A80004434030390090493C2F004EB900008BD4588F33C20090493C60000120702B8043662
%4E6658000443603802D844244B487800034EB9000404BAD080207C0000CBE235B008004000588
%4E6308000443806018 3202D241204B30034 8C0D080247C0000C53431B20800100 03A02DA45207C
%4E6228000443A0009028003203 48C1247C0000C6607000183218003802720BE364D044320348C1
%4E63D8000443C0D281227C0000C5AC90711800318050003802D844207C0090300032034 8C1247C
%4E6098000443E00000C6247000103218003202 48C10281000003E00A81000003E0ED81D0413180
%4E6558000444004000 3802D8442A6EFFFC204D3003720AE3603180400032 02EA415241D2417040
%4E6538000444208041 6E02723F4A416D2A300148C0D0802E00068700905F8020474A5066163001
%4E6368000444404 8C05341D0802E00068700905F802047308260D23002D040207C009040463194
%4E6918000444600000 4A5467103214D2412A6EFFFC204D3002D17010003882524 2526EFFFA3E2E
%4E6FC80004448 0FFFABE466D00FDB2300248C04CDF3CFC4E5E4E754BE73F30362F0026342F002A
%4E66C8000444A03A2F002E247C0000C5AC267C0090493C7005B042661E4A53670E700030132F00
%4E6658000444C04EB900008BD4588F36835243300348C0600001EE4A42660A5243300348C06000
%4E6248000444E001E03C0342473647600001CA7001B042670000127039B042670000 0A7038B042
%4E6198000445006600007030064 8C02F004EB900008BD43006D040207C0090200031BC80000000
%4E6238000445203806D844207C009028003206700BE161926A000231814000320 6D241207C0090
%4E60F8000445403000300648C00280000003E00A80000003E0ED80318010003806D844207C0090
%4E6228000445603800320270 0AE161318140005 88F6000013E703AB042670000227 03BB0426700
%4E6098000445800 01A7006B042670000127007B04267000 00A7008B0426600007030064 8C02F00
%4E6358000445A04EB900008BD43006D040207C0090200031BC800100003806D844207C00902800
%4E6058000445C03206700BE161926A000231814000320 6D241207C00903000300648C002800000
%4E6318000445E003E00A80000003E0ED80318010003806D844207C009038003202700AE1613181
%4E65C8000446004000588F600000A8702BB042661A487800034EB9000404BAD080207C0000CBE2
%4E6278000446203270080058 8F6010300248C0D080207C0000C5343270080042A7300248C02F00
%4E6F78000446403202 48C1207C0000C6247000103018003206 48C10281000003E00A81000003E0
%4E6578000446 60ED81D0812F003206 48C1700BE1A1300248C0207C0000C66078001830080 0D284
%4E6508000446803002 48C0D080204A30300800 48C092802F01300948C02F00300648C02F004EB9
%4E6728000446A000008A34 33C300 80493A4FEF00180446002052 4BB6C56D00FE3452433003 46C0
%4E6A98000446C04CDF0CFC4E754BE73E36342F00263 62F002A247C009020002 67C00042898287C
%4E61E8000446E000903800 3A02EA453C020246001F4A4366000 0B43002D040204A0C7080000000
%4E6018000447006740 3002D040204A0C708001000067323002D040204A4A700000672630024 8C0
%4E66F8000447202F004EB90000BBD4300648C02F00300548C02F004EB900043B424FEF000C6000
%4E6E08000447400356 3002D040204A0C708000000067000012 3002D040204A0C7080010000 6600
%4E60B800044760033636 02D643204A3002D040224C4241338100003802D844227C009030003001
%4E60F8000447803380400032 02D241227C009028003380100031803000 42A7300248C02F004E93
%4E6158000447A0508F600002F27001B043670000127038B0436700000A7039B0436600000C03002
%4E6188000447C0D040204A0C708000000673C3002D040204A0C708001000 0672E3002D040204A
%4E6648000447E04A700000672230024 8C02F004EB900008BD4300648C02F00300548C02F004EB9
%4E62680000448000004 3B424FEF000 3002D040204A31BCB0000000 3802D844207C009028003202
%4E6308000448207 00BE1613003 48C0 180227C0000C5AC927108003181400032 02D241207C0090
%4E606800044840300 0300248C00280 0003E00A80000003E0ED80318010003802D844204C3203
%4E640800044860700AE16131814000300348C02F00300248C02F004E9350 8F6000021C703AB043
%4E60F80004488067000 22703BB04367000 01A7006B0436700001270 07B0436700000A7008B043
%4E6138000448A0660000B63002D040204A0C708000000673C3002D040204A0C708001000 0672E
%4E63A8000448C03002D040204A4A7000006722300248C02F004EB900008BD4300648C02F003005
%4E66A8000448E048C02F004EB90004 3B424FEF000C3002D040204A31BCB00100003802D844207C
%4E6098000449000090280032027 00BE16192790000C5AE318140003202D241207C009030003002
%4E6248000449204 8C00280000003E00A80000003E0ED80318010003802D844204C3203700AE161
%4E6218000449403181400030034 8C02F00300248C02F004E93508F600001403002D040204A0C70
%4E6EF8000449608000000670000103002D040204A0C70800100006622 3002D040204A3802D844
%4E641800044980224C4241338140003181000042A7300248C02F004E93508F7005B04366204A79
%4E67A8000449A00090493C671270003039009049 3C2F004EB900008BD4588F33C20090493C42A7

```
%4E60D8000449C0300348C02F003203348C1227C0000C62470001031180032024BC1028100000 3E0
%4E6548000449E00A81000003E0ED81D0812F0032024BC1700BE1A1300348C0207C0000C6607800
%4E639800044A0018300800D284300348C0D080207C0000C5AC3030080048C092802F0130034BC0
%4E63B800044A20D080207C0000C534303008004BC02F0030024BC02F004EB900008A847003B043
%4E687800044A404FEF0018661C4B7B0002300648C02F0030054BC02F004EB900043C284FEF000C
%4E668800044A6060207004B043661A487B000330064BC02F0030054BC02F004EB900043C284FEF
%4E691800044A80000C300648C02F0030054BC02F004EB900043B42508F4CDF1C7C4E7548E73000
%4E608800044AA042423002D040207C00904A4C3030000036007201B24066163002E540207C0000
%4E63D800044AC0A2E62F3000004EB9000480645B8F7000303900904006 7207C081670000087001
%4E65D800044AE0B04366367004B04366163002E540207C0000A2F62F3000004EB9000480645B8F
%4E611800044B004A4367163202D241207C00904A4C3003E340024000073180100052427004B042
%4E6DF800044B206E804CDF000C4E754E56FFFE48E73E3C267C009048D6287C00904862283C0090
%4E62D800044B4048EA70003039009040067 23FC081660000844243300 3E540204B4AB000006700
%4E62C800044B60006C3003207C009049360C300001000066 5A300348C0D080207C009048644A70
%4E6FD800044B8008006748 3003E540204B53B000003003207C009049D000300002000 03003E540
%4E658800044BA0204B0CB0000000C800006C2048780004320348C12F014EB90004AFF632034BC1
%4E688800044BC02F014EB9000467DC4FEF000C52437004B0436E804245424330034BC0D080207C
%4E646800044BE0009048643C3008006700049C3003D040207C009049FB4A7000006D0E3003D040
%4E62F800044C00207C009049F8537000003003E540204B4AB000066000 3F67A0130032A44204D
%4E61C800044C204A300000660000 6A42A74878001B72001239000 0C63F3006D040247C00903000
%4E624800044C407400343200000 2820000FF80D2822F01740014390000C67B3006D040207C0090
%4E62D800044C6028007200323000000 2810000FF80D4812F023039000 0C56A48C02F0030064BC0
%4E63D800044C802F004EB900008A844FEF0018600000B030032A44204D0C3000010000 6608203C
%4E647800044CA000000AFC6006203C00001D763D40FFFE30032A44204D0C300001000066047009
%4E6D4800044CC06002701132403003 2A44204D0C300001000066047000 6006203C000002003040
%4E60F800044CE032032A44244D7000103210002F00487B0035340648C20282000003E00A820000
%4E661800044D0003E0ED82300948C0D4802F02320648C1700BE1A1700010390000C695D2803008
%4E6A2800044D2048C092802F01302EFFFE48C02F0030064BC02F004EB900008A844FEF00183203
%4E664800044D4048C12F01340648C22F024EB900045FBA300348C052B0D040207C009020004A70
%4E63C800044D600000508F672032034BC12F014EB900008E90300348C052B0D040207C00702000
%4E631800044D8042700000588F3003 4BC07219D081D040207C009020004A700000672632034BC1
%4E648800044DA07418D2822F014EB900008E90300348C07219D081D040207C00902000 42700000
%4E622800044DC0588F30032A44204D42300000 3003207C009048E6423000003003207C00904936
%4E62F800044DE0423000003003 48C0D080207C00904864427008003003D040207C00904B0831BC
%4E659800044E00000100003003D040207C00904AA831BCFFFF0000300348C0D080207C00904AF8
%4E630800044E2042700800300348C0D080207C00904B00427002003003 48C0D080207C00904AF0
%4E673800044E404270080030034 8C0D080207C00904BD631BCFFFF080053547003B05466120839
%4E642800044E60000600904B56660300390020009048560C790098009040006 50E4A54660A33F9
%4E622800044E8000904A72009040007008B07900904004620E4A54660A33F900904000 0090401 0
%4E624800044EA03403E542247C00904A243203D241207C00904A34700030 3010002F003003E540
%4E650800044EC0207C009048EE2F3000004EB9000404062 58020004A93508F660000604AAB0004
%4E6B6800044EE066584AAB000866524AAB000C664C5279009049BE0C7907D0009049BE6F3C7000
%4E61B800044F00303900904AA60280000 2000672600798000 00904AA67000303900904AA62F00
%4E652800044F204878000C4EB9000001C0700123C0009040125 08F427900 9049BE3203D241247C
%4E646800044F4000904A347000303210002F00340348C22F024EB90000019C320348C12F014EB9
%4E652800044F60000478AE320348C12F014EB9000430AC3003D040247C0000A2AE30320000 48C0
%4E690800044F802F004EB900040 4BAE5803203E541207C0000A29ED0B0100058BF2A402F154EB9
%4E65F800044FA00004B06480 03E5404700000A2B62F3200004EB9000480644A544FEF00186616
%4E679800044FC04A7900904B245 70E33FC000100904B244EB90004B5FC7001B079009040046 60A
%4E69D800044FE033FC0258009049686 00E33FC04B0009049684EB900042D8AB67900904B666600
%4E61A80004500000864EB90004C34A6000C07C3003E540204B0CB0000000C800006C00006A3203
%4E630800045020D241207C00904AA83003D040247C00704AAB30320000524002407FFF31801000
%4E60D8000450403003E540204B22300000EA813001D040247C0000A0AC30320000 48C03203D241
%4E64B8000450602 07C00904AA834301000 48C2C08266163003E540247C0000A2C62F3200004EB9
%4E65C80004508000048064508F52437004B0436E00FB4A4A45674E42433003E540204B4AB00000
%4E62FB000450A0673B3203D241207C00904B087000303010003214 48C1D281B081651E7001B054
%4E621800045 0C06D0472016006321448C1D2813003D040207C00904B0831810000524 37004B043
%4E67A8000450E066B44CDF3C7C4E5E4E752F02342F000A223C000001E8300248C00280000003E0
%4E6628000451000A60000003E0E280928C706C92802F0132024BC1701FC280E9815981706 89280
%4E6BD8000451202F014EB9000454D4508F241F4E754E56FFF648E73F38267C00904856247C0090
%4E6308000451404864227C00904B624A5167000380081300056708 3A3C80013C0560044245 3C05
%4E6F080004516 03D7C7FFFFFFC3D6EFFFCFFFA363900904008044300983803064402003D7C027C
%4E64B80004518 0FFF83E2EFFF89E790090400A3D47FFF83D6EFFF8FFF6046E0200FFF642473847
%4E65A8000451A0300C48C0D080204A4A700800670000DA300C48C0D080207C00904BD64A700800
%4E6DD8000451C06D3A300C48C0D080207C00904BE03D700800FFFE322EFFFE48C1701FC280E981
%4E64E8000451E03401594232 2EFFFE48C10281000003E00A81000003E0E28130016034300C48C0
%4E61D800045200D080204A30300800D040207C00902800343000 00EE4A300C48C0D030204A3030
%4E617800045220 0800D040207C00903000030300000EE48B4436C0606420200 6008D4446D040442
%4E66D8000452400200B06EFFF6600606400200600AB06EFFF86D0404400200081300056726BA42
%4E61B8000452606C023A02BC406C023C003E2EFFFCBE426F043D42FFFC3E2EFFFABE406F0A3D40
%4E6B38000452B0FFFA6004DA42DC40524C7204B24C6E00FF100813000567 22322EFFFC48C13005
%4E693800045 2A048C0D2B0E2813A01322EFFFA48C1300648C0D280E2813C016014300548C081D1
```

%4E6618000452C048C03A00300648C081D148C03C00303C01EB90463C00300548C02F004EB90004
%4E6518000452E055603A00300648C02F004EB9000455923C00081300065 08F660001BE42473847
%4E68A800045300300C48C0D080204A3D700800FFFE6700019E360551433803064400E0302EFFFE
%4E61B800045320D040207C0090280034300000EE4A300248C0320348C1048100000090B0816C06
%4E602800045340064202006016300248C0320448C1068100000090B0816D0404420200B4436D00
%4E672800045360006B4446F063A390090400836065143380306440 0E8343C01E8302EFFFED040
%4E61F800045380207C0090300030300000EE489440300248C0320348C104810000008CB0816C06
%4E6138000453A0064202006016300248C0320448C106810000008CB0816D0404420200B4436D00
%4E65B8000453C00006B4446F063C390090400A300C48C0D080207C00904BD64A7008006D0000D0
%4E6A08000453E036055143380306440 0E0300C48C0D080207C00904BE03D700800FFFE322EFFFE
%4E63B80004540048C1701FC280E98134015942300248C0320348C1048100000090B0816C060642
%4E6FB80004542002006016300248C0320448C1068100000090B0816D0404420200B4436D000006
%4E680800045440B4446F063A39009040083606514338030644 00E8343C01E8322EFFFE48C10281
%4E60980004546000000 3E00A81000003E0E28130019440300248C0320348C104810000008CB081
%4E6178000454806C06064202006016300248C0320448C106310000008CD0816D0404420200B443
%4E6708000454A06D000006B4446F063C390090400A524C7204B24C6E00FE4A300648C02F003205
%4E6C88000454C048C12F014EB9000454D4508F4CDF1CFC4E5E4E752F02322F000A342F000E0839
%4E6248000454E000030090485666147005B0416F047205600A0C4101246F04323C012408390002
%4E62B80004550000904856661470 01B0426F047401600A0C4201186F04343C01183001024001FF
%4E62B8000455203 3C000904008300 2024001FF33C00090400A30390090400848C05180EF8033C0
%4E65E80004554000904A6C203C00000108323900904 00A48C19081EF8033C000904A6E241F4E75
%4E61C80004555602F02322F000A207C0090400804410068341094417003B0426E0632105541600A
%4E64D80004558070FDB0426D0432105441300148C0241F4E752F02322F000A207C0090400A0441
%4E6398000455A0006C341094417003B0426E0632105541600A70F0B0426D043210544130014 8C0
%4E65C80004555C0241F4E752F024242300248C0D080207C009048644A700800670000CC4A790090
%4E6108000455E0485266143002D040207C0090402832300000241001F601E3002E540207C0090
%4E6E68000456004 94A20700000082800000001670470006002701C3200701CB041660000 8A3002
%4E6318000456202 07C009048E64A300000675A33C20090402670003002E5805E80D080207C0000
%4E6118000456 40F14033F008000090402230022 07C009048E6533000004 879000000264EB90004
%4E65B8000456608064300248C02F004EB90004372648790000800030 0248C02F004EB90004AFF6
%4E667800045680 4FEF0010602048780010300248C02F004EB90004AFF6487900000 04B4EB90004
%4E6978000456A080644FEF000C52427004B0426E00FF1A241F4E7548E73838247C00902000267C
%4E6568000456C000904BD6287C00008E904244300448C0D080207C0090488C4A70080067303004
%4E6488000456E048C0D080207C0090488C53700800661E300448C07211D081D040204A42700000
%4E661800045700320448C17010D2802F014E94588F4A4466000146300448C07219D0815800D040
%4E601800045720204A4A70000067000130526B0008362B0008E243082B000000096600011C7005
%4E64D800045740B0436600007E343900904BE8303900904868D040204A33F00000000904BD43239
%4E6558000457600 0904B6848C12F014EB900008BD433C200904B683002D040204A4270000042A7
%4E63C8000457800487B003F320248C10281000003E00A81000003E0ED817012D2802F01320248C1
%4E6628000457A0700BE1A10481000002002F01487817093002 48C02F004EB900008A844FEF001C
%4E67F8000457C0605C700BB04366184878000432390090 4BE848C12F014EB900046070508F603E
%4E64D8000457E07010B0436614303900904B68D040204A31B900904BD4000060247016B0436C1E
%4E6D58000458004878001C4E94426A003A277CFFFF00084EB90004D98C4EB90004D6A8588F700B
%4E633800045820B0436F123003D040207C0000A25E35700000003A6022700BB0436E1C7016B043
%4E63C8000458406D16300348C0720B9081D040207C0000A25E35700000003A300448C07219D081
%4E623800045860D040204A4A700000670000EE300448C0D080204B5270080036300800E2433004
%4E6368000458804 8C0D080204B08300000008 01660000CA7005B0436610320448C12F014EB90004
%4E6A58000458A0DE90588F605E700BB0436610320448C12F014EB90004DED2588F60487010B043
%4E6868000458C0661032044 8C12F014EB90004E2AC588F60327016B0436C2C320448C1701BD280
%4E6828000458E02F014E94300448C07219D081D040204A42700000300448C0D080204B31BCFFFF
%4E6458000459000800588F700BB0436F1E300448C07219D0813200D241204A3003D040227C0000
%4E647800045920A25E31B100001000700BB0436E2A7016B0436D24300448C07219D0813400D442
%4E62E800045940204A300348C0720B9081D040227C0000A25E31B100002000300448C0720DD081
%4E61E800045960D040204A323000006700011C300448C0D080207C009048CE5270080036300800
%4E641800045980E243300448C0D080207C009048CE08300000080166 0000F00C4109246D500C41
%4E68E80004559A0095A6E4A700EB0436E22320448C1700CD2802F014E94300448C0720DD081D040
%4E63E8000459C0204A427000000588F600000BC300448C0720DD0813200D241204A3003D040227C
%4E66A8000459E00000A0BA31B1000010006000009A0C410EFC6D4E0C4110FC6E487004B0436E22
%4E653800045A00320448C1700CD2802F014E94300448C0720DD081D040204A427000000588F6000
%4E611800045A200066300448C0720DD0813200D241204A3003D040227C0000A0D631B10000100C
%4E661800045A4060447004B0436E20320448C1700CD2802F014E94300448C0720DD081D040204A
%4E646800045A6042700000588F601E300448C0720DD0813200D241204A3003D040227C0000A0DE
%4E6CD800045A8031B10000100052447004B0446E00FC3E4CDF1C1C4E754E56FFFE48E73E38267C
%4E631800045AA000903000247C00902800287C009020004244300448C0D080207C0090487C4A70
%4E64A800045AC008006710300448C0D080207C0090487C5370080052447008B0446ED642443004
%4E62B800045AE048C0528032003C013001D040204C4A700000670003E2300448C0D080207C0090
%4E627800045B004894363008007008B0446E0000243004D040207C00904A544A7000006D483204
%4E652800045B20D241207C00904A547006B07010006F36320448C12F01340348C22F024EB90004
%4E6DC800045B4007123D40FFFE508F6D1C320448C12F01342EFFFE48C22F024EB900048C804A8C
%4E615800045B60508F660004447000303900904006320448C1B38008000000660000CE3004D040
%4E642800045B80207C00904A54537000003D700000FFFE6C203004D040207C0000A2063204D241
%4E6A7800045BA0227C00904A543D700000FFFE33AEFFFE10007004B0446F3E36060643204C3004

```
%4E6B7800045BC048C0E980320448C1D281227C0090491E32311B0048C1E381342EFFFE48C2D282
%4E669800045BE0740FC282D081D080227C0000C6DC31B10800300060527008B0446F323406D442
%4E68B800045C00204C300448C0D080227C0090491E3031080048C0E380322EFFFE48C1D081D080
%4E65B800045C20227C0000C4D231B10800200601A3206D241204C302EFFFE48C0D080227C0000
%4E62E800045C40C4F231B10800100003006D040204A3A3000009A7900904A6C3006D040204B343C
%4E63A800045C600000947900904A6E0C457400620000080C427800633032044BC12F014EB9000C
%4E6Q4800045CB08E903006D040204C427000003006D040204A427000003006D040204B4270000C
%4E647800045CA0588F600003047008B0446E543004D040207C00904A544A700000664432044BC1
%4E66A800045CC02F01340648C22F024EB9000461163204 48C12F014EB900008E903006D040204C
%4E617800045CE0427000003006D040204A427000003006D040204B427000004FEF000C600002AA
%4E6BD800045D00300448C0D080207C0090491E3D700800FFFE7004B0446F603404E742D46EFFFE
%4E621800045D20300448C0D080207C00904AFB083C0000308016704064200283206D241204A3002
%4E621900045D40D040227C0000A0E630310000D17010003A301000EE4D3206D241204B3002D04C
%4E613800045D60227C0000A17630310000D17010003430100 0EE4A600001007008B0446F543606
%4E660800045D80D643204A322EFFFE48C17420D2823001D040227C0000A0E630310000D1703000
%4E68D800045DA03A303000EE4D3606D643204B322EFFFE48C17420D2823001D040227C0000A176
%4E619800045DC030310000D17030003430300 0EE4A600000A636045143300348C0D080207C009C
%4E637800045DE04A963203 48C1D281227C00904A863231 1800D370080030300800 48C0020000CC
%4E63F800045E00FF803206D241204A74003430100 0727FC481D0823206D241204A3A0031851 00C
%4E672800045E203005EE483A00300348C0D080207C00904A9E320348C1D281227C00904A8E3231
%4E61E800045E401800D370080030300800 48C002800000FFB03206D241204B740034301000727F
%4E62A800045E60C481D0823206D241204B340031821 0C03002EE4834007000300550 80E3803600
%4E608800045E80024300 1F7200320250810281000001F00A81000001F0E3813001D6403004 48C0
%4E66E800045EA0D080207C0090489 1B6700800670000FA320448C12F014EB900008E903204 48C1
%4E680800045EC02F01340348C22F024EB900008DC84FEF000C600000D47004B0446F0000003004
%4E635800045EE048C0D080207C009048644A70080067 0000B83004207C009049360C3000080000
%4E61C800045F00670000A64A7900904852661030 04D040207C0090485A303000006014300 4E540
%4E602800045F20207C0090494A22700000301102 4000F30800000166000072300448C0D080207C
%4E634800045F4000904AF04A700800665E3004D040207C0090490E4A7000006700002230044 8C0
%4E621800045F60D080207C0000C0403230080030 04D040227C00904916827100006C2C30040040
%4E654800045F80207C00904916427000003004D040207C0090490E31BCFFFF00003004D040207C
%4E6B3800045FA00090490642700000524 4700CB0446E00FB2E4CDF1C7C4E5E4E7548E73300362F
%4E608800045FC00012342F00163802064 4000D3004D040207C009020004A700000671230024 8C0
%4E656800045FE0720CD0812F004EB900008E90588F3004D040207C0090200031BC092400003204
%4E6F2800046000D241207C009028003003D040227C009028003031 00000240FF800240318010 0C
%4E6E480004602032 04D241207C009030003003D040227C0090300030310 0000240FF80064000 12
%4E635800046040318010003002 48C02F003203 48C12F014EB900008D86300248C0D080207C0090
%4E6AB8000460604BCE31BCFFFF0800508F4CDF001C4E7548E73800362F0012342F00163802064 4
%4E615800046080001930 04D040207C009020004A700000671230024 8C07218D0812F004EB90000
%4E62B8000460A08E90588F3004D040207C0090200031B90000A25E00003204D241207C0090280C
%4E6FD8000460C03003D040227C009028003031 00000240FF80524031801000 3204D241207C009C
%4E6DF8000460E030003003D040227C009030003031 00000240FF80064000123180100030024 8C0
%4E6A58000461002F0032034 8C12F014EB900008DBA508F4CDF001C4E7548E73C38342F002238 2F
%4E6F3800046120002624 7C00902800267C009030002 87C009020003A04024500030645000D3005
%4E66B800046140D040204C4A700000671030054 8C053802F004EB900008E9058 8F7208B2446F0E
%4E650800046160300 5D040204C31BC0EFC0000600C3005D040204C31BC1C5C00000C4204006D5C
%4E601800046180044204007220B2426F06064200 20600A0C4204006F0404420020320 5D241204A
%4E6078000461A0300448C05280D040224A3031 00000240FF805240318010003205D241204B3004
%4E6168000461C048C05280D040224B3031 00000240FF800640000931801000600000FC320248C1
%4E6358000461E0701FC2806642320 5D241204A300448C05280D040224A3031 00000240FF805240
%4E600800046200318010003205D241204B300448C05280D040224B3031 00000240FF800640000 9
%4E6F68000462203180100060000 0B03002D040204A720032300000 7038C2807608B6816D223002
%4E6F98000462 40D040204A7200323000000281 0000FF8052813005D040224A3601338300006028
%4E6E680004626 03002D040204A72003230000002810000FF80068100000200528130 05D040224A
%4E60A8000462803601338300 00EE433002D040204B72003230000002810000FF807009D2803005
%4E6478000462A0D040224B3A0133850000EE457220B2426F24320348C15081E881340102420 01F
%4E6268000462C0300548C0508002800000 01F00A80000001F0E380D440300448C07603C0832F00
%4E65C8000462E0300248C02F004EB900008D86320448C17003C2802001D080207C009048CE4270
%4E6288000463000800508F4CDF1C3C4E752F024201424230 02D040207C009038003030000000240
%4E63F800046320FC000C400C00670000080C40100066103002 48C02F004EB900008B04720158 8F
%4E675800046340524 20C4204006 6C84A01670E48790000001 54EB9000480645 88F241F4E7548E7
%4E652800046360303824 7C0090485226 7C00904936287C0090400052B900904A744A790090 4862
%4E6ED8000463806600023270001 02B000372001 22B000274001 42B0001760016138483828 28081
%4E6EA8000463A008000001670002 0E7400343900902020700030390090201E72003239009020 1C
%4E66A8000463C0760036390090201A828380818480660001E470FDB05266284E8900041 2E44279
%4E66A8000463E000904968 4A7900904B24670001C833FC000100904B244EB90004B5FC600001B6
%4E628800046400 4A7900904B14660000 8E33F900904A700090400432390090 4A72388170003001
%4E634800046420 2F004EB900040984424158 8F3001D040207C00904A3C31B9009040040000524 1
%4E6E18000464407004B0416EE62F3CFFFFFFFF4EB9000430AC4EB900042E844EB900041708323 9
%4E6818000464600090496648C12F013239009049644 8C12F014EB9000413AA0C5400984FEF000C
%4E634800046480640001324879000000494EB900048064588F6000012053790090 4B144A790090
%4E6438000464A04B1466000110700 1B052663C42527000301 42F004EB9000409E04EB900042E84
```

%4E67080004640O4EB90004170832390090496648C12F0132390090496443C12F014EB9000413AA
%4E63D8000464E04FEF000C600000CE42423002204B083000010000670E320248C12F014EB90004
%4E6C8800046500 6AEE588F52427004B0426EDE4EB900046A444EB9000419C04EB90004C5864EB9
%4E6488000465200004308642790090 4B160C54009865444EB90004BEC022005381300 1E540207C
%4E631800046540 0000A2762F3000004EB9000480644878000 34EB9000404BA22003001E540207C
%4E64E8000465600000A306588F2F3000004EB90004803C508F60407008B0790090400462364878
%4E66280004658000104EB9000404BA720DB280588F6C24487800034EB9000404BA22003001E540
%4E6498000465A0207C0000A312588F2F3000004EB90004803C588F42423002D040207C00904028
%4E6438000465C0303000004 8C0721FC081721CB28066000 1A83002E540207C009048D64AB00000
%4E6FEB000465E067363202D241207C00904A347000303010007200323900904AA6028100000300
%4E6300000466 00E0815281B0816510300220 4B4A30000066064A526C0000264A790090484E6600
%4E623B000466293002204B4A300000670000124A790090484E660001444A526C00013E4A790090
%4E69B8000466404B4E66224A526C1E4EB900041E4A42B900904848320248C12F014EB900046A9C
%4E658800046660588F600001144A790090 4B146600008C4A52660000864A79009049686D00007C
%4E6B68000466804A790090486266604EB900043086700030142F004EB9000409562F3CFFFFFFFF
%4E67B8000466A04EB9000430AC4879000000434EB90004806442B900904B744EB900041554 4EB9
%4E6668000466C0000417083239009049664 8C12F01323900904964 48C12F014EB9000413AA42B9
%4E6838000466E000904A744FEF0014320248C12F014EB900046A9C588F600000804A790090 4B14
%4E674800046700660000684A7900904862664E4EB900043086428900904B744A790090484E6634
%4E654800046720 4A526D307000301 42F004EB9000409564EB9000417083239009049664 8C12F01
%4E67D80004674032390090496448C12F014EB9000413AA4FEF000C42B900904A74320248C12F01
%4E69F8000467604EB900046A9C588F600E320248C12F014EB900046 8CA588F52427004B0426E00
%4E681800046780FE364CDF1C0C4E752F02342F000A7001B07900904862670000 0E0CB900000258
%4E66E8000467A000904A746D0E4879000000654EB90004803C588F0CB900000 25800904A746D00
%4E6708000467C000183002E540207C0000A31E2F3000004EB90004803C588F241F4E7548E73C00
%4E63E8000467E0362F00163003207C009049F44A300000660000D23003D040207C009049F84A70
%4E64F800046800000 06C0000C0320348C1D281207C00904AF870003030180072FEC08167464878
%4E67680004682000084EB9000404BA7203B280588F6C34424442453203 48C1D281207C00904AF8
%4E6408000468407000303018007201 1405E5A1C08167025244524570 08B0456EDA7001B0446C04
%4E662800046860780360 0E4878000 34EB9000404BA3800588F300348C0E58022403004E540207C
%4E6598000468800000A37ED3F000002F114EB90004803C3004E540207C0000A32E2F3000004EB9
%4E6388000468A00004803C3003207C009049F411BC000100003003D040207C009049F831BC0708
%4E6848000468C00000508F4CDF003C4E7548E73820242F0014247C009048524A790090484E6700
%4E6688000468E0000A70FDB0526600007A3002E540207C009048EE42B0000070FDB052663E3202
%4E622800046900E541207C009048D67000303900904AA6028000000300E0805240360078003839
%4E6368000469 2000904AA6701FC8B03004D040227C0000A21EC6F100002183100060163202E541
%4E618800046940207C009048D67000303900 00A25C218010003002D040207C00904A3431BC0001
%4E65880004696000004A52660A2F024EB9000001CC588F7001B0790090486267000 00A4A790090
%4E67F8000469804B166F06427900904B163002D040207C00904AA831BCFFFF00003002E540227C
%4E6438000469A00000A2D62F3100004EB9000480647001B0790090 4004588F6700000A4A790090
%4E61B8000469C04B1466103002207C0090493611BC00010000600E3002207C0090493611BC0002
%4E6458000469E00000 3002207C009049F44230000 03002D040207C009049F831BCFFFF00007002
%4E62F800046A00B0790090486266184241300120 7C00904A204230000052417004B0416F0E60EA
%4E66A800046A203002207C00904A20423000002F024EB9000430AC2F024EB900046788508F4CDF
%4E613800046A40041C4E7548E7300042403600340048C272033001207C009049360C3000010000
%4E63F800046A60661C3001D040207C00904A34D67000003001E540207C009048EED4B000005341
%4E6A0800046A804A416CCE2202700EE0A1300148C081C3D139009048584CDF000C4E752F02342F
%4E698800046AA0000A300248C02F004EB900046AEE4A80588F6736300248C02F004EB9000468CA
%4E64B800046AC07003B07900904862588F6700000C7004B0790090486266120839000600904856
%4E674800046AE066080039002000904856241F4E7548E73E20342F001E247C009048624A52660A
%4E62D800046B0036390090493C600000C44246300648C0D080207C009048643A30080067000090
%4E60A800046B2042443004D040207C0000A39E36300000300502400 3E0D640024303E03004D040
%4E663800046B40227C0000A38E30310000D0450240001FD640300348C0721FC081E9805980EF80
%4E61B800046B60907900904A6C0C40700062000038300348C00280000003E00A80000003E0E280
%4E635800046B80EF80907900904A6E0C40740062000016320348C12F014EB900046D384A80588F
%4E681800046BA0660000 2A52447004B0446E00FF7652467004B0466E00FF5648790000004A4EB9
%4E650800046BC0000480647000588F60000168300248C0E7805880D080207C0000C79C3A300800
%4E630800046BE03002D040207C009048FE31BC0004000032024 8C12F0142A7300348C00280000 0
%4E666800046C0003E00A80000003E0ED807212D0812F00380248C4700CD330320348C1700BE1A1
%4E638800046C200481000002 0CD8812F04300548C02F00300348C02F004EB900008A843002207C
%4E63A800046C40009049360830000 100004FEF00186614320248C12F01300348C02F004EB90004
%4E667800046C605FBA50 8F300248C0D080207C009048643183080 03002D040207C00904A3C31B9
%4E615800046C800090400400 003202D241207C00904A443602D643227C00904A18424033803000
%4E632800046CA03602D643227C00904A0833803000 3602D643227C00904A00338030003602227C
%4E604800046CC000904B101B00138430003002D040227C00904A4C76001604338300003183100 0
%4E67A800046CE03002D040207C00904A1031BC003C0000300248C0D080207C00904BD631BCFFFF
%4E60E800046D000600300 2207C0090493611BC000100005252700 1B0526612300220 7C000086FE
%4E68D800046D2013F0000000904858600642390090485870FF4CDF047C4E7548E73E20322F001E
%4E6FD800046D40227C00902000702 0B0416C0000160C4104006C00000E3001D04020494A700000
%4E605800046D6067067000600000E83A01700BE16504450200300148C00280000003E00A800000
%4E62C800046D8003E0ED803440424530060040207C0000A39E383000000300102400 3E0D84030 0
%4E627800046DA0D040207C0000A38E30300000D0410240001FDB407020B0446C000038 0C4104 0

%4E608800046DC06C0000803004D04000494A70000067000072300 4D040207C00902800760030 0
%4E6DF800046DE000007000300596605404D4422049700030302000028000008000670604830000
%4E60F800046E0002004A836C062003448026000C83000007C06E00002E3004D040207C00903000
%4E60A800046E207400343000007000300A94804A826C062002448024000C82000007C06E047000
%4E6BC800046E40600C52467008B0466E00FF3E70FF4CDF047C4E7548E72020227C00904A80207C
%4E638800046E6000904 00A4A7900904862670 0007C3039009040080440001 7EF4033C000904A82
%4E636800046E80303C00F99050EF4033C000904A84301048C006800000011802800 00001F0E680
%4E63E800046EA048C0D080068000905F822440301 2D0403280660A303900905F80D04032803010
%4E63F800046EC048C051800280000001F0E68048C0D08024000682009 05F822042301048C02F00
%4E6A2800046EE04EB900008000588F4CDF04044E7548E73E203A2F001E362F0022342F0026247C
%4E635800046F00009028003002 48C05880D080207C00904 87C31BC003C08003005D040204A0070
%4E614800046F20001000003C05DC46207C009040463005D040227C00904046303100000 24003FF
%4E634800046F403803720AE364D0443180600030024 8C05380D080207C0090486431850 8003002
%4E64C800046F6048C05380D080207C0090491E318308003002 48C053802800D884207C0000A206
%4E632800046F80320248C153812001D080227C00904A543C30480033860800 3005D040204A3830
%4E630800046FA000000244FF803005D040207C009030003A30000002 45FF807009B0426F423003
%4E61A800046FC0D040207C0000A5803030000006 40000DD8403003D040207C0000A590DA700000
%4E625800046FE03202D241207C009020003003E34048C0D080227C0000C4D231B108001000606 0
%4E60D80004700030 03D040207C0000A5A0DB7000003003D040207C0000A5B0DA70000030024BC0
%4E64280004702072099081D040207C00904A9631840000300248C0720990 81D040207C00904A9E
%4E6F180004704031850000320 2D241207C009020007000300 6D080227C0000C4F231B108001000
%4E6DE8000470603202D241204A30045240318010003202D241207C009030003005064000093180
%4E62B800047080100 03004EE483800300 5EE483A0070003004720CD081E8803600024 3001F7000
%4E6068000470A0300550800280000001F00A80000001F0E380D640320248C12F01700030032F00
%4E6B98000470C04EB90000BD94508F4CDF047C4E7548E73F30382F0026362F002A302F002E247C
%4E6678000470E0009049624A79009048526C0A53524A526D1A6000013A340048C2487800204EB9
%4E65680004710000040 4BAB480588F6F0001244A790090485266104878 00044EB9000404BA3640
%4E61280004712058 8F600442473647 3C0B600000F23006D040207C0000A5503A3000003004024 0
%4E619800047140 03E0DA40024503E03006D040207C0000A53830300000D0440240001FDA403405
%4E65A8000471604 8C22F024EB900046D384A80588F670000AC3006D040207C0000A56834300000
%4E61C8000471804 8C22F02300348C02F00300348C0207C0000C6247200123008003005 48C00280
%4E61C8000471A0000003E00A80000003E0ED80D2802F01300348C0207C0000C660740014300800
%4E6178000471C0320548C1700BE1A104810000020 0D4812F023006D040207C0000A56832300000
%4E65D8000471E048C1300304400009 48C081FC000348C0EF80D2802001D080207C0000CBE83030
%4E64E800047200080048C02F0030054 8C02F004EB900008A8434BC00014FEF00186012524 63006
%4E6AA800047220 48C0340B48C25082B0826D00FF024CDF0CFC4E752F02302F000A48C081FC0002
%4E60F800047240320034390 0904AEE0242000730 02D040207C0000A3BE303000004 8C02F003001
%4E655800047260 48C02F004EB900047280300 2D040207C0000A3AE303000004 8C0508F241F4E75
%4E6468000472804 8E73800342F0012362F00164244300448C0D080207C0090488C4A7008006600
%4E6448000472A000A6300448C0D080207C0090488C31BC003C0800300448C07211D0813200D241
%4E60C8000472C0207C009020003003E540227C0000A3CE31B100021000300448C07211D0813200
%4E6088000472E00241207C009028003002D040227C00902800303100000240FF80584031801000
%4E6EB800047300300448C07211D0813200D241207C009030003002D040227C009030003031000 0
%4E60A800047320024 0FF80064004000 6400010318010003204 48C12F01300248C02F004EB90000
%4E6BC800047340 8D9E508F600A52447004B0446E00FF404CDF001C4E7548E73F38302F002A362F
%4E62F800047360002E207C00902800247C00904A443200D241227C009040463A311000700AE06D
%4E665800047380320 3D241227C00903800367110007 00A3E0BE06F3647320B48C12001C1898 2FC
%4E6AB800047 3A00009C1896D0002AAC1898 2FC0018C1896E00029E224043E9FFF720092240D3C0
%4E609800047 3C02007303B00064EFB000200200026002C0038003C0040004A004E0052005C005C
%4E63F800047 3E0005C0066006A006E0084740A4244600A7414780 46004741E78083 87C01006000
%4E636800047400006878 0C60067810600278143 87C0200600002 1C780C60067810600278143 87C
%4E60B800047420040060000 20A781C387C080060000200780C600678106002781438 7C10003203
%4E650800047440D24122480271FFEF1000600001E2781838 7C20003205D241227C00904A4C0071
%4E63A80004746000011000600001C832034 8C12F014EB900008BD4320248C12F0134054 8C22F02
%4E688800047480 4EB90004A9A44FEF000C320548C1D281227C0090401A33BC000C18007218B24B
%4E661800047 4A06600007C320548C1D281227C00904AFB2009C189083100051801C18967047438
%4E619800047 4C0600274183205D241224A2009D442207C0000A3F634302000 2240D57110003205
%4E64C800047 4E0D241224A2009C1890C7100C81000C189632C3205D241224A42711000320548C1
%4E6BF80004750 02F01340348C22F024EB900045FBA320348C12F014EB900008BD44FEF000C3205
%4E659800047520 48C1D2B1227C00904AFB2009C189083100051801C18967047C2060027C003605
%4E669800047540E543227C009048D62009320548C134044 8C2D282D286D241207C0000A3F63230
%4E651800047560100038014 8C1C18993B13000C1896C0E3205E541227C009048D642B110003205
%4E62F80004758 0D241227C00904A00200934042240D5711000320448C12F01340C48C22F023005
%4E670800047 5A048C02F004EB90004AFF63205227C009049D0003100021000 7209B24B4FEF000C
%4E67E800047 5C06E1E720BB24B6D183005E540207C0000A5282F3000004EB9000480645 88F602A
%4E66B8000475E07218B24B67244B7800044EB9000404BA22003001E540207C0000A476588F2F30
%4E661800047600000 04EB9000480645 88F3 20548C12F014EB900047656427900904B224A790090
%4E6538000476204B16588F6F2A4279009 04B1660223203D24122482009C189083100051001C189
%4E66D8000476406 600FE483203D24122 48007100201000 4CDF1CFC4E7548E73020362F0012227C
%4E637800047660 00904A7B30034 8C0D08020495370080030034 8C0D08020494A7008006C603403
%4E657800047680 48C2D48224494B78000 84EB9000404BA32003039009048 62D040207C0000A50A
%4E626800047 6A0D2700000358128003003247C0000A52410320000488048C02F004EB9000404BA

%4E6308000476C0E5B022403003E540207C0000A514D3F00000568F2F114EB9000490645 08F4CDF
%4E6538000476E0040C4E75102F00070C0000416D120C00005A6E0C488048C07237908160000 06E
%4E61C8000477000C0000306D120C0000396E0C488048C0723090916000005 60C00000865067032
%4E61180004772060000 04A0C0C003F66047024603E0C00003B66047027603 40C00002166047028
%4E61E8000477406 02A0C000023660470296020 0C00003A6604702A60160C00002E6604702B600C
%4E68A8000477600C00002C6604702C600270254E754E56FFF848E73020247C00904AA648780 00C
%4E68A8000477804EB9000001AB34807000301202800000800058 8F672642AEFFF84202486EFFF8
%4E6598000477A042A71002488048C02F004EB9000001B44FEF000C52020C02000466E042790090
%4E65F8000477C04002420276FF42A71002488048C02F004EB9000001AE20404A90508F66044203
%4E6588000477E0601C48780004100248B048C02F004EB9000001AE20404A90508F660276040C03
%4E6578000478000 0F 7446036120248 81C2FC0050207C0 0BD3C10034880E740D0C148700000
%4E64B8000478201003488048C02F001002488048C02F004EB9000001B44FEF000C52030C03000A
%4E6048000478406 6C442790090400252020C0200046600FF7470003012028000008 00067160252
%4E6578000478607FFF700030122F004878000C4EB9000001C0508F420310034880E540207C0090
%4E6278000478804ABCD0C0224842011001488041E9000111BC0041000052010C01000366EA5203
%4E67F800047 8A00C03000466D04CDF040C4E5E4E752F02342F000A3002E540207C00904A242F30
%4E62E8000478C00000300248C02F004EB9000001C63202207C00904ACC118010000C00000A508F
%4E66F8000478E06C00006E3002207C00904ACC4A3000006D5E3002E540207C00904ABCD0C02248
%4E62D8000479003002207C00904AB811BC00A000003002D040207C00904AA831BC0A8C00003002
%4E614800047920D040207C00904AB04270000042113002207C0090493611BC000400000C790708
%4E66B80004794000 9049BE6F1A33FC07080090 49BE60103002D040207C00904AA831BC02580000
%4E6D28000479603 00248C02F004EB9000430AC588F241F4E754E56FFF848E73E3C342E000A267C
%4E6848000479800 0904AB0287C00904AA82C3C00904AB83002E540227C00904ABCD2C024491612
%4E6188000479A03002D040204C4A7000006 70A3002D040204C537000003002D040207C0090485A
%4E6278000479C030300000EB481A0046053002D040204B383000001205488148C17009C2806716
%4E6728000479E04A446D0E52440C4400A06F2E383C00A060284244602412054381 48C17006C280
%4E67C800047A0067164A446E0E53440C44FF606C0C383CFF6060064244600242443002D040204B
%4E612800047A2031B4000030022A46204D7800183000006702534 44A446600011A10034 88041EA
%4E6ED800047A400001123000003002D040204B4A7000006700 00B43002D040204B4A7000006F04
%4E601800047A6052016002530 10C01000966047220604 00C010021660472416036 0C01005B660C
%4E63B800047A804A0367047208602872206 0240C01000766047 25A601A0C01001F660C4A035704
%4E61B800047AA07208600C725A60080C010040660272204879000080001003488043EA00011381
%4E672800047AC000001001488048C02F004EB9000476E4588F2F0030024 8C0C1FC00055C805480
%4E662800047AE02F001003488048C0E3807224D0812F004EB90000224508F2F004EB90000020C
%4E635800047B004FEF000C60024244300 22A46204D118400003002D040204B4A7000006F1C223C
%4E60A800047B20000000A03002D040204B3030000048C09230EA813801504460183002D040204B
%4E600800047B4032300000 48C1068100000 0A0EA8138015044 30022A46204D118400003002D040
%4E62C800047B60207C009040283230000048C1700FC280700CB0816700001E3002D040207C0090
%4E61E800047B8040303230000048C1700FC280700CB081660000F03002D040204C0C700A140000
%4E664800047BA06C0000E0300248C0C1FC00055C8054802F001003488048C0E3807224D0812F00
%4E620800047BC04EB900000224280032 02D241227C00009E087000303110002F0010034 88041EA
%4E651800047BE0000110300000488048C02F004EB9000476E4588F2F002F044EB90000020C1003
%4E61F800047C00488041EA00010C30000800004FEF0014671052033002D040204C31BC03340000
%4E643800047C20600253030C0300036C564A036D52300248C0C1FC00055C8054802F0010034880
%4E636800047C4048C0E3807224D0812F004EB900000224280048790000800010034880 43EA0001
%4E67B800047C601031000048 8048C02F004EB9000476E4588F2F002F044EB90000020C4FEF0014
%4E60E800047C8014B33002D040204C4A7000006700000A0C030003660 0009A3002E540207C0090
%4E665800047CA04A242D700000FFF842031203488141EEFFFC10034B8043EA000111B1C0001000
%4E662800047CC052030C03000366E2486EFFF83C02227C00904ACC1031000048804 8C02F003002
%4E628800047CE048C02F004EB9000001B43002207C0090493642300000 3002D040207C00904028
%4E6FA800047D003202D241227C0090403042433383100031830000 3002D040204C31BC02580000
%4E6F3800047D20300248C02F004EB9000430AC4FEF00104CDF3C7C4E5E4E754E56FFF848E73E20
%4E62A800047D40247C000001423 23C009733C1009040007000300 12F004EB9000409D64EB90004
%4E66C800047D601709303900904966 48C02F003039009049644 8C02F004EB9000413AA33FC000
%4E64F800047D800090400833FC000500 90400A48780400487900 00BE944E924878080004879000 0
%4E6C9800047DA0BEA64E9248780C004879000 0BEB84E92487810004879000 0BEC84E9242A74879
%4E628800047DC00000BE7C4EB9000002004 2034FEF003408030000 6704701B600270023C001003
%4E626800047DE04880E2404A406704701360027003 3A0010034880D040207C00009E083830000 0
%4E642800047E000444800042021002488048C02F001003488048C02F004EB9000001AE244043E
%4E667800047E20FFF80C020009508F670412FC002012FC00230C020009660A12FC003112FC0030
%4E605800047E4060081002060000311 2C012FC002041EA00044 20012D852000C00000366F64211
%4E695800047E60300448C02F0048 6EFFF81002488048C0320548C1D0812F00300648C02F004EB9
%4E63C800047E800000025A300448C02F004878000148 7800072F1210024 88048C0320548C1D081
%4E670800047EA02F00320648C17009D2802F014EB9000002604FEF00 2852020C02000A6600FF48
%4E6D9800047EC052030C03000466 00FF084CDF047C4E5E4E754E56FFFC48E73830342E000A247C
%4E65A800047EE000904ACC3002E540207C00904ABCD0C02648300 2D040207C00009E08383000 00
%4E65C800047F001602C7FC00055C034879000080004879000 0BED61003488048C052032F004873
%4E653800047F20001E4EB90000025A48790000800048790000BEE41003488048C052032F004873
%4E63F800047F40001D4EB90000025A300448C02F00487800014878000 73002E540207C00904A24
%4E66C800047F602F300000100348 8048C02F004878001D4EB9000002604 3EEFFFC3002204A0C30
%4E63B800047F800090 0004FEF00386704 12FC002012FC00233002204A0C300009C000660A12FC
%4E6FB800047FA0003112FC00306 00E3002204A10300000069 00031 12C042114879000080004 86E

%4E67F800047FC0FFFC1003488048C052802F00487800204EB90000025A1003488048C02F004878_
%4E62F800047FE000244EB9000002242600420 24FEF0018B4136706300448C06006203C00008000
%4E6468000480002F001002488041EB000110300000488048C02F004EB9000476E4588F2F002F03
%4E6968000480204EB90000020C58834FEF000C52020C02000366BC4CDF0C1C4E5E4E75122F0007_
%4E6098000480407000303900904AA6028000000800660000121001488048C02F004EB900048064
%4E675800048060588F4E752F02142F000B4A79009049426712100248804 8C02F004EB9000480D4
%4E6598000480805 88F602410024880 48C02F004EB9000002424A80588F66101002488048C02F00
%4E66B8000480A04EB9000480D4588F241F4E7542413001207C00904AD011BC00FF000052417008
%4E6858000480C0B0416EEA420013C000904ADA13C000904ADB4E752F02102F000B227C00904AD8
%4E65F8000480E01411488248C2123900904ADA488148C194817207C4817207B2826700001A1211
%4E6168000481004981207C00904AD0118010001011520002000007128024 1F4E7548E72020247C
%4E630800048120009 04ADA4A79009048506600006 44A79009049426600005A42421012B0390090
%4E6688000481404AD8674C7008B0426F4610124880207C00904AD0103000004 88048C02F004EB9
%4E6228000481600000 02424A80588F671A10124880207C00904AD011BC00FF000010125200020 0
%4E6C28000481800007148070045340 4A406CFA524260AA4CDF04044E754E56FFFC48E73E38247C
%4E6488000481A00090491626 7C00902000287C009048FE70FDB079009048526600013042443004
%4E6128000481C0D040207C0090495A4A700000670001123004D040207C0090495A537000003004
%4E62A8000481E0D040207C0090495A4A700000660000F23004E540207C0090494A54B000003004
%4E6388000482 00E540207C0090494A22700000101114000C0000FD630000AA0C0200FF663C4878
%4E60E8000482 20005A4879000080003004E540227C0090494A207100003210 48C10281000000FF
%4E64E800048240 2001E580207C0000C3B22F3008004EB90000012A4FEF000C60543004E540207C
%4E60A8000482600090494A227000001429000 1020200FF700010022F004EB900046A9C70001002
%4E61D800048280D040207C0090495A31BC0001000072001202E541207C0090494A70001002E540
%4E625800048 2A0227C0000C03021B1000010005 88F3004E540207C0090494A54B000006000FF40
%4E61A8000482C03204D241207C0090495A3004E540227C0090494A227100001011488031B01000
%4E66E8000482E052447004B0446E00FED64246426EFFFE42443004207C009049360C3000040000
%4E66680004830066183204 48C12F014EB90004797 24EB900042D8A588F60000674300 4207C0090
%4E6EC80004832049360C30000800006600018430 04D040204A5270000303000004 8C07203C081
%4E61A80004834066000 64A300448C0D080207C00904864343008003204D241204C7004B0701000
%4E6F2800048360675230 04D040204A42700000320 4D241204C3004D040224C303100005340 0240
%4E6138000483800073180100 03602D643204B3004D040224C3031000048C0320448C1E7B12401
%4E62A8000483A0D082D080227C0000C79C31B108003000600005DA3204D241204A7020B0701000
%4E6408000483C06E0000AE3004207C00904936 11BC0002000032044 8C17414D2822F014EB90000
%4E650B000483E0BE90300448C0D080207C00904B6442700800537900904862700 3B07900904862
%4E6398000484005 88F6612083900060090485 6660600390020009048567008B07900904A706426
%4E668800048420 4A79009048626 61E0C79009800904000641453790090496A4A790090496C6706
%4E6618000484405379009049 6C0C7900980090400 0650E4A79009048626606 4EB90004BC303204
%4E65E8000484604 8C12F014EB9000430AC588F6000051E300448C0D080207C0090486436300B00
%4E64D8000484 80D643224B3004D040204A3030000048C0E480320448C1E7812401D082D080207C
%4E6198000484A00000C75C33B00800300060000 4E0300448C0D080207C009048643430080067 00
%4E6838000484C00488320448C12F014EB90004E486300448C0D060207C00904BD64A700800588F
%4E6848000484E06C0004AA3D7C00F0FFFC300448C0D080207C00904B004A70080067343004 48C0
%4E61E80004850 0D080207C00904B00537008003004 48C0D080207C00904B004A700800 66123004
%4E6708000485 2048C0D080207C00904AF80270FFFE08004A7900904852661430 04D040207C0090
%4E64F800048540485A3A30000052 6EFFFE60143004E540207C0090494A227000003A11024500F3
%4E64F800048560300448C0D080207C00904AF04A7008006710300448C0D080207C00904AF05370
%4E6388000485800800300448C0D080207C00904AF04A700800660001A2320430044 8C0D080207C
%4E6088000485A000904AF8083000060801670258413001D040207C0000C0583630000030 01D040
%4E6108000485C0207C0000C0783430000048C23001D040227C0000C06830310000 48C072003239
%4E6078000485E000904006C081B48064040643008070003005028000000 0F00C80000000F0674A
%4E6F58000486003004D040207C0090490E4A7000006700001C3004D040207C0000C04030300000
%4E6568000486203204D241224AB07110006C1E3404D442204C70003005E888720FC081D040227C
%4E6ED8000486400000C01031B10000200030 04D040207C0090490630300000 48C03204D241224C
%4E6348000486603231100048C190817407C0827203B2806C0E3004D040207C009049064A700000
%4E6FF8000486803004D040207C0090490E4A7000006700001E3004D040207C0000C04030300000
%4E61A8000486A03204D241224AB07110006C00008A0805000167000082300448C0D080207C0090
%4E6248000486C04AF04A7008006600006E3004D040207C009049064A70000067000018 3004D040
%4E6628000486E0204A3030000048C0720FC0817407B480664433FC000200904ADC427900904B1B
%4E6668000487007000000 52F0034034BC22F02300448C02F004EB9000092523D40FFFC4A790090
%4E64B8000487204B184FEF000C660E3004D040207C009049064270000030044 8C0D080207C0090
%4E6318000487404864343008006700017C3004D040207C009049064A700000674C3602D643204B
%4E6358000487603004D040224A3031000048C0E2807207C0813204D241224C3431100048C2E782
%4E65C8000487803204 48C1ED81D481D082D080227C0000C8DC31B10800300030 04D040204A5270
%4E64A8000487A0000060000 1200C6E00F0FFFC674C3602D643204B3004D040224A3031000048C0
%4E678800048 7C0E4807203C0813204D241224C3431100048C2E582320448C1EB81D481D082D080
%4E6238000487E0227C0000CADC31B1080030003004D040204A5270000060000 0CC3004D040207C
%4E61C8000488000090490E4A700000670000903602D643204B3004D040224A3031000048C0E480
%4E66C8000488207203C0813204D241224C3431100048C2E582320448C1EB81D481D082D080227C
%4E6EC800048840000 0C7DC31B1080030003004D040204A3430000052700000 3004D040207C0000
%4E66C80004886 0C040B4700000660E320448C12F014EB900048A54588F700FB0426D00000E0805
%4E6338000488800001674070 08B0426C3A3004D040207C0090490E42700000602A3602D643204B
%4E64B8000488A03004D040224C3031000048C0320448C1E7312401D082D080227C0000C79C31B1

%4E647800048BC00800300030044BC0D080207C00904AF808300000801674E4A7900904B246646
%4E6428000488E030044BC0D080207C00904B0030300800EE40D040227C0000BFA0343100004BC2
%4E62C800048900720032390090400 6C481661A300448C0D080207C00904864303008000D040224B
%4E631800048920338C1709000032042O7C009048EA700010301000DC403004D040207C00904AE6
%4E6578000489403 1AEFFFC000060443004D040207C00904AA84A7000006D343004D040207C0090
%4E652800048960 4AA8537000003004D040207C00904AA84A7000006C164A7900904852 6D0E3204
%4E6CE800048980 48C12F014EB9000430AC588F52447004B0446E00F95E4A6EFFFE670000B04A79
%4E647800048 9A000904B166D32527900904B164A466708223C00000A8C6006223C000004B03039
%4E6B78000489C000904B1648C0B0816F0E4EB90004630A33FCFFFF00904B16527900904B220C79
%4E65B8000489E02EE000904B226D0000644242 45EB0040603A200A224B90892200E2892001723F
%4E646800048A00C0816606427900904002 0C528000661A48780006220A224B92892001E2382F00
%4E6B28000 48A204EB9000446C674015 08F548A41EB0800B5C865BE4A42670E48790000003F4EB9
%4E6A7800048A40000480645 88F427900904B224CDF1C7C4E5E4E7548E73C00362F00163203 48C1
%4E61B800048A6052813001D040207C009020004A7000006600015A3203D241207C009048FE3003
%4E648800048A8048C0D080227C00904 91E3A30100033850800300348C0D080207C00904A044270
%4E658800048AA00800320348C152B13801D844207C00902000300348C0E980340548C2E382720F
%4E642800048AC0C481D082D080227C0000C6DC31B1080040003005D040207C0000BFD032300000
%4E627800048AE048C1300348C0D080227C009048643431 0800D442207C009028007000303020 00
%4E64D800048B0002800000FF80740CD082340348C2D082D280300348C05280D040207C00902800
%4E61F800048B2038013184000030 05D040207C0000BFE0323000004 8C1300348C0D080227C0090
%4E61D800048B4048643431 0800D442207C009030007000303020000 2800000FF807409D082D280
%4E620800048B60300348C05280D040207C009030003401318200003004EE483800300 2EE483400
%4E603800048B8072003204508 1E8810241001F7000300250800280000001F00A8000000 1F08300
%4E668800048BA0D240300348C02F00340148C22F024EB900008DC83003E540227C0000C0480F 01
%4E690800048BC000004EB90004B0644FEF000C4CDF003C4E7548E73800302F0012342F0016362F
%4E617800048BE0001AD040207C009040463830000030 03B0790090403A633C300448C002B00000
%4E643800048C002000671 8303900904 03C48C0320248C14481B0816F0670FF600000603 00448C0
%4E643800048C2002800000080 0670CB4790090403C6F0470FF6046300280790090403 8633A3004
%4E64D800048C40480002800000100067163039009040 3E48C0320348C14481B0816F0470FF601A
%4E667800048C6030044B00028000000400670CB6790090403E6F0470FF600270004CDF001C4E75
%4E6B36000 48C804E56FFFE48E73F38382E000A362E000E247C00904B16287C000404BA267C0004
%4E669800048CA0803C0C4404006D3C340348C22F02300448C02F004EB9000461163403 48C22F02
%4E665800048CC04EB90000 8E90320348C15281D241227C00902000427110007 2FF20014FEF000C
%4E64A800048CE060000 8883204D241227C009038003A311000700AE06D424634037204B2426F1A
%4E62B800048D003203D241227C00904AF82009C18908310004100 1C1896702504232022 7C0000
%4E603800048D20C3CE1D711000FFFF3E2EFFFE48873D47FFFE320222 7C0000C3DA2009C1894A31
%4E6DF800048D401000C18967124878000 24E943E2EFFFEDE403D47FFFE588F3404D442227C0090
%4E631800048D6028002009720022403231 2000740FC282700C80816E00027E3204D241227C0090
%4E628800048D8040463C311000700AE06E7204B2436F000102083900000090485667000076320 6
%4E664800048DA0D241227C00904AF00671002810003406D442227C00904AF02009725AC189B271
%4E653800048DC02000C1896C103206D241227C00904AF033BC005A10003206D241227C00904906
%4E656800048DE0427110003006 48C0E580207C0000A4762F3008004EB900048064320648C1D281
%4E643800048E00227C0090401A33BC000C1800588F6000070C0839000100904856676032 06E541
%4E66E800048E20227C009048D62009C18955B11000C1896C0E3206E541227C009048D642B11000
%4E638800048E403206227C009049D000310002100030064 8C0E580207C0000A4762F3008004EB9
%4E64E800048E6000048064320648C1D281227C0090401A33BC000C1800588F600006A248784000
%4E695800048E80340348C22F024EB90004AFF6508F6000068C7208B2436F0000AE3206D241227C
%4E64A800048EA000904AF82009C189083100051001C189679472046002720 03A06E545227C0090
%4E663800048EC048D62009340648C2D4813202207C0000C3E6123010004881340148C1C18993B1
%4E64B800048EE05000C1896C0E3206E541227C009048D642B11000320622 7C009049D000310002
%4E64C800048F001000300648C0E580207C0000A4762F3008004EB90004806448C22F0248780400
%4E694800048F20300648C02F004EB90004AFF6320648C1D281227C0090401A33BC000C18004FEF
%4E63C800048F400010600005D83206D241227C00904AF82009C189083100051001C18967047204
%4E65A800048F60600272003A06E545227C009048D62009340648C25082D4813202207C0000C3E6
%4E66D800048F801230100048813401 48C1C18993B15000C1896C0E3206E541227C009048D642B1
%4E61A800048FA01000320622 7C009049D00031000210003006 48C0E580207C0000A4762F300800
%4E699800048FC04EB90004806448C22F02487808003006 48C02F004EB90004AFF6320648C1D281
%4E661800048FE0227C0090401A33BC000C18004FEF00106000052A320548C12001C189B2FC0003
%4E677800049000C1896D00051 8C189B2FC003FC1896E00050C22405789200922 40D3C02009303B
%4E681800049020000 64EFB00020100010C04F601F001F001F0036003B203CA03AE03BE03EE03AE
%4E66D800049040030E03EE03AE03BE03EE03FC04000404043203 5A0446045A035A0446045A035A
%4E66A800049060044604 5A035A0446045A035A0446045A04F604F601F604F6029804F601F00298
%4E664800049080029802980298029802 9801F0010C00D0007A04F601F001F004F604F604F6016A
%4E6A98000490A07204B2436F142F300004000034 0348C22F024EB90004AFF6508F7203B26EFFFE
%4E6A48000490C06F00007034 2EFFFE48C22F02300448C02F004EB900041CCC3A04DA45227C0090
%4E6A78000490E0380020093 42EFFFE720AE36222409571500050 8F604C7202B26EFFFE6F000034
%4E69380004910034 2EFFFE48C22F02300448C02F004EB900041CCC3A04DA45227C009038002009
%4E68980004912034 2EFFFE720AE362224095715000508F601042A7340448C22F024EB900044 6C6
%4E66A80004914050 8F340348C22F02300448C02F004EB9000461167204B243508F6F0C42790090
%4E661800049160 4B224A526F02425 0340348C22F024EB900008E9032034 8C15281D241227C0090
%4E63C8000491800300042 1100078FF 001588F600003D07204B2436F00038634034 8C22F023004
%4E6A98000491A048C02F 348 90004 FBA4EB90004D046487801F4340348C22F024EB90004A9A4

%4E67C800049100 4A524FEF00100F0042522340348C22F024EB900008E90320348C15281D241227C
%4E6488000491E000902000427110007 2FF2001588F6000037A487802C0487802C0340448C22F02
%4E63E8000492004EB90004BBD24A804FEF000C6600030E700060000356700060000350340348C2
%4E67F8000492202F02300448C02F004EB900046116340448C22F024EB90000BBD47204B2434FEF
%4E6548000492400000C6F0002DB427900904B224A526F024252487800023403 48C22F024EB90004
%4E69C800049260AFF64A80508F660002B4487800044E944A8058BF660002A6487800044E944A80
%4E69E8000492B0588F661C487B00024E94E580207C0000C41E588F2F3008004E93588F600027E
%4E63A8000492A03003E540207C0000C4262F3000004E934879000000AD4E93508F600002603403
%4E66E8000492C048C22F02300448C02F004EB900046116340448C22F024EB90000BBD448790000
%4E6618000492E000264EB900048064 7204B2434FEF0010EF00022A427900904B224A526F024252
%4E63380004930032004801E5615E81D231227C0000F14033F1180000904022340358423 3C20090
%4E67B8000493204026487800403403 48C22F024EB90004AFF64A80508F660001E4487800044E94
%4E69A8000493404A80588F660001D6487800044E944A8058BF660E48790000009D4E93588F6000
%4E64B80004936001BC3003E540207C0000C4362F3000004E934879000000B14E93508F600019E
%4E6638000493804279009048227C0A34034BC22F02300448C02F004EB900046116 7204B243508F
%4E6538000493A06E0000207219B2456E08721BB2456C000012 7209B2456E0001427218B2456D00
%4E6AE800049 3C00013A340448C22F024EB90000BBD4588F600001287C0560B07C0A7202B26EFFFE
%4E6098000493E06E1B60A47C05720 2B26EFFFE6E0C60987C0A7203B26EFFFE6F8E3204D241227C
%4E6938000494000090200200 9342EFFFE22409571100060000 0CE7C057203B26EFFFE6EDC6000
%4E61C800049420FF687401600674026002740 33204D241227C009028002009C1B908310004100 1
%4E6A0B00049440C1B9670670006000 01223E2EFFFEBE426C00FF367C0560A27C017204B2436F00
%4E6A28000494600 09A527900904AEE6000009042790090 4B227C0A7202B26EFFFE6E166000FF0A
%4E6B78000494804279009 04B227C0A7203B26EFFFE6F00FEF83A04DA45227C009038002009342E
%4E65E8000494A0FFFE720AE36222409571 50003A04DA45227C009020002009 3204D241207C0090
%4E6138000494C03B0034301000720AE26A72003202D281207C0000C534224033B018005000601A
%4E68A8000494E03A04DA45227C00903800200 9342EFFFE720AE362224095715000 7204B2436F1C
%4E69C8000495003 02EFFFEC1C62F00300348C02F004EB90004A9A44A52508F6F0242523204D241
%4E6538000495202 27C009020002009C1894A711000C18967143403 48C22F02300448C02F004EB9
%4E64780004954000046116508F340348C22F024EB900008E90320348C15281D241227C00902000
%4E6048000495604271100072FF2001588F4CDF1CFC4E5E4E754E56FFFE48E73F3C382E000A362E
%4E6658000495800 00E247C0090490 6267C0004A9A4287C009028003203D2412A7C00904AF8200D
%4E6E18000495A0C18D08350001 1001C18D67047004600270003D40FFFE3E2EFFFEDE433D47FFFE
%4E6738000495C03204D2412A7C009038003A351000700AE06D32054BC12001C18DBAFC0003C18D
%4E6B28000495E06D00064AC18DBAFC003FC18D6E00063E2A40578D200D2A40DBC0200D303B0006
%4E6368000496004EFB000200FA00FA062B0622062206220 46A046A046A013601860 21401360186
%4E66E800049620021401360186021402EB02EC02F0062804A804F4058E04A804F4058E04A804F4
%4E63C800049640058E04A804F4058E04A804F4058E0622062206220622062206220622062206220622
%4E6088000496600622062206220622062206280628062806280622062206280628062800 7A3203
%4E683800049680D2412A4A200DC18D4A751000C18D672C340348C22F02300448C02F004EB90004
%4E6A28000496A05FBA4EB90004D346487B01F4340348C22F024E934FEF0010600003D67201B279
%4E65B8000496C000904ADC662C3403D4422A4A200D3203D241207C009048FE3230100052412A40
%4E6398000496E03B8120000 3203D2412A7C00904916427510003 3FC000100904B18600003584878
%4E69380004970004C0487805C0340448C22F024EB900048BD24A804FEF000C6718340348C22F02
%4E67080004972030 0448C02F004EB900049C36508F600004FE72FF2001600004F63203D2412A4A
%4E6918000497402 00DC18D4A751000C18D673E48780019340348C22F024E93508F340348C22F02
%4E66C80004976030 0448C02F004EB9000461163404 48C22F024EB900008BD43203D2412A4A4275
%4E62D80004978010004FEF000C60000308 3003D040207C0000C4063430000048C22F024EB90004
%4E69F8000497A004BA3C00302EFFFED040207C0000C3F6DC7000003203D2412A4A200DC18D4A75
%4E6948000497C01000C18D588F67507202B2466F00FF7E340348C22F02300448C02F004EB90004
%4E6288000497E0611 63204D2412A7C009038000475040010003204D2412A4C537510004878001 9
%4E6438000498003403 48C22F024E9333FC000100904B184FEF00106000023E3003D040207C0000
%4E68E800049820C40634300000 48C22F024EB9000404BA3C00302EFFFED040207C0000C3F6DC70
%4E6858000498400000 3203D2412A4A200DC18D4A751000C18D588F67547203B2466F00FEF03403
%4E6638000498604 8C22F02300448C02F004EB9000461163A04DA452A7C00903800200D3406720A
%4E64E800049880E3622A40957550003204D2412A4C200D34062A4095751000487800193403 48C2
%4E6878000498A02F024E934FEF0010603672 01B27900904ADC662C3403D4422A4A200D3203D241
%4E6318000498C0207C009048FE3230100052412A403B8120000 3203D2412A7C0090491642751000
%4E62C800049 8E033FC000100904B186000016A7A0160067A0260027A033003D040207C0000C406
%4E677800049900 3430000048C22F024EB9000404BA3C00302EFFFED040207C0000C3F6DC700000
%4E682800049920BC4588F60283204D2412A4C200DC18D08350004 1001C18D66143203D2412A4A
%4E6738000499402 00DC18D4A751000C18D6600FE003204D2412A4C200DC18D08350004 1001C18D
%4E649800049960674 43204D2412A4C0275FFEF10003204D241207C009020003004D040227C0090
%4E61C800049980404674003431000 0700AE0AA068200000200 2002D080227C0000CBE831B10800
%4E658800049 9A0100060000 0A83203D2412A4A200DC18D4A751000C18D674C340348C22F023004
%4E679800049 9C048C02F004EB9000461163A04DA452A7C00903800200D3406720AE3622A409575
%4E673800049 9E05000 3204D2412A4C200D34062A409575100048780019340348C22F024E934FEF
%4E67C80004 9A0000106048 7201B27900904ADC663E3203D2412A4A200DC18D4A751000C18D662C
%4E62C800049A203403D4422A4A200D3203D241207C009048FE3230100052412A403B8120003203
%4E6588000 49A40D2412A7C009049164275100033FC000100904B1S4A7900904B166F0642790090
%4E640800049A604B164279009 04B227000600001C2340448C22F02300348C0D080207C00904864
%4E674800049A80 30 3000 ... 004EB90004735 6508F4A7900904B166F06427900904B164279
%4E66F800049AA0009 ... 2001600 00184322EFFFE D2412A7C0000C40E3C3510003203D241

%4E693800049AC02A4A200DC18D4A751000C18D670000FC340648C2487800044EB9000404BAB480
%4E6D6800049AE0588F6F0000E6487B000A340348C22F024E93508F6000FC64322EFFFED2412A7C
%4E651800049B000000C40E3C3510003203D2412A4A200DC18D4A751000C18D670000B0340648C2
%4E68C800049B2048780004 4EB9000404BAB4805B8F6F00009A340348C22F0230044BC02F004EB9
%4E60E800049B4000046116320 4D2412A7C00903800047504001000 3404D4422A7C00902000200D
%4E647800049B6032054 8C15381D281207C0000C5342A4038B018002000 4878000A340348C22F02
%4E6BD800049BB0485885FC0001009 04B184FEF00106000FEC4322EFFFED2412A7C0000C40E3C35
%4E66B800049BA010003203D2412A4A200DC18D4A751000C18D67163406 48C2487800044EB90004
%4E6C6800049BC004BAB480588F6E00FF6A4A466F543203D2412A4A200DC18D4A751000C18D6642
%4E66A800049BE07201B27900904ADC663B3403D4422A4A200D3203D241207C009048FE32301000
%4E622800049C00524124403B81200032 03D2412A7C009049164275100033FC000100904B186000
%4E6C1800049C20FE347000600872FF2001600270004CDF3CFC4E5E4E7548E73E38382F0026362F
%4E652800049C40002A247C009048EA267C00904B22287C000480643204D241227C009038003A31
%4E693800049C601000720AE26D340548C22002C189B2FC0003C1896D000A30C189B2FC0008C189
%4E65D800049C806E20224057892009 2240D3C02009303B00064EFB000209B409640A1000CA00CA
%4E600800049CA000CAC189B2FC002BC1896D0009FAC189B2FC003BC1896E0009EE224043E9FFDB
%4E68E800049CC020072240D3C02009303B00064EFB000206B8069007DA07DA04E404E405BE05FB
%4E69D800049CE005F805F805F805F805F802F009D609D609D609D60028005A2F3C000800003203
%4E6AA800049D004BC12F014EB90004AFF64A7900904B16508F6F06427900904B164EB900041B6B
%4E674800049D20425374FF200260000994320348C1D281227C00904BD62009C1894A711800C189
%4E666800049D406D067000600009763 20348C12F01300448C02F004EB90004DA64508F6000095E
%4E658800049D604253B67900904B6666064EB90004C34A3203227C0090493613BC000810003403
%4E628800049D8048C27215D481D442227C009028002009 3204D241207C009028003230100004 41
%4E63D800049DA002000241FF800641000CD24322403381200 0340348C27215D481D442227C0090
%4E6EF800049DC030002009320 4D241207C009030003230100002 41FF800641001222403381 2000
%4E693800049DE0320348C1D281227C00904BD62009C1894A711800C1896D28340348C27215D481
%4E62C800049E00D442227C00902000200932 0348C1D281207C00904BCC224033B0180020006032
%4E643800049E2034034BC27215D481D442227C00902000200932 0348C1D281207C009048643230
%4E621800049E401800D241207C009020002240 33B0100020003 20348C12F01300448C02F004EB9
%4E662800049E6000008DAC300348C0D080207C0090486432300800 48C12F014EB900008BD43403
%4E62F800049E8048C2D482227C009048642009320306410015224033812800 3203D241227C0090
%4E64C800049EA04916427110007406B4454FEF000C6600007C0C79009800904000640000923239
%4E659800049EC000904004524133C100904A700C7903E700904A706308047903E000904A7033F9
%4E64D800049EE00090400000904A727B017407B47900904000 6206D8790090400E4A4467105279
%4E677800049F0000904A7253444EB90004A9E260EC7407B47900904A726636323900904 00E5241
%4E644800049F200241000733C100904006022340548C250B2E5B233C200904A70323900904A70
%4E65A800049F405341 33C100904A724EB90004A9E20C790098009040006 52E0C39000100904936
%4E63C800049F6067240C39000100904937671A0C390001009049386710 0C39000100904 9396706
%4E643800049F8042790090484C3203D241227C00904A3C33B900904A7010003003E540207C0000
%4E69B800049FA0C4562F3000004E944A7900904B16588F6F06427900904B1674FF200260 0006FE
%4E607800049FC03403227C009048E62009720022401231200034032 04A70001030200 0D2B0700B
%4E672800049FE0B0816400006A2F3C002000003203 48C12F014EB90004AFF64245508F3205E541
%4E66B80004A000227C007048D62009C1894AB11000C1896D2E3205227C009049362009C1890C31
%4E61D80004A02000011000C1896618320 5224A2009C1890C31000C1000C18964067000600006 7E
%4E64480004A04052457404B4456EB442536000064A42533003E540207C0000C4762F3000004E94
%4E66680004A060487B00643203 48C12F014EB90004A9A442A7320448C12F014EB9000472803204
%4E64380004A080D241227C009040463231 1000740AE4693A017002B0414FEF0014630C3203224A
%4E60380004A0A05231100060 0000EA70C3403224A2009700022401231 20009C4132032 07C0090
%4E62180004A0C048E670001030100 09C40BA466F0000B43403224A2009120622 40D3312000 3A04
%4E63B80004A0E0DA45227C00904046200932 06740AE5612240937150003204D241227C00904046
%4E6EF80004A1002009740022403431100002B20000FC000C82000004006648 3204D241227C0090
%4E61080004A120200033BC0AFC1000320 4D241227C0090260006710200100034 04D442227C0090
%4E6E080004A14030002009320 4D241207C009030003230100002 41FFC000410009224033812000
%4E66280004A160320348C12F014EB90004372 64A7900904B16588F6F06427900904B1670006000
%4E62A80004A180053C3403224A200912052240D331200032 0348C12F014EB900043726487800 08
%4E67F80004A1A0320348C12F014EB90004AFF64FEF000C600004E44253 3403227C009048E62009
%4E6F080004A1C07200224012312000340320 4A70001030200 0D2B0700BB081640000742F3C0020
%4E67A80004A1E00000320348C12F014EB90004AFF6742DB445508F6652424532 05E541227C0090
%4E64F80004A20048D62009C1894AB11000C1896D2E3205227C009049362009C1890C3100011000
%4E62F80004A2200C18966183205224A2009C1890C31000C1000C1896406700060000482 52457404
%4E61B80004A240B4456F000452 60B07000600004703203227C009048E652311000 3003E540207C
%4E64680004A2600000C4862F3000004E94320348C12F014EB900043726487800203 20348C12F01
%4E68780004A2B04EB90004AFF64FEF00106000040A487B002E320348C12F014EB90004B2BA3203
%4E63B80004A2A0D241227C00904B0033BC04B010003003E540207C0000C4862F3000004E944253
%4E67A80004A2C04FEF000C600003D0320548C12F01300348C02F004EB90004B2BA3A00508F6652
%4E6FE80004A2E03403227C009048E62009720022401231 20003403204A70001030200 0D2B0700C
%4E63E80004A300B081631032 03227C009048E65231100 07A01601E7401B47900904862661448 7B
%4E67080004A32000643203 48C12F014EB90004A9A47A01508F4A4567243203 48C12F014EB90004
%4E63180004A340372 63003E540207C0000C4862F3000004E944253508F6000033E70006000035E
%4E67B80004A3603C39009049B070003006 80FC03E802B00000FFFF52802F00300448C02F004EB9
%4E66580004A3800004728050 8F603C487B008032 0348C12F014EB90004AFF63203227C00904B10
%4E64D80004A3A052311000 7C640C79009800904000508F640002E442A7320448C12F014EB90004

%4E64E80004A3C07280508F7401B47900904862670E3203D241227C00904B08547110003203D241
%4E63580004A3E0227C00904B0820097400224034311000323900904862248C1D281B481631A3403
%4E63680004A400D442227C00904B082009323900904862D241224033812000424 5BA43674A3205
%4E66180004A420E541227C009048D62009C1894AB11000C18967343205D241227C00904B082009
%4E63D80004A4407401C189B4711000C189641C3205D241227C00904B08537110003205227C0090
%4E63380004A46049D00031000210005245 7404B44566AA3003E540207C0000C4862F3000004E94
%4E63380004A480320648C12F01300348C02F004EB90004A9A43203227C009049D00031000 21000
%4E65580004A4A042534FEF000C600001EE3203227C00904A202009C1894A311000C18967503203
%4E62780004A4C0227C00904A2052311000 3203227C00904A202009C1890C31000A1000C1896652
%4E66380004A4E07401B479009048626C483003E540207C0000C4462F3000004EB90004803C4879
%4E62380004A500000[illegible]0B94EB90004803C508F60244245[illegible]05227C00904A20423110005245 7404
%4E64F80004A520B4456EEC3203227C00904A2013BC00011000 3203E541227C009048D620097464
%4E65180004A5402240D5B110003203E541227C009048D62009C1890CB1000000CB1000C1896D1C
%4E66180004A5603203D241227C00904AA833BCFFFF10003203227C009049F44231100032032 27C
%4E64980004A580009049D0003100021000487800204EB9000404BA721DB280588F6C343003207C
%4E66480004A5A00000C4CE1030000048804 8C02F004EB9000404BAE5803203E541207C0000C4BE
%4E66480004A5C0D0B01000588F22402F114E94588F60123003E540207C0000C4662F3000004E94
%4E67880004A5E0588F4878000132 0348C12F014EB90004AFF64253508F6000009E3203224A2009
%4E62280004A600C1894A311000C18966067000600000AE42533203224A5331100032034 8C12F01
%4E65880004A6204EB9000437264878000432034 8C12F01300448C02F004EB90004A6C248790000
%4E65A80004A64000154E944FEF0014604C3203224A2009C1894A311000C18966047000605E4253
%4E62880004A6603203224A53311000320348C12F014EB9000437264878000332034 8C12F013004
%4E69780004A68048C02F004EB90004A6C24879000000154E944FEF00144A7900904B166F0C4279
%4E69280004A6A000904B166004700060123204 48C12F014EB900008BD474FF2002588F4CDF1C7C
%4E67A80004A6C04E7548E73820362F0016342F001A322F001E247C009049E4227C009049D43003
%4E64A80004A6E0D040207C009020000C709D7C00006546300248C0D0803800D84420493002 48C0
%4E6F780004A700D0805280320 0D2413003338010003180400030024 8C0D080D040204A42700000
%4E60D80004A720300248C0D0805280D040204A31BC00020000600000CE3003D040207C00902000
%4E64B80004A7400C709D3C00006548300248C0D0803800D844204930024 8C0D08052803200D241
%4E60380004A760300333801000318040003002 48C0D080D040204A31BC00030000300248C0D080
%4E60D80004A7805280D040204A31BC00010000600000744244700 4B04166363004 48C02F003002
%4E66780004A7A048C02F0030034 8C02F004EB90004A80E48C02F0030024 8C02F00300348C02F00
%4E67080004A7C04EB90004A8D838004FEF00186034300448C02F0030024 8C02F00300348C02F00
%4E69F80004A7E04EB90004A8D848C02F0030024 8C02F00300348C02F004EB90004A80E38004FEF
%4E69280004A80000184EB900043B8C4CDF041C4E7548E73E00382F001A362F001E342F00223A04
%4E66880004A820EA453C040246001F7002B0426F4C320648C12F01300548C053802F004EB90004
%4E65B80004A840382A4A80508F6[illegible]20 0348C0D080320248C1D081D040207C009049D431840000
%4E64E80004A860300348C0D0803202 48C1D081D040207C009049E4427000005242 7002B0426F4E
%4E66E80004A880320648C12F01300548C052802F004EB90004382A4A80508F6734300348C0D080
%4E64D80004A8A0320248C1D081D040207C009049D431840000300348C0D080320248C1D081D040
%4E67C80004A8C0207C009049E431800002000052423002 48C04CDF007C4E7548E73E00382F001A
%4E67280004A8E0362F001E342F00223A04EA453C040246001F7002B0426F4E320648C153812F01
%4E66980004A900300548C02F004EB90004382A4A80508F67343 00348C0D080320248C1D081D040
%4E65780004A920207C009049D4318400003003 48C0D080320248C1D081D040207C009049E431BC
%4E64480004A9400003000052427002B0426F4E320648C152812F01300548C02F004EB90004382A
%4E64F80004A9604A80508F6734300348C0D0803202 48C1D081D040207C009049D431840000 3003
%4E66280004A98048C0D080320248C1D081D040207C009049E431BC00010000524230024 8C04CDF
%4E66D80004A9A00070[illegible]343F000E362F00123002E540207C009048EE3202D241227C
%4E61E80004A9C000904B[illegible]C3D3B00000300220 7C009049D0003000010000 4CDF000C
%4E67780004A9E04E752F0A247C00904A727007B05266063 4B9009040104EB90004FED470003012
%4E65080004AA00E5802040D1F9000380004A90670000087072B052641E7072B052640E34BC0007
%4E68980004AA2070012 3C000904013600252524EB90004FED460CB245F4E7548E73F3C267C0090
%4E65E80004AA4040042870000480C227C000404BA2A097C0F42440839000000904856672 62F3C
%4E66E80004AA600000880048790000D49E4EB9000001424A44508F663C4879000000 9E4E947801
%4E65D80004AAB0588F602E083900010090485667242F3C000084004879 0000D4D84EB900000142
%4E6A480004AAA04A44508F660C487900000 0AC4E947801588F4A790090496A66447008B053623E
%4E66C80004AAC02F3C00008C004870000D4624EB9000001427600487800042A454E954A8057C3
%4E6A280004AAE0440374004A4457C24402C6824FEF000C670C4879000000AE4E947801588F0839
%4E64A80004AB000006009048566722F3C0000900048790000D50C4EB9000001424A44508F661A
%4E69480004AB2048780004 2A454E954A80588F660C4879000000AF4E947801588F70088036300
%4E6FC80004AB4000F27000303900904AA60280000004006700001270 01B053670000 0A7007B053
%4E63480004AB60660000D07000301353 80E540207C0000D43A247000003812360448C32F032F2A
%4E69080004AB8000023406 48C252462F02741D2F2A00024EB90004381894 80E282588F2F024EB9
%4E66780004ABA00000025A4AAA00064FEF00106730360448C32F032F2A0006340648C252462F02
%4E6AF80004ABC0741D2F2A00064EB9000438189480E282588F2F024EB90000025A4FEF00104AAA
%4E63C80004ABE0000A67187000303900904AA60280000004006608246A000A6000FF7C7005B053
%4E67C80004AC00620000FE4878000 42A454E954A8058 8F660000EE760036135B833003E540207C
%4E62D80004AC200000D4562F3000004E947801588F600000D00C7900980090400064 0000C47000
%4E62580004AC40303900904AA60280000004006600008248780008 2A454E95260030033640E540
%4E65A80004AC60207C0000D3FA22300000300BE540207C0000D41A247000004A81588F672C4879
%4E67A80004AC8000000002F013A0648C352462F03741D2F014EB9000438189480E282588F2F02
%4E6B980004ACA04EB90000025A4FEF0010CF8A4A87CF8A672A4879000080002F0A360648C32F03

%4E6AA80004ACC0741D2F0A4EB900043B189480E2B2588F2F024EB90000025A4FEF00104A446620
%4E6E780004ACE0487800042A454E954A80588F6612CF8B4A47CF8B660A48790000009F4E9458BF
%4E6AA80004AD004CDF3CFC4E7548E73830246F0018267C000441F6204A700AD1C013D000904B1A
%4E67380004AD20204A700BD1C013D000904B1C204A700CD1C013D000904B1E204A700DD1C013D0
%4E63A80004AD4000904B2076001639009O4B1C7420720ED5C10C4204006C0002987000101A3800
%4E62E80004AD600244001F72003200028100000C02041B0FC00806D066E16600001AEB0FC0000
%4E67180004AD806DD06E026012B0FC004066C6602AB0FC00C066BE6000020A36004878000017000
%4E66280004ADA03003723FC0812F00300248C02F004E9334004FEF000C609A72003200703OC280
%4E6FB80004ADC0E8813001E540207C0000D800207000007600161072003203028100000C02041
%4E6AE80004ADE0B0FC00806D066E1C600000CCB0FC00006D00FF606E026018B0FC00406600FF54
%4E64080004AE0060000007CB0FC00006600FF48600000E07000103900904B1EB0436700000E7000
%4E63E80004AE[illegible]03900904B20B043662C70003004720FC08152802F0072003203703FC2802F01
%4E67A80004AE4030024BC02F004EB9000444943400 4FEF000C6000FEFE70003004720FC0815280
%4E67180004AE602F007200320370 3FC2802F01300248C02F004E9334004FEF000C6000FED67000
%4E64680004AE803004720FC08152802F0042A7300248C02F004E9334004878000170003003723F
%4E67680004AFA0C0812F00300248C02F004E9334004FEF00186000FE9E4878000170003003723F
%4E65080004AEC000812F00300248C02F004E93340070003004720FC08152802F0042A7300248C0
%4E66480004AE[illegible]2F004E9334004FEF00186000FE6670003004720FC08152802F00487800013002
%4E64B80004AF[illegible]48760001700030037 23FC0812F00300248C02F004E933400
%4E65180004AF204FEF00186000FE2008000005674E08000004672670003004720FC08152802F00
%4E66E80004AF4048780001300248C02F004EB90004449434004FEF000C6000FDFA70003004720F
%4E66880004AF600C08152802F004878000130024BC02F004E9334004FEF000C6000FDD870003004
%4E67780004AF80[illegible]03FC2802F01300248C02F004E9334004FEF000C6000FDB4
%4E64480004AFA00[illegible]300452802F0042A732024BC12F014E933400487800014878
%4E64C80004AFC0000[illegible]4E9334004FEF00186000FD80700030045 2802F0042A73202
%4E61980004AFE048C12F014E9334004FEF000C6000FD644CDF0C1C4E754E56FFFE48E73F3C362E
%4E64980004B00000[illegible]0012247C00904B30287C00904B2E227C0000025A2A09426E
%4E65F80004B020FFF[illegible]04B48C0826706 70C0600002824A7900904B24670E33FC00010090
%4E65880004B0404B[illegible]C200281B900904848424670011206E3A0C0826600000A5246
%4E63080004B060702[illegible]03900904AA60280000004006700000A4A790090485 26C10
%4E64880004B0803006E540207C0000DE2026700000600E3006E540207C0000DE7826700000CF8B
%4E65080004B0A04AB[illegible]7000600002083006E540207C0000E01C4AB0000067 1C3006E540
%4E69080004B0C0207C0000E0[illegible]2F3000004EB90004803C7E013D47FFFE588F4AAB000467047001
%4E63B80004B0E06002[illegible]04AAB0008670472016002720056 40D04133C000904B2C2F134EB90004
%4E64E80004B1003B1[illegible]3048C0D0020 7C0070406 44A700800588F671030034BC0
%4E6E380004B1202F[illegible]2F3CFFFFFFFF4EB900048 4A4588F700030122F00
%4E62180004B140700[illegible]04EB90000022483C000904B2642 46508F60103006207C00904B32
%4E64080004B16011BC00[illegible]0005246BC7900904B2A6DE83006207C00904B32423000003C3C8000
%4E62D80004B1803006 48[illegible]F004E7900904B32700030125 2522F00700030142F002A454E953006
%4E64080004B1A048C02F002F13700030125 2522F00700030142F002A454E950C82000001004FEF
%4E60A80004B1C0002065[illegible]0200062 3C3203D241207C00009E08700030301 0002F004878
%4E63280004B1E0000148[illegible]300448C02F00700030125380 2F0072003214700FD2802F014EB9
%4E62880004B200000002[illegible]84AAB00046720300648C02F002F2B00047000301252522F00
%4E65280004B2207000301 4[illegible]02A454E954FEF00104AAB0008672030064 8C02F002F2B00087000
%4E64B80004B2403012 5[illegible]F00700030142F002A454E954FEF00103006 48C02F004B7900904B32
%4E62580004B2607000301 2[illegible]F00700030142F002A454E9570003039 00904AA6028000000 4004FEF
%4E64D80004B28000105[illegible]2F0009600904B24600833FC007800904B243003E540207C0000E07C
%4E6FF80004B2A02F3000[illegible]EB90004806430 2EFFFE48C058BF4CDF3CFC4E5E4E754 8E73838362F
%4E64580004B2C0001E382F00222470C0904B30267C00904B2E297C0000025A0444002E3004D040
%4E63D80004B2E0227C0000D8103231000048C1340348C2D482207C00904AF870003030 2800C280
%4E65680004B300670670006000019B4A7900904B24670E33FC000100904B244EB90004B5FC3003
%4E63A80004B32048C0D080227C00904AF83204D241207C0000D81032301000837108 0033FC0016
%4E63580004B34000904B2A70003037009 04AA6028000000400660A33FC000400904B2C600B33FC
%4E63A80004B36000030 0904B2C300348C02F004EB90004B4A4700030122F00700030132F004EB9
%4E61580004B38000000224230000904B263003D040227C00009E0834310000300248C02F004879
%4E61580004B3A00000DED070003012525 22F00700030132F004E947000303900904AA602800000
%4E65F80004B3C004004FEF001C66483003E540207C0000DB1E2F3000004EB90004803C300248C0
%4E62C80004B3E02F003003E540207C0000DFF02F3000007000301252522F00700030132F004E94
%4E64280004B400487[illegible]00000A04EB90004803C4FEF0018[illegible]248C02F003004E540207C0000E000
%4E61F80004B4202F300000700030125 2522F00700030132F004E943004E540207C0000D82E2F30
%4E62780004B44000004EB90004803C300248C02F0048790000DED0700030122F00700030132F00
%4E64280004B4604E943003E540207C0000E07C2F3000004EB9000480647000303900904AA60280
%4E66D80004B480000004004FEF0028660A33FC009600904B24600833FC007800904B2470014CDF
%4E69080004B4A01C1C4E7548E73030322F0016227C00904B2E247C00904B30267C00904B2A70FF
%4E65C80004B4C0B041670000D2300148C0D080207C00904BD64A7008006D46300148C0D080207C
%4E66C80004B4E000904BE0363008003003 48C0741FC082E980323900904008 48C190815980E680
%4E62B80004B50032803003 48C0028000000 3E0E28034390090400A48C29082E6803480605 83001
%4E62980004B52048C0D080207C00904864363008003203D241207C0090280070003030 1000EE88
%4E64380004B5403239009040084 8C19081E6883280203C000001E834390090400A48C290823403
%4E63880004B560D442207C00903000720032302000EE899081E68034800251003F0252003F701C
%4E66680004B580B05165000008701DB05264123 2BC000E34BC000F600832BC000E34BC000F700F
%4E63A80004B5A0B0526304585 2600A303900904B2C5240915230 1 3E240B05164 1C70003011741D %4E64280004B5C032134 8C15281E2819481B08264083013E24091516020700030117 41D321348C1
%4E68880004B5E05281E2819481B0826508701C905332806004 32BC00014CDF0C0C4E7548E73000
%4E64080004B600207C00904B244A50674453504A50663E424260324240600E207C00904B262250
%4E67A80004B620549042515240B07900904B2A6DEA704032390090 4B2A48C19081D0802600D7B9
%4E68980004B64000904B265242B47900904B2C6DC64CDF0000C4E7548E73030362F0016267C0000
%4E61F80004B660025A323C009733C10090400070003001 2F004EB9000409B6207C009050004242
%4E69B80004B6B0588F424130FC80005241701DB0416EF47046D1C05242701EB0426EE64EB90004
%4E67C80004B6A017083439009049664 8C22F023039009049644 8C02F004EB9000413AA4A43508F
%4E67380004B6C0660A4EB90004B984600002B47008B043660A4EB90004B9AE600002A470073403
%4E65A80004B6E048C29082C0FC003C207C0000E500D0C0244833D2009040 0833EA00020090400A
%4E64980004B7007001B0436512701972153601EB43D64047A7487B003F340348C202820000 03E0
%4E63580004B7200A8200000 10ED9 27012D4802F0232034 80170085 1A1048100000 2002F013039
%4E66E80004B7400000D2 [illegible] 2F0600034 8C02F004EB900008A844FEF001B207C009055 22740A
%4E68280004B7607211425852 41701DB0416EF67068D1C05242700FB0426EEB487900008 0002F2A
%4E68A80004B7B000442A7740E2F2A00044EB90004381694805 88F2F024EB90000026C76044AAA
%4E68480004B7A000084FEF0010671A487900080002F2A0008340348C252432F0242A74E934FEF
%4E68080004B7C000104AA000C671A487900080002F2A000C340348C252432F0242A74E934FEF
%4E66C80004B7E000104AA0010671A487900080002F2A00103403 48C252432F0242A74E934FEF
%4E65880004B80000104AAA00146718487900088002F2A001434034 8C22F0242A74E934FEF0010
%4E66680004B82048790000 80002F2A00184878000B74112F2A00184EB90004381894805 88F2F02
%4E67D80004B8404E93487900008 0002F2A001C4878000D74112F2A001C4EB9000438189480588F
%4E69F80004B8602F024E9348790000800048790000E08C4878000F42A74E93760F4AAA00204FEF
%4E65180004B8800030671C48790000 80002F2A00203403 48C252432F02487800124E934FEF0010
%4E64F80004B8A048790000 [illegible] 06090487800124 2A74F93761348790000 30002F2A0024
%4E65280004B8C0340348C252432F02487800014E934879000080002F2A0028340348C252432F02
%4E66F80004B8E0487800014E934879000080002F2A002C340348C252432F02487800014E934AAA
%4E66C80004B90000304FEF0040671A48790000 80002F2A0030340348C22F02487800014E934FEF
%4E66580004B9200010487900008000487900 00E0A848780018 42A74E93761 94AAA00344FEF0010
%4E67080004B940671C48790000 80002F2A00343403 48C252432F02487800014E934FEF00104AAA
%4E67B80004B9600038671A48790000 80002F2A0038340348C22F02487800014E934FEF00104CDF
%4E64D80004B9800C004E7548790000 8000487900 00E3764EB90000014 22F3C00000800 48790000
%4E6A880004B9A0E4F44EB9000001424FEF00104E7548E7302033FC01140090400833FCFFFC0090
%4E67880004B9C0400A207C009051AE720374174258524 2701DB0426EF67074D1C05241701CB041
%4E68780004B9E06EE848790000800048790000E0C242A7740E48790000E0C24EB9000438189480
%4E66280004BA00588F2F024EB90000026C247C0000E0CA70003039009 04AA6028000000 4004FEF
%4E64F80004BA2000106706247C0000E1DC76054A926720487900008 0002F1A340348C252432F02
%4E6A780004BA4042A74EB90000025A52434FEF001060DC4CDF040C4E7548E72038247C000404BA
%4E67780004BA60287C00904B54267C00904B524A7900904B14660001B64A790090484C670001AC
%4E63C80004BA804A79009048526600 01A20C79009800904000650001965379009048 4C70003039
%4E65980004BAA00090484C80FC003C484002800000FFFF4A80660001604879000080004878 0001
%4E66280004BAC0487800027000303900904 84C80FC003C02800000FFFF340048C02F00487B0002
%4E67280004BAE0487800224EB900002727 00AB0424FEF00186626425342544 87800104E924A80
%4E67680004BB00588F661670 32B0790090400464 0C4878000 44E925240398058 8F4A5367065353
%4E67480004BB20600000F24A54675A7006B0426E54300248C05D80E580321448C15381E541207C
%4E65280004BB400000EE08D0B010002 2402F114EB90004806470 06B04258 8F660000BA48780002
%4E68880004BB604E92E580207C0000EE18588F2F3008004EB9000480 6436BC0001425458 8F6000
%4E68780004BB80009470 06B04266 3A487800044E924A80 00 F662E487800044E923400E540207C
%4E65F80004BBA00000EE30588F2F3000004EB90004803C3002D040207C0000EE4036B00000588F
%4E62980004BBC060524A4266327000303900904AA602800000008006704700060084878 00044E92
%4E67E80004BBE0588FE540207C0000EE202F3000004EB90004806458 8F601C700AB0426D163002
%4E68E80004BC00E540207C0000ED8C2F3000004EB9000480645 88F4A790090484C660E4A790090
%4E6EB80004BC2048626706 4EB90004BC304CDF1C044E754E56FFFC48E73E38247C00904936287C
%4E62280004BC40000002 60267C0000025A4879000000484EB90004806433F900904A7200904000
%4E6CD80004BC6033F900904A700090400433FCFFFF00904B6C427900904B6833FCFFFF00904B52
%4E6BB80004BC802F3CFFFFFFFF4EB9000430AC207C00905000424250 8F424130FC80005241701D
%4E6AB80004BCA0B0416EF47046D1C05242701EB0426EE64EB90004BEC03A00CAFC006442423002
%4E62780004BCC0D040207C00009E083C3000003602C7FC00055C433002204A0C30000200006700
%4E60F80004BCE00010300220 4A0C3000080000660001 4C3002D040207C00904A343830 0000CBC5
%4E66180004BD003002207C00904B1010300000024000FFC0C42D40FFFC3002E540207C009048EE
%4E63580004BD20222EFFFCD3B000003002207C009049D00030000100003006 48C02F0048790000
%4E64F80004BD40ED60320348C12F01487800074E93300648C02F00487800014878000370003005
%4E63F80004BD602F00300348C02F00487800074E94300648C02F00487800014878000570003004
%4E66F80004BD802F00300348C052432F00487800164E94300648C02F0048790000ED6C320348C1
%4E64380004BDA02F01487800094E93300648C02F0048780001487800043202207C00904B107000
%4E65580004BDC01030100 02F00300348C052432F00487800174E94300648C02F0048790000ED78
%4E69480004BDE0320348C12F014878000D4E93300648C02F00487800014878000 62F2EFFFC3203
%4E64280004BE0048C12F01487800154E943002204A0C3000080000 4FEF00906600006E3002204A
%4E65180004BE2011BC0002000030024 8C07214D0812F004EB900008E905B3F604E3002204A0C30
%4E64580004BE4000010000664230064 8C02F0048790000ED80320348C152B12F01487800044E93
%4E65880004BE6030024 8C0D080207C00904864303008004 8C02F004EB900008BD43002204A11BC
%4E63480004BE80000200004FEF00143002 48C0D080207C0090466 4427008005242700 4B0426E00
%4E6C080004BEA0FE1E4279009048 6233FC00010090485233FC012C00904B144CDF1C704E5E4E75

%4E60880004BE002F02227C00904F364242424130012049 0C300001000067000010000120490C30
%4E60780004BEE000020000670000 0E3001204 90C300008000066025242524170 04B0416ECE3002
%4E69080004BF0048C0241F4E754BE73E3023FC0000EE5000904B604279 00904B5C207C00904B60
%4E66180004BF2022505490 33D100904B5E33F90000EE4A00904B5A33FC0001 00904B5642433003
%4E6A480004BF4048C0E980D080068000910200224070 1CD3C032BCBFFF52437009B0436EE03C3C
%4E68C30004BF60AB8024700000EE5E7420227C00905FA842443A3C008032C2424330390000EE5E
%4E61480004BFB0321A3641B041 67303002D040207C009020003 1BB00003202D241207C00902B00
%4E6FB80004BFA03004D04531B010003002D040207C00903000318600005242064504005243702 9
%4E67480004BFC0B0436EB604460400524470 09B0446EA2558953424244 3602B6516D163203D241
%4E64A80004BFE0207C00903B003003534031B01000534360E6328255893403524470 09B0446ED6
%4E62130004C000300248C0 2 0 3207C0090380032025241318100003 3F90000EE4800904B58
%4E5B680004C0204CDF C7C 2E 4B 2030247C00904B5C207C00904B56227C00904B5870FEB079
%4E65C80004C04000904B52660 000 4A516D0000C65351 4A5 60000CBF32B90000EE48227C0091
%4E65980004C0600204267C00910206424242413 2DB52417007B0416EF67010D7C032DB7010D3C0
%4E68180004C08052427009B0426EE2537900904B5A4A7900904B5A6C00006A33F90000EE4A0090
%4E66080004C0A04B5A3010D1523012B0790000EE4E6F1034B90000EE4E301048C0448030806040
%4E65980004C0C03012B0790000EE4C6C3634B90000EE4C30104BC044303080301 0D152207C0090
%4E66580004C0E04B60225054903 3D100904B5E20790 0904B604A5066 0A23FC0000EE5000904B60
%4E66E80004C10030127200E360D07900904B5E33C000910 3124CDF0C044E754BE72020247C0090
%4E64080004C1204B6C4A52660000FC303900904B7E3400D040207C009020004A700000660000DE
%4E68B80004C14030024 8C02F004EB900046D384A80588F670000CA33FC000800904B6A42A7487B
%4E62C80004C160003F300248C002B0000003E00A80000003E0ED807212D0812F0032024BC1700B
%4E64780004C180E1A104810000020 03F0130390000C6BC48C02F00300243C02F004EB90000 8A84
%4E66B80004C1A0303900904B6648C02F0032024BC12F014EB900045FBA300233C000904B6833C0
%4E6C280004C1C000904B7234BCFFFF23FC00007D2900904B7B427900904B6E427900904B7C33FC
%4E6AA80004C1E0000100904BA433FCFFFF00904BDE42B900904B74487800083 00248C02F004EB9
%4E67980004C2000004C7344EB90004D6A848790000004 14EB9000480644FEF002C600C34BC0078
%4E6BD80004C22060064A526F0253524CDF04044E754E56FFF848E73000424 33003D04041EEFFF8
%4E61B80004C24042700000300320 7C009049364A300000670000B23003E540207C009048D64AB0
%4E63680004C26000006700 00A03003 48C0D080207C0090486 44A70080067000 08C3403D44241EE
%4E67480004C280FFF832034 8C1D281227C00904AF870003 03118 0072FEC081E9803 18020003203
%4E65B80004C2A0D24141EEFFF83403227C009048E6700010312000C1FC0003D1701000 3203D241
%4E66380004C2C0207C00904B087001B0701000641A3203D24141EEFFF83003D040227C00904B08
%4E64880004C2E030310000D17010003203D24141EEFFF83403227C009048EA700010312000E348
%4E68580004C300D17 100052437004B0436E00FF2C33FC. . F00904B66424142433003D04041EE
%4E66C80004C320FFF8B27000006C123003D04041EEFFF83230000033C300904B6652437004B043
%4E69D80004C3406ED84CDF000C4E5E4E75207C00904B684A5067000074 7001B07900904B6E6700
%4E66080004C360006833FC000100904B6E4A7900904BA06706537900904BA03010B07900904B70
%4E67A80004C38066084EB90004D6A860463010B07900904B72662B1 03900904BA6488048C05880
%4E68180004C3A07207C0812F00301048C02F004EB90004C7344EB90004D6A8508F601433F90090
%4E6C380004C3C04B7000904B72600833FCFFFF00904B6C4E754BE73C30362F001E227C00904B78
%4E67280004C3E0267C00904AFB247C00904B084A7900904B6E6600000A0C9100007D2967067000
%4E65C80004C4006000017E33C300904B6633FC000200904B6E427900904BA83003207C009048E6
%4E61680004C42078001830000 0C9FC00033003D040204A3A30000030 03207C009048EA74001430
%4E63A80004C4400000E34A320348C1D281204B7001B0701B0064064240600000 40B8426F08B845
%4E69D80004C4606F04702D6032BA446F08BA426F0470296026B4456F08B4446F047035601A4A44
%4E65780004C4806704702D60124A4567047029600A4A4267047035600270294BC02040B0FC002D
%4E66680004C4A060066E1C6000006EB0FC00006D0000AE6E026016B0FC0029660000A26000007A
%4E64280004C4C0B0FC003566000096605C702D22807807320348C1D281204B7000303018007201
%4E65480004C4E01404E5A1C0816724300348C0D080204B72011404E5A14641C37008003203 48C1
%4E68580004C5002F014EB9000430AC588F6050534444 446F4A60BC702D2230300320 7C009048E6
%4E6FE80004C520533000006036703522803003207C009048EA5330000060243203D241204A7000
%4E63E80004C54030301000C1FC03E8ED807229D08122803003D040204A31BC00010000320 348C1
%4E68080004C5602F014EB9000430AC2F3C0001000032034BC12F014EB90004AFF670014FEFC00C
%4E6CF80004C5804CDF0C3C4E754BE73030247C00904B66267C0090400433FCFFFF00904B6C4279
%4E66F80004C5A000904B6E4A790090485 26D0000DE7008B053620000D674003413E68A48780008
%4E69680004C5C04EB9000404BAB480588F630000BE4EB90004C22E70FFB052670000B030124BC0
%4E64A80004C5E0D080207C0090486430300800 33C000904B6433C000904B7E36135143706 4B043
%4E62780004C600600276643003E240360070329043360030 12E540207C00904BEE2230000 0700D
%4E64BB0004C620E0A92401301 2D040207C00904A3484F00000700FB0426C02740F320248C1700A
%4E66380004C640D2803003 48C0D2802F014EB9000404BA721492 42D041E5403200E940904133C0
%4E66280004C66000904B6C427900904BA2427900904BA04243598F3003D040207C00904B804270
%4E67880004C6800000524370 10B0436EEA4CDF0C0C4E754BE72020342F000E302F0012247C0090
%4E64580004C6A04B64B07900904B6666000034700 1B07900904B6E670000283002 48C02F003012
%4E6C980004C6C048C02F004EB90004D9DE508F2F0030124BC02F004EB90004C6E43482508F4CDF
%4E65FB0004C6E004044E754BE73000342F000E122F00137000300280FC002C48400280000 0FFFF
%4E64C60004C700760036028 6FC002C02830000FFFF2403EF82068200905054D0822040100 15200
%4E62FB0004C720020000 0F1210020100F0D00110804CDF000C4E754BE73000342F000E122F0013
%4E66F80004C74070003002 80FC002C484002800000FFFF760036028 6FC002C02830000FFFF2403
%4E63EB0004C760EF820682009050 54D08220404A7900904B6E661E700010100280000000F06612
%4E63380004C7807900101 5 480E98 12100201000FD00110804CDF000C4E752F02322F000A7000
%4E688800040 A3300180 00204840028 0000 0FFFF7400340184FC002C02820000FFFF2202EF81

%4E631800047C0006B100905054D081204O4A7900904B6E670C1010E8080200000F53006008101O
%4E670800047E00200000F53004A006C0270084880048C0241F4E7548E73030247C00904B68267C
%4E674800004C80000904B6A227C00904B724A526700027E70FFB07900904B6667000272 4A790090
%4E657800004C8204BDE6C00026B7002B07900904B6E66000088361 2D643207C0090200030134 8C0
%4E67FB00004C840E780227C00904BA8321148C15251E4817407C282D081D080227C0000D37A31B1
%4E66F80004C8600800300070 1FB07900904BA86C00021E4EB90004C34A487800024EB900040 4BA
%4E65F80004C88022003000134004B00E580227C0000F9C8586F2F3108004EB900048064300248C0
%4E68E80004C8A0E580227C0000F9D02F3108004EB90004803C508F600001D64A7900904BA4663E
%4E61560004C8C03412D442207C009028003012720BE36004400200318020003412D442207C0090
%4E6FE80004C8E030003212 48C1028100000 3E00A81000003E0ED81300106400012318020007208
%4E661800004C9003012B051671A321148C12F0134124 6C22F024EB90004D9DE3200508F600000A4
%4E652800004C9203011148C0721FC081E98034005942301248C0721FC08166143012D040207C0090
%4E603800004C94028004A7000006C0406420200301 2D040207C009028003030000 0EE4894403011
%4E6F480004C96048C002800000 03E00A80000003E0E28036003012D040207C0090300030300000
%4E69380004C980EE489640720170 03B0426D0870FDB0426E0242417003B0436D0870FDB0436E02
%4E64E80004C9A0720270FDB0426D0A70089041024000073200 70FDB0436D0A700C904102400007
%4E641800004C9C0320036813001D040207C0000F9D8323000004279009 04BCA700030012F004EB9
%4E667800004C9E00004CA92240032023001 33C100904BA4588F6D0000984A7900904B7C67343612
%4E663800004CA00D643207C009020003013 48C0E780227C00904BA8321148C15251E4817407C282
%4E666800004CA20D081D080227C0000D2FA31B108003000605A4A40673A7008B0536F343612D643
%4E65D80004CA40207C0090200030134 8C0E580227C00904BA8321148C15251E4817403C282D081
%4E631800004CA60D080227C0000C69C31B108003000601C3212D241207C00902000301348C0D080
%4E6C880004CA80227..000D2E831B1080010004CDF0C0C4L,54E56FFEC48E73F38362E000A247C
%4E64E80004CAA0009028002 67C00903000287C0004D2E242443C3900904B683006D040204A3D70
%4E658800004CAC00000FFEC3006D040204B3D700000FFEE08030004660001743006D040204A0670
%4E6B480004CAE0018000002F3CFFFFFF0048522F3C000406AC4E943A004FEF000C6C0678016000
%4E6F380004CB0002BA3005D040207C009020000C70800000006700001 63005D040207C00902000
%4E624800004CB200C70800100006600000C80C79020000904 03A630000BC320548C1300648C05280
%4E650800004CB40741FC0823D46FFFA2E2EFFF848C72D47FFF87420D5AEFFF802AE000003E0FFF8
%4E6AF80004CB60D0AEFFF8B28066320803000667 2C3006D040204B067000800000 2F3CFFFFFF80
%4E672800004CB8048532F3C000404C24E944A804FEF000C6C00050E7801600005083205 48C13006
%4E67B80004CBA048C05280741FC0823A0648C574209A8202850000 03E0D085B280660001FE0803
%4E63F80004CBC00007670001F63006D040204B047000800000487800 8048532F3C0004053E4E94
%4E651800004CBE04A804FEF000C6C0004B87801600004B23005D040204A720032300000700FC280
%4E63D80004CC00740CB4816E0001B478013205D241207C009040467000303010007 20AE2A82F00
%4E68D80004CC204EB90004C3D24A80588F67C0018E3006D040204A31AEFFEC00003006D040204B
%4E62C80004CC4031AEFFEE00006000017208030005660001 6A3006D040204A047001800000487 8
%4E65D80004CC60018048522F3C000406464E943A004FEF000C6C067801600001423005D040207C
%4E6DF80004CC80009020000C708000000067000016300 5D040207C009020000C70800100006600
%4E68C80004CCA000C80C79020000904 03A630000BC320548C1300648C05380741FC0823D46FFFE
%4E66B80004CCC02E2EFFFC48C72D47FFFC7420D5AEFFFC02AE000003E0FFFCD0AEFFFCB2806632
%4E682800004CCE0080300066 72C3006D040204B067000800000 2F3CFFFFFF8048532F3C000404C2
%4E67980004CD004E944A804FEF000C6C0003967801600003903205 48C1300648C05380741FC082
%4E63F80004CD203A0648C574209A82028500000 3E0D085B28066000036080300076700007E3006
%4E66A80004CD40D040204B047000800000487800 8048532F3C0004053E4E944A804FEF000C6C00
%4E638800004CD60034078016000033A3005D040204A720032300000700FC280740CB4816E3C7801
%4E665800004CD803205D241207C009040467000303010007 20AE2AS2F004EB90004C3D24A80588F
%4E67980004CDA0671 33006D040204A31AEFFEC00003006D040204B31AEFFEE0000080300066600
%4E660800004CDC001723006D040204B04700180000487801804 8532F3C0004053E4E943A004FEF
%4E60A80004CDE0000C6C067801600002B83005D040207C009020000C70800000006700001 63005
%4E60B80004CE00D040207C009020000C70800100006600000C80C790200009040386300000BC3205
%4E61B80004CE2048C1300648C05380741FC0823D46FFF22E2EFFF048C72D47FFF07420D5AEFFF0
%4E67C80004CE4002AE000003E0FFF0D0AEFFF0B28066320803000567 2C3006D040204A06700080
%4E6BC80004CE6000002F3CFFFFFF8048522F3C000406AC4E944A804FEF000C6C00022678016000
%4E666800004CE800220320548C1300648C05280741FC0823A0648C57420DA820285000003E0D085
%4E628800004CEA0B280660001FC08030004670001F43006D040204A047000800000487800804852
%4E66EB0004CEC02F3C000406464E944A804FEF000C6C0001D07801600001CA3005D040204A7200
%4E638800004CEE032300000700FC280740CB4816E0001B278013205D241207C00904046700030 30
%4E6A880004CF00100072 0AE2A82F004EB90004C3D24A80588F67000 18C3006D040204A31AEFFEC
%4E62860004CF20000030 06D040204B31AEFFEE000060000170080300076600016830 06D040204B
%4E6AD80004CF40067001800000 2F3CFFFFFF0048532F3C000404C24E943A004FEF000C6C067801
%4E6FC80004CF606000013E3005D040207C009020000C708000000067000016300 5D040207C0090
%4E617800004CF8020000C70800100006600000C40C79020000904038630000B8320548C1300648C0
%4E621800004CFA05380741FC0823D46FFF62E2EFFF448C72D47FFF4742095AEFFF402AE000003E0
%4E6BE80004CFC0FFF4D0AEFFF4B2806632080300056 72C3006D040204A06700080000 02F3CFFFF
%4E6A880004CFE0FF8048522F3C000406AC4E944A804FEF000C6C0000AC7801600000A6320548C1
%4E651800004D0003006 4BC05280741FC0823A0648C574209A82028500000 3E0D085B28066000082
%4E607800004D0200803000467000 07A3006D040204A047000800000487800 8048522F3C0004064 6
%4E65D80004D0404E944A804FEF000C6C567801605230 05D040204A720032300000700FC280740C
%4E64A80004D060B4816E3C78013205D241207C009040467000303010007 20AE2A82F004EB90004
%4E6A680004D080C3D24A80588F67183006D040204A31AEFFEC00003006D040204B31AEFFEE0000
%4E654800004D0A03006D040204A36300000EE4B3006D040204B3E300000EE4F3847320348C1700C

%4E63880004D0C0D280E8813A01024500 1F340C48C250820282000001F00A82000001F0E3823002
%4E6A380004D0E0DA40302EFFEC0240FF803206D241204A32301000241FF8090413D40FFEC302E
%4E6D080004D100FFEE0240FF803206D241204B32301000241FF8090413D40FFEE0C6EFF00FFEC
%4E6D380004D1206D00001E0C6E0100FFEC6E0000140C6EFF00FFEE6D00000A0C6E0100FFEE6F06
%4E66F80004D140427900904B7C4A7900904BCA6600017CBC45675C3005D040207C009020004A70
%4E66480004D1600000664C30054BC02F00340648C22F024EB90000BB9E33C500904B6830390090
%4E67F80004D1804B72B07900904B68508F6624103900904BA6488048C058807407C0822F003039
%4E67580004D1A000904B6848C02F004EB90004C734508F303900904B72B07900904B686600010C
%4E67080004D1C032054BC1701FC280E9813401594232390090 4B6848C1701FC280661430390090
%4E62180004D1E04B68D040204A4A7000006C04064202003003904234006C08300248C044803400
%4E62880004D200300[illegible]20548C10281000003E00A8100000[illegible]0E28190414A406C0448C044807203
%4E65280004D220B2426D0000A67203B2406D00009E303900904B7EB07900904B7067000086 3039
%4E66C80004D24000904B7EB07900904B6866000076 7201B27900904B6E6600006A0CB900007D29
%4E65680004D26000904B78672223F900904B7800904B742F3C0002000030390090 4B6648C02F00
%4E69B80004D2804EB90004AFF6508F303900904B6648C02F003439009 04B6848C22F024EB90004
%4E6B080004D2A05FBA303900904B6848C02F004EB900008BD4427900904B6872FF20014FEF000C
%4E6B480004D2C060184EB90004D6A87801323900904B7C48C1300448C0D28020014CDF1CFC4E5E
%4E66980004D2E04E7548E73C00222F0014242F0018362F001E3A3900904B68300548C02F002041
%4E68E80004D3004E903800588F6D36300448C02F004EB90004D4264A80588F6624300548C0D080
%4E65980004D3202040D1C2300548C0D0802240D3C23011D0430240FF3F3080300448C0600270FF
%4E69E80004D3404CDF003C4E7548E73C003A3900904B684279009 04B6842790090 4B6E38390090
%4E63080004D3604B7A0244003F3205D241227C00902000300448C0D080207C0000C53433B00800
%4E60980004D38010003405D442227C00903000320448C1207C0000C62470001030180032054 8C1
%4E61F80004D3A002B1000003E00A81000003E0ED81D04133802000 3605D643227C009028003204
%4E63580004D3C048C1207C0000C6607000103018003405720BE362D042320448C1D281207C0000
%4E64580004D3E0C5AC907018003380300034 05D442227C00903800300472 0AE3603205D241207C
%4E62680004D400009038003230100002410 3FFD04133802000203900904B78EC8033C0007049B0
%4E69080004D4204CDF003C4E7548E73820362F0016247C00904B7C207C00904BA83003D040227C
%4E6FE80004D440009038003831000 0700AE06C3403D442227C00902800220970002241303 12000
%4E66680004D460740FC082720CB2B06E00011A7001B07900904B6E66000108 4A52670000F6700F
%4E65980004D480B0506C0000FA0CB900007D2900904B78670000EC3003D040227C009040463831
%4E66180004D4A00000700AE06C300448C0D080227C00904AF82209C3890831000508 01C3896704
%4E63780004D4C070046002700036 04E543227C009048D62209340448C2D4803002D040207C0000
%4E67180004D4E0F98830300000 48C0C38991B13000C3896C0E3004E540227C009048D642B10000
%4E64580004D5003004227C009049D00031000200004 87800104EB9000404BA4A80588F66264678
%4E65980004D52000034EB9000404BA24003002E540207C0000F9BC588F2F3000004EB90004 8064
%4E67280004D540588F60183 00448C0E580207C0000A4762F3008004EB90004806 4588F300448C0
%4E63380004D560D080227C0090401A33BC000C08004252600C303900904B6A5240348042 507000
%4E65A80004D5806000012070 3BB0446612340348C22F024EB90004D798588F600001087009B044
%4E69080004D5A06E507027B0446D4A4A5267 34700FB0506C3A343900904B6648C22F023203 48C1
%4E69180004D5C02F014EB900046116340348C22F024EB900008BD4425270FF4FEF000C600000C4
%4E64880004D5E030390090 4B6A52403480425070006 00000B2300448C02200C389B2FC0003C389
%4E69380004D6006D00009EC389B2FC0008C3896E202241578922092241D3C12209323B10064EFB
%4E69580004D6201002007E007E007E007E007E007EC389B2FC0018C389660460000066C389B2FC
%4E6C280004D640002 7C3896D5AC389B2FC003AC3896E50224143E9FFD922092241D3C12209323B
%4E6F580004D66010064EFB100200280028002800280028002800280028002800280028002800 28
%4E66680004D680002800280 03A003A003A003A003A340348C22F024EB90000BBD470FF588F6002
%4E69A80004D6A070004CDF041C4E7548E72038247C00904BA6267C00904B6328 7C00904B723213
%4E66C80004D6C048C12F014EB90004C798146033D400904B7010124880D040207C0000F9783030
%4E62280004D6E00000D0530240001F12124881D241207C0000F9AA343010003213024103E0D441
%4E65180004D700D0423880081200005 88F6600008 6321448C12F014EB90004C79834007008B042
%4E65880004D720588F6700006E1012488048C0320248C1B3807203C0817202B280665612124881
%4E62780004D740D2424A4266080C1200066700000C4A126608 7006B04266025041 3001E2401480
%4E61A80004D76010124880D040207C0000F99830300000D0530240001F12124881D241207C0000
%4E68D80004D780F9AA343010003213024103E0D441D04238804CDF1C044E7548E73838342F001E
%4E66B80004D7A0247C00904BA0287C00902800267C00904B684A526D00003 6B47900904B726600
%4E62180004D7C0002C301248C0D080207C00904B803830080067000016 3004D040204C72003230
%4E64980004D7E00000700FC280700CB0816E067000600001963012B07900904BA26D127210B252
%4E62680004D800660C4EB90004C34A70006000017A3004D040207C009020004A700000670E3004
%4E69180004D82048C02F004EB900008BD4588F33FC000100904BCA4A7900904B6E661430125252
%4E64480004D84048C0D080207C00904B803193080060123012535248C0D080207C00904B804270
%4E65F80004D86008004B780004300248C02F004EB9000460704279009 04BDE33C400904BE83004
%4E60C80004D880D040207C0090200031BC000100003604D643204C3004720BE360044002003204
%4E61A80004D8A0D241224C32311000024100 7FD04131803000 3604D643207C009030003000448C0
%4E60D80004D8C002800000 03E00A80000003E0ED803204D241227C0090300032311000024100 7F
%4E62480004D8E0D0413180300 0[illegible]3604D643204C3002720BE360044002003204D241224C3231
%4E6F980004D900100002 41007FD04131803000 3604D643207C00903000300248C00280000003E0
%4E60A80004D9200A80000003E0ED803204D241227C009030003231100002410 07FD04131803000
%4E65C80004D9404B790000 00404EB9000480643013B07900904B704FEF000C672830390090 4B70
%4E69580004D9604BC02F00301348C02F004EB90004D9DE508F2F0030 1348C02F004EB90004C734
%4E6A780004D98050B[illegible]FF20014CDF1C1C4E754A7900904[illegible]E66000048303900904BA048C05380
%4E65680004D9A0D040207C00904BAA3030000033C000904B7248C02F00303900904B6848C02F00

%4E6CB80004D9C04EB90004D9DE508F2F00303900904B6B48C02F004EB90004C734508F4E7548E7
%4E64A80004D9E03C00342F0016322F001A38020244001F36010243001F4A44660C701FB0436606
%4E62780004DA0006440020600E4A43660A701FB0446604064300203A039A443601024303E03002
%4E62C80004DA20024003E0964072014A45660242414A43660272024A456C0A7008904102400007
%4E65080004DA4032004A436F0A700C9041024000073200 4A4566064A4366027208300148C04CDF
%4E6CE80004DA60003C4E754E56FFF448E73F38362E000A382E000E267C00904A6C247C00904A6E
%4E67480004DA803003D040207C009028007E002D47FFFC3D700000FFFE3003D040207C00903000
%4E6DA80004DAA07C003C300000426EFFF42D7C00000080FFF6426EFFFA600000F0302EFFFA48C0
%4E69380004DAC0D080207C0090496E303008003840B640670000D23A0C48C5701FCA80E9855985
%4E64780004DAE0EF85300590530C407000620000B8340C48C20282000003E00A82000003E0E282
%4E62880004DB00EF82300290520C40740062000098143900904856488202420000830 0C0240001F
%4E63080004DB2032030241001FB04163063A009A4160043A019A404A42670C7010B04562067020
%4E67880004DB4090453A00300CEA403203EA41B04163063C009C4160043C019C40202EFFF67200
%4E65580004DB60320574003406D282B0816200001C202EFFF67200320574003406D282B0816624
%4E61980004DB804A79009040446C1C7E002D47FFF63D45FFF8700030062E2EFFF6DE802D47FFF6
%4E64180004DBA03D4CFFF4526EFFFA3E2EFFFABE79009049AE6D00FF064A6EFFF4660670006000
%4E60980004DBC002C84243426EFFFA302EFFFA48C0D080207C0000F99838700800D8EEFFF42E0C
%4E6A180004DBE00247001F3847302EFFFA48C0D080207C0000F9AA30300800322EFFF4024103E0
%4E696B0004DC00D041D8C03A0C48C5701FCA80E9855985EF85300590530C40700062000052340C
%4E62280004DC2048C20282000003E00A82000003E0E282EF82300290520C407400620000323204
%4E69780004DC4048C12F01340C48C22F024EB90004E2264A80508F66000018320C48C12F014EB9
%4E6E580004DC600004E39C4A80588F670000045243526EFFFA7008B06EFFFA6E00FF4E7201426E
%4E6DE80004DC80FFFA302EFFFA207C009049364A300000673C302EFFFAE540207C009048D64AB0
%4E60E80004DCA0000672A302EFFFAD040207C00904BEA3E2EFFF4BE70000066143 02EFFFAD040
%4E6CD80004DCC0207C00904B064A7000006D025241526EFFFA7004B06EFFFA6EA8B6416C067000
%4E66380004DCE0600001A632044 8C12F01300448C0D080207C00904864343008 0048C22F024EB9
%4E69080004DD00000460703004D040207C00904BEA31AEFFF40000B87900904B66508F662B4A79
%4E68A80004DD2000904B6E6620700FB07900904BA26D16303900904BA248C0D080207C00904BAA
%4E65880004DD4031AEFFF408003004D040207C00904BD6427000004879000000404EB900048064
%4E67E80004DD603D790090400 8FFFE2E2EFFFC48C72D47FFFC7068D1AEFFFC700B2E2EFFFCE1A7
%4E6B280004DD802D47FFFC04AE00000200FFFC3C390090400A48C6706CDC800286000001F00A86
%4E60B80004DDA000001F0EF8642AEFFF64243426EFFFA588F302EFFFA48C0D080207C0000F998
%4E6D380004DDC038700800D8EEFFF42E0C0247001F3847302EFFFA48C0D080207C0000F9AA3030
%4E6D280004DDE00800322EFFF4024103E0D041D8C03A0C48C5701FCA80E9855985EF8530059053
%4E62D80004DE000C40700062000064340C48C20282000003E00A82000003E0E282EF8230029052
%4E64A80004DE2000C407400620000443005906EFFFE320048C12A016C06200544802A003002904 6
%4E6AA80004DE40320048C124016C06200244802400 2005D0822E2EFFF6BEB06C102D45FFF62E2E
%4E62E80004DE60FFF6DE822D47FFF6360C526EFFFA7009B06EFFFA6E00FF3C3004D040207C0090
%4E6BD80004DE804BE0318300007 0FE4CDF1CFC4E5E4E752F02302F000A3200D241207C00904BCC
%4E60B80004DEA048C0D080227C00904864303108003400D040227C0090200031B1000010003002
%4E68180004DEC0D040207C0090200031BC17090000241F4E7548E73E38342F0026247C0004E2DE
%4E63380004DEE0267C00904B66287C00904864300 2D040207C009048 5A72003230000002310000
%4E64E80004DF0000F00C81000000F06610487B00084EB9000404BA3A00588F6024300 2D040207C
%4E64080004DF2000904B5A72003230000 0E889700FC2802001D080227C0000BFF03A3108003002
%4E63480004DF40D040207C00904BEA3C300000424430 04207C0000F9EA72001230000 0D2450241
%4E64E80004DF600007300148C0D080207C0000F998363008 00D6460243001F300148C0D080227C
%4E62E80004DF800000F9AA3031080032060241 03E0D041D6407220B2436E0002100C4304006C00
%4E67C80004DFA00208300348C0721FC081E9805980EF80907900904A6C0C40700062 0001EC3003
%4E65D80004DFC048C0028000000 3E00A80000003E0E280EF80907900904A6E0C407400620001CA
%4E66680004DFE0300248C02F00300348C02F004EB90004E2264A80508F660001B0300348C02F00
%4E66080004E0004EB90004E39C4A80588F6700019C3002D040207C00904BE0318300002F3C0010
%4E69480004E020000030024 8C02F004EB90004AFF6B453508F662A4A7900904B6E6622720FB279
%4E64180004E04000904BA26D18207C00904BA2301052504 8C0D080227C00904B80338308003002
%4E65680004E06048C0D080224C303108004 8C02F004EB900008BD4300248C0D080204C31830800
%4E64580004E0803003D040207C009020004A700000588F6756300248C02F00300348C02F004EB9
%4E67680004E0A000049C364A80508F6610300348C02F004EB90004E36C588F602E3002207C0090
%4E62F80004E0C049360C30000800006 61E3203D241207C009020003002D040227C00904BCC31B1
%4E6F680004E0E000001000600001 3A300248C02F0042A7300348C0028000000 3E00A80000003E0
%4E64380004E100ED8[illegible]212D0812F00[illegible]48C1700BE1A1C[illegible]3100000200700CD28030024 8C0D280
%4E66980004E1202F014B781709300348C02F004EB900008A84300248C02F00300348C02F004EB9
%4E62C80004E140000460703002 48C02F00300348C02F002F3C000404C24E92300248C02F003003
%4E66780004E16048C02F002F3C0004053E4E92300248C02F00300348C02F002F3C000406464E92
%4E66E80004E180300248C02F00300348C02F002F3C000406AC4E92B4534FEF00506600008433C3
%4E66580004E1A000904B646000007A52447208B2446E00FD9E3202D241207C00904BE0300248C0
%4E63480004E1C0D080224C3031080036003180100 02F3C001000003002 48C02F004EB90004AFF6
%4E68080004E1E0300248C02F00300348C02F004EB900046070B4534FEF0010661C4A7900904B6E
%4E64F80004E2006614303900904BA248C0D080207C00904B8042700800B453660633C300904B64
%4E64780004E2204CDF1C7C4E7548E73800322F0012342F00163001D040207C0090200038300000
%4E60F80004E24030 01D040207C00903800363000007 00AE06B0C4480006700004870 01B0446700
%4E62380004E2600040D241207C00902800700030301000720FC081720CB2806F000026703BB043
%4E61D80004E28067000 01E7004B04367000008 7003B04366123002207C009048EA4A3000006604
%4E64F80004E2A07001600270004CDF001C4E752F02342F000A300248C0D080207C009048643230

%4E64080004E2C00800D241227C009020003002D040207C00904BCC33B000001000241F4E7548E7
%4E66380004E2E03C00282F0014362F001A342F001E300348C02F0020444E903A0058BF6D000068
%4E62D80004E3003005D040207C00902800720032300000700FC280700CB0816F4C3005D040207C
%4E6E880004E32000902000C7080010000673A3005D040207C009020000C70800000000672B3002
%4E68580004E34046C02F003005480C02F004EB900049C364AB0508F6698300548C02F004EB90004
%4E6BC80004E360E36C588F60884CDF003C4E75302F0006B07900904B68661642790090486833FC
%4E60B80004E380FFFF00904B6C33FCFFFF00904B6648C02F004EB900008BD4588F4E7548E73E00
%4E62680004E3A0342F001A3802700BE1640444020030024BC00280000003E00A80000003E0ED80
%4E63480004E3C03C004245300548C0D080207C0000A39E36300800300202400 3E0D640300548C0
%4E63380004E3E0D080207C0000A38E30300800D0420240001FD6407020B0436C00007A0C430400
%4E61F80004E4006C0000723203D241207C00902800700030301000720FC081720CB2806E563003
%4E6FE80004E420D040207C0090280072003230000070003004928 04A816C06200144B022000C81
%4E6F480004E4400000007C06E00002E3003D040207C00903000720032300000700030069 2804A81
%4E65A80004E4606C06200144B022000C81000007C06E047000600C52457008B0456E00FF4870FF
%4E69580004E4804CDF007C4E7548E7303B342F001A247C00904A10267C00904A08287C00904A18
%4E60980004E4A03002D040204A4A7000006F0001443002D040204A537000003002D040204A4A70
%4E61980004E4C0000006600014C3002D040204C527000003002E540207C009048D60CB0000001F4
%4E63580004E4E000006C423002D040207C00904A003030000048C0E5803202E541227C009048D6
%4E66380004E500B0B110006F204B7B000 4300248C02F004EB90004AFF6300248C02F004EB90004
%4E64C80004E52067DC4FEF000C3202D241207C00904A007014B07010006C383002D040204B3202
%4E60E80004E540D241227C00904A000322 11000D37000003002D040204B0C707D0000006F0000B2
%4E60880004E5603002D040204B31BC7D000000600000A23002D040224B3031000048C03202D241
%4E63180004E580204C81F01000360070508 0436C463202D241204C7003B07010006C3848780002
%4E68780004E5A04EB9000404BAE580227C0000F9F2588F2F3108004EB900048 03C3002D040204A
%4E66780004E5C031BCFDA800003002D040204B427000005 8SF603C703CB0436F363002D040204C
%4E6E880004E5E0427000003002D040204B427000060203002D040204A527000003002D040204A
%4E60080004E6004A700000660A3002D040204C427000003002D040204A4A700000661A3002D040
%4E63D80004E620204A31BC003C00003002D040207C00904A00427000004CDF1C0C4E7500904A00
%4E68180004E640427000004CDF1C0C4E753A03EA4D3B02EA4C0839000400 7048B1672230059084
%4E6D480004E6600C800000001063060644002060103004908 50C800000001063040645002034 04
%4E63580004E680944572014A46660242 14A42660272024A466C0A7008904102400007 32004A42
%4E65980004E6A06F0A700C904102400007 32004A4666064A42660272087000300 14CDF007C4E75
%4E67880004E6C048E73C3B382F0022342F0026247C0090488A267C00047872287C009049443004
%4E64480004E6E0D040207C009038003A300000720AE26D36050C4300016D0007C20C4300106E2A
%4E65680004E700D643363B30044EFB3002009C07B007B007B007B007B007B007B0005600560056
%4E64680004E7200760073A07B0014001400C4300316D00078A0C43003E6E000782D643363B30A4
%4E68880004E7404EFB300204C6077604AC05CE05CE02E602E6013403A203D603F20404040A00D8
%4E69880004E760300548C02F004EB90004D8004A80588F670A48790000003F4E93588F2F3C0080
%4E65D80004E7800000300248C02F004EB9000493044A7900904890508F6F064279009004890425 2
%4E66F80004E7A072FF6000072A42A7300448C02F004EB90004364A3002D040207C00904AFC3202
%4E65E80004E7C0D241227C0000FD483602D643247C009049FE32311000358130004 8C144813181
%4E60480004E7E000003002D040207C009049644270000030020D040207C0090401E31BC00120000
%4E64F80004E8002F3C040000000300248C02F004EB90004930472FF4FEF0010600006B43002D040
%4E65180004E820207C00904B8C4A7000006D046000068C300248C02F00300448C02F004EB90004
%4E65680004E840C7422200508F600006864252300548C02F00300448C02F0048C22F024EB90004
%4E68C80004E860D37A4A7900904890 4FEF000C6F064279009048906000FF2A3002207C00904940
%4E6FB80004E880720 [illegible] 2300000 [illegible] 602700010343000D280 [illegible] B308164522F3C02000000300248C0
%4E65F80004E8A02F004EB90004 [illegible] 044245508F3005E540207C009049304AB000006D1E3005207C
%4E60C80004E8C00090495 80C30000100000660E30050C34000C000064040600005E252450C450004
%4E65480004E8E06DCA4252600005C442523002E540207C0000FD502F3000004E93487800643002
%4E66D80004E90048C02F004EB90004F19642A7300448C02F004EB900046A903004D040207C0090
%4E62980004E92040563030000 0720AE268320055404FEF00146C0A30025234000060000 0CA700C
%4E61D80004E9403A027600163450009 0433A02227C009049407600163150009043B2406F0000A2
%4E62F80004E96036021200D33430003604D643207C0090405648C0720AE3A0917030003004D040
%4E60380004E980207C0090405672003230000000 2810000FC000C8100000400 66463004D040207C
%4E61B80004E9A00090200031BC0AFC00003004D040207C0090280006700200000 03604D643207C
%4E61080004E9C000903000D844227C00903000720032314000028 10000FFC07009828031813000
%4E68280004E9E0300248C02F004EB9000465604A7900904890588F6F064279009048906000 04BC
%4E63C80004EA003002D33400000 300248C02F004EB900046560487800033002 48C02F004EB90004
%4E60880004EA2093044FEF000C600004 8242523002207C009049407200123000 00360270001034
%4E63A80004EA403000D280700BB0816400005C2F3C0200000030024 8C02F004EB9000493040C45
%4E65A80004EA600037508F663C42453005E540207C009049304AB000006D1E3005207C00904958
%4E60080004EA800C300001000066 0E30050C34000C000064040600000 42652450C4500046C00040C
%4E61780004EAA060C66000041630022 07C009049405230000030 02E540207C0000FD902F300000
%4E68480004EAC04E93300248C02F004EB9000465604878000 20300248C02F004EB9000493044FEF
%4E65680004EAE00010600003C648780006300248C02F004EB9000495CA3002D040207C0090489A
%4E65080004EB0031BC04B00000E542207C0000FD902F3020004E9342526000FF0A487800073002
%4E66F80004EB2048C02F004EB9000495CA3002D040207C009048A260CA48780008300248C02F00
%4E64880004EB404EB9000495CA60BE4878000960EC3004D040207C009020007200323000000481
%4E65C80004EB6000001700E4B12F01300248C02F004EB9000495CA3A00508F664C3002207C0090
%4E6FE80004EB8049407200123000003602700010343000D280700CB0816310300 2207C00904940
%4E64F80004EBA052300000 7A01601E0C790001009048BC66144878000 64300248C02F004EB90004

%4E68E80004EBC0F1967A01508F4A456722300248C02F004EB900046550E542207C0000FD902F30
%4E65080004EBE020004E934252508F600002C0600002CC363900904B087000300380FC03E80280
%4E65E80004EC000000FFFF52802F00602E4878008030024 8C02F004EB90004930430022 07C0090
%4E66380004EC2049FA5230000076640C79009800904000508F6400027642A7300448C02F004EB9
%4E63F80004EC4000046A9050BF0C79000100904 8BC670E3002D040207C00904892547000003002
%4E64080004EC60D040207C009048927200323000003039009048BC48C0D080B28063183002D040
%4E67280004EC80207C0090489232390090 48BC48C1D281318100004245BA42673E3005E540207C
%4E62880004ECA0009049304AB00000672E3005D040207C009048920C70000100006 31C3005D040
%4E61F80004ECC0207C00904892537000003005207C009048 8C0030000200005 2450C4500046 6B6
%4E65B80004ECE03002E540207C0000FD902F3000004E93300348C02F0030024 8C02F004EB90004
%4E63280004ED00F196207C009048 8C003000022000 6000FE043002207C00904AB04A300000674A
%4E60C80004ED203002207C00904AB0523000003002207C00904AB00C30000A0000 66520C790001
%4E66F80004ED4000904 8BC6F483002E540207C0000FD702F3000004EB900047B4A487900000B9
%4E66180004ED604EB90004784A508F602442453005207C00704AB0423000005 2450C4500046DEC
%4E61A80004ED803002207C00904AB011BC000100003002E540207C009049307264D3B000003002
%4E67E80004EDA0E540207C009049300CB0000000C800006D1C3002D040207C009049D031BCFFFF
%4E6F680004EDC000003002207C00904A8442300000 3002207C0090488C003000020000 48780020
%4E67C80004EDE04EB9000405F0721DB280588F6C303002207C0000FDD8103000004880 48C02F00
%4E67A80004EE004EB9000405F0E5803202E541227C0000FDC8D0B11000588F28402F14600E3002
%4E66C80004EE20E540207C0000FD802F3000004E93588F4878000130024 8C02F004EB900049304
%4E62980004EE406000FDA230024A34000066046000006C4252300253340000300248C02F004EB9
%4E60380004EE600004656048780 00D602230024A3400006602604642523002533400003002 48C0
%4E68E80004EE802F004EB90004656048780 00C300248C02F00300448C02F004EB90004EED64679
%4E65580004EEA0000000154E934FEF00144A79009048906F0C4279009048906004720060103004
%4E6D980004EEC048C02F004EB90000E4B672FF588F20014CDF1C3C4E7548E73820362F0016342F
%4E65C80004EEE0001A382F001E247C00904A40227C00904A303003D040207C009020000C709D7C
%4E62080004EF000000653A300248C0D080D040320248C1D2815281D24133831000338300003002
%4E62280004EF2048C0D080D040427200003002 48C0D0805280D04035BC000200006 00000B83003
%4E65380004EF40D040207C009020000C709D3C0000653C300248C0D080D040320248C1D2815281
%4E62480004EF60D2413383100033830000300248C0D080D04035BC000300003002 48C0D0805280
%4E63780004EF80D04035BC000100006000006A42410C44000D662E48C12F01300248C02F003003
%4E68980004EFA048C02F004EB90004F00032004 8C12F01300248C02F0048C32F034EB90004F0CA
%4E66D80004EFC0602C48C12F01300248C02F00300348C02F004EB90004F0CA320048C12F013002
%4E6B380004EFE048C02F0048C32F034EB90004F00032004FEF00184EB9000429504CDF041C4E75
%4E66880004F00048E  :00382F001A362F001E342F0022:  J4EA453C040246001F0C4200026C4C
%4E66A80004F020320648C12F0130054 8C053802F004EB9000428F44A80508F6732300348C0D080
%4E63780004F040320248C1D081D040207C00904A3031840000300348C0D080320248C1D081D040
%4E63180004F060207C00904A404270000052420C4200026C4E320648C12F01300548C052802F00
%4E67180004F0804EB9000428F44A80508F6734300348C0D080320248C1D081D040207C00904A30
%4E62180004F0A031840000300348C0D080320248C1D081D040207C00904A4031BC000200005242
%4E69C80004F0C0300248C04CDF007C4E7548E73E00382F001A362F001E342F00223A04EA453C04
%4E66A80004F0E00246001F0C4200026C4E320648C153812F01300548C02F004EB9000428F44A80
%4E63B80004F100508F6734300348C0D080320248C1D081D040207C00904A3031840000300348C0
%4E63080004F120D080320248C1D081D040207C00904A4031BC000300005 2420C4200026C4E3206
%4E66B80004F14048C152812F01300548C02F004EB9000428F44A80508F6734300348C0D0803202
%4E64880004F16048C1D081D040207C00904A3031840000300348C0D080320248C1D081D040207C
%4E65F80004F18000904A4031BC000100005242300248C04CDF007C4E7548E73800362F0012382F
%4E63980004F1A0001632 03E541207C009049483403D442227C009048927000 30312000C0C4D1B0
%4E65280004F1C01000207C009048 8C003000013000 4CDF001C4E7548E73000322F000E48C1302F
%4E65280004F1E0001248C0EB80D081D08041F90090200043F900903800363C0040383C08004282
%4E60780004F200064000400 24007FEB0436D18323000000C41800066123231000002 41FC000C41
%4E60F80004F220FC0067040642001004400080024007FEB0436D18323000000C41800066103231
%4E62580004F24000000241FC000C41FC006702504232005540024 0003E024107C0D041B0436D18
%4E6FC80004F260323000000C41800066103231000002 41FC000C41FC006702524206400040B043
%4E60A80004F2806D18323000000C41800066103231000002 41FC000C41FC00670254420640004 0
%4E62B80004F2A0024007FEB0436D18323000000C41800066103231000002 41FC000C41FC006702
%4E61480004F2C0584232005840024 0003E024107C0D041B0436D18323000000C41800066123231
%4E61180004F2E000000241FC000C41FC00670406420080044000 40B0436D18323000000C41B000
%4E62180004F30066123231000002 41FC000C41FC006704064200400440004 0024007FEB0436D18
%4E60E80004F3203230000000C41800066123231000002 41FC000C41FC006704064200202 0024CDF
%4E67E80004F340000C4E7548E73E38382F0026362F002A247C00904964267C00904890287C0004
%4E62880004F36005F03003D040207C009049B808300002000167047A0460027A00DA433004D040
%4E62580004F380207C009038003C300000700AE06E30060C40000 16D0005120C40003E6E00050A
%4E6CF80004F3A0D040303B00044EFB000203A804FE04FE04FE04FE04FE04FE04FE03A803A803A8
%4E68D80004F3C000A800A8007C03A803A800E001A801A801A8014C04FE01A800E004FE00E004FE
%4E68C80004F3E0027A02AE0338027A02AE0338027A02AE0338027A02AE0338027A02AE033804FE
%4E6A180004F40004FE04FE027A02AE033803A803AE03A803A803A803A803A803A803A803A803A8
%4E65F80004F42003A803A803A83003D0404A720000671230 0348C02F004EB90004BC1E588F6000
%4E64180004F44000A60C79000100904BB0660001C06000019 6487804C0487805C0300448C02F00
%4E6B680004F4604EB9000484024A804FEF000C6718300348C02F00300448C02F004EB90004E6C0
%4E63F80004F4802400600002F6600002CA300448C02F00D643207C009048BE3030300048C02F00
%4E68580004F4A04EB900046B6674FF600002D0487800193003 48C02F004EB90004F196508F3003

%4E69180004F4C048C02F00300448C02F004EB900044EDA300448C02F004EB90000E4B6D6434272
%4E65780004F4E030004FEF000C4A536F024253427900904B8A6000025E3004D040207C00902800
%4E62280004F5000B30000400016 74A3004D040207C009028000270FFEF00003204D241207C0090
%4E6FE80004F5202000D844227C00904056740034314000700AE0AA30027400340006820000 0200
%4E60680004F540D482227C0000B91231B12800100060000 0BC3003D0404A72000067000 0803003
%4E67180004F560D040207C0000FDEC3430000048C22F024E9432003005D040227C0000FDDCD271
%4E6EC80004F58000000 3004D040207C00902800937000003430000 00242000F300648C0227C0000
%4E65F80004F5A0B2027200123108009441 54425742588F6400FEFA300348C02F00300448C02F00
%4E68B80004F5C04EB900044EDA48780019300348C02F004EB90004F1964FEF001060300C790001
%4E63780004F5E000904BB066263003D0403203D241227C0090495C3431100048C2528235820000
%4E65A80004F600D643207C009049744270300033FC0001009049B64A536F02425342790090488A
%4E61280004F62060000286300 5D040207C0000FDF43A3000003003D0404A720000670000D03405
%4E68380004F64048C2487800044E94B480588F6F0000BE4878000A6000FE5A3005D040207C0000
%4E66D80004F660FDF43A3000003003D0404A72000006700009C340548C2487800044E94B480588F
%4E65B80004F6806F00008A300348C02F00300448C02F004EB900044EDA3004D040207C00903800
%4E62780004F6A0047004000000D844207C0090200034064 8C2538 2D482227C0000B24231B12800
%4E66680004F6C04000487800 0A300348C02F004EB90004F19633FC0001009049B64FEF00106000
%4E65880004F6E0FF343005D040207C0000FDF43A3000003003D0404A72000067123405 48C24878
%4E67F80004F70000044E94B480588F6E00FF7A4A456F3E3003D0404A72000066340C7900010090
%4E64280004F7204BB0662A3003D0403203D241227C0090495C3431100048C2528235820000D643
%4E63980004F740207C00904974427030006000FEC06000015874FF600001543003207C00904944
%4E63580004F7604A300000661A2F3C0800000 0300348C02F004EB9000493047400508F6000012C
%4E63E80004F780300 [illegible] 07C009049445330000 0300348C0[illegible] [illegible]04EB90004656030 0348C0E580207C
%4E65280004F7A00000FD502F3008004EB9000478723003D040207C009049FE31BC001E00003003
%4E69A80004F7C048C02F00300448C02F004EB900044D74343900904 8BC48C2D48250822F024E94
%4E66E80004F7E03A000C4500014FEF001466047A1B60280C4500036C047A38601E0C4500076C04
%4E63E80004F8007A3360140C450007670000080C45000966047A3660027A3442A7300548C02F00
%4E60580004F820320548C1207C0000B1C2700010301800320448C10281000003E00A81000003E0
%4E64280004F840ED81D0812F00300548C0227C0000B2027400143108003204 48C1700BE1A13005
%4E64780004F86048C0D080207C0000B14430300800 48C09280D4812F02300548C0D080207C0000
%4E68D80004F880B242303008004 8C02F0048C42F044EB90000E36642790090488A4A534FEF0018
%4E6C180004F8A06F02425360000002740020024CDF1C7C4E75F0F0F0F0F0F0F0F4F0F0F0F0F0F0
%4E61F80004F8C0F0F0F0F0F0F0F0F0F0F070F0F0F0F0F0F0F0F0F0F0F0F0F0F0F0F0F0F0F0F0F0F0
%4E62980004F8E0F0F0F0F0F0F0F0F0F0F0F0F0F0F0F0F0F0F0F0F0F0F0F0F0F0F0F0F0F0F0F0F0F0
%4E61080004F9002F5D0F0AE1F070F0F0F0F0F0F0F0F0F0F0F0F0B3F0E0F0F0F0F0D0F0F0F0F0
%4E61D80004F920F0F0F0F0F0F0F0F0F0F0F0F0F0F0F0F0F0F0F0F0F0F0F0F0F0F0F0E0F0F0F0F0
%4E61480004F940F0F0F0F0F0F0F0F0F8F0F0F0F0F0F0F0F0F0E0F0F0F0F0F070F040F0F0F0F0
%4E62280004F960F0F0F0F0F0F0F0F0F0F0F0F0F0F0F0F0F0F0F0F0F0F0F0F0F0F0F0F0F0F0F0F0
%4E62380004F980F0F0F0F0F0F0F0F0F0F0E0F0F0F0F0F0F0F0F0F0F0F0F0F0F0F0F0F0F0F0F0F0
%4E61D80004F9A0F0F0F070F0F0F0F0F0F0F0E0F0F0F0F0F0F0F0F0F0F0F0F0F0F0F0F0F0F0F0F0
%4E62B80004F9C0F0F0F0F0F0F0F0F0F8F0F0F0F0F0F0F0F4F0D0B1F0F0F0F0F0F0F0B0F0F0F0
%4E62580004F9E0F0F0F090F0F0F0F0F0F0F0F0F0F0F0F0F0F0F0F0F0F0F0F0F0F0F0F080F0F8F0
%4E62C80004FA009ADE8F07F0F0F0F0F0F0F0F0F0F0F0F0F0F0D0F0F0F0F0F0F4F0D0F0F0F0F0
%4E61A80004FA20F0F0F060F0F0F0F0F0F0F0F0F0F0F0F0F8F0B0F0F0F0F0F0F0F0F0F0F0F0F0F0
%4E62180004FA40F0F0F0F0F0F0F0F0F0F0F0F0F0F0F0F0F0F0F0F0F0F0F0F0F0F0F0F0F0F0F0F0
%4E62180004FA60F0F0F0F0F0F0F0F0F0F0D0F0F0F0F0F0F0F0F0F0F0F0F0F0F0F0F0F0F0F0F0F0
%4E62780004FA80F0F1F0F0F0F0F0F0F0F0F0F0F0F0F0F0F0F0F0F1F0F0F0F0F0F0F0F0F0F0
%4E62D80004FAA0F0F8F0F0F0F0F0F0F2F0B0F0F0F0F0F0F0F0F0F0F0F0F0F0F0F0F0F0F0F0F0F0
%4E62980004FAC0F0F0F0F0F0F0F0F0F0F0F0F0F0F0F0F0F0F0F0F0F0F0F0F0F0F0F0F0F0F0F0F0
%4E62D80004FAE0F0F0F0F0F0F0F0F0F0F0F0F0F0F0F0F0F0F0F0F0F2F0F0F0F0F0F0F0F0F0F0F0
%4E62580004FB000E9F0FAD60F07CF0F0F2F0F0F0F0F0F0F0F0F0F0F0B0F0B2F0F0F0F0F0F0F0F0
%4E62980004FB20F0F0F0F0F0F0F0F0F1F0F0F0F0F0F0F0F8F0F0F0F0F0F0F0F0F0F0F0F0F0F0F0
%4E60F80004FB40F0F4F0F0F0F0F0F0F0F0F0F0F0F0F0F0F0F0F0B0F0F0F0F038F000F0F0F0F0
%4E62280004FB60F0F0F0B0F0F0F0F0F0F0F0F0F0F0F0F0F0F0F0F0F0F0F0F0F0F0F0F0F0F0F0F0
%4E62780004FB80F0F1F0F0F0F0F0F0F0F0F0F0F0F0F0F0F0F0F0F0F0E0F0F0F0F0F0F0F0F0F0
%4E62680004FBA0F0F4F0F0F0F0F0F0F0F4F070F0F0F0F0F0F0F0F0F0F0F0F0F0F0F0D0F0F0F0F0
%4E62B80004FBC0F0F0F0F0F0F0F0F0F0F1F0F0F0F0F0F0F0F0F0F0F0F0F8F0F0F0F0F070F0F0F0
%4E62A80004FBE0F0F0F0E0F0F0F0F0F0F0E0F0F0F0F0F0F0F0F0F0F0F0F0F0F0F0F0F0F0F0F0F0
%4E6FC80004FC004F554F03F0F0F0F0F0F4F030F0F0F0F0F0F0F060F0F0F0F0F0F0F060F0F0F0F0
%4E63180004FC20F0F0F0F0F0F0F0F0F0F2F0B0F0F0F0F0F0F0F0F0F0F0F0F0F0F0F0F0CF0F0F0F0F0
%4E62580004FC40F0F1F0F0F0F0F0F0F0F0E0F0F0F0F0F0F0F0F0F0F0F0F0F0F2F0F0F0F0F0F0
%4E62580004FC60F0F0F0F0F0F0F0F0F0F0F0F0F0F0F0F0F0F0F0F0F0F0F0F0F0F0F0F0F0F0F0F0
%4E62F80004FC80F0F0F0F0F0F0F0F0F0F0F0F0F0F0F0F0F0F0F0F0F0F0F0F0F8F0F0F0F0F0F0
%4E62A80004FCA0F0F1F0F0F0F0F0F0F0F0F0F0F0F0F0F0F0F0F0F0F0F0F0F0F0F0F0F0F0F0F0F0
%4E63180004FCC0F0F0F0F0F0F0F0F0F4F0F0F0F0F0F0F0F0F0F0F0F0F0F0F0F2F0F0F0F0F0F0
%4E62D80004FCE0F0F0F0F0F0F0F0F0F0F0F0F0F0F0F0F0F0F0F0F0F0F0F0F0F0F0F0F0F0F0F0F0
%4E62380004FD000B0F6F1D24F0FBF0F0F2F0F0F0F0F0F0F0F0F0D060F0F1F0F0F8F0F0F0F0F0F0
%4E61A80004FD20F0F0F0F0F0F0F0F0F0F070F0F0F0F0F0F0F0F0F0F0F0F0F0F0F0F0F0F0F0F0F0
%4E612B0004FD40F0F0F0E0F0F0F0F0F0F0F0F0F0F0F0F0F0F0F0F0F0F0F0F074F020F0F0F0F0
%4E62680004FD60F0F2F0D0F0F0F0F0F0F0F0E0F0F0F0F0F0F0F0F0F0F0F0F0F0F2F0E0F0F0F0F0
%4E61C80004FD80F0F0C0D0F0F0F0F0F0F0F0D0F0F0F0F0F0F0F0F0F0F0F0F0F0F0F070F0F0F0F0
%4E62880004FDA0F0F0F0F0F0F0F0F0F0F0B0F0F0F0F0F0F0F0F0F0F0F0F0F2F0F0F0F0F0F0

%4E64180004FDC0F0F1F0F0F0F0F0F0F0F0F0F0B0F0F0F0F0F0F0F0F0F0C2F0FDF0F0F6F0F0D0F0F8F0
%4E62680004FDE0F0F0F0F0F0F0F0F0F0F0F0F0F0F0F0F0F0F0F0F0F0F0F0F0F0F0F0F0F0F0F060F0F1F0
%4E61A80004FE00432F4F2CF0F0F0F0F0F0F0F0F0F0F0F0B0F0F0F0F0F0F0F0F0F0F0F0F0F0F0F0F0F0
%4E62280004FE20F0F1F0B0F0F0F0F0F0F1F0F0F0F0F0F0F0F0F0F0F0F0F0F0F0F0F1F0F0F0F0F0F0
%4E62580004FE40F0F0F0F0F0F0F0F0F0F0F0F0F0F0F0F0F0F0F0F0F0F0F0F0F0F0F0F0F0F0F0F0F0F0
%4E62580004FE60F0F0F0F0F0F0F0F0F0F0F0F0F0F0F0F0F0F0F0F0F0F0F0F0F0F0F0F0D0F0F0F0F0
%4E63080004FE80F0F0F0F0F0F0F0F0F0F0F0D0F0F0F0F0F0F0F0F0F0F0F8F0F1F0F0F0F0F0F0
%4E62D80004FEA0F0F0F0F0F0F0F0F0F0F0F0F0F0F0F0F0F0F2F0F0F0F0F0F0F0F0F0F0F0F0F0F0F0
%4E6C480004FEC0F0F0F0F0F0F0F0F0F0F0F0F0F0F0F0F032904E7540C046FC270033C00003800
%4E65780004FEE033C00003804046C04E7540C046FC270033C00003800033C00003807046C04E75
%4E61B80004FF0033C      03800031800004E7533C00003       50BC33C00003800033C00003FB2A
%4E60B80004FF2031B000004E754BE73E004200140012001601700010012B3C000380004245427 9
%4E60C80004FF400080310020441010720032O5E9897040D2B03C013206700030062040D1C41010
%4E60280004FF602044D61020445288D41070003001204OD1C4101072024279008031007000300 1
%4E64A80004FF802040D1C4D6107000300152802040D1C4D41054410C41200065DC52457204B245
%4E64F80004FFA0629C42400C0300FF66080C0200FE6602700142790080310072003200 7010E1A9
%4E6AB80004FFC070001003E1887600160 2D083D28020014CDF007C4E75F0F0F0F0F0F090F0D0F0
%4E61080004FFE0F0F0F0D0F0F0F0F0F0F0F0F0F0F0F0F0F0F0F0F0F0F0F0F0F0F0F0F0F0F000000
%0A81640000
tra

What is claimed is:

1. A video game comprising:

a central processing unit;

a video display;

a plurality of sets of controls coupled to said central processing unit;

sofware means run by said central processing unit and coupled to said controls, and to said video display for reading player input from said controls and generating, storing, changing and outputting data for causing said video display to display a maze populated by a plurality of different kinds of characters each having attributes, said maze also being populated by a plurality of attribute-affecting entities including monsters, each said character having attributes including longevity and abilities including the ability to fight and to move, said attributes defined by stored data, said longevity attribute defined by stored data and decreasing over time and when that character is damaged by a monster, and including means for displaying different types of resources having characteristics defined by stored data and displayed on said video display throughout said maze in quantities and loctions established by said software means, said resources increasing the longevity attribute or otherwise affecting the attributes of the first character which is displayed to have obtained possession of them, and for causing said video display to display action by said characters and said monsters in accordance with rules of said game implemented by the following included means:

first means for allowing a plurality of players to each simultaneously and independently control the movements and actions of one of said plurality of characters in the video game via said controls;

second means for allowing any one of said plurality of players to enter the game at any time and simultaneously and independently control the movements and actions of one of said characters independently of when the other players started playing or when any other said player or players stops playing; and third means for encouraging the players to cooperate during play by displaying on said video display only a window portion of said maze which is related to the relative positions of all the characters being active in that they are controlled by a player at that time and by not allowing any active character to move outside the bounds of said window portion and by moving the window portion to display different portions of said maze only so long as all the active characters are contained in said window portion.

2. The apparatus of claim 1 further comprising means for independently changing the stored data regarding the attributes of each character based upon events which happen to that character and actions taken by that character during the game.

3. The apparatus of claim 1 wherein characters which are under control of any player are active characters and further comprising means in said software means for reading player command inputs indicating a desire to cause the character under that player's control to appear on said video display to shoot and for causing the appropriate active character to appear to shoot, and if the character appearing to shoot is displayed on said video display as pointing at other characters or any said limited resource or a monster, for causing the video display to show the character appearing to shoot the other character or said limited resource or monster being pointed at and for causing the stored data corresponding to the other character, monster or limited resource so shot to be altered and to drive said video display according to said altered data so that said limited resource or said monster that was shot appears to be altered or the longevity attribute of the character which was shot is altered.

4. The apparatus of claim 1 further comprising fourth means in said software means for allowing any of said plurality of players to stop playing at any time regardless of whether the other players are or are not still playing.

5. The apparatus of claim 4 wherein said software means includes means for displaying limited resources and means for reading player control inputs controlling the corresponding character is a manner to appear to take possession on said video display of one or more of said displayed limited resources where taking possession occurs when said character is displayed to have entered an area around the displayed location of said limited resource, and further includes means to alter the stored data associated with that character's attributes by increasing the character's longevity or by otherwise affecting the character's attributes in a positive manner to help avoid reduced longevity of that character resulting from attacks from said monsters, and wherein these effects may not be the same on each character which possesses that limited resource, and further comprises means for altering the data associated with said limited resource to alter the availability of said limited resource to other characters who attempt to take possession of said limited resource.

6. The apparatus of claim 5 wherein said software means includes means for displaying a window portion of at least one maze occupied with attribute-affecting entities including said monsters or other entities and for causing said attribute-affecting entities to appear on said video display to attack and otherwise harm said characters by altering the stored data associated with the longevity attribute of each character so attacked or harmed thereby shortening the longevity attribute of any character which is affected by said attribute-affecting entity, and further comprising means in said software means for driving said video display in such a manner as to display only said window portion of said maze, said window portion selected to encourage the players which are controlling the characters which are active in the game to cooperate with each other to avoid the effect of said attribute-affecting entities by not allowing a player to move his or her controlled character outside the bounds of the currently displayed window portion and by selecting the portion of said maze which will be displayed as said window portion as a function of the collective positions of all the players such that said window portion cannot be moved to encompass the area in said maze where said limited resources are located until all the characters are moved on said video display such that said window portion can encompass all said characters and said limited resource or any other object in the maze which the players desire their characters to be able to reach, wherein said software means moves a character under player control by altering stored data defining the character's position on said video display in accordance with player control inputs indicating the direction to move the controlled character, and wherein said software means includes means for altering the stored longevity data to increase the longevity of any character which first obtains possession of at least one type of said limited resources.

7. The apparatus of claim 6 further comprising means for allowing each player to control his character to either cooperate or compete with the other characters independently of the actions of the other characters in either cooperating or competing with each other.

8. The apparatus of claim 7 further comprising collision means in said software means for allowing a first player to hinder the progress of a second player's character which may independently be attempting to obtain possession of said limited resources or otherwise attempting to move through said maze, said hindrance caused by reading the control inputs of the first player to move the first player's character into the path of the second player's character or to such a position that a wall portion of the maze and the first player's character together block the path of the second player's character, including means to check for collisions between the second player's character and another character or a wall of the maze and to prevent movement of the second player's character if such movement would cause such a collision, said collision means also for allowing one player to impede free movement of the other player's characters throughout the displayed maze by refusing to move so that said window portion cannot move to display another portion of the maze thereby letting the other players move their characters into said other portion of the maze until said first player chooses to move his character so as to allow the window portion to both display said other portion of said maze as well as all active characters within the perimeter of said window portion.

9. The apparatus of claim 4 wherein said fourth means includes means to independently calculate said longevity attribute data for each character based at least upon events which happen in the game to each character and wherein said events may include the receipt of new coins for a character, said fourth means also responding to the receipt of new coins for a particular character by increasing that character's longevity attribute.

10. The apparatus of claim 9 further comprising means in said software means for reading each player inputs from said controls indicating that the player desires, the character being controlled to take possession of a limited resource displayed on said video display and to cause said video display to depict a scene wherein said character appears to have taken possession of the limited resource and for causing said attribute data defining the ability to fight and to move for the character taking possession of said limited resource to be altered upon appearing to gain possession of one or more of said limited resources and further comprising means in said software means for establishing multiple levels of maze between which the characters may move.

11. The apparatus of claim 9 further comprising means for independently changing the stored data defining the attributes of each character based upon events which happen to each character and actions taken by each character during the game.

12. The apparatus of claim 9 wherein said software means drives said video display to display at least one maze occupied with entities including said monsters and includes means for altering the longevity data associated with characters attacked by said monsters by shortening the longevity attributes of any character which is affected by any said attribute-affecting entity, and further comprising means in said software means for driving said video display in such a way as to encourage the players which are active in the game to move their characters so as to cooperate with each other to avoid the effect of said displayed attribute-affecting entities in attempting to get to move their characters to an area in said displayed maze where said resources which increase longevity are displayed, but for allowing each player to independently attempt to move his or her character through said displayed maze and avoid the effect of said attribute-affecting entities in an effort to first obtain possession of said resource where possession occurs when the player moves his or her character on the display so to enter an area around the displayed location of said resource.

13. An apparatus as defined in claim 12 further comprising means for displaying at least one exit door and at least one key in said maze for unlocking said exit door.

14. The apparatus of claim 13 further comprising means for allowing each player to control his character to either cooperate or compete with the other characters in performing actions in the game including, for example, defeating monsters, obtaining possession of limited resources or moving through the maze independently of the actions of the other players in controlling their characters to either cooperate or compete with the other active characters.

15. A video game comprising:

control means including one set of controls for each of a plurality of characters for generating signals in response to player manipulation of said controls;

means for displaying a maze, limited resources in said maze and the movements and actions of a plurality of characters in a maze;

movement means for receiving player inputs from said control means and for causing said display means to display said maze, limited resources in said maze and one or more characters in said maze, each said character with different attributes in terms of ability to move, shoot and otherwise fight in said maze and for independently calculating a longevity attribute and recording same in the form of stored longevity data for each character which decreases with time and decreases with damage from entities and increases with obtaining possession of said limited resources where obtaining possession of a limited resource means moving a character into an area including said limited resource within its perimeter and for causing said display means to stop displaying movement and actions by each said character when said longevity attribute for that character reaches zero, and for causing each said character to move in said maze displayed on said means for displaying in response to player input from a corresponding set of said controls, and including means for controlling said means for displaying to display only a window portion of said maze related to the positions of all the characters in said maze, and for restricting movement on said display means of each said character to the bounds of said window portion as determined by the positions of all said characters;

coin accepting means corresponding to each said character and coupled to said movement means for the corresponding character for accepting coins which bring the corresponding character to life by increasing its longevity in the game and allowing said movement means to move said character on said display means in response to player inputs on the corresponding set of controls;

first means in said movement means and coupled to said control means for responding to a plurality of players each having his or her own controls so that each player may independently, simultaneously control the movements and actions of at least one of said plurality of characters in the video game each of which has a longevity attribute independently calculated for that character based upon at least the events which happen in the game affecting that character and for responding to any player who wishes to join the game and control an unused character at any time regardless of when the game started or to leave the game when the player's character's longevity attribute decreases to zero or at any other time;

maze means in said movement means for driving said display means to display said maze through which said characters move and in which are displayed said limited resources in quantities and locations determined by said maze means which affect at least the longevity attribute of any character having said limited resources in its possession, and further driving said display means to display a plurality of different types of entities in said maze which shorten the longevity attributes of said characters if not avoided by said characters; and second means in said movement means for driving said display means in a limited fashion such that players whose characters have non zero longevity attributes in the game may either cooperate or compete in avoiding said entities to reach the area of said maze where said limited resources are displayed including means for causing possession of the same type of limited resource to affect the attributes of different characters differently, and means for allowing any character to appear on said video display to push any other character to change that character's position on said display means to move said character in said maze against the wishes of the player whose character has been pushed.

16. The apparatus of claim 15 further comprising means in said second means for driving said display means in a limited fashion such that said players are encouraged to manipulate their characters so as to cooperate for the good of the group of characters to defeat the entities in said maze until they reach the area of any one or more of said limited resources, but to drive the display means in such a manner as to allow the players to independently decide to manipulate their characters so as to either cooperate or compete with each other to obtain possession of said limited resources when the manipulated character group successfully reaches the location of said limited resources including means for allowing any player's character to destroy the limited resources sought by another character by appearing to shoot said limited resources where said movement means maintains stored data defining the attributes and location of said limited resources and where the movement means includes means to modify the attribute data of any limited resources which have been shot by a character to alter the limited resources in some way such as by remvoing said limited resources from the displayed maze, and means in said movement means for shortening the longevity on said display means of any character which appears to have been shot or otherwise attacked by any other character by altering stored longevity data defining the longevity attribute corresponding to the character which appears to have been shot or otherwise attacked.

17. The apparatus of claim 15 further comprising means for allowing any player to enter an unused character in the game or withdraw a character controlled by a player at that time from the game independently of when the game started, and independently of how many other characters are in the game and further comprising means for allowing any character to independently stay in the game as other characters are placed in or withdrawn from the game.

18. A video game subsystem for providing a facility for game play of a video game involving multiple displayed characters each of which has a set of attributes and each of which may be separately controlled by one of a plurality of players and each of which has a separate longevity attribute in said game defined by corresponding longevity data, comprising:

a computer system including a plurality of control sets each of which corresponds to one of said characters, a display and a plurality of coin receiving mechanisms each of which corresponds to one of said plurality of characters, each of said plurality of control sets, said display and said plurality of coin receiving mechanisms being coupled to a CPU;

software means controlling said CPU for reading player control inputs from said control sets and from said plurality of coin receiving mechanisms and for driving said display to control said game play by displaying a maze and said characters and by moving said characters through said maze and by changing the appropriate longevity data stored for each said character including the following elements:

first means for responding to the control inputs from said plurality of control sets where each said control set is manipulated by one of a plurality of players and where each said player has a separate control set, and for responding to control inputs generated by dropping a coin into any of said plurality of coin receiving mechanisms by altering stored longevity data corresponding to the character assigned to the coin receiving mechanism in which said coin was dropped, said first means also for driving said display so that each said player may appear to bring a character to life on said display so as to respond to player control commands entered via the corresponding one of said control sets by dropping a coin into a coin receiving mechanism corresponding to the character to be controlled by said player, said first means also for responding to said control inputs from said control sets and from said coin receiving mechanisms so that each player may independently and simultaneously control the displayed movements and actions of a character in said video game and for driving said display such that each said character is displayed as having a plurality of different attributes defining the ability of each said character to move through, fight and shoot in said maze and for separately calculating a longevity attribute for each character based upon at least the events which happen affecting that character in the game and automatically decreasing over time and for appropriately altering said stored longevity data in accordance with said calculation, and for driving said display means so as to display actions by said character only so long as said longevity attribute is satisfying a predetermined criterion;

maze means for driving said display means so as to display a maze through which said characters move and in which are displayed one or more limited resources which affect the displayed attributes of any character having a sought after one of said limited resources in its possession where possession is defined as movement of a character into an area of the display wherein said sought after one of said limited resources is displayed, and for driving said display means such that possession of said sought after one of said limited resources appears to affect the attributes of different characters differently, and for further driving said display to show entities in said maze which shorten the longevity attributes of said characters if not avoided by said characters; and means for driving said display means in such a fashion that the characters displayed are encouraged to cooperate to maximize their longevity attribute to move through the maze until they reach the area of any of said limited resources, said encouragement including driving said display to display only a window portion of said maze, which portion is related to the positions of all the characters, while not allowing any character to move outside the bounds of said window portion, but for driving said display in such a manner as to allow said characters to either cooperate or compete with each other to obtain possession of any of said limited resources by driving said display so as to allow any character to shoot and destroy said limited resources or shoot any other character when the characters collectively move so that said window portion can be moved so as to allow the limited resource being sought to be displayed in said window portion thereby allowing any of said characters to individually reach the area of said maze displayed in said window portion where said limited resource being sought is displayed;

means for driving said display so as to establish different attributes for each character defining each character's characteristics and abilities to move and fight in said maze when manipulated by the player;

means for independently changing the attributes of each character on said display based upon events which happen to each character and actions taken by each character during the game; and means for driving said display for allowing any player to enter an unused character in the game being displayed or withdraw a player controlled character from the game independently of when the game started, and independently of how many other characters are in the game, and to allow any player to independently stay in the game as other characters are placed in or are withdrawn from the game as long as the player's character still has a longevity attribute which satisfies a predetermined criteria.

19. A video game subsystem for providing a facility to display video game action by a plurality of characters each of which has a changeable longevity attribute which determines how long that character may be manipulated by a player to perform action on a displayed playfield having one or more limited resources displayed thereon comprising:

means for displaying said playfield having resources thereon, the quantities and locations of which are automatically predetermined by said means for displaying;

multiple control means each corresponding to a particular character and each allowing any player manipulating said control means to control the movements and actions of the corresponding character, each said control means for allowing a player manipulating said control means to control the movements and actions of a corresponding character on said display;

means for driving said display means so as to allow each of a plurality of players to join the game and to appear to bring one of a plurality of characters selected by the player to life on said display means at any time by providing a predetermined control input thereby allowing control of the corresponding selected character on said display means, each of said characters having different attributes on said display means including a longevity attribute which decreases automatically with time, and said means for driving also for responding to player inputs from one of said control means by controlling the character corresponding to said control means on said display means simultaneously with control of other characters by other players through manipulation of their respective control means;

means for limiting said display means so that it displays only a portion of said playfield at any particular time in a window and for causing said display means to move the window across the playfield in response to the movements of said characters; and means for driving said display means so as to force all the currently player controlled characters with non zero longevity attributes to remain visible in said window all the time when said game is played and only allowing a character to obtain one or more of said limited resources if a sought after one of said limited resources is showing in said window and for causing the attributes of the first character obtaining the resource to be affected by obtaining possession thereof.

20. A video game subsystem including a display comprising:

first means for allowing a plurality of players to simultaneously and independently control the movements and actions of a plurality of characters each of which has one or more attributes defining said character in a maze in said video game;

second means for allowing any one of said plurality of players to enter the game at any time and to simultaneously and independently control the movements and actions of one of said characters independently of when the other players started playing or when any other said player or players stop playing;

third means for forcing the players to cooperate during play by not allowing any character to move outside a window portion of said maze and by allowing the window to move only in response to the collective positions of all the players, and for providing a facility by which any player may manipulate his or her character to appear to move any other player's character by appearing to push said other player's character on the display and for providing a facility by which a first player's character may appear to damage the character of another player by appearing to shoot and other character on said display, said third means also for causing said display to display one or more limited resources in said maze which alter the attributes of any said character having one or more of said limited resources in the possession of said character, where possession occurs when said character is moved on said display into an area on said display containing one or more of said limited resources, but said third means allowing any said character to take possession of a limited resource only when the sought after limited resource is visible in said window portion; and coin accepting means for receiving coins for each character in the game and for adding longevity to any character for which coins are received in proportion to the amount of money received.

21. A method of operating a video game having a display and controls comprising the steps of:

displaying a playfield containing different kinds of monsters and one or more characters having attributes including a longevity attribute which characters may be moved on said playfield by players manipulating said controls and displaying predetermined amounts of different limited resources on said playfield;

limiting the displayed portion of the playfield in accordance with the collective positions of all said characters which are active in that they have longevity attributes which allow said characters to be moved on said playfield by said players by manipulation of said controls, said limitation of the displayed portion of the playfield being such that all the characters must be visible at all times in the displayed portion of said playfield;

reading control inputs from multiple control mechanisms and controlling the movements and actions of said multiple characters each of which has different attributes including the ability to fight and move and each of which responds to control inputs from a corresponding set of control mechanisms;

reading start data from multiple start mechanisms at the beginning of said game and during said game so as to allow new players to join the game at any time and begin controlling an unused character; and forcing the players to cooperate during play of the game by limiting the life of each character by decreasing said longevity attribute automatically over time or when the character is damaged by said monsters and by allowing a character to increase its longevity attribute by taking possession of predetermined types of said limited resources where taking possession of any said limited resource is accomplished when a character enters the area on said display where said limited resource is displayed, but only allowing a character to take such possession of a limited resource when the limited resource is showing in the window of said playfield which is currently displayed based upon the collective positions of all the active characters and by not allowing any active character to move to a position on said playfield outside the bounds of the currently displayed portion.

* * * * *